(12) United States Patent
Biggerstaff

(10) Patent No.: US 6,745,384 B1
(45) Date of Patent: Jun. 1, 2004

(54) ANTICIPATORY OPTIMIZATION WITH COMPOSITE FOLDING

(75) Inventor: Ted J. Biggerstaff, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 351 days.

(21) Appl. No.: 09/667,958

(22) Filed: Sep. 21, 2000

Related U.S. Application Data

(63) Continuation of application No. 09/087,431, filed on May 29, 1998, now abandoned.

(51) Int. Cl.[7] .............................................. G06F 9/45
(52) U.S. Cl. ..................... 717/156; 717/155; 717/152; 717/136; 717/140; 717/151; 709/100; 712/203; 712/209; 712/212
(58) Field of Search ................................ 717/110, 140, 717/139, 150, 154, 160, 146, 136, 137, 161, 151, 100, 155, 156, 157; 709/100; 712/203, 209, 212

(56) References Cited

U.S. PATENT DOCUMENTS

| | | | | |
|---|---|---|---|---|
| 5,148,513 A | | 9/1992 | Koza et al. ................... 706/13 |
| 5,161,216 A | * | 11/1992 | Reps et al. .................. 717/151 |
| 5,175,843 A | | 12/1992 | Casavant et al. ........... 395/500 |
| 5,191,646 A | * | 3/1993 | Naito et al. ................. 345/853 |
| 5,193,190 A | * | 3/1993 | Janczyn et al. ............. 717/156 |
| 5,327,561 A | * | 7/1994 | Choi et al. .................. 717/157 |
| 5,343,554 A | | 8/1994 | Koza et al. ................... 706/13 |
| 5,408,603 A | * | 4/1995 | Van de Lavoir et al. ... 345/763 |
| 5,511,167 A | * | 4/1996 | Kawano et al. ............. 709/202 |
| 5,539,894 A | | 7/1996 | Webber ....................... 711/128 |
| 5,577,233 A | | 11/1996 | Goettelmann et al. ...... 395/500 |

(List continued on next page.)

OTHER PUBLICATIONS

Title: A Practical and Flexible Flow Analysis for High-Order Languages, author: Ashley, ACM, 1996.*
Title: Global Tagging Optimization by Type Inference, author: Henglein, ACM, 1992.*
Title: Generation and Quantitative Evaluation of Dataflow Clusters, author: Roh et al, ACM, 1993.*
Title: Untagged Data in Tagged Environment: Choosing Optimal Representations at Compile Time, author: Peterson, ACM, 1989.*
Title: Efficient Optimization of Simple Chase Join Expression, Author: Atzeni, ACM, 1989.*

(List continued on next page.)

Primary Examiner—Chameli Chaudhuri Das
(74) Attorney, Agent, or Firm—Ipsolon LLP

(57) ABSTRACT

A method and system for anticipatory optimization of computer programs. The system generates code for a program that is specified using programming-language-defined computational constructs and user-defined, domain-specific computational constructs, the computational constructs including high-level operands that are domain-specific composites of low-level computational constructs. The system generates an abstract syntax tree (AST) representation of the program in a loop merging process. The AST has nodes representing the computational constructs of the program and abstract optimization tags for folding of the composites. A composite folding process is applied to the AST according to the optimization tags to generate optimized code for the program. The composite folding process includes identifying an optimization event, identifying each abstract optimization tag applied to the programming-language-defined computational constructs and having a transformation condition identifying the optimization event as a condition for attempting an anticipated optimization in the translation, and attempting execution of each of the anticipated optimization transformations associated with the optimization event.

72 Claims, 70 Drawing Sheets

U.S. PATENT DOCUMENTS

| | | | | | |
|---|---|---|---|---|---|
| 5,802,373 | A | * | 9/1998 | Yates et al. | 717/139 |
| 5,805,895 | A | * | 9/1998 | Breternitz, Jr. et al. | 717/160 |
| 5,812,850 | A | * | 9/1998 | Wimble | 717/131 |
| 5,852,734 | A | | 12/1998 | Komatsu et al. | 395/707 |
| 5,911,072 | A | | 6/1999 | Simonyi | 395/701 |
| 5,930,509 | A | * | 7/1999 | Yates et al. | 717/159 |
| 6,097,888 | A | * | 8/2000 | Simonyi | 717/144 |
| 6,226,789 | B1 | * | 5/2001 | Tye et al. | 717/138 |
| 6,253,373 | B1 | * | 6/2001 | Peri | 717/150 |
| 6,314,562 | B1 | * | 11/2001 | Biggerstaff | 717/156 |
| 6,397,379 | B1 | * | 5/2002 | Yates, Jr. et al. | 717/140 |
| 6,427,234 | B1 | * | 7/2002 | Chambers et al. | 717/140 |
| 6,502,237 | B1 | * | 12/2002 | Yates et al. | 717/136 |
| 6,535,903 | B2 | * | 3/2003 | Yates et al. | 718/100 |
| 6,625,797 | B1 | * | 9/2003 | Edwards et al. | 716/18 |
| 6,651,247 | B1 | * | 11/2003 | Srinivasan | 717/161 |

OTHER PUBLICATIONS

Title: Compiler Transformations for High Performance Computing, author: Bacon, ACM, 1994.*

L. J. Guibas and D. K. Wyatt, *Compilation and Delayed Evaluation in Apl,* Fifth ACM Symposium Principles of Programming Languages, pp. 1–8, 1978.

David F. Bacon, Susan L. Graham, and Oliver J. Sharp, *Compiler Transformations for High–Performance Computing,* ACM Surveys, vol. 26, No. 4, pp. 345–420, Dec., 1994.

Philip Wadler, "Deforestation: Transforming Programs to Eliminate Trees," Journal of Theoretical Computer Science, pp. 231–248, Jun., 1990.

Gregor Kiczales, John Lamping, Anurag Mendhekar, Chris Maede, Cristina Lopes, Jean–Marc Loingtier and John Irwin, *Aspect Oriented Programming,* Tech. Report SPL97–08 P9710042, Xerox PARC, 1997.

James M. Neighbors, *The Draco Approach to Constructing Software from Reusable Components,* Workshop on Reusability in Programming, Newport, RI , pp. 167–178, 1983.

James M. Neighbors, Draco: A Method for Engineering Reusable Software Systems. In Ted J. Biggerstaff and Alan Perlis (Eds.), Software Reusability, Addison–Wesley/ACM Press, pp. 295–319, 1989.

Dz–ching Ju, Chuan–lin Wu, and Paul Carini, *The Synthesis of Array Functions and its Use un Parallel Computation,* 1992 International Conference on Parallel Processing, pp. II–293–II–296, 1992.

Gwan–Hwan Hwang, Jeng Kuen Lee, and Dz–ching Ju, *An Array Operation Synthesis Scheme to Optimize Fortran 90 Programs,* SIGPLAN Notices Conference, vol. 30, No. 8, pp. 112–122, Aug., 1995.

Batory et al, *Scalable Software Libraries,* Proceedings of ACM SIGSOFT '93, pp. 1–9, Dec., 1993.

* cited by examiner-

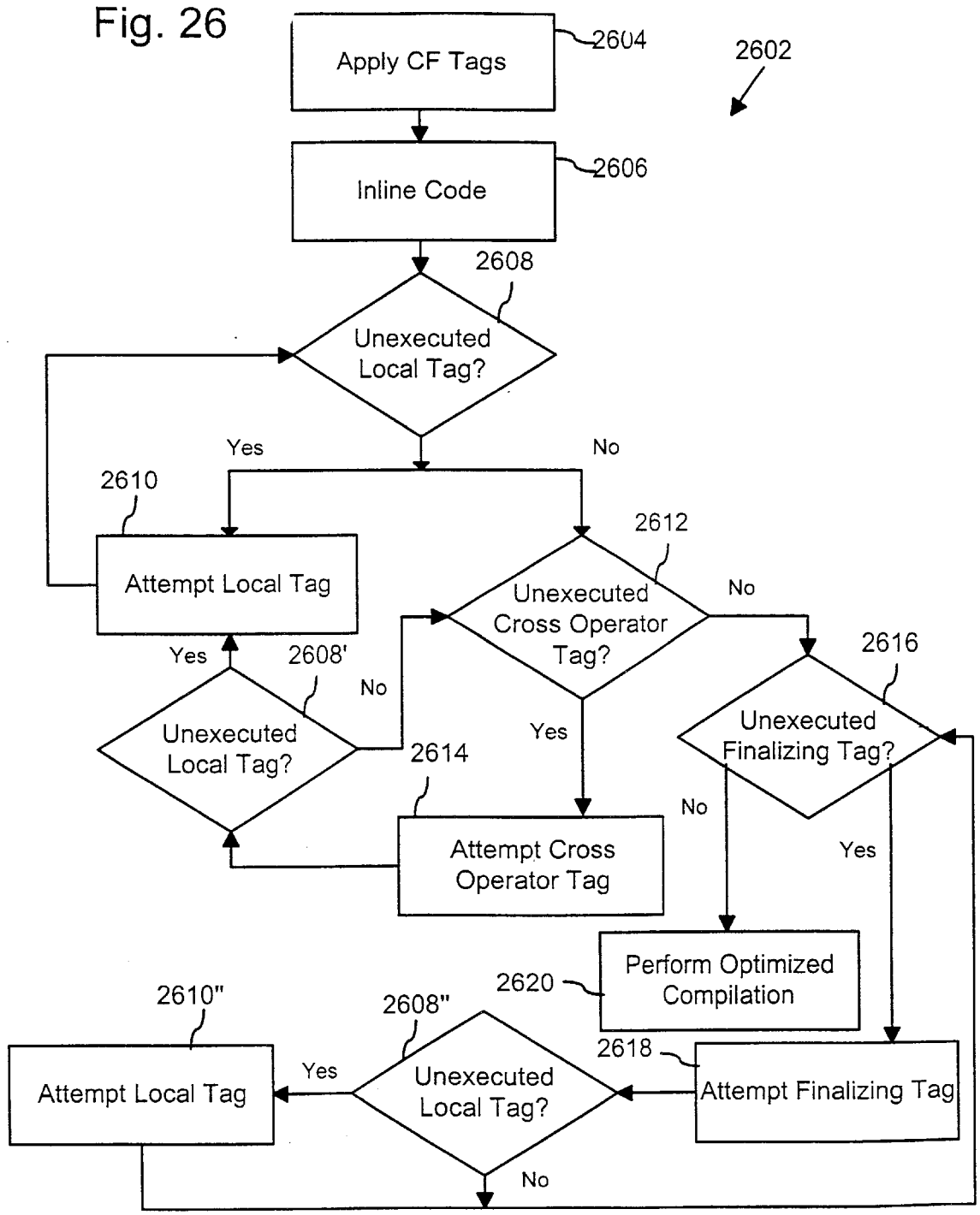

Fig. 27

(a[i,j] ⊕ s) ⟹ {Σp,q (p ∈ pRange.s )
                    (q ∈ qRange.s ) :
{a[row.s(i,j, m, n, p,q),col.s(i,j, m,n,p,q)] *
        w.s(i,j,m,n,p,q) }}

(_ON CFWRAPUPEND
    (_UNWRAPIFSMALLCONSTANT p |pRANGE|)
(_ON CFWRAPUPEND
    (_UNWRAPIFSMALLCONSTANT q |qRANGE|)

2710, 2712 row.s (fi,fj,fm,fn,fp,fq) ⟹ ( fi + fp)
col.s (fi,fj,fm,fn,fp,fq) ⟹ ( fj + fq)
pRange.s (fi,fj,fm,fn,fp,fq) ⟹ [-1:1]
qRange.s (fi,fj,fm,fn,fp,fq) ⟹ [-1:1]

(_ON CFWRAPUP (_MERGECOMMONCONDITION))

(_ON SUBSTITUTIONOFME
    (_PROMOTECONDITIONABOVELOOP FP FQ))

(_ON SUBSTITUTIONOFME (_FOLD0))

(_ON SUBSTITUTIONOFME
    (_REMOVEUNDEFINED))

2708

2702

2704

2706 w.s(fi,fj,fm,fn,fp,fq) ⟹
{if (((fi == 0)||(fj == 0)||(fi == (fm - 1) || (fj == (fn -1)))
    then 0;
    else {if (((fp != 0) && (fq != 0)) then fq;
        else {if ((( = fp 0) && (fq != 0)) then (2 * fq);
            else *undefined* }}}

Fig. 33

```
{for (i=0; i<m; i++)
  {for (j=0; j<n; j++)
    {{{if ((i == 0) || (j == 0) (i == (m - 1)) || (j == (n - 1)))
      then {b[i,j] = 0 ; }
      else { t1= { (a[(i + 1) , (j + 1)] - a[(i + 1) , (j -1)] +
                   (a[i , (j + 1)] * 2) - (a[i , (j -1)] * 2) +
                   a[(i -1) , (j + 1)] - a[(i -1) , (j -1)]) }
             t2 = { (a[(i + 1) , (j + 1)] + (a[(i + 1) , j] * 2) +
                    a[(i + 1) , (j -1)] - a[(i -1) , (j + 1)] -
                    (a[(i -1) , j] * 2)  - a[(i -1) , (j -1)] ) }
             b[i,j] = sqrt(t1*t1 + t2*t2);}}}}}
```

(_PromoteAboveLoop J (ConstantExpressionOf I))
(_PromoteToTopOfLoop J (ConstantExpressionOf J))

Fig. 34

```
INT JM1, JP1, IM1, IP1;
FOR (I=0; I < M ; I++)
  { IM1=I-1; IP1= I+1;
    FOR (J=0; J < N ; J++)
      { JM1= J-1; JP1 = J+1;
        IF(I==0 || J==0 || (I==M - 1) || (J==N - 1))
          THEN {B[I, J] = 0 ; }
          ELSE {
            T1 = A[IP1 , JP1] - A[IP1 , JM1] +
                 (A[I , JP1] * 2) - (A[I , JM1] * 2) +
                 A[IM1 , JP1] - A[IM1 , JM1];

T2 = A[IP1 , JP1] + (A[IP1 , J] * 2) +
                 A[IP1 , JM1] - A[IM1 , JP1] -
                 (A[IM1 , J] * 2) - A[IM1 , JM1];

B[I, J] = SQRT(T1*T1 + T2*T2);
          }}}
```

Fig. 35

```
for (i=0; i < m ; i++)
 {for (j=0; j < n ; j++)
    {t1 = (a[i,j] ⊕ s);
     t2 = (a[i,j] ⊕ s');
     b[i,j] = sqrt(t1*t1 + t2*t2);}}
```

3502 (_CF, _MMX)

3504 (_PromoteAboveLoop J (ConstantExpressionOf I))
(_PromoteToTopOfLoop J (ConstantExpressionOf J))

Fig. 37

{∀i, j (i ∈ [0:(m-1)]) (j ∈ [0:(n-1)]) :
{{if ((i == 0) || (j == 0) (i == (m - 1)) || (j == (n - 1)))
then {b[i,j] = 0 ; }
else {t1 = {Σp,q (p ∈ [-1:1] ) (q ∈ [-1:1] ) :
{a[( i + p) , (j + q) ] *
if((p != 0) && (q != 0)) then q;
else {if ((p == 0) && (q != 0))
then (2 * q);
else nil }}} t2 = {Σp,q (p ∈ [-1:1] ) (q ∈ [-1:1] ) :
{a[( i + p) , (j + q) ] *
if ((p != 0) && (q != 0)) then p;
else {if ((p != 0) && (q == 0))
then (2 * p);
else nil }}} b[i,j] = sqrt(t1*t1 + t2*t2);}}}

(_ON SUBSTITUTIONOFME
(_MAPTOARRAY))  — 3606

Fig. 38

(UNWRAP)

3802

```
{∀i,j (i ∈ [0:(m-1)]) (j ∈ [0:(n-1)]) :
  {int s[(-1:1),-1:1] = ∀p,q (p ∈ [-1:1]) (q ∈ [-1:1]) :
    if ((p != 0) && (q != 0)) then q;
      else {if ((p == 0) && (q != 0)) then q;
        then (2 * q); else 0; }}
  {int s'[(-1:1),-1:1] = ∀p,q (p ∈ [-1:1]) (q ∈ [-1:1]) :
    if ((p != 0) && (q != 0)) then p;
      else {if ((p != 0) && (q == 0))
        then (2 * p); else 0 }}
  {if (((i == 0) || (j == 0) (i == (m - 1)) || (j == (n - 1)))
    then {b[i,j] = 0 ; }
    else {t1= {Σp,q (p ∈ [-1:1]) (q ∈ [-1:1]) : a[(i + p), (j + q)] * s[p,q] }
      t2 = {Σp,q (p ∈ [-1:1]) (q ∈ [-1:1]) : a[(i + p), (j + q)] * s'[p,q] }
      b[i,j] = sqrt(t1*t1 + t2*t2); }}}
```

Fig. 39

(_ON CFWRAPUPEND(0) (_SPLITLOOPONCASES))

3610

{int s[(-1:1), (-1:1)] = {{-1, 0, 1}, {-2, 0, 2}, {-1, 0, 1}};
{int s'[(-1:1), (-1:1)] = {{-1, -2, -1}, {0, 0, 0}, {-1, -2, -1}};
{∀i, j (i ∈ [0:(m-1)]) ( j ∈ [0:(n-1)]) :
 {if ((i == 0) || (j == 0) (i == (m - 1)) || (j == (n - 1)))
  then {b[i,j] = 0 ; }
  else {t1 = {Σp,q (p ∈ [-1:1] ) (q ∈ [-1:1] ) : a[( i + p), (j + q) ] * s[p,q] }
        t2 = {Σp,q (p ∈ [-1:1] ) (q ∈ [-1:1] ) : a[( i + p), (j + q) ] * s'[p,q] }
        b[i,j] = sqrt(t1*t1 + t2*t2); }}}

Fig. 41

```
{int s[(-1:1), (-1:1)]] = {{-1, 0, 1}, {-2, 0, 2}, {-1, 0, 1}};
{int s' [(-1:1), (-1:1)]] = {{-1, -2, -1}, {0, 0, 0}, {-1, -2, -1}};
{∀j ( j ∈ Range [0,(n-1)] ) : b[0, j] = 0 }
{∀i ( i ∈ Range [0,(m-1)]] : b[i, 0] = 0 }
{∀j ( j ∈ Range [0, (n-1)] ) : b[(m-1), j] = 0 }
{∀i ( i ∈ Range [0,(m-1)]] : b[i, (n-1)] = 0 }
{∀i, j (i ∈ Range [1,(m-2)]) ( j ∈ Range [1,(n-2)] ) :
    {t1= {∑p,q (p ∈ [-1:1] ) (q ∈ [-1:1]) : a[(i + p), (j + q) ] * s[p, q] }
     t2 = {∑p,q (p ∈ [-1:1] ) (q ∈ [-1:1]) : a[(i + p), (j + q) ] * s'[p, q] }
     b[i,j] = sqrt(t1*t1 + t2*t2);}}
```

(_ON CFWRAPUPEND(1) (_MMXLOOP))

3612

ANTICIPATORY OPTIMIZATION WITH COMPOSITE FOLDING

This is a continuation of application Ser. No. 09/087,431, filed May 29, 1998 now abandoned.

TECHNICAL FIELD

The present invention relates generally to a computer method and system for generating a computer program and, more specifically, to a computer method and system for optimizing a computer program.

BACKGROUND OF THE INVENTION

Computer programs are generally written in a high-level programming language (e.g., Pascal and C). A compiler is then used to translate the instructions of the high-level programming language into machine instructions, which can be executed by a computer. The use of high-level programming languages results in dramatically increased program development productivity as compared to programming in either an assembly language or machine language. The increase in program development productivity results from allowing a programmer to use high-level computational constructs rather than low-level computational constructs. Since certain high-level computational constructs (e.g., Fast Fourier Transform) may translate into hundreds of low-level computational constructs, some of the increase in productivity arises directly from the ratio of high-level to low-level computational constructs. A programmer can more quickly specify one high-level computational construct rather than hundreds of low-level computational constructs. Also, a programmer can typically debug a computer program expressed with high-level computational constructs more quickly than the equivalent computer program expressed with low-level computational constructs. The productivity also increases because the intent of the programmer is generally more readily apparent when the computer program is expressed with high-level computational constructs. The identification of the programmer's intent is especially useful to another programmer who later modifies the computer program.

Unfortunately, the code compiled from a computer program developed in a high-level programming language can be much less efficient than the code generated from an equivalent computer program expressed in a low-level programming language. The efficiency of code manually written with low-level computational constructs may result, for example, because some or many of the low-level operations compiled from different high-level operations may be shared so that the compiled low-level operations can be rewoven into different sequences of low-level operations to implement the different high-level operations. Such code reweaving and sharing is, however, very difficult to automate once the high-level operations are compiled into segments of low-level operations. Some of the analyses required to accomplish such reweaving can require deep inferences about the low-level operations that for large segments of compiled code in the context of large programs could take years to complete using an automated reasoning system. On the other hand, a human programmer, given enough time, can always develop code using low-level computational constructs to be as efficient as code compiled from a computer program developed in a high-level programming language. Moreover, the programmer may be able to optimize a computer program developed using low-level computational constructs in ways that are not currently available to a compiler or a post-compilation optimizer. For example, current compilation techniques often generate highly inefficient code to access high-level composite data structures, such as a matrix. Operations on a matrix typically require iterative code (i.e., looping code) that selects and processes each one of the elements of the matrix in each step of the iteration. If several high-level operations on a matrix are combined into single statement and each operation requires selecting and processing each element, the compiled code is likely to include multiple "for" loops that each include a nested "for" loops. For example, to double the value of each element of a matrix and then add the resulting values to the values of the elements of another matrix, the programmer may specify the following statement using high-level computational constructs:

$$A=B+(2*C)$$

where A, B, and C are matrices. When a compiler generates code for this high-level statement, the compiler may generate nested "for" loops to select the element at each row and each column of the C matrix, to multiply the value of the selected element by 2, and to store the doubled values in a temporary matrix. The compiler also generates nested "for" loops to select the element at each row and column of the temporary matrix, to add that value to the value of the corresponding element of the B matrix and to store the sum in another temporary matrix. The compiler generates a third set of nested "for" loops to select the element at each row and column of the temporary matrix and to store the value of that element into the A matrix. The resulting code may be:

```
for i=1,m
   for j=1,n
      temp[i,j]=2*C[i,j]
for i=1,m
   for j=1,n
      temp[i,j]=B[i,j]+temp[i,j]
for i=1,m
   for j=1,n
      A[i,j]=temp[i,j]
```

A programmer, however, using a low-level language would combine these three sets of nested "for" loops into a single set of nested "for" loops. The resulting programmer optimized code would be:

```
for i=1,m
   for j=1,n
      A[i,j]=B[i,j]+(2*C[i,j])
```

Although program optimizers have been developed that attempt to coalesce loops, the optimization techniques generally do a poor job in identifying those portions of the compiled code that lend themselves to coalescing.

If a programming language has high-level computational constructs built into the language, then various optimization techniques can be also built in. For example, since the computational construct "matrix," which is a composite of low-level computational constructs such as integers and integer operations, is built directly into the programming language APL, the loop optimizations described above are easily accomplished by APL. APL compilers can and do use the built-in knowledge of the semantics of matrices and their operations to anticipate the looping inefficiencies and compile directly to the optimized code for known patterns and combinations of high-level operators and high-level composite operands. If, however, such high-level computational constructs are not built into an existing programming language, then they need to be added as extensions to the existing programming language or defined by the programmer. In both cases, the extensions and their optimizations cannot be added to the existing language framework by simply defining the new constructs and their optimizations in terms of existing constructs. These extensions and their optimizations cannot be added primarily because conventional programming languages provide no constructs for expressing how to reweave definitions of high-level operators and data structures for optimizable combinations of those operators and data structures. Of course, the programmer can define to the compiler high-level composite data structures like images, for example, in terms of matrix-like data structures composed with other data structures (e.g., C like structs) that are native to the target compiler (e.g., C). Further, the programmer can define how each individual composite data structure and their operators are to be compiled individually (e.g., the "*" operator used in the context of "(constant*matrix)" type expression should compile into two nested loops over the matrix). However, the programmer has no way to tell the compiler how to reweave the code of several such individual definitions composed together in an expression in order to share the low-level operations for the particular composition.

It would be desirable to have a general method for a programmer to define such optimization rules for reweaving the definitions of high-level (i.e., composite) data structures and their operators when the multiple high-level operators and their high-level data structures are used together in optimizable patterns or combinations. It would further be desirable that the optimization method behave like a compiler definition generated on-demand for some specific combination of operators and operands that directly compiles the rewoven, optimized low-level code without ever producing the separate segments of uncombined low-level code for each definition of the individual high-level operators and operands.

SUMMARY OF THE INVENTION

The present invention provides an Anticipatory Optimization method and system for programmer-defined optimization rules that can be applied when generating a low-level implementation of, computer program from a high-level implementation of a computer program. The system provides a mechanism for user-defined transforms for annotating the high-level implementation of the computer program with optimization tags; for redefining those high-level operators, operands, and tags; and for combining those high-level operators, operands, and tags such that the individual low-level operations eventually compiled for each of the high-level operators and operands are shared so as to improve performance. The optimization tags indicate optimizations that may be applicable when generating the low-level implementation of the computer program. For each high-level computational construct of the high-level implementation of the computer program, the system applies those transforms that are applicable to the high-level computational construct so that annotations indicating various optimizations can be added to the high-level computation construct. The system then generates the low-level implementation in accordance with the indicated optimizations.

In one embodiment, the high-level computational constructs are user-defined, domain-specific computational constructs and the low-level computational constructs are programming-language-defined computational constructs, the computational constructs including high-level operands that are domain-specific composites of low-level computational constructs. An abstract syntax tree. (AST) representation of the program is generated and, with respect to the AST, loop merging is performed on the program followed by a kind of program reorganization called "composite folding.

The AST includes nodes that represent computational constructs within the program and abstract optimization tags that are used for various optimization purposes, such as storing optimization state information or indicating deferred program transformations that are used to generate an optimized version of the AST. For each AST pattern of user-defined, domain-specific computational constructs, the system determines whether a user-defined, domain-specific transform has, been defined for the pattern. A transform transforms a portion of the AST relating to the pattern of user-defined, domain-specific computational constructs into one or more programming-language-defined computational constructs. When a domain-specific transform has been defined for the pattern of computational constructs, the system transforms the AST in accordance with the domain-specific transform. The transformed AST is in a form that reflects an optimization of the programming-language-defined computational constructs based on the domain-specific computational constructs.

In the phase of optimization following loop merging, a composite folding process is applied to the AST according to the optimization tags to generate optimized code for the program. The composite folding process includes identifying an optimization event, identifying each abstract optimization tag applied to the programming-language-defined or remaining domain specific computational constructs and having a transformation condition identifying the optimization event as a condition for attempting an anticipated optimization in the translation, and attempting execution of each of the anticipated optimization transformations associated with the optimization event.

BRIEF DESCRIPTION OF THE DRAWINGS

FIG. 26 is a flow diagram of a composite folding process.

FIG. 27 illustrates exemplary tags on an inlined method.

FIG. 33 illustrates the state of the example expression just after a composite folding transformation is completed.

FIG. 34 illustrates the final form of code generated for a conventional single CPU machine.

FIG. 35 illustrates exemplary parallel processing optimization planning or composite folding tags that are incorporated into the loop-merged AST of FIG. 21D for parallel or vector processing.

FIG. 37 shows the result of the operation of selected tags.

FIG. 38 shows the result of initial operation of a selected tag.

FIG. 39 shows the result of the optimization identified by a selected tag.

FIG. 41 shows the resulting positions of selected tags.

DETAILED DESCRIPTION OF THE INVENTION

Figure 1A:
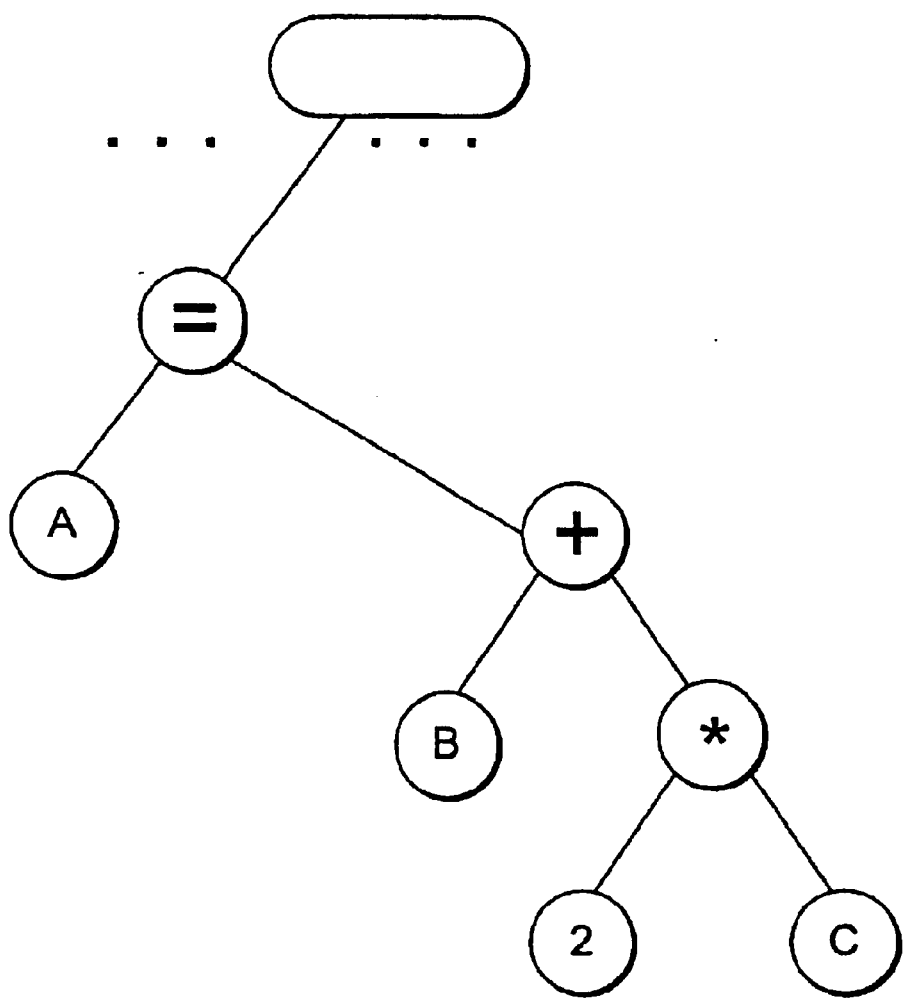
FIGS. 1A–1D illustrate the application of transforms to the portion of the AST representing the sample statement.

The present invention provides a method and system for anticipatory optimization (AO) of computer programs for compilation. With a computer program represented by an abstract composite expression of abstract operators and operands, the composite expression is transformed into a form that will compile directly into optimal code by using the semantics of the abstract operators and operands, thereby eliminating the need to perform expensive and possibly only partially successful analyses of the compiled code.

The AO method operates as follows: It performs multiple distinct recursive walks of the abstract syntax tree (AST). As it goes, individual transformations are triggered by the pattern of domain specific operators and operands at each subtree. These transformations may rewrite the tree (e.g., transform one abstraction such as an image into a simpler abstraction such as a pixel); add property tag adornments to the AST expressions—adornments that anticipate how those expressions might be implemented (e.g., an image might be implemented as an array of pixels); migrate the adornments about the tree; merge the adornments in ways that anticipate optimizations in the eventual implementation (e.g., sharing of loop prefixes), re-organize and inline function code; reorganize blocks of code for greater efficiency; merge blocks of code to share common parts (e.g., sharing condition checks in multiple if ... then ... else blocks); promote code not dependent on loop variables outside of loops; unwrap and peel loops so as to introduce opportunities for to other optimizations; and/or collapse a series of related arithmetic assignment statements into a single formula.

Overall, their are two major kinds of optimizations handled in two distinct phases of processing: 1) loop merging, and 2) composite folding. During loop merging various transformations alter the AST in a step by step manner that maps abstractions into programming constructs, anticipates implementation constructs for composites (e.g., loops), and migrates the anticipatory adornments up the AST merging them together (i.e., making anticipatory optimizations) based on the semantic nature of the operators and operands over which they migrate. In the course of this process, adornments specific to composite folding are added and the adornments specific to loop merging are enhanced with modifiers that anticipate optimizations that will be needed later during composite folding. Once this migration and merging for loop merging is complete, the optimized code for the loops is generated directly from the adorned domain specific expression. Then the composite folding phase operates on the body of the resultant loops to simplify, rewrite, reorganize and merge the implementation code for the individual domain specific operators and operands in the original domain specific expression.

LOOP MERGING PHASE OF AO

In a preferred embodiment, the anticipatory optimization ("AO") system performs a multi-phase processing of an abstract syntax tree ("AST") representation of a computer program that is expressed using high-level computational constructs. In one phase, the AO system identifies portions of the AST whose corresponding low-level computational constructs (e.g., machine instructions) may potentially be optimized. The AO system "anticipates" the optimizations by storing indications of various optimizations that are potentially applicable to portions of the AST. The AO system is developed with knowledge of the meaning of the high-level computational constructs and identifies the optimizations that are potentially applicable when translating to low-level computational constructs. In a subsequent phase, the AO system translates the high-level computational constructs into low-level computational constructs that are optimized in accordance with the anticipated optimizations.

The AO system is extensible in the sense that when new high-level computational constructs are defined, new optimizations can also be defined that apply to the newly defined high-level computational constructs without modifying the AO system. New high-level computational constructs may be defined using, for example, the Intentional Programming ("IP") system described in U.S. patent application Ser. No. 08/431,049, entitled "Method and System for Generating a Computer Program." According to the IP system, new high-level computational constructs can be defined by a programmer without modification to the IP system. For example, a new operator to multiply two matrices can be defined and used in programs without modification to the IP system. The IP system stores a computer program as a tree of operators and operands (i.e., an IP tree). The AO system allows a programmer to define various transforms for transforming an IP tree, and more generally an AST, into a tree that facilitates the implementation of various optimizations. A transform is a program module that inputs a portion of an AST, determines whether it should be applied to the portion, and, if so, effects its application. Once a tree representation of the program expressed using high-level computational constructs is generated, the AO system attempts to apply transforms to various portions of the tree. The transforms may modify portions of the tree or may add optimization tags to the tree to identify potential optimizations. The optimization tags are annotations that provide information derived from knowledge of the semantics and syntax of high-level computational constructs that may be useful when translating into low-level computational constructs. The optimization tags generally provide information that would be difficult for a post-compilation optimizer to derive.

The processing of a sample statement expressed using high-level computational constructs will help illustrate the functionality of the AO system. The sample statement expressed using high-level computational constructs is:

$A=B+(2*C)$

FIGS. 1A–1D illustrate the application of transforms to the portion of the, AST representing the sample statement. FIG. 1A illustrates the portion before application of any transforms. The operands A, B, and C are matrices that are high-level computational constructs in the sense that there is no low-level computational construct corresponding to a matrix. Rather, a matrix is conceptually a composition of low-level computational constructs, such as integers. Similarly, the operators "=," "+," and "*" are matrix operators that are high-level computational constructs with no corresponding low-level computational construct. Rather, the behaviors of the matrix operators are implemented using low-level computational constructs such as integer addition. Transforms have been defined that when applied to a tree representation will add optimization tags that identify matrix operators and matrix operands. These optimization tags allow further transforms to be applied to further identify optimizations. The goal of these transforms is to identify iterations that are needed to access the elements of a matrix and to identify when these iterations can be coalesced into a single iteration control statement. When the code for the same statement is generated, the optimization tags will indicate that a single iteration control statement can be used for this sample statement. If anticipatory optimization was not used, then as described in the background three separate sets of nested "for" loops may be used to implement this sample statement. Further, if anticipatory optimization is not used, loop coalescing via conventional optimization technology is possible but requires two extra steps. The first step generates the three separate loops, and the second step involving a complex analysis of the three loops to determine data flow, data dependencies, and aliasing information (i.e., different names and expressions that reference the same data). Only then can the coalesced loop be generated and only if the analysis was successful (which it may not have been). In contrast, the AO system produces one coalesced loop directly without actually having to generate the three loops in the first place and therefore, without the difficult intervening analysis step. It performs this direct generation of the coalesced loop based only on knowledge of the high-level operators and the optimization tags that incorporate the "implied" data flow and data dependency information. There is no aliasing information because the method inherently prevents aliasing from occurring. Creation of the tags makes the flow and dependency information implied by the high-level operators and operands explicit. The optimization tags are directly, incrementally, and simply built up by separate transformations that record, migrate, and merge the implied data flow and data dependency information as a part of the information useful to the anticipatory optimization process.

The AO system processes an AST by visiting the nodes in a depth-first, left-to-right traversal. In the general case, there may be multiple passes over the AST transforming high-level, domain operators and operands into successively lower-level operators and operands and eventually into programming-language operators and operands. For example, database operators and operands might be transformed into relational algebra operators and operands, which are then transformed into abstract data type operators and operands before finally being transformed into C code. If a given pass over a subtree of the AST produces operators and operands that need further transformation, the subtree will be flagged as incompletely transformed, which will cause it to be scheduled for further transformation. In the following, to keep the examples simple, operators, operands, and transformations are used that can complete their translation work in one pass of the AST.

Figure 1B:
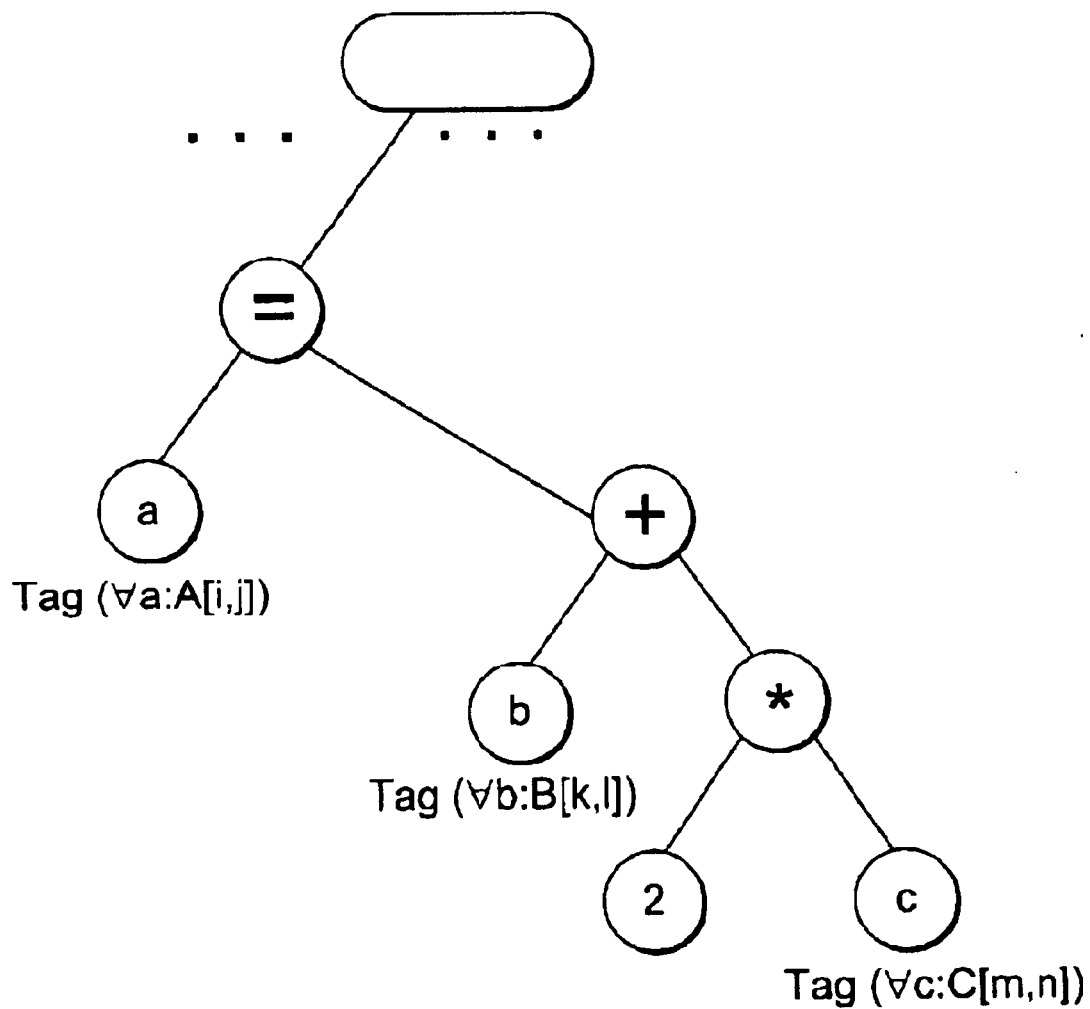
Figure 1C:
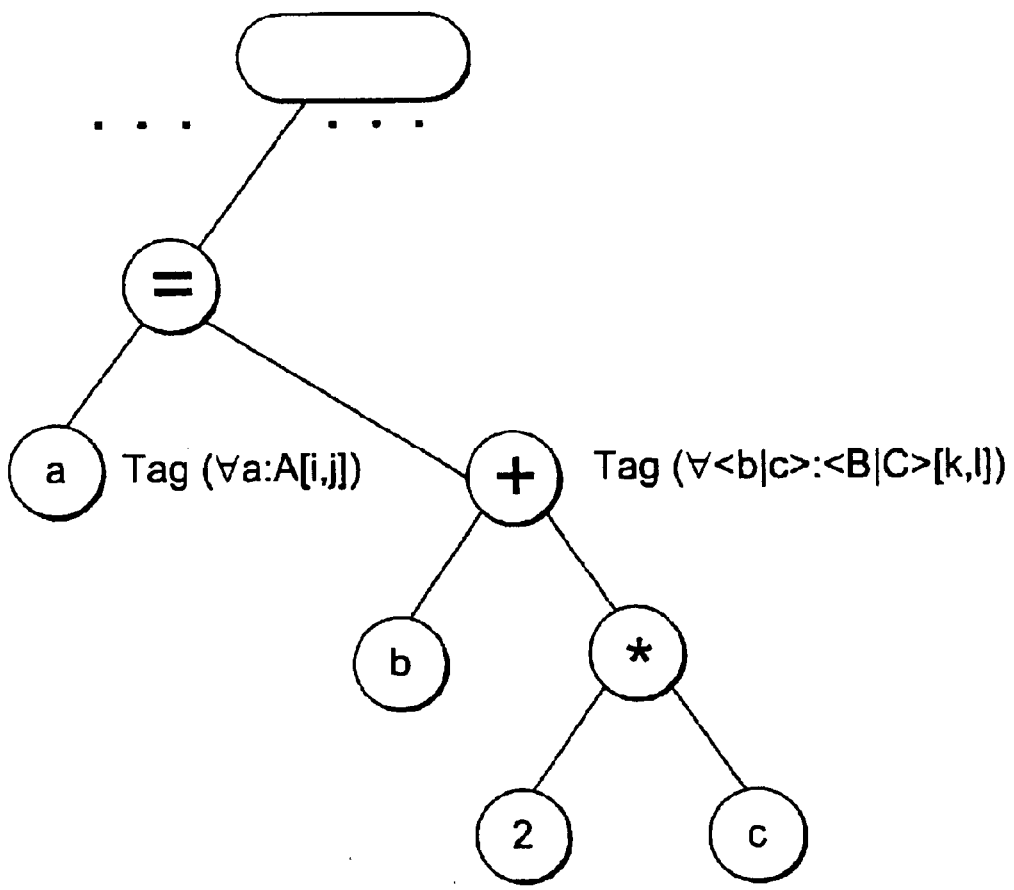
Figure 1D:
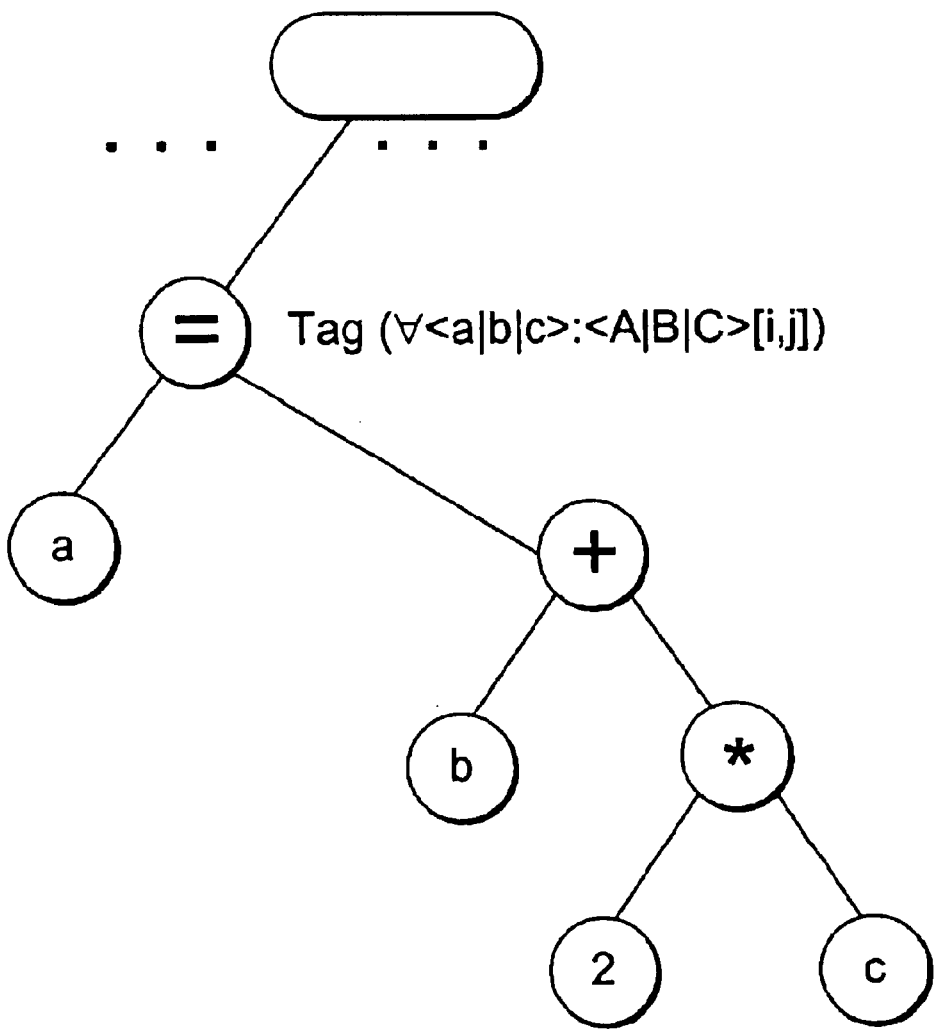

Using such a traversal technique, the AO system first visits the node for operand A. Since operand A is a high-level computational construct that is a matrix, a transform applies that replaces the node and adds an optimization tag to the replaced node. The replaced node contains a reference to an operand of iteration with a system-generated name. For each step of the iteration, the operand of iteration, takes on the value of each element of the matrix. The operand of iteration thus has the same type as the elements of the matrix. The optimization tag maps the operand of iteration to the operand A and indicates that two nested "for" loops with separate index variables need to be used to access the elements of the matrix at each step. The AO system then visits nodes for operands B, 2, and C. The same transform is applied to the nodes for operands B and C, since both operands represent matrix data structures. Thus, similar replacement nodes and optimization tags are applied to the nodes for operands B and C. FIG. 1B illustrates the replaced nodes with their tags. The operands of iteration are shown in lower case letters. The tag "$\forall a:A[i,j]$" indicates that the operand a of iteration represents access to the elements of matrix A and that nested "for" loops (i.e., $\forall$) using index variables i and j are used to access each element of matrix A. After visiting the node for operand C, the AO system visits the node for operator "*." The AO system applies a transform that recognizes the tag on the node for operand c, the operator "*," and the constant operand value. The transform moves the optimization tag from node for operand c to the node for operator "*," since the expression "2*C" needs to be within the nested iterations. The transform to move the optimization tag was developed in anticipation that the iteration to access the elements of a matrix could be coalesced with another iteration at a higher point in the tree. After visiting the node for operator "*," the AO system visits node for operator "+." The AO system applies a transform that recognizes the operator "+" and the two operand nodes with tags relating to "for" loops to access matrices. The transform removes both tags and adds a coalesced tag to the node for operator "+." The coalesced tag is "∀<b|c>:<B|C>[k, l]." The "<b|c>" field and the "<B|C>" field indicate that b is the operand of iteration for matrix B and c is the operand of iteration for matrix C. Since the same index variables can be used to access both matrix B and C, the transform selects the index variables k and l to index both matrices. FIG. 1C illustrates the coalescing and migrating of the optimization tag to the node for operator "+." The AO system then visits the node for operator "=." The AO system applies a transform that recognizes the optimization tags of the nodes for operand a and operator "+" can be coalesced to indicate a single iteration with the same indexes. Thus, an optimization tag is placed on the node for operator "=." FIG. 1D illustrates the migration of the optimization tag to node for operator "=." The optimization tag on the node for operator "=" indicates that the iteration for each of the matrices of the statement can be controlled at the statement level by a single iteration control statement. Each of the elements of matrices can be accessed using the index variables i and j. When the AO system generates the low-level implementation (e.g., generates machine instructions) of this statement using another transform, the AO system recognizes the optimization tag and generates an implementation of the iteration at the statement level with the proper indexing for the variables A, B, and C.

Figure 2:
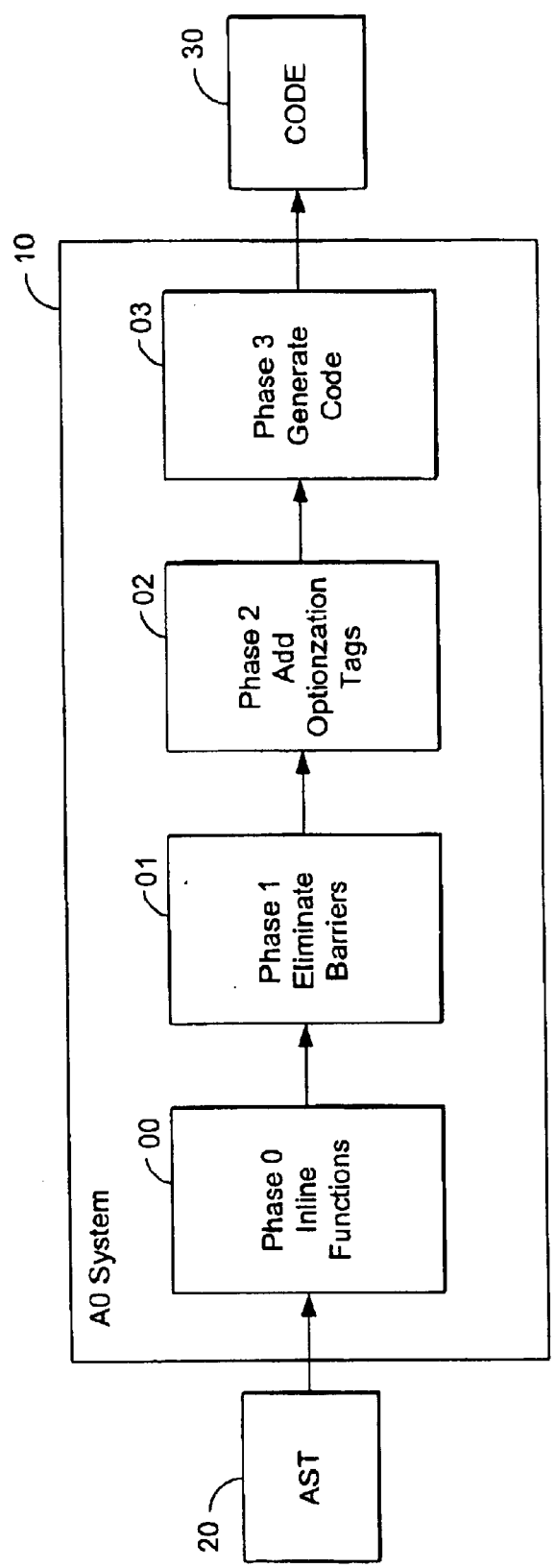
FIG. 2 is a block diagram illustrating the components of the AO system.

FIG. 2 is a block diagram illustrating the components of the AO system. The four components of the AO system 210 are the Inline Functions component 200, the Eliminate Barriers component 201, the Add Optimization Tags component 202, and the Generate Code component 203. The AO system inputs an AST 220 and outputs generated code 230. The components execute on a computer system with a central processing unit and memory. The components are preferably loaded from a computer-readable medium (e.g., CD-ROM) into memory. Each of the components correspond to phases 0–3 of the AO system. The InLine Function component corresponds to phase 0 and determines whether any portion of the AST invokes a function that may result in greater optimization if that function was expressed inline rather than invoked. For example, if a function were defined that multiplied each element of a matrix by 2, then it could be invoked to replace the expression "2*C" in the sample statement. However, when optimizing, the iteration within the function could not easily be combined with an iteration outside the function. The Inline function component identifies such functions that can be advantageously placed inline and places them inline. The Eliminate Barriers component corresponds to phase 1 and determines whether any portion of the AST could be restructured to improve the chance of optimizing. For example, consider the graphics imaging domain in which images are represented by matrix-like data structures containing one record per pixel in the image. For simplicity but without loss of generality, this example is restricted to gray scale images in which the pixel records are simple integers ranging from zero (white) to some upper limit (black), with all intervening integers representing varying shades of gray. The images can be operated on by a backward convolution operator (i.e., "⊕") which generates an output image by arithmetic summations of a pixel's neighborhood in an input image to compute the corresponding pixel in the output image. More specifically, a particular example convolution operation on an image matrix might generate an output image matrix in which each element of the output image matrix is set to a weighted average of the eight neighboring elements (or fewer neighboring elements in the case of border elements) of the corresponding pixel in the input image. Thus, to generate the value of an element of the output image matrix, the values of the corresponding pixel in the input image matrix and all of its neighboring elements need to be known. However, if the input image matrix is expressed as the sum of two image matrices to which a convolution operator (i.e., "⊕") is then applied in a single statement (e.g., C=(A+B)⊕T), then an iteration to access image matrices A and B cannot be combined, or at least not in a straightforward manner, with the iteration to access image matrix C. The matrix T is a template which provides the weight to be assigned to the neighboring elements when calculating the average. For simplicity it can be assumed to be a 3×3 matrix with each weight equal to 1. In this example, the Eliminate Barriers component would move the expression "A+B" outside of the statement, use a temporary image matrix variable to hold the result of the expression, and substitute the temporary image matrix variable into the statement. The Add Optimization Tags component corresponds to phase 2 and adds optimizing tags, replaces operands as appropriate, and coalesces and migrates the optimization tags. The Code Generation component corresponds to phase 3 and generates the code for the AST based on the optimization tags.

The transforms can be identified with a specific problem domain and phase. When a new high-level computational construct is defined, it is applicable to a specific problem domain. For example, the transforms described above that add, coalesce, and migrate optimization tags relating to iterations are applicable to the domain of image matrix operations. The definitions of the domain-specific data structures and their operators are defined in a type hierarchy that may be supplied by and/or extended by the user. These definitions drive the transformation-based compilation of the target program that is written in terms of those domain-specific data structures and operators. The type hierarchy is an AST containing one node for each type or operator with associated values (i.e., subtrees) that define those domain-specific types and operators. Each node that defines some operator or operand is marked with a specific domain marker or if not so marked, will inherit the domain marker of one of its ancestor node. The domain marker will restrict the transformations that can apply to instances of it occurring in the user's target program. Additionally, the definition of the types and operators may contain AST patterns that help to disambiguate overloaded operators. For example, the "=" operator in the statement "A=B+(2*C)" might be an integer assignment operator, a floating point assignment operator, or a matrix assignment operator. However, the pattern associated with the matrix assignment operator eliminates all other assignment operators because of the types of its operands (i.e., the types of A and the expression (B+(2*C)) are both "matrix"). Hence, only transformations that apply to the matrix assignment operator will apply in this case. If the types of the arguments were instead "image matrix," then any transformations on the "=" operator associated with the image domain would apply first and failing that, transformations on the = operator associated with the more general matrix domain would apply. Thus, transformations are inherited, starting with the more specific domains and failing there, then moving to the more general domains.

Figure 3:
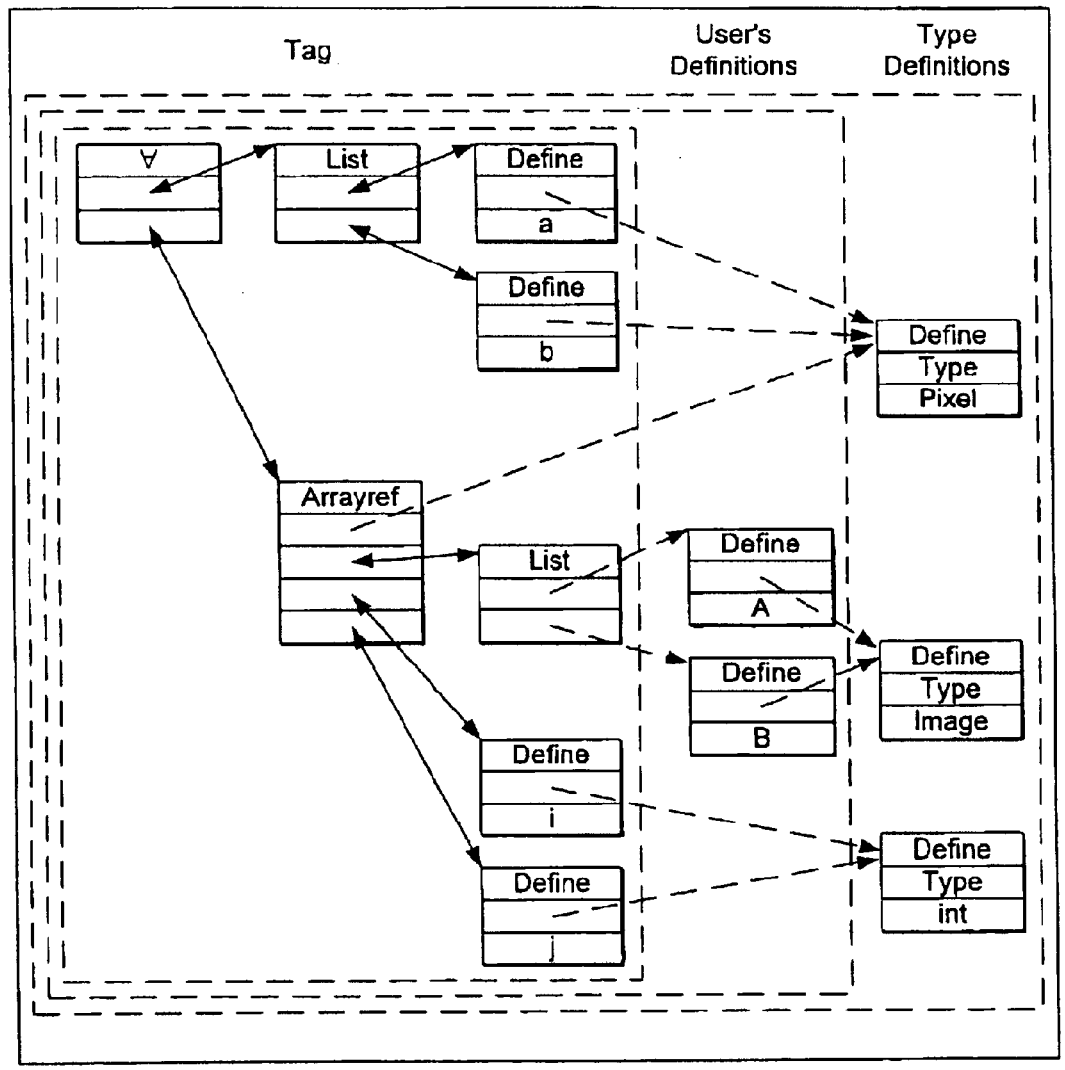
FIG. 3 represents a sample data structure representing an optimization tag.

The syntax and semantics of the optimization tags can be defined by the developer of the transforms that process the optimization tags and can be tailored to their specific domain. The tags can be represented as an expression (e.g., "∀a:A[i,j]") that may need to be parsed or as a data structure in which parsing is not needed. FIG. 3 represents a sample data structure representing an optimization tag. By using complex data structures, the transforms can avoid parsing that may be necessary to interpret an optimization tag. The organization and adding of tag is preferably consistent with the data structures used by the IP system. In the following, optimization tags relating to high-level computational constructs in the domain of image processing are described. An image is represented by a matrix in which each element is an integer that represents a pixel. An integer value represents the gray-scale intensity of the pixel. The high-level computational construct of type image and pixel are defined.

A quantifier tag is used to add information relating to various type of iterations (e. a, "for" loop and "repeat/until" loop). A quantifier tag has the following form:

_Q(expression)

where expression is a description of an iteration and the operands for the iteration. The expression for a "forall" loop has the following form:

∀p:(prototype:type)

where the symbol ∀| indicates that the iteration is a "forall" loop, where the symbol p identifies the abstract operand of iteration, where the prototype indicates the implementation relationship between the abstract operand p of iteration and the anticipated implementation form of the container (e.g., of the image) from which each value of p (i.e., the abstract operand of iteration) is chosen, and where the type indicates the type (e.g., pixel) of the abstract operand of iteration. The prototype identifies the container implementation and the anticipated index implementation variables for accessing the container. For example, the prototype may have the form:

A[i:int,j:int]

where symbol A identifies the implementation form of the image (i.e., a matrix), where symbols i and j identify the index implementation variables, and the symbol int identifies that the type of the index implementation variables is integer.

The following quantifier tag indicates a "forall" loop to access all pixels a of matrix A using index variables i and j:

_Q(∀a:(A[i:int,j:int]:pixel))

The operands of iteration and the containers in a quantifier tag may be represented as tuples shown as:

<a|b> or <A|B>

Such tuples indicate that in the generated code for operands of iteration a and b can be accessed by a single iteration. For example, in the following quantifier tag, operands of iteration a and b specify iterating over pixels in the images A and B, respectively, within the iteration whose index variables are i and j.

_Q(∀<a|b>:(<A|B>[i:int,j:int]:pixel))

This quantifier tag is generated by coalescing the quantifier tags

_Q(∀a:(A[i:int,j:int]:pixel))

_Q(∀b:(B[k:int,l:int]:pixel))

in a statement that may be "A=2*B." The code generated based on this quantifier tag is for i=1,m
      for j=1,n
        A[i,j]=2*B[i,j]

User-defined modifiers can be added to a quantifier tag or to individual elements within a quantifier tag. These modifiers act as hints when generating code to produce variations or optimizations in the final code that may have been recognized by previously applied transforms in the course of their application. For example, if an operator (e.g., convolution) is embedded within an expression that is tagged such that one or more iterations will eventually be generated and wrapped around the expression, then the embedded operator will often generate expressions that are known (by the transform processing the embedded operator) to be promotable outside of an iteration. The transform can designate the promotable statement or statements in a modifier that extends the quantifier tag that defines the iteration. This would extend the quantifier tag to have a form such as:

_Q(∀<a|b>:(<A|B>[i:int,j:int]:pixel),_PromoteAboveLoop(j,ConstantExpressionOf(i)))

which would cause a transform applied in the code generation phase to invoke a transform named "_PromoteAboveLoop" to effect the promotion after the inner "for" loop is generated of any expression that involves only constants and the variable i. This transform creates a temporary variable, say im1; generates a statement that assigns the constant expression involving i to im1; and promotes (i.e., places) that statement outside and just preceding the loop whose iteration index is j. All instances of that exact constant expression of i used within the loop whose iteration variable is j are replaced by the newly-created temporary variable im1. For example, the neighborhood in and around pixel A[i,j] contains three pixels each of the forms A[i-1,_], A[i,_], and A[i+1,_] which after the promotion will have the respective forms A[im1,_], A[i,_], and A[ip1,_], where im1 and ip1 are the two temporary variables created by the transform _PromoteAboveLoop. This eliminates two computations for each of the expressions (i-1) and (i+1). The modifier mechanism defers, until code generation time, any commitment to the exact name and form of the temporary implementation variables (e.g., im1 and jm1) and to the details and exact location of the promoted statements. By this mechanism, the complexity of the transforms that do the main anticipatory optimization (i.e., the Add Optimization Tags component 202) is significantly simplified. The transforms do not have to contend with detailed implementation variations that are irrelevant to their main function. In the example, the transform promotes the statement "im1=i-1" above the iteration for index variable j.

Modifiers may also be used to broaden the applicability of the transformation rules. For example, the matrices used as operands of an operator in an expression may not be the same size or shape, in which case, the operators by implication may apply to only parts of the matrices. In such a case, the code generator generates "if-then-else" statements that provide the case logic for operating on the various sections of the matrices. Modifiers provide a technique for keeping track of the conditions within that case logic and for defining the various ranges for the overlapping and non-overlapping portions of the operands. Of course, the exact information needed in these modifiers is determined by the semantics of the high-level data structures and operators. An example of such a modifier is:

_Case(=(a,0) when (<(j,max(range(k)))))

In other words, some element a, which might eventually be represented in low-level code as A[i,j], has a value of zero whenever its index j is greater than the maximum of the range of some related index k. There may be other case modifiers for values of j that do not meet this condition which define the behavior for those areas of the matrices. If not, the default behavior is defined by the expression of the high-level operators. In short, the exact way in which special case logic arises is dependent on the semantics of the high-level data structures and operators and is defined by a set of transforms that express that logic. The AO system does not, however, inherently restrict such semantic variations.

Modifiers may also be used to associate anticipated optimizatior is with specific, user-defined optimization events. These are called Event-Driven Modifiers. Event-Driven Modifiers have the form _On(EVENTNAME, MODIFIEREXPRESSION)

These are like interrupts in the AO transformation domain. Whenever the named optimization event occurs, the transformation MODIFIEREXPRESSION is triggered. For example, if the Event-Driven Modifier _On(SubstitutionOfMe,_Fold0)

is attached to a zero data value, then the transformation _Fold0 would be invoked any time some transformation substituted that specific tagged zero for some other construct within an expression. Suppose that tagged 0 was substituted for "x" in the expression (a+x)

producing the expression (a+0 _On(SubstitutionOfMe,_Fold0)).

Upon completion of the substitution operation, _Fold0 will be triggered and apply one of its many built-in transforms. In this case, it will apply the transform ($X+0)→$X (i.e., anything plus zero may be represented as anything) which will result in the expression being simplified to just a.

This allows the transformation programmer to embed anticipated optimizations in code fragments that may be stored in a reusable component library. Event-Driven Modifiers eliminate the open-ended searches that would be required using conventional optimization techniques for such jobs as (but not limited to) promoting a conditional expression outside of a loop once the conditional expression generation step is completed, merging "if-then-else" statements that share common conditional expressions once all possible such if-then else statements have been generated, unwrapping or peeling loops once code generation has created all loops of a particular kind, and so forth. Event-Driven Modifiers associate a specific AO transformation with a specific event time for its execution and with a specific piece of target code upon which it is to focus its operation. By contrast, conventional optimization strategies would produce such associations through an open-ended search over a large space of possible transforms, over a large set of possible invocation times, and over the whole of the target program at each point in its evolution. In other words, the search space of conventional optimization strategies is large leading to large and often infeasible amounts of search time.

The transformation writer can create an unlimited variety of events such as WrapUp, EndOfWrapUp, AfterUnWrap, etc. If several Event-Driven Modifiers are triggered by the same event such as WrapUp and they need to be executed in a particular order, the events may have arguments with numbers that indicate the order of modifier transformation invocation. An example of such event specifications would be WrapUp(1), WrapUp(2), WrapUp(3), and so forth.

Figure 4A:
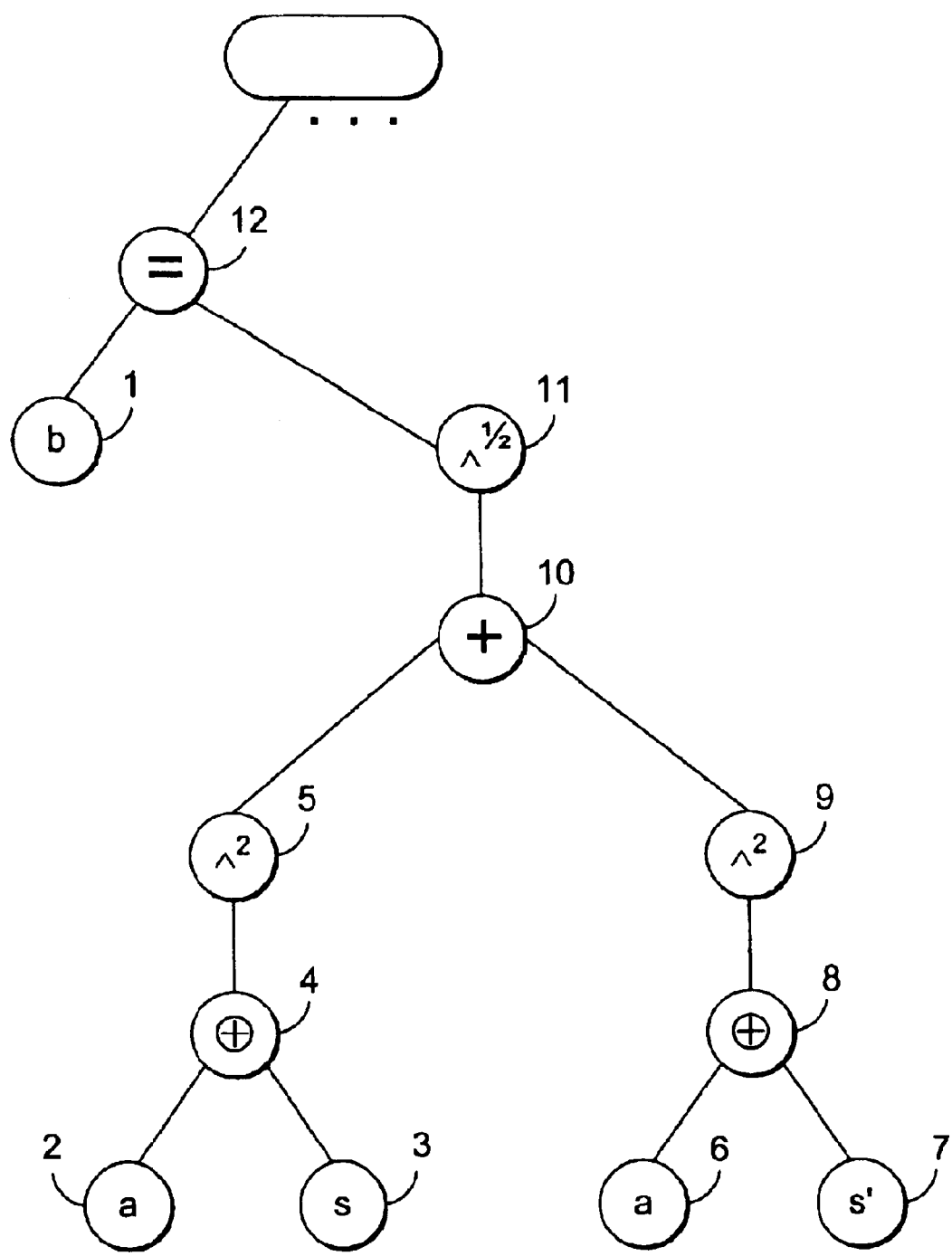
FIGS. 4A–4I illustrate a detailed example of anticipatory optimization for the domain of image processing.

FIGS. 4A–4I illustrate a detailed example of anticipatory optimization for the domain of image processing. FIG. 4A illustrates a portion of the AST corresponding to the following high-level statement.

$$b=[(a\oplus s)^2+(a\oplus s')^2]^{1/2}|$$

The variable a represents an image and is of type image; the variable s represents template matrix, which in this example is a 3×3 matrix; and the variable b is an image into which the result is stored. The operator "⊕" is the backward convolution operator that applies a template to each pixel within the image. The operator "+" is the image addition operator that indicates to add corresponding elements of an image. The operators "$^2$" and "$^{1/2}$" take each pixel of the image to the specified power. The convolution operator indicates that each pixel in the resulting image is a sum of the neighborhood of pixels around the corresponding pixel in the input image times the weights in the 3×3 convolution matrix. This neighborhood is defined by that 3×3 convolution matrix, and the 3×3 convolution matrix is defined by the right hand operand of the ⊕ operator (e.g., the templates s or s'). Sample values for the template matrix s and s' are $$s = \begin{bmatrix} -1 & \phi & 1 \\ -2 & \diamond & 2 \\ -1 & \phi & 1 \end{bmatrix} \text{ and } s' = \begin{bmatrix} -1 & -2 & -1 \\ \phi & \diamond & \phi \\ 1 & 2 & 1 \end{bmatrix}$$

These template matrices perform a Sobel edge detection operation in an image, which produces an image with edge segments emphasized and areas of constant texture removed. The constants are weights to be multiplied with the pixels to which they correspond for each specific placement of the diamond on a pixel in an image A. For each such positioning of the diamond (i.e., "◊") on a pixel in A, the semantics of the convolution operator (i.e., "⊕") define the formula for computing the pixel corresponding to the diamond pixel in the resulting image. Since the diamond elements of the template matrices show no numerical value in them, the image pixels corresponding to them do not contribute to the convolution computation for each positioning. Similarly, the null symbols (i.e., "ø") indicate that the pixels that correspond to these elements on each positioning of the template also do not participate in the convolution computation.

Figure 4B:
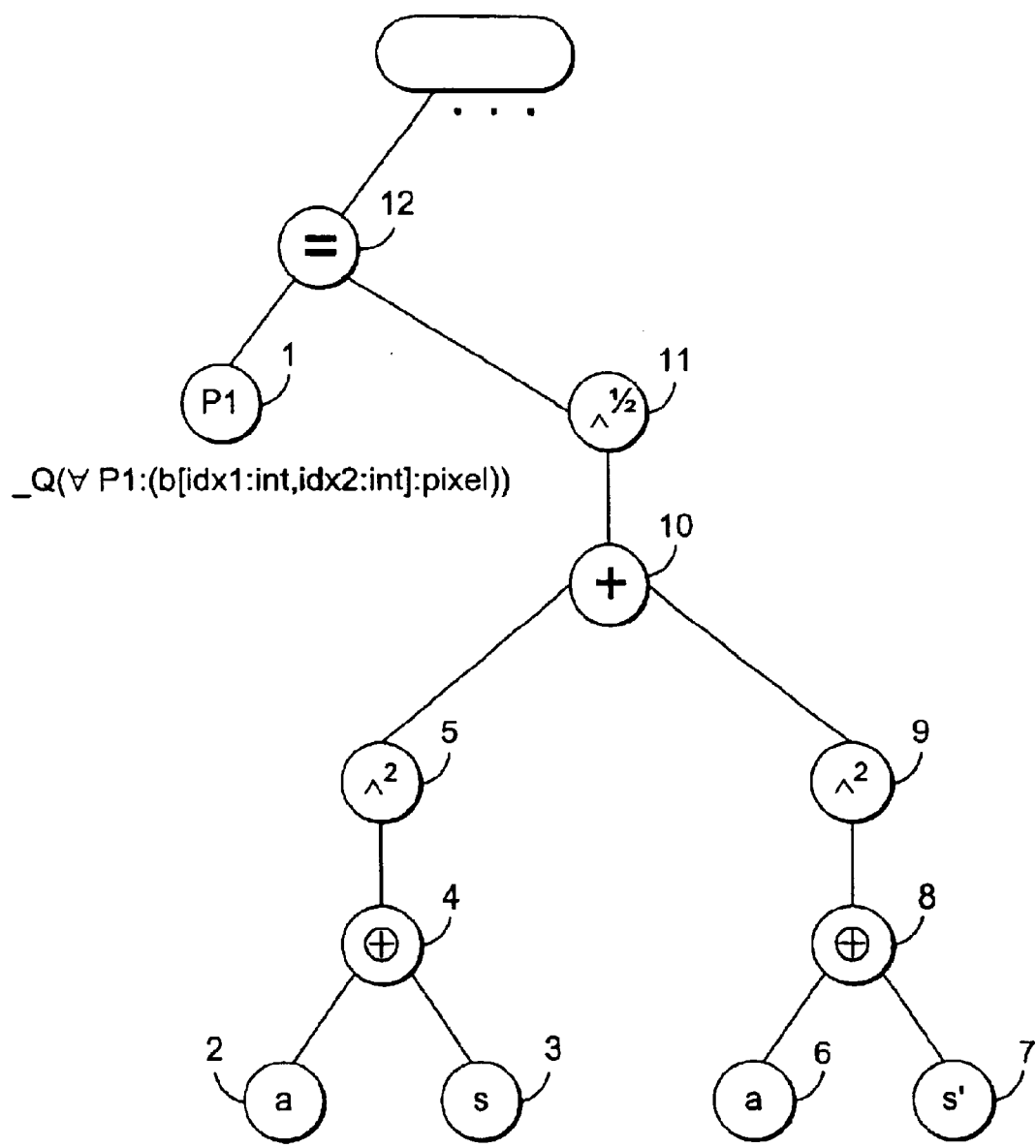

As described above, the AO system processes the nodes of the AST in a depth-first, left-to-right manner. As each node is processed, the AO system attempts to apply the transforms. The first node processed is leaf node 401. FIG. 4B illustrates the AST after the AO system has processed leaf node 401. Since the type of variable b is image, the transform replaces node 401 with a node that contains a reference to an AO system generated iteration operand p1 and adds the quantifier tag:

_Q(∀p1:(b[idx1:int,idx2:int]:pixel))

Figure 4C:
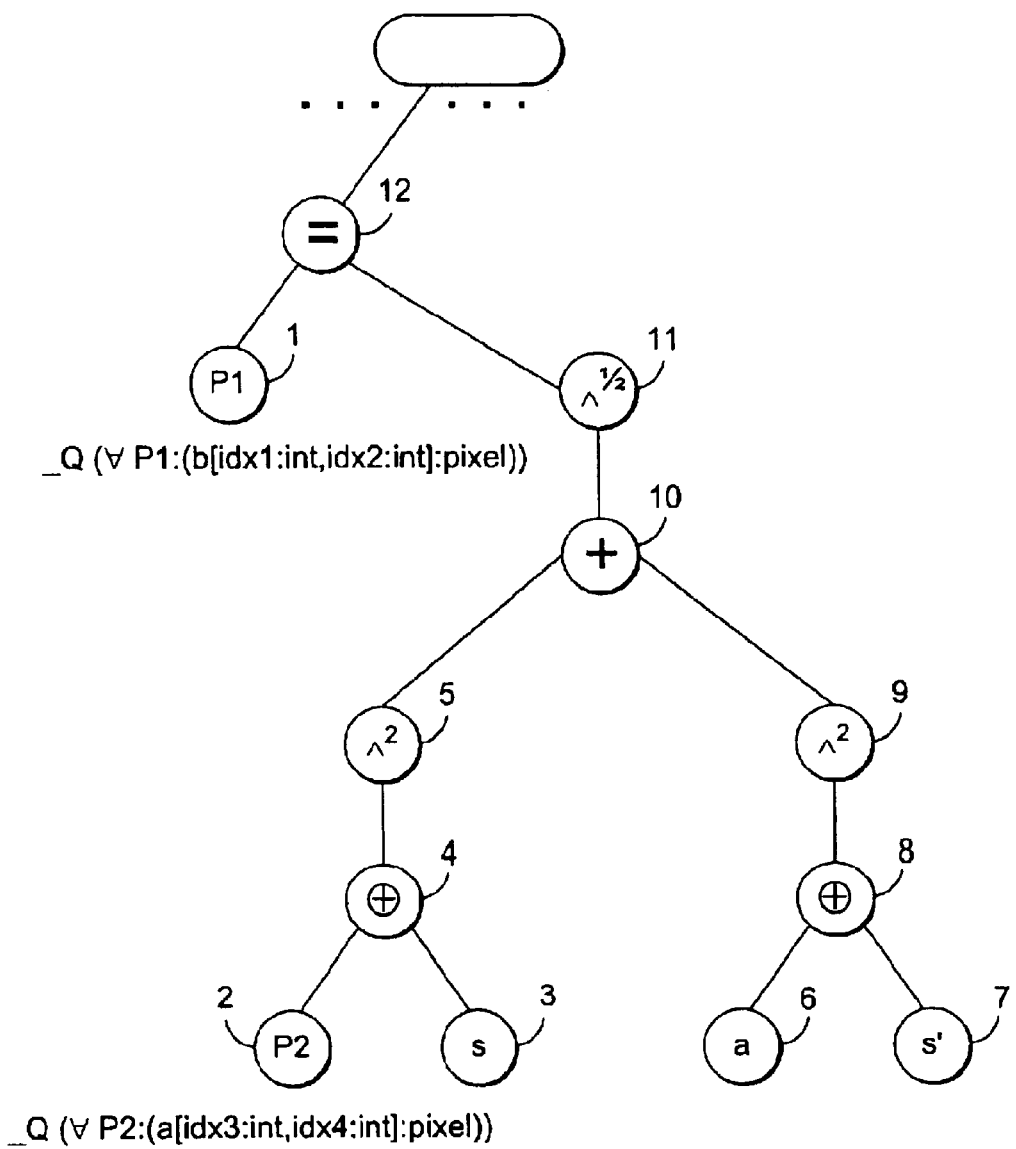

This quantifier tag indicates that iteration operand p1 is a pixel type that should be replaced at code generation time with a reference to image b indexed by variables idx1 and idx2. The next node processed is node 402. FIG. 4C illustrates the AST after the AO system has processed leaf node 402. Since the type of variable a is image, the transform replaces node 402 with a node that contains a reference to an AO system generated iteration operand p2 and adds the quantifier tag:

$$\_Q(\forall p2:(a[idx3:int,idx4:int]:pixel)$$

Figure 4D:
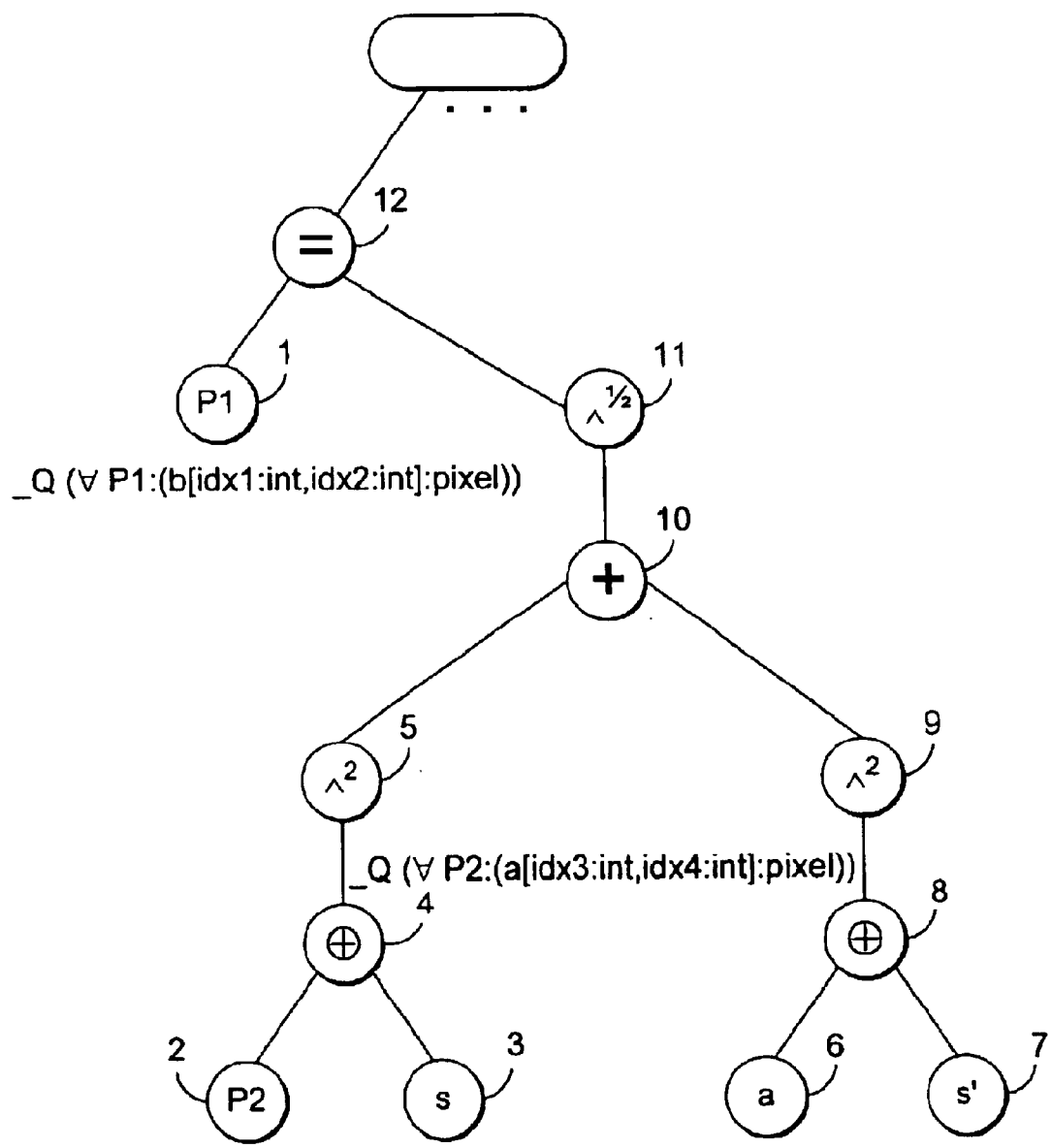
Figure 4E:
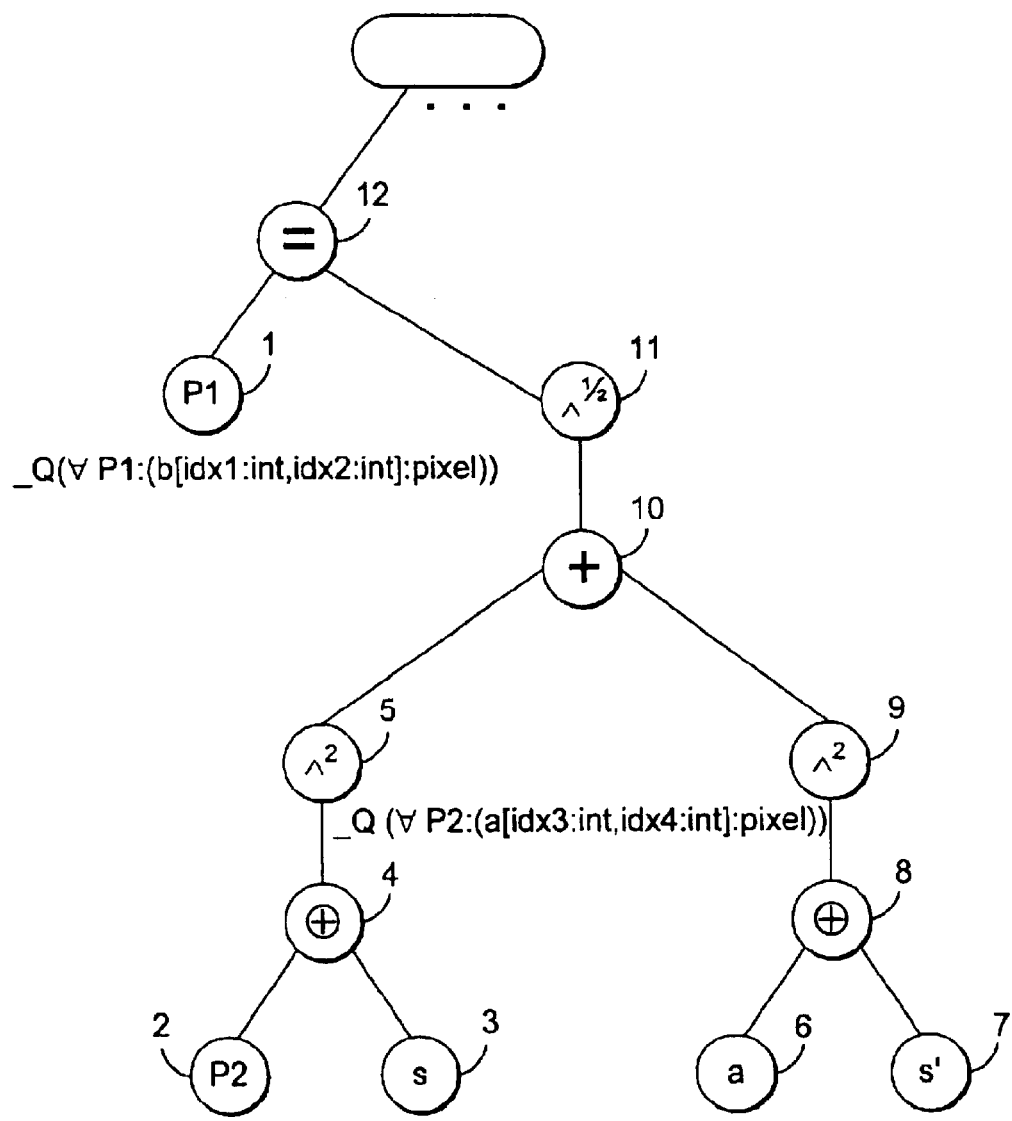
Figure 4F:
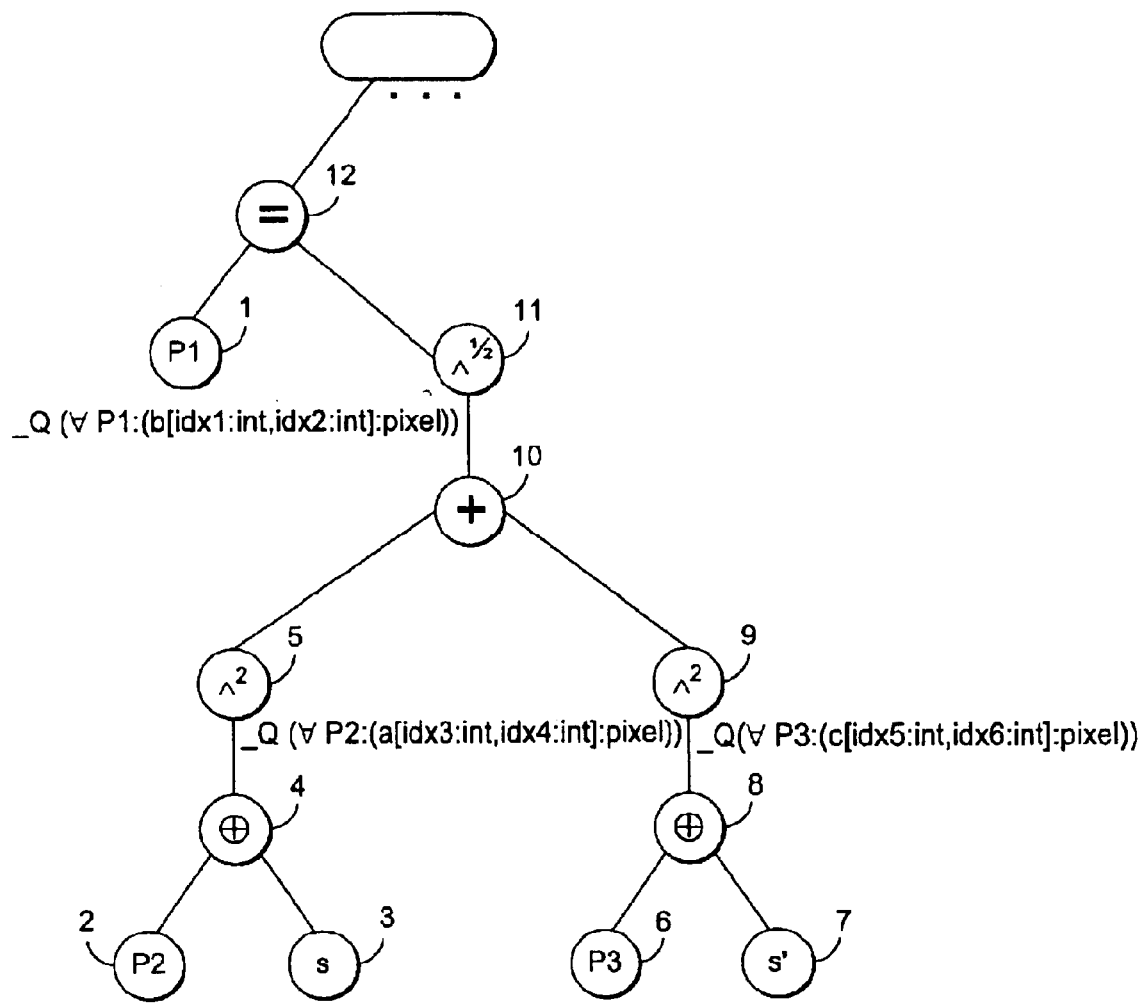
Figure 4G:
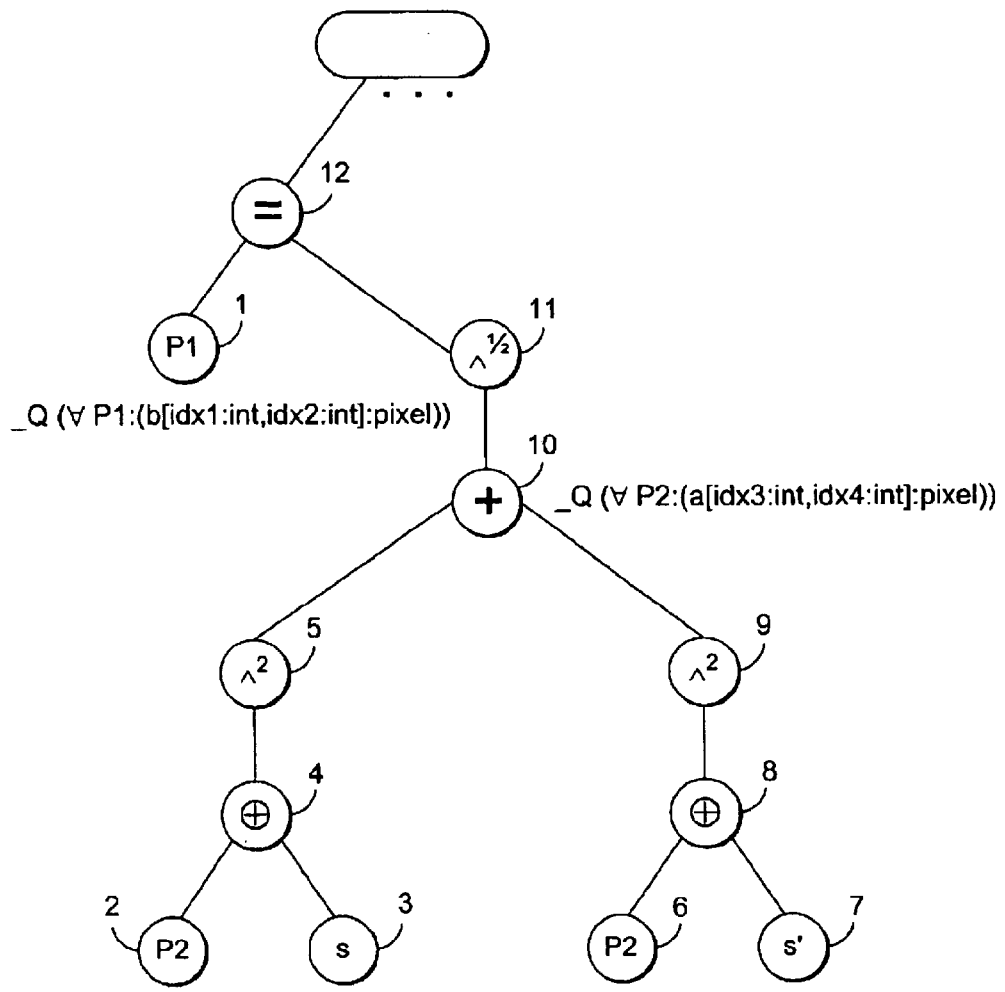

This tag indicates that the iteration operand p2 is a pixel type that should be replaced at code generation time with a reference to the image a indexed by variables idx3 and idx4. The system then processes node 403, but no transforms are applicable. The AO system then processes node 404. The AO system processes node 404 by applying a transform that recognizes that the quantifier tag on node 402 can be migrated to node 404. FIG. 4D illustrates the AST after the AO system has processed node 404. The AO system processes node 405 by applying a transform that recognizes that the quantifier tag on node 404 can be migrated to node 405. FIG. 4E illustrates the AST after the AO system has processed node 405. The AO system then processes nodes 406–409 in a manner similar to the processing of nodes 402–405. FIG. 4F illustrates the AST after the AO system has processed node 409. Node 406 has been replaced by a node that contains a reference to the iteration operand p3. A quantifier tag was added to node 406, but eventually migrated to node 409. The AO system then processes node 410 by applying a transform that recognizes that nodes 405 and node 409 have a "forall" loop quantifier tag that indicates an iteration over each of the elements of image a. The transform coalesces and migrates the quantifier tags of nodes 405 and 409 to node 410. FIG. 4G illustrates the AST after the AO system has processed node 410. The transform recognizes that the iteration operands p2 and p3 were over the same image a. Therefore, a single iteration operand and a single pair of index variables can be used in the iteration. Thus, the AO system coalesces the quantifier tags into:

$$\_Q(\forall p2:(a[idx3:int,idx4:int]:pixel))$$

Figure 4H:
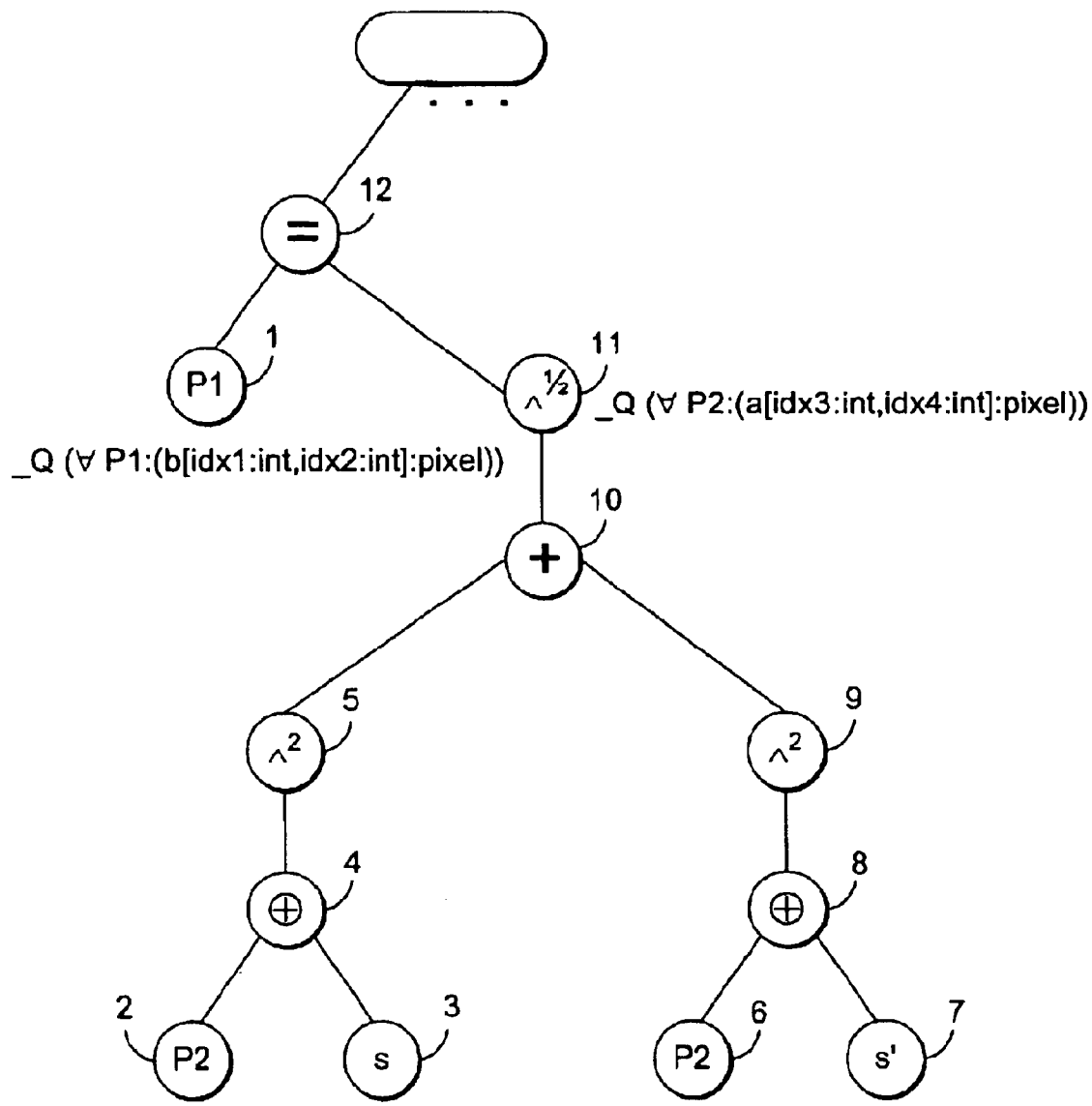
Figure 4I:
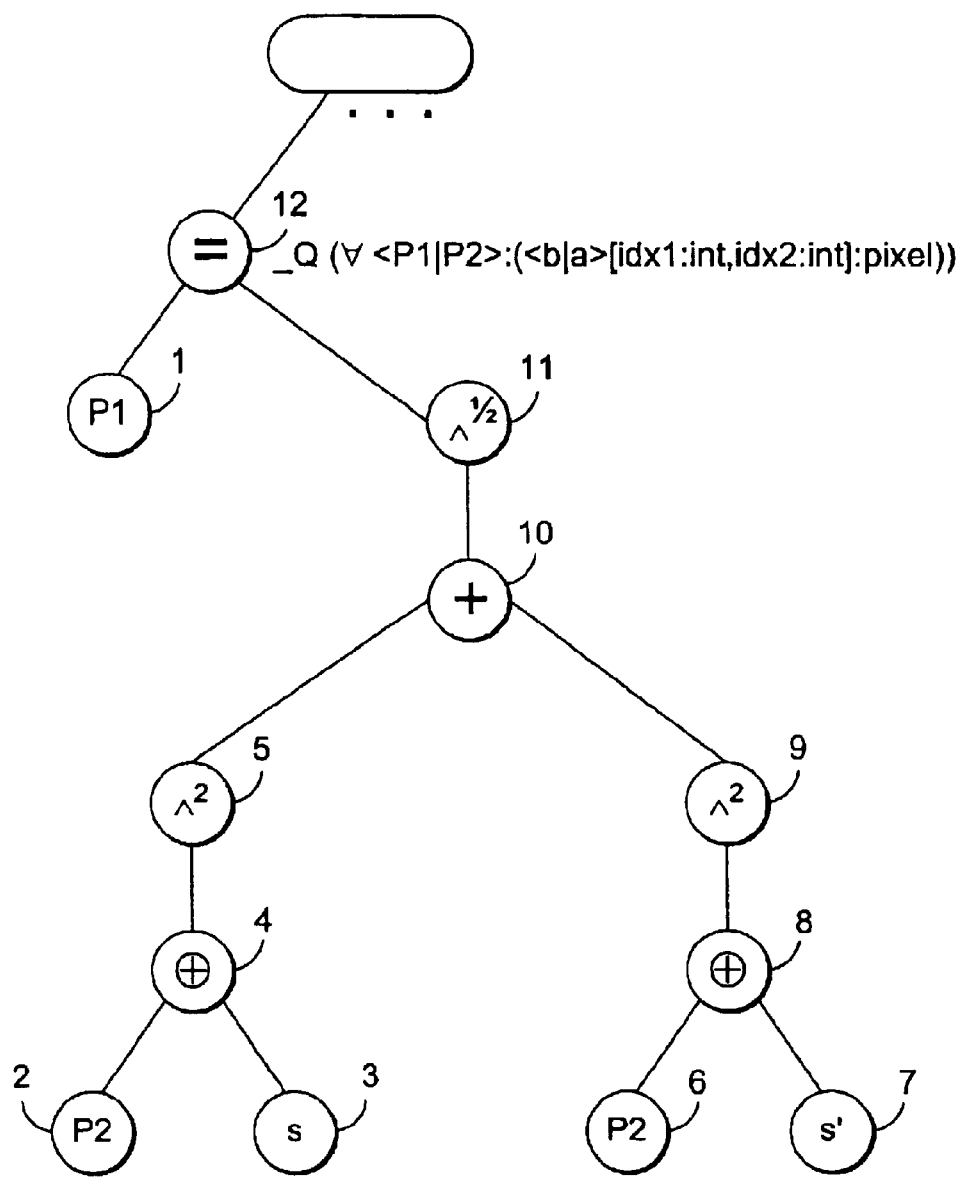

The transform also changes the reference in node 406 to point to iteration operand p2, rather than iteration operand p3. The AO system then processes node 411 by applying a transform that recognizes that the quantifier tag of node 410 can be migrated to node 411. FIG. 4H illustrates the AST after the AO system has processed node 411. The AO system then processes node 412 by applying a transform that recognizes that the quantifier tags of node 401 and node 411 can be coalesced and migrated. FIG. 4I illustrates the AST after the AO system has processed node 412. The transform coalesced the quantifier tags into the quantifier tag:

$$\_Q(\forall <p1|p2>:(<b|a>[idx1:int,idx2:int]:pixel))$$

The transform recognizes that the images a and b are of the same size and thus can be accessed by the same index variables. Therefore, the coalesced quantifier tag indicates that iteration operands p1 and p2 should be applied to image b and a through index variables idx1 and idx2.

Whenever two quantifier tags for a "for" loop can be coalesced and migrated, different iteration operands for accessing the same container can be replaced by a single iteration operand. For example, as shown in FIGS. 4F and 4G, iteration operands p2 and p3 were combined since they both are used to indicate the accessing of image a. FIGS. 5A–5D illustrate another example of combining iteration operands. The portion of the AST of FIG. 5A corresponds to the following high-level statement:

$$c=[(a \oplus s)^2+(b \oplus s')^2]^{1/2}|$$

Figure 5A:
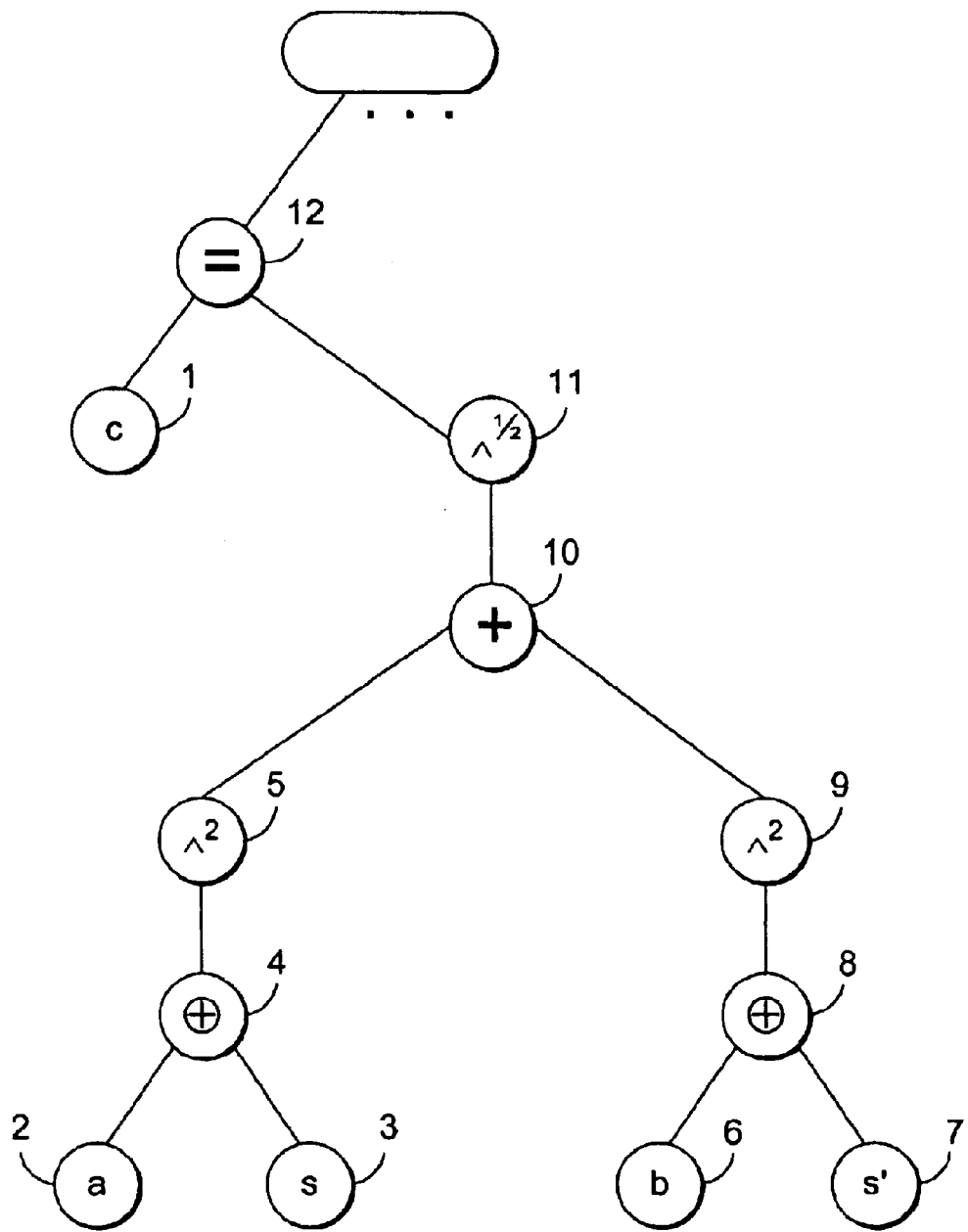
FIGS. 5A–5D illustrate another example of combining iteration operands.
Figure 5B:
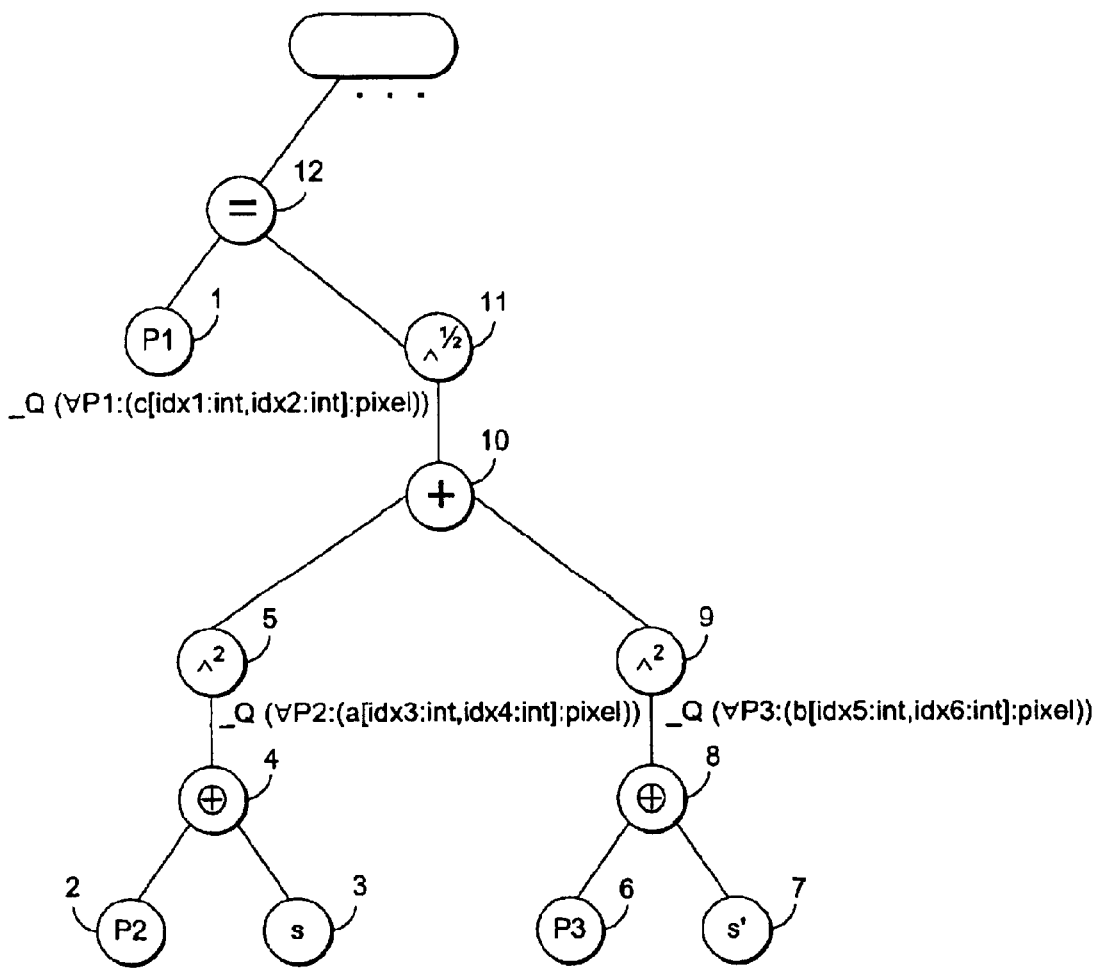
Figure 5C:
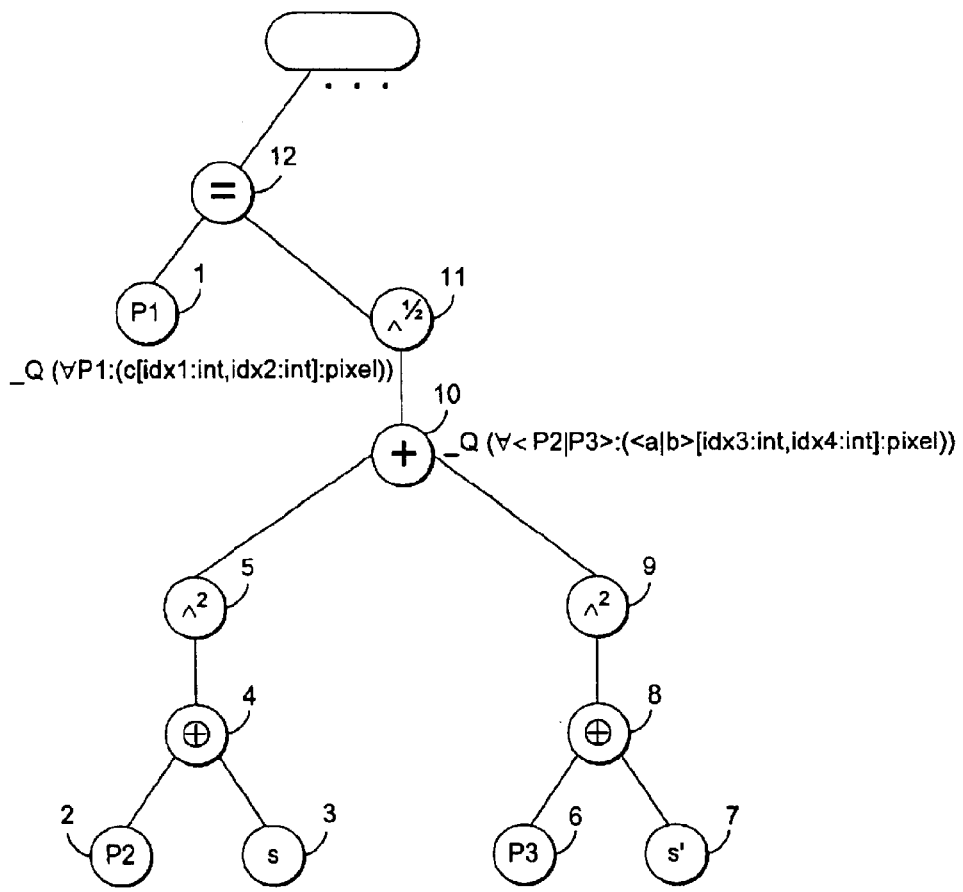
Figure 5D:
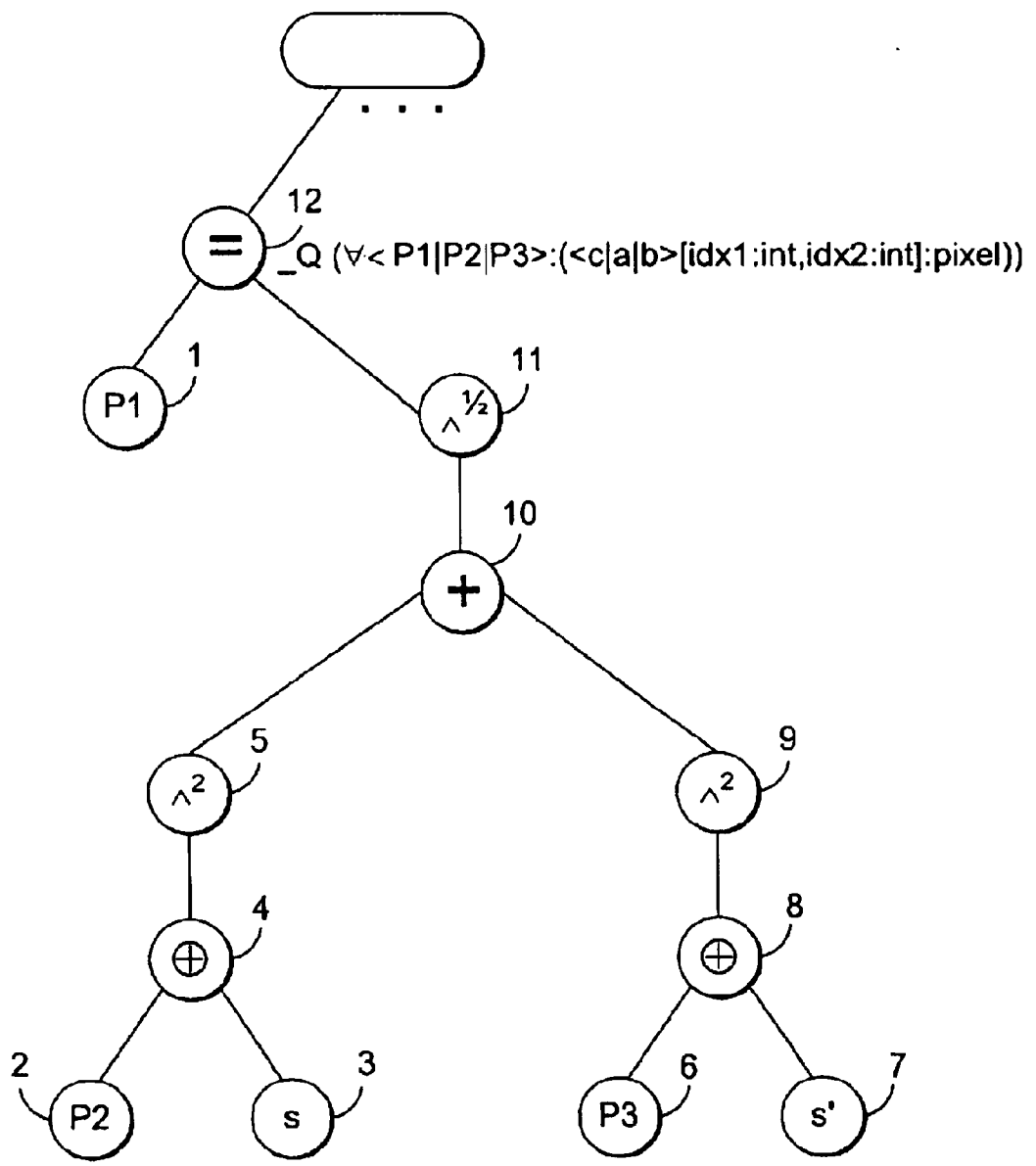

FIG. 5B illustrates the portion of the AST after quantifier tags have been added when nodes 501–509 are processed. The AO system then processes node 510 by applying a transform that recognizes that the quantifier tags of nodes 505 and 509 can be coalesced and migrated. However, since the iteration operands p2 and p3 are applied to different images, that is a and b, the iteration operands cannot be coalesced. However, since the images have the same size, the index variables can be combined. The resulting quantifier tag is:

$$\_Q(\forall <p2|p3>:(<a|b>[idx3:int,idx4:int]:pixel))$$

When the AO system processes node 511, it migrates the quantifier tag from node 510 to node 511. The AO system processes node 512 by applying a transform that recognizes that the tags on node 501 and node 511 can be coalesced and migrated. The transform recognizes that a single pair of index variables can be used to access images a, b, and c. Thus, the transform adds to node 512 the following quantifier tag:

$$\_Q(\forall <p1|p2|p3>:(<c|a|b>[idx1:int,idx2:int]:pixel))$$

The AO system applies the transforms by traversing the AST and at each node determining whether each transform can be applied to the node. Each transform includes a test to determine whether it is applicable. If the transform is applicable, the transform performs the transformation and returns an indication that it was applied. Conversely, if a transform is not applicable, the transform makes no modification to the AST and returns an indication that it was not applied. A transform determines whether it is applicable by comparing the contents of the subtree of which the current node is the root node. For example, referring to FIG. 5B, when processing node 510, one transform would detect that the operator in node 510 is a "+" operator (i.e., image addition operator) and that a "forall" loop quantifier tag for images of the same size have been added to its two operand nodes 505 and 509. When the transform detects such a pattern, the transform performs the coalescing of the quantifier tags and migrates the quantifier tag to node 510. The transform then returns an indication that it was applied. In one embodiment, the transforms are organized according to the domains to which and phases in which they can be applied. At each phase, the AO system only attempts to apply those transforms that have been designated for that phase.

In many instances, the processing of a transform is the same for many different operators that are in the current node. For example, referring again to FIG. 5B, if node 510 referred to an image subtraction operation ("−") rather than an image addition operator (e.g. "+") operator, then the processing would be the same. Therefore, the transforms can be grouped according to the types of operators referred to as a "group" of operators. The high-level operators that apply to the image data structures can be categorized into the following groups:

1. arithmetic operators;
2. parallel independent data flow operators;
3. reduction operators;
4. convolution operators; and
5. expansion operators.

Within each group, all of the operators have a common data flow and data dependency pattern and thereby, the groupings "encode" that data flow and data dependency pattern information implicitly. This implicit encoding is used by the AO system to avoid the difficult data flow and data dependency analysis step that conventional optimization methods employ.

Figure 6A:
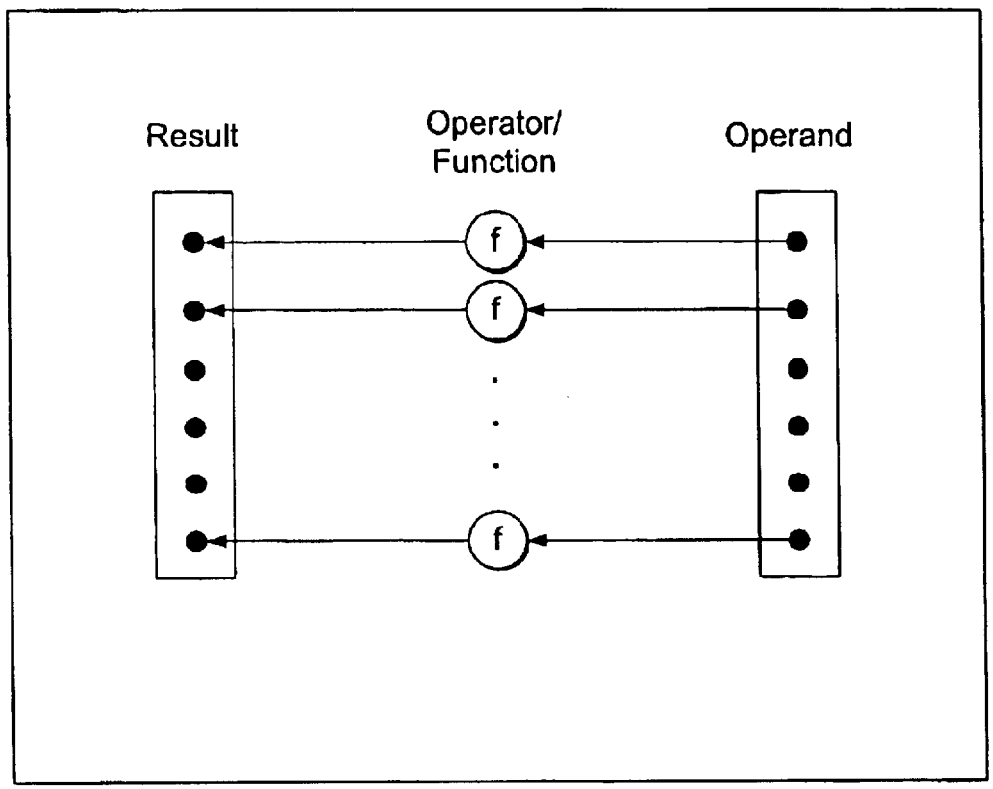
FIGS. 6A–6E illustrates the relationship between the operand, operator, and result for various operator groups.
Figure 6B:
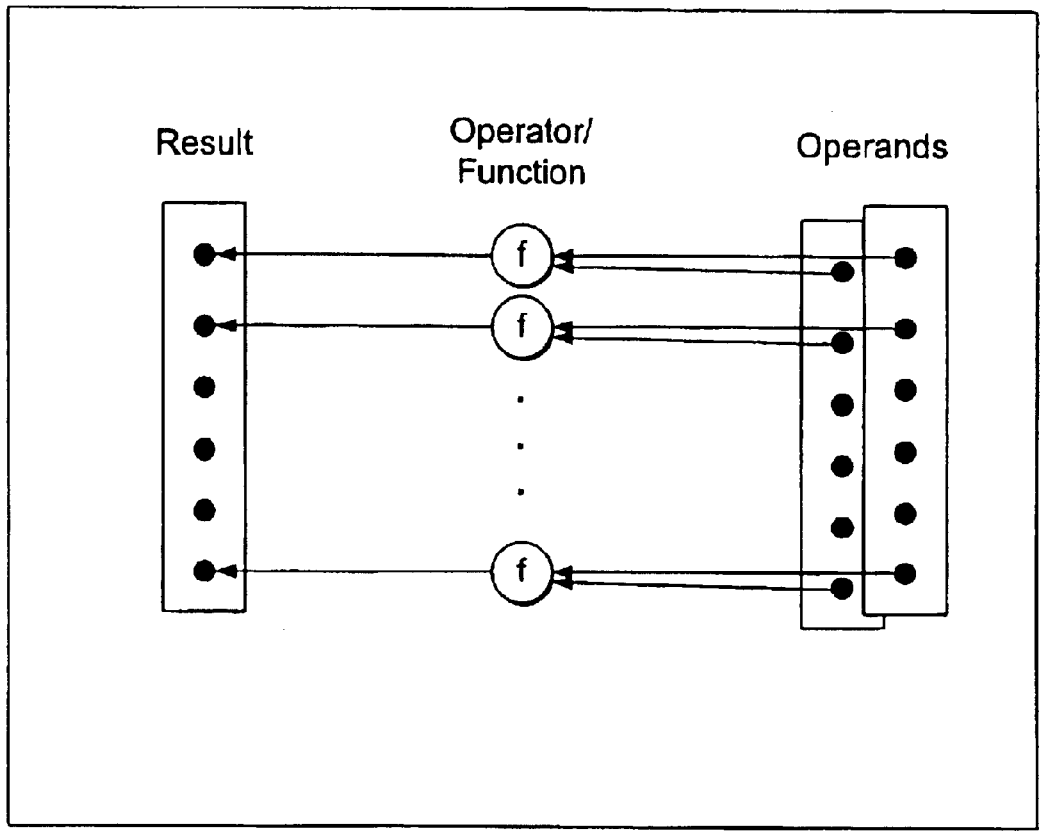

The arithmetic operators have the characteristic that the result for a given element of the image relies only on the value in the corresponding element of the operand. For example, the squaring of an image (e.g., $a^2$), is calculated by squaring each individual element of the image. FIGS. 6A and 6B illustrate the data flow and data dependency relationships between the operator, operands, and results for the unary and binary operator arithmetic groups, respectively. The arithmetic operator group comprises unary arithmetic operators (e.g., square and square root), binary arithmetic operators (e.g., addition of a constant value to each element in the image), the assignment operator, and function operators that input an image and output another image whose values depend only upon the values of the input image and which have no side effects. Iterations for multiple subexpressions within an encompassing expression can be combined when the operators of those subexpressions are arithmetic operators. For example, the high level subexpressions of unary operator f and binary operator g (which are shown in function form) can potentially have their iterations combined for many combinations of those operators such as (but not limited to):

... f(g(ImageA, ImageB)) ...
... h(f(ImageC), g(ImageA, ImageB)) ...
... g(f(ImageA), ImageB) ...

given the additional requirement that the newly introduced binary operator h is a member of the parallel independent data flow operator group.

The parallel independent data flow operators have the characteristic that they are applied to sets of high-level data structures that are structurally isomorphic or that have subparts that are structurally isomorphic. For example, the addition operator that applies to two images with the same dimensions is in this group. The $[i,j]^{th}$ element of the sum of the two images depends only upon the $[i,j]^{th}$ element of each operand image. The computation on each element is independent in the sense that between each step of the iteration the resulting value does not depend on the values generated during another step. FIG. 6B illustrates the relationship between the operands, operator, and result for the parallel independent data flow group. This group includes arithmetic operators (e.g., unary minus) and mathematically pure functions applied to individual replicated structures or applied to parallel replicated structures. Iterations over the operands and results for operators in this group can typically be combined. (A mathematically pure function is a single-valued function—symbolically represented as f(x,y, ... )—that depends only on the input values x,y, ... and no other values. Further, these functions have no side effects, such as the assignment of values to global variables or the execution of input or output operations.)

Figure 6C:
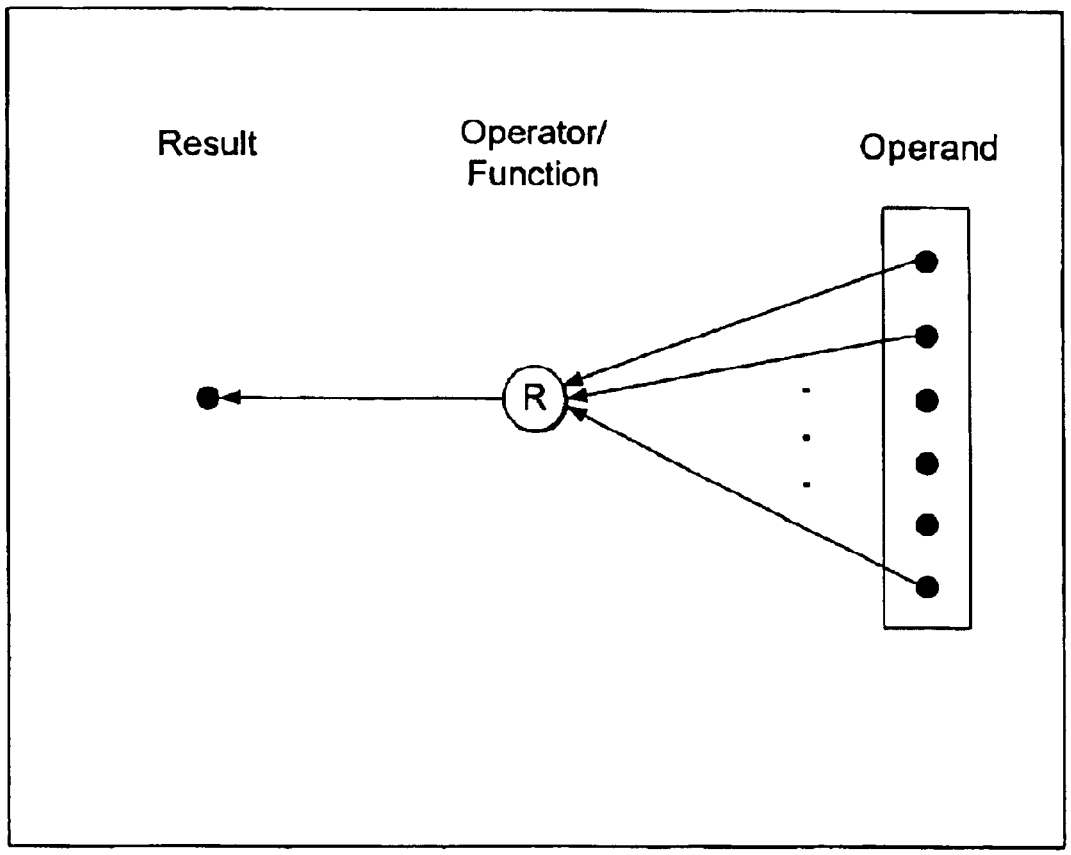

The reduction operators are operators that map a high-level data structure or a portion of a high-level structure into a single value. Because of the dependency, all the values of the operand need to be established prior to calculating the result. FIG. 6C illustrates the operand, operator, and result of reduction group. This group includes operators that search a composite data structure for a certain value (e.g., minimum value) and that compute a single value for a composite data structure (e.g., the average of all the values). Certain iterations cannot be combined when reduction operators are used. For example, in the following expression $A + \min(B)$ the iteration to find the minimum value of matrix B cannot be combined with the iteration to add that minimum value to each element of matrix A.

Figure 6D:
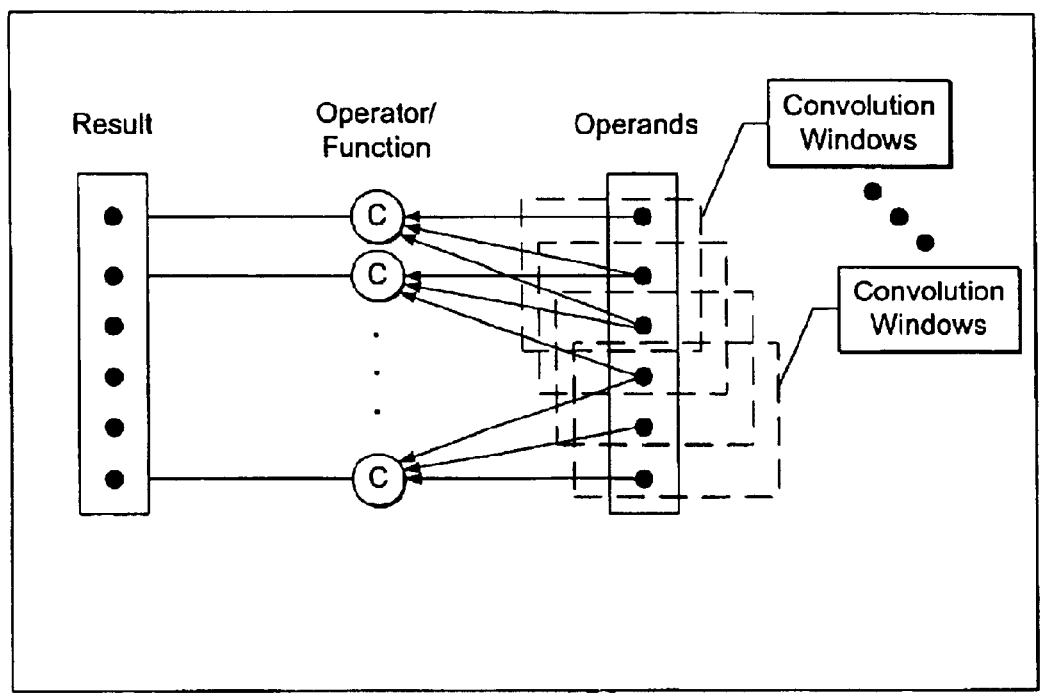

The convolution operators are combinations of reduction operators nested within parallel data flow operators. The convolution operators reduce a portion of the high-level data structure into a single value in the resulting data structure. The convolution operators are typically implemented with nested loops: the outer loop iterates over each element of the operand high-level data structure and the inner loop iterates over a convolution window. FIG. 6D illustrates the operands and convolution windows, operator, and result for the convolution group. When convolution operators are used, all the values of an operand matrix may need to be determined before the convolution operator is applied. This requirement limits the combining of iterations when convolution operators are being used. For example, in the expression $((A \oplus s) \oplus t)$ the ($A \oplus s$) convolution must be completed and stored in some temporary image such as T21 before the (T21$\oplus$t) convolution can be begun. Therefore, the iterations over these two convolutions may not be combined.

Figure 6E:
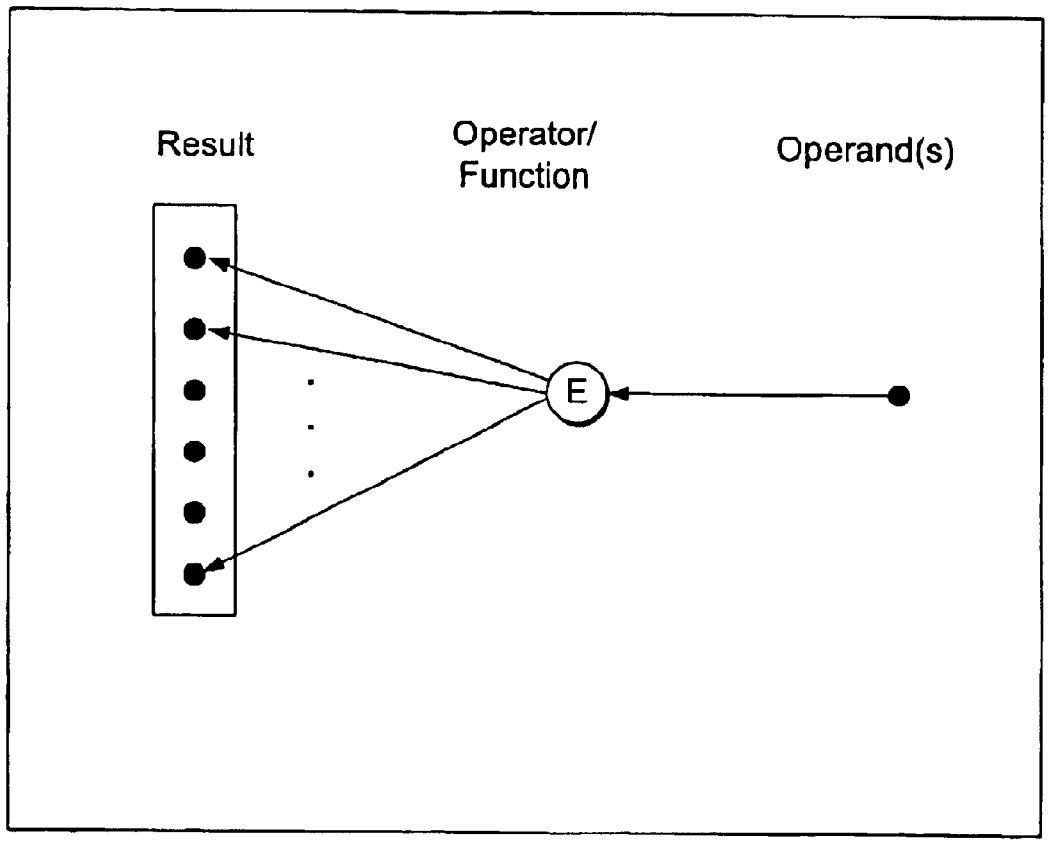

The expansion operators are the inverse of reduction operators. The expansion operators take a single value and generate multiple values to fill a high-level data structure. The complete set of operands upon which the result depends need to be computed before the result is known. If the input operands of the expansion operator are atomic values (i.e., integers), the iterations may be combinable. If the input operands are expressions, the semantics of those expressions determine the combinability of the iteration. FIG. 6E illustrates the operand, operator, and result for the expansion group. The group includes operators that fill an array with a constant value or an array with values that vary based on the index of the array.

Figure 7:
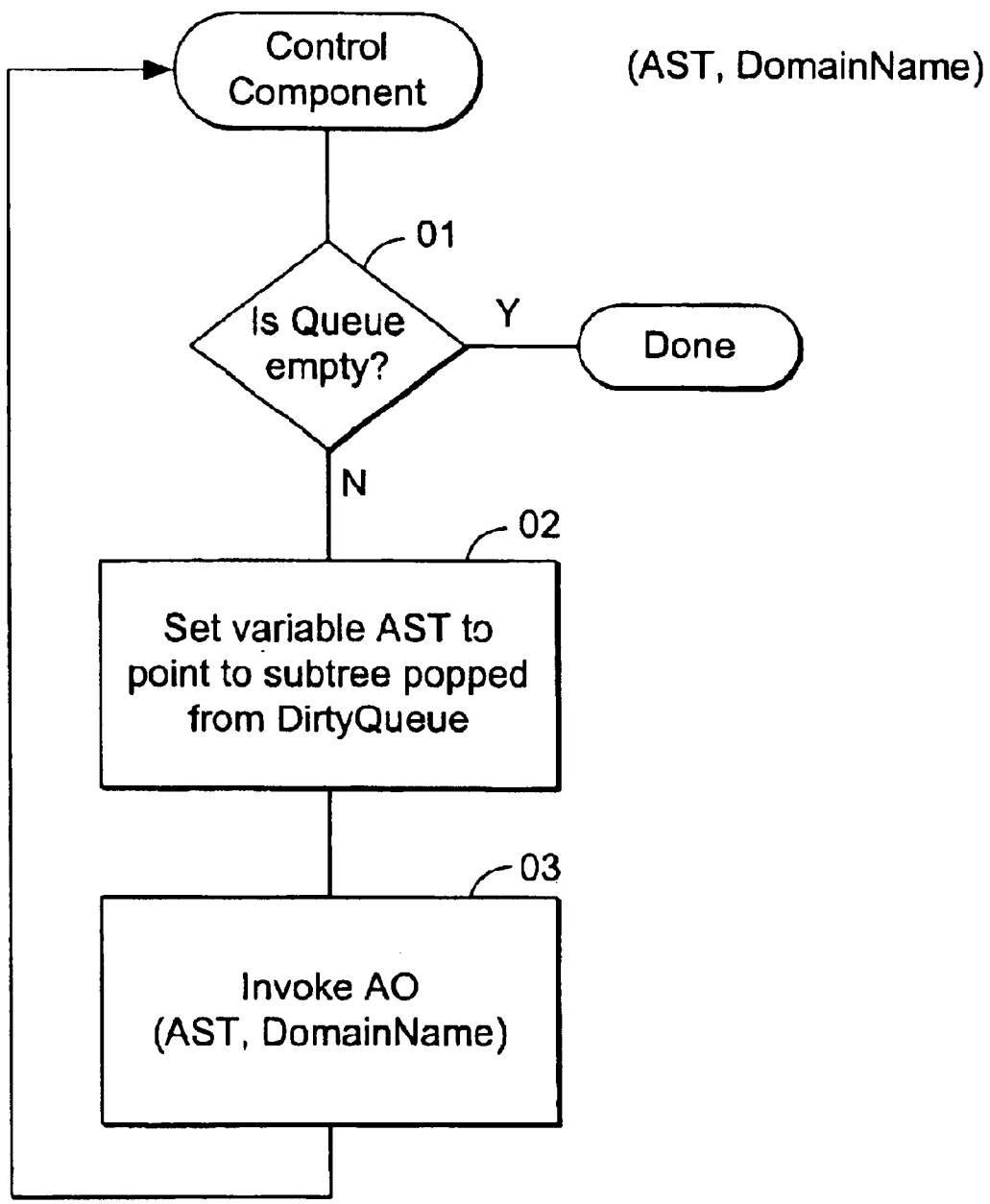
FIG. 7 is a flow diagram of the control component.

The AO system includes a control component that controls the traversing of an AST and applying of the various transforms to the AST. When the control component is invoked, it is passed the root node of the AST to be processed and the name of a domain associated with the AST. The control component stores a reference to a root node in a to-be-processed queue and loops popping the top of the queue and invoking an AO routine that controls the traversing and invoking of the routines that implement the phase components. A transform may replace a subtree with another subtree that, for example, may use lower-level computational constructs. The transform may place the root node of the new subtree on the queue. In this way, the AO system applies further transforms to the nodes of the subtree. FIG. 7 is a flow diagram of the control component. The control component initially stores a reference to the root node of the AST in the queue. In step 701, if the queue is empty, then the control component is done, else the control component continues at step 702. In step 702, the control component selects a subtree headed by the node popped from the queue. In step 703, the control component invokes the anticipatory optimization ("AO") routine passing the selected subtree and the domain name. The control component then loops to step 701 to determine whether the queue is empty.

Figure 8:
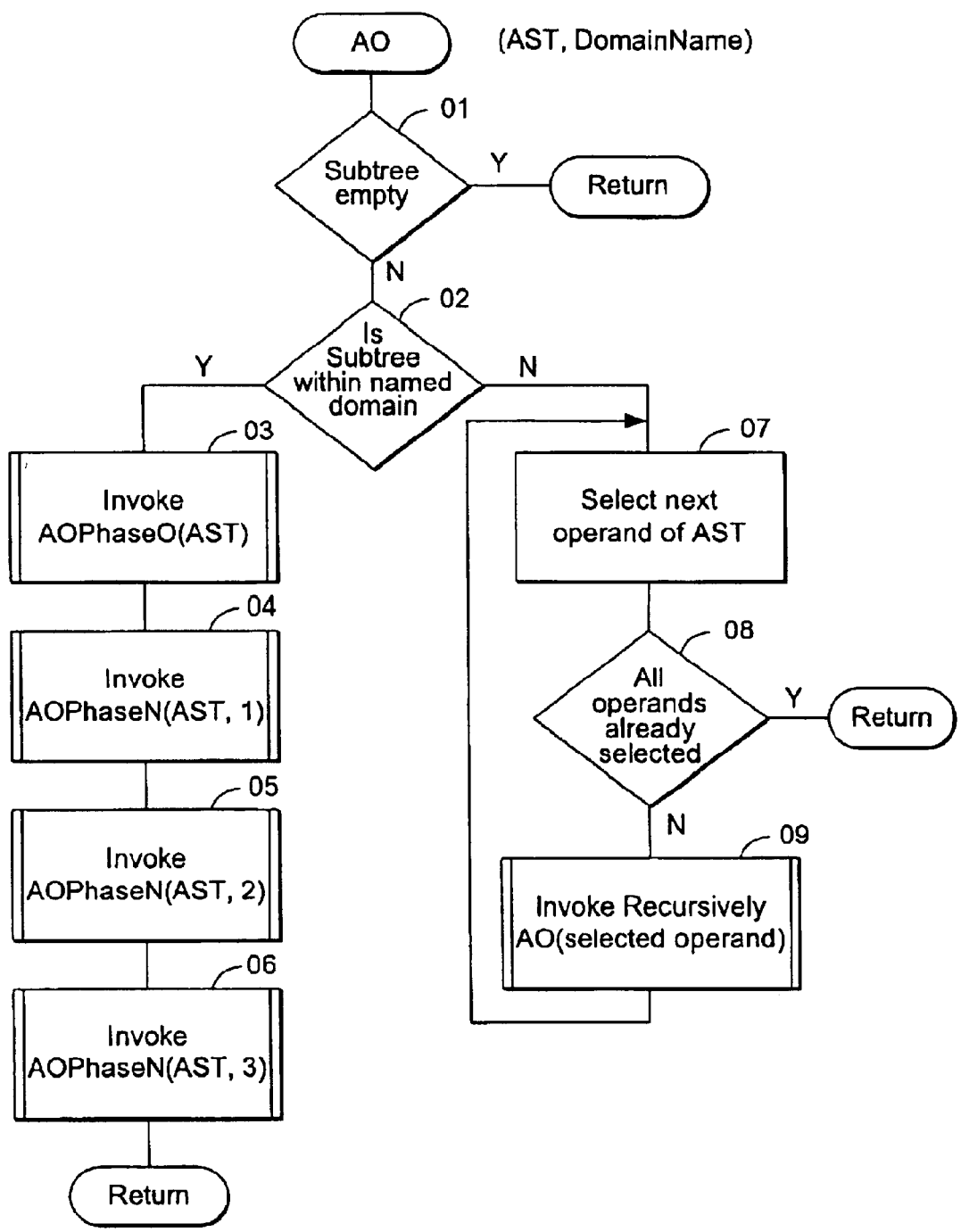
FIG. 8 is a flow diagram of the AO routine.

FIG. 8 is a flow diagram of the AO routine. The AO routine is passed a pointer to the subtree to be processed and a domain name. The routine examines the definition of the operator at the top of the AST to see if it is in the named domain or within a domain that inherits from the named domain. For example, if the operator in the AST is the convolution operator, then the definition of convolution operator, which is located at some remote point in the AST, is tagged with the domain "Image." If the domain condition is fulfilled, the routine performs the anticipatory optimization on the subtree by successively invoking routines to effect the processing for phases 0–3. Otherwise, the routine recursively invokes the AO routine for each operand of the root node of the subtree. In step 801, if the subtree is empty, then the routine returns, else the routine continues at step 802. In step 802, if the subtree is within the named domain, then the routine continues at step 803, else the routine continues at step 807. In steps 803–806, the routine invokes the subroutines to process each of the phases of the AO system and then returns. Since the processing for phases 1, 2, and 3 are the same, except for selecting to apply only transforms appropriate to the phase, the processing of these phases is implemented in a single subroutine ("AOPhaseN") with the current phase being passed as a parameter. In steps 807–809, the routine selects each of the operands of the subtree and recursively invokes the AO routine passing the node of the selected operand. In step 807, the routine selects the next operand of the subtree. In step 808, if all the operands have already been selected, then the routine returns. In step 809, the routine recursively invokes the AO routine passing the selected operand and the domain name. The routine then loops to step 807 to select the next operand of the subtree.

Figure 9:
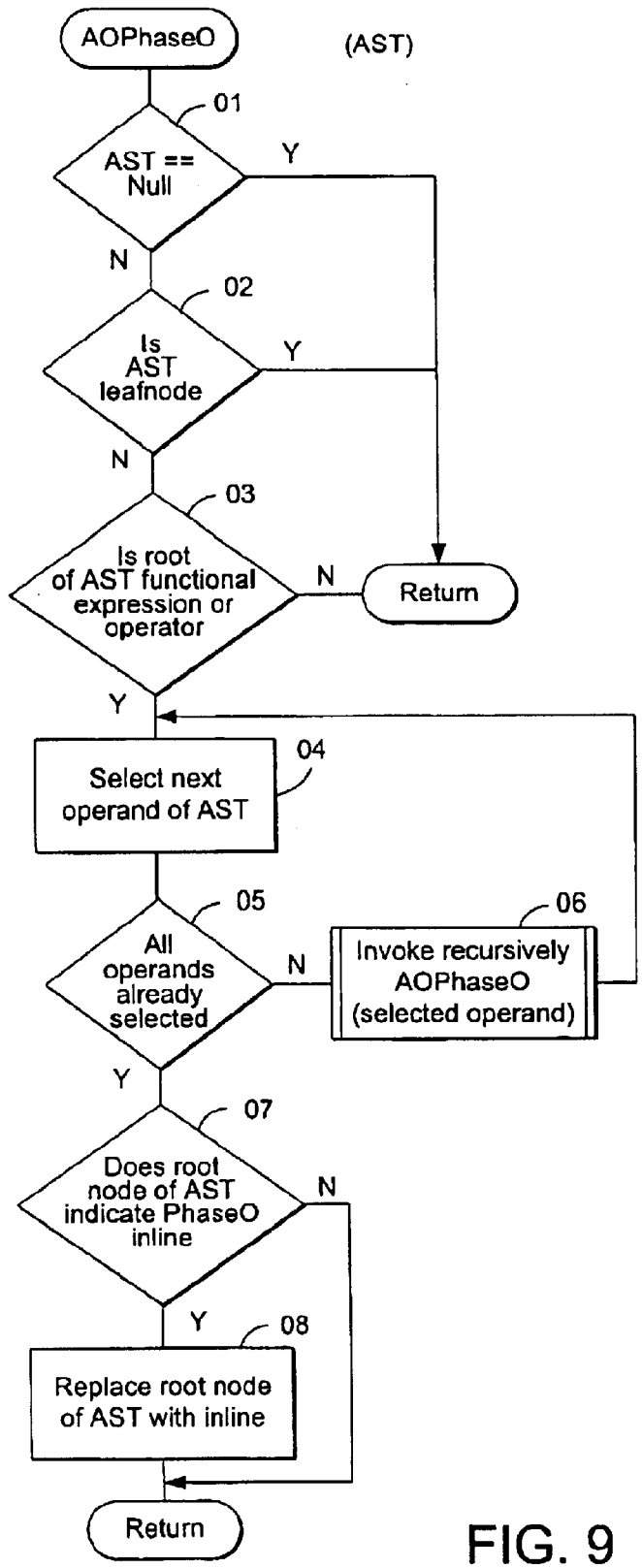
FIG. 9 is a flow diagram of the routine for processing phase 0 of the AO system.

FIG. 9 is a flow diagram of the routine for processing phase 0 of the AO system. This routine traverses the passed subtree in a depth-first, left-to-right manner by recursively invoking this routine for each operand. If the operator of the root node of the subtree has an optimization tag in its definition that indicates it should be moved inline, then the routine replaces the root node with the inline version of the operator. In step 901, if the subtree is empty, then the routine returns, else the routine continues at step 902. In step 902, if the subtree is a leaf node, then the routine returns, else the routine continues at step 903. In step 903, if the root of the subtree is a node with a functional expression or an operator, then the routine continues at step 904, else the routine returns. In steps 904–906, the routine loops recursively invoking the AOPhase0 routine for each of the operands of the root node of the subtree. In step 904, the routine selects the next operand of the root node of the subtree. In step 905, if all the operands have already been selected, then the routine continues at step 907, else the routine continues at step 906. In step 906, the routine recursively invokes the AOPhase0 routine passing the selected operand as the root of the subtree and loops to step 904. In step 907, if the definition of the operator in the root node of the subtree indicates that it can be placed inline, then the routine continues at step 908, else the routine returns. In step 908, the routine replaces the root node of the subtree with the corresponding inline subtree and returns. Alternatively, this subroutine could be implemented in the same manner as the subroutine for processing the other phases and a transform can be implemented to effect the placing of functions inline.

Figure 10:
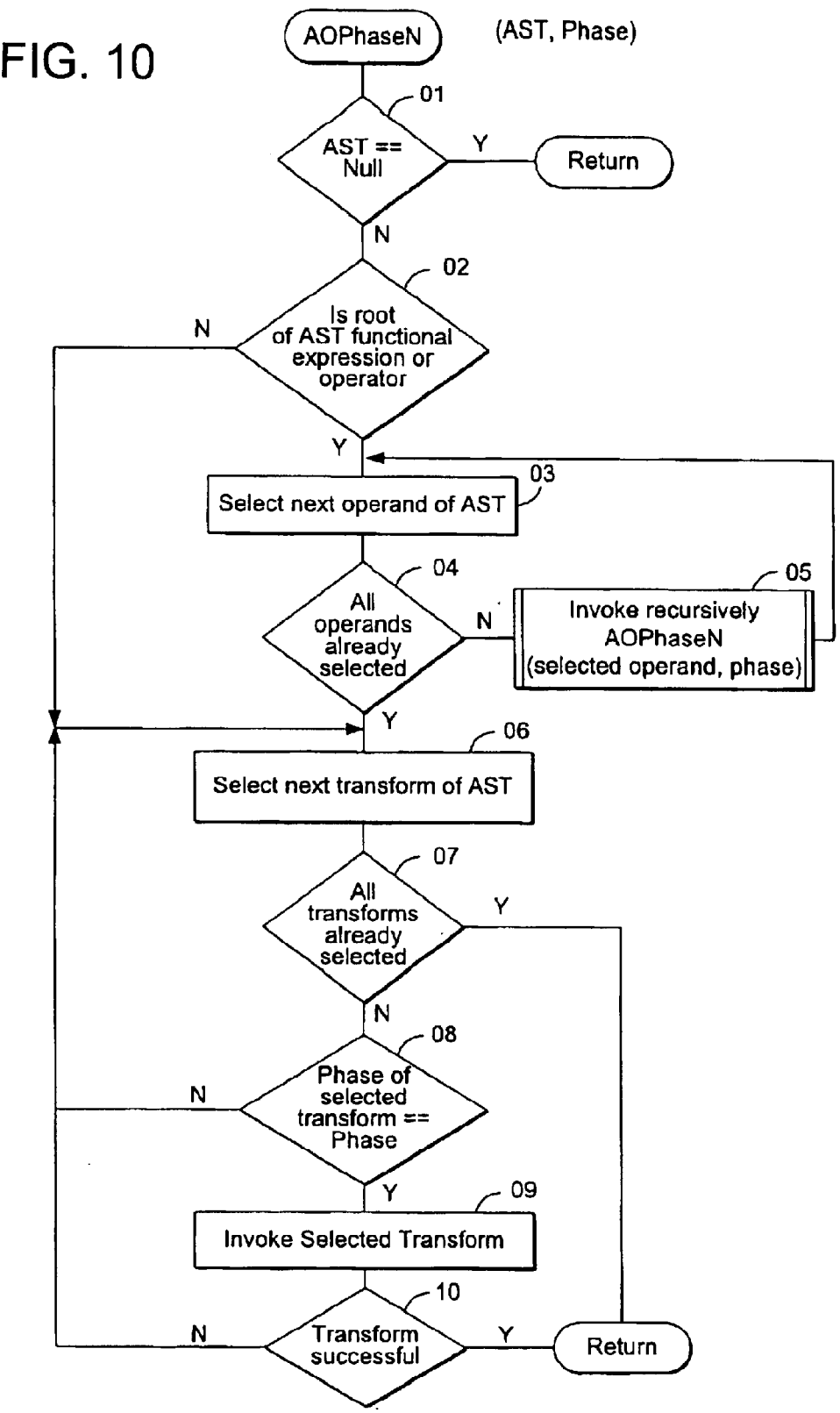
FIG. 10 is a flow diagram illustrating a routine for processing of phases 1–3 of the AO system.

FIG. 10 is a flow diagram illustrating a routine for processing of phases 1–3 of the AO system. This routine is passed an AST subtree and an indication of the current phase. The routine performs a depth-first, left-to-right traversal of the subtree by recursively invoking the routine. When a node is visited, the routine invokes each transform for that phase. When the first transform indicates that it was successfully applied, the routine then returns. A transform may add the root node of a subtree to the queue for further processing by the AO system. In step 1001, if the subtree is empty, then the routine returns, else the routine continues at step 1002. In step 1002, if the root node of the subtree is a functional expression or an operator, then the routine continues at step 1003, else the routine continues at step 1006. In steps 1003–1005, the routine loops selecting the operands of the root node of the subtree and recursively invoking the AOPhaseN routine for the current phase. In step 1003, the routine selects the next operand of the subtree. In step 1004, if all the operands have already been selected, then the routine continues at step 1006, else the routine continues at step 1005. In step 1005, the routine recursively invokes the AOPhaseN routine for the current phase and loops to step 1003 to select the next operand. In steps 1006–1010, the routine loops attempting to apply each transform until one applies. In step 1006, the routine selects the next transform that might be applicable to the root node of the subtree. In step 1007, if all the transforms have already been selected, then the routine returns. In step 1008, if the phase of the selected transform matches the current phase, then the routine continues at step 1009, else the routine loops to step 1006 to select the next transform. In step 1009, the routine invokes the transform. In step 1010, if the transform is successful (i.e., applied), then the routine returns, else the routine loops to step 1006 to select the next transform.

In the following, various transforms are described relating to the domain of image processing. These transforms operate on operators and operands that are in the domain of image processing. The type of high-level computational constructs for this domain include a pixel, an image, a template, and a number, which is inherited from the C programming language domain. Data of type pixel represents the gray scale intensity of one pixel of an image. Data of type image is defined to be an m by n matrix of pixels. A template datatype translates into a complex C domain data structure consisting of three components:

1. A matrix w containing numbers representing weights w[l,m] to be applied by the convolution operator,
2. A similarly structured matrix XY that for each w[l,m] defines an [x,y] coordinate pair value XY[l,m]=[f(i), g(j)] identifying, the pixel in the input image a to which the weight w[l,m] is to be applied, where the values f(i) and g(j) are computed from the coordinates of the currently selected pixel a[i,j] and the offsets implied by the coordinates l and m within w, and
3. A procedure that at run-time calculates the coordinate pair values of XY for each pixel positioning [i,j] in a and the values of w, if they are not constant (e.g., they could be a function of the [i,j] position in a).

In other words, a template performs two separate functions: 1) it supplies data values or weights that participate in the computation of the output pixel corresponding to the current input pixel and 2) it supplies a coordinate mapping from the [x,y] position of the current input pixel upon which the w matrix is centered into a set of coordinate pairs of the pixels in the neighborhood of the current pixel that will participate in the computation of the output pixel corresponding to the current input pixel. The coordinate mapping and the computation of the w values may involve arbitrarily complex logic. For example, when centering w on a border pixel in a, this logic determines whether or not to include the elements of w that fall outside of the image a and if they are to be included, exactly how will they participate in the computation (e.g., will they all be zero or some other value?).

For example in the case of the backward convolution operator, the output pixel (b[i,j]) corresponding to the input pixel a[i,j], is computed by the following formula:

$$b[i,j]=\Sigma_{l,m}(a[x \text{ coordinate of } XY[l,m], y \text{ coordinate of } XY[l,m]]*w[l,m])$$

Data of type number is a group of types that includes integers and reals. The type number is introduced to represent types of operands that can be treated as a group. Table 1 provides a definition of these types. The definition of these types includes a list of those transforms that can be applied to these types. In the case where the mapping of a high-level type to a lower-level type is straightforward with little or no variation, the complexity of defining a separate transform or transforms for each data type is omitted and a shorthand that expresses the simple transform inline as the value (i.e., the right hand side of the → operator) of the definition is used. This is just a notational convenience and simplification. Underneath, there is still an AO system generated transform that is triggered to do the translation from high-level to low-level constructs. For example, the following declaration of a variable as type pixel:

pixel var1;

would map to the following low-level declaration:

int var1;

This mapping is provided by the following definition in Table 1:

Define Type Pixel $Name→{int $Name}

The text to the right of the assignment operator indicates the low-level mapping. The symbol prefixed with the "$" indicates substitution of the corresponding symbol from the high-level declaration. For example, the symbol "var1" is substituted for the symbol "$Name." The types are defined hierarchically and transforms can be defined for each level in the hierarchy. For example, the highest level type is composite, which includes pixel, image, template, and number as subtypes.

TABLE 1

```
Define Types
{
    Define Type Composite    _Transform(CompositeLeaf)
                             _Transform(ReduceLeafAbstractions)
                             _Transform(ReduceAbstractDeclarations)
                             _Domain(Image)
    {
    Define Type Pixel $Name · {int $Name};
    Define Type Image $Name [$Dim1, $Dim2] · {Pixel $Name [$Dim1, $Dim2]};
    Define Type Template $WeightType $Name () [$Dim1, $Dim2] {$CodeBody} ·
        {
        // Define table to communicate with convolution function
        #{ $TableName = concat($Name,"Table");} //Side effect: create name
        TableElement ( $WeightType) $TableName [$Dim1, $Dim2];
        #{ $ProcName = concat($Name,"Proc");} //Side effect: create name
        // Define user written template code procedure
        void $ProcName () { $CodeBody}
        // Register the table with the convolution operator code
        // Giving pointer to it, its dimensions, and routine that fills it with data
        RegisterConvolutionTable(&($TableName), $Dim1, $Dim2,
                                    ((* $ProcName) ()));
        }
    Define Type TableElement ($WType) · // Simple parameterized type
        {struct
            {
            int XIndex; // X index in target image in terms of current pixel
            int YIndex; // Y index in target image in terms of current pixel
            $WType weight; // Convolution weight multiplier for
                                        // target image pixel [XIndex, YIndex]
            }};
    Define Type Number; _Domain(C)
        {
        Define Type int;
        Define Type real;
        ...
        }
    }
    ...
}
```

Table 2 contains the definitions of the operator group. The operators are organized hierarchically and transforms can be defined for each level. The definitions of the operators define the AST pattern of the operators and their operands as well as the return type of the operator. For example, the definition Define Operator Group ArithOp $Op(pixel, pixel):pixel when
  ($Op∈{*,/,+,− . . . })

where ArithOp is the(name of the operator group, "(pixel, pixel)" indicates the pattern of the operand types in the AST (i.e., the operators of this group operate on two operands of type pixel); ":pixel" indicates the return type of the operation; and the "when ( . . . )" clause is a shorthand that indicates an additional condition for ArithOps that are covered by this definition. In this case, the "when" clause requires that the specific ArithOp operator, which will be bound to the transformation-time pattern variable $Op, be a member of the enumerated operator set {*,/,+,−, . . . }. This shorthand saves the transformation programmer from having to write a separate definition expression for each specific operator. A "when" clause can express arbitrary conditions. Operationally, the patterns plus the "when" conditions provide the case logic for identifying the specific class of operators in a specific situation and thereby determine where on the inheritance hierarchy to start the search for applicable transformations. This group is within the higher-level operator group ArithOps, which has transforms "ArithOpsOnComposites" and "GenerateCodeForFunctions" defined as indicated by the following:

Define *OperatorGroup* ArithOps_Transform(*ArithOpsOnComposites*)

_Transform(*GenerateCodeForFunctions*)

The transforms for the types of Table 1 and the operator groups of Table 2 are described in the following.

TABLE 2

```
Define OperatorGroups _Transform(GenerateLoopStructure) _Domain(Image)
{
    Define OperatorGroup ArithOps      _Transform(ArithOpsOnComposites)
                                       _Transform(GenerateCodeForFunctions)
    {
    Define Operator Group ArithOp $Op(pixel,pixel):pixel when ($Op+{*,/,+,-,=,...});
    Define Operator Group ArithOp $Op(pixel):pixel when ($Op+{+,-,power,sqrt,...});
    ...
    Define Operator power( [ pixel | number], number) : [ pixel | number] ;
    _Transform(GeneratorCodeForPower)
    }
    Define OperatorGroup ParallelOps _Transform(ParallelOpsCompositeOperands)
    {
    Define Operator Group ParallelOp $Op(pixel,pixel):pixel when ($Op+{*,/,+,-,=,...});
    Define Operator Group ParallelOp $Op(pixel):pixel when ($Op+{+,-,...});
    Define Operator Group ParallelOp $Op(image,image):image when ($Op+{*,/,+,-,=,...});
    Define Operator Group ParallelOp $Op(image) : image when ($Op+{+,-,...});
    }
    Define OperatorGroup ConvolutionOps    _Transform(BreakNestedConvolutions)
                                           _Transform(ReduceConvolutionOperator)
    {
    Define Operator Group BackwardConvolutionOp(image, Template):image
    when ($Op+ {⊕,☑,☑, ... }); _Transform(BackwardConvolutionOnLeaves)
    Define Operator Group ForwardConvolutionOp(Template, image) : image
    when ($Op+ {⊕,☑,☑, ... }); _Transform(ForwardConvolutionOnLeaves)
    }
}
```

Figure 11A:
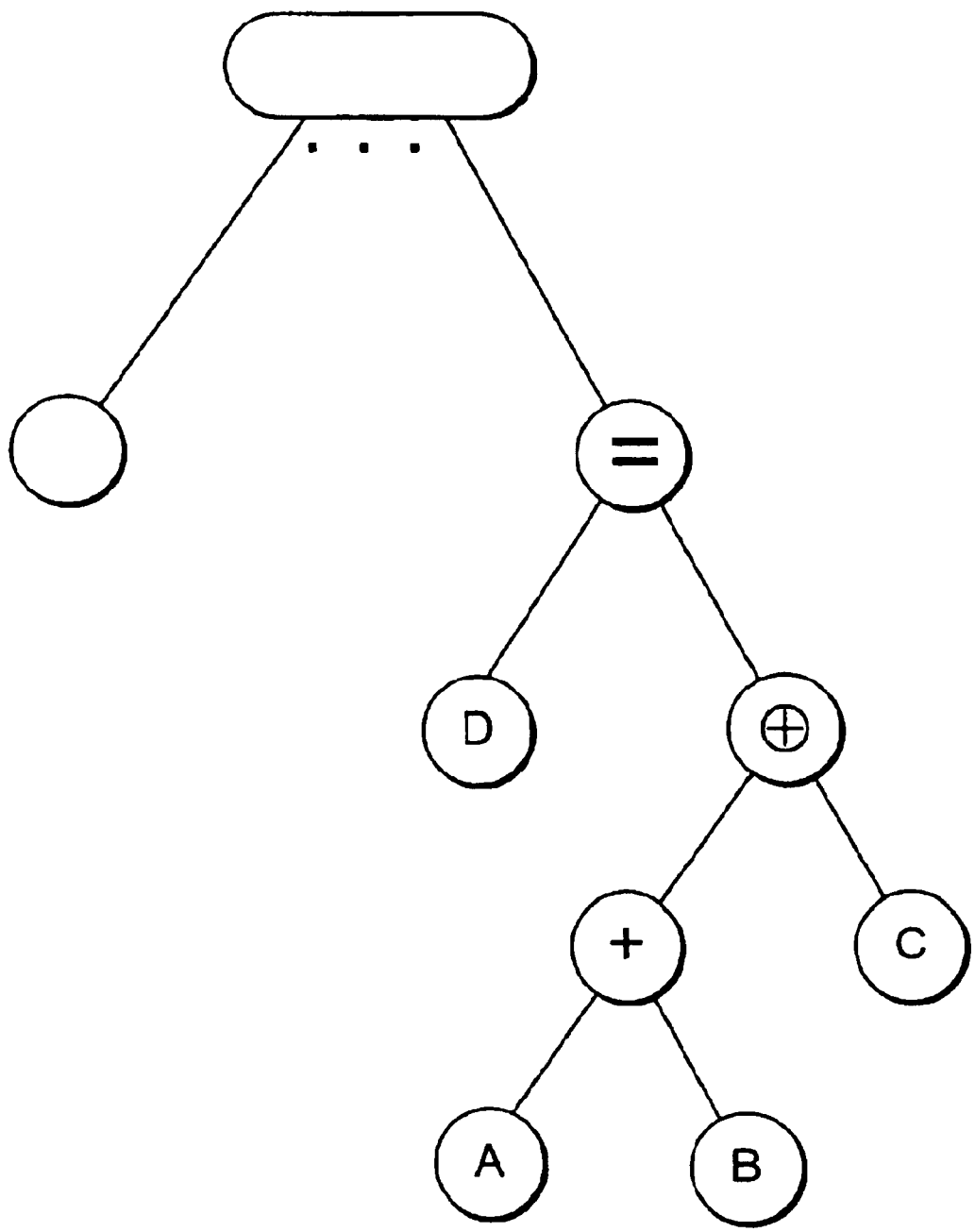
FIGS. 11A–11C illustrate the transforming of nested convolutions during phase 1.
Figure 11B:
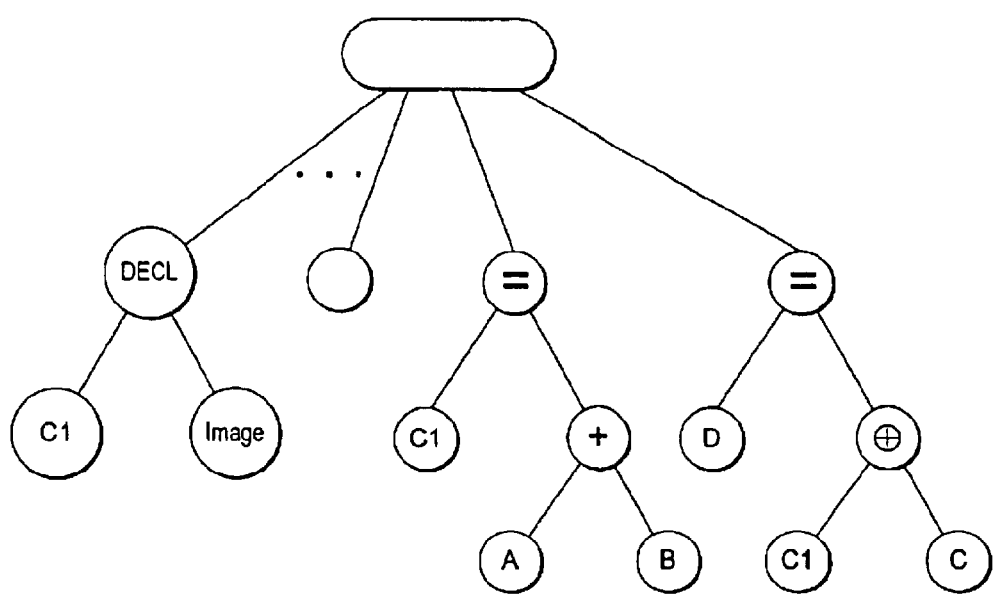
Figure 11C:
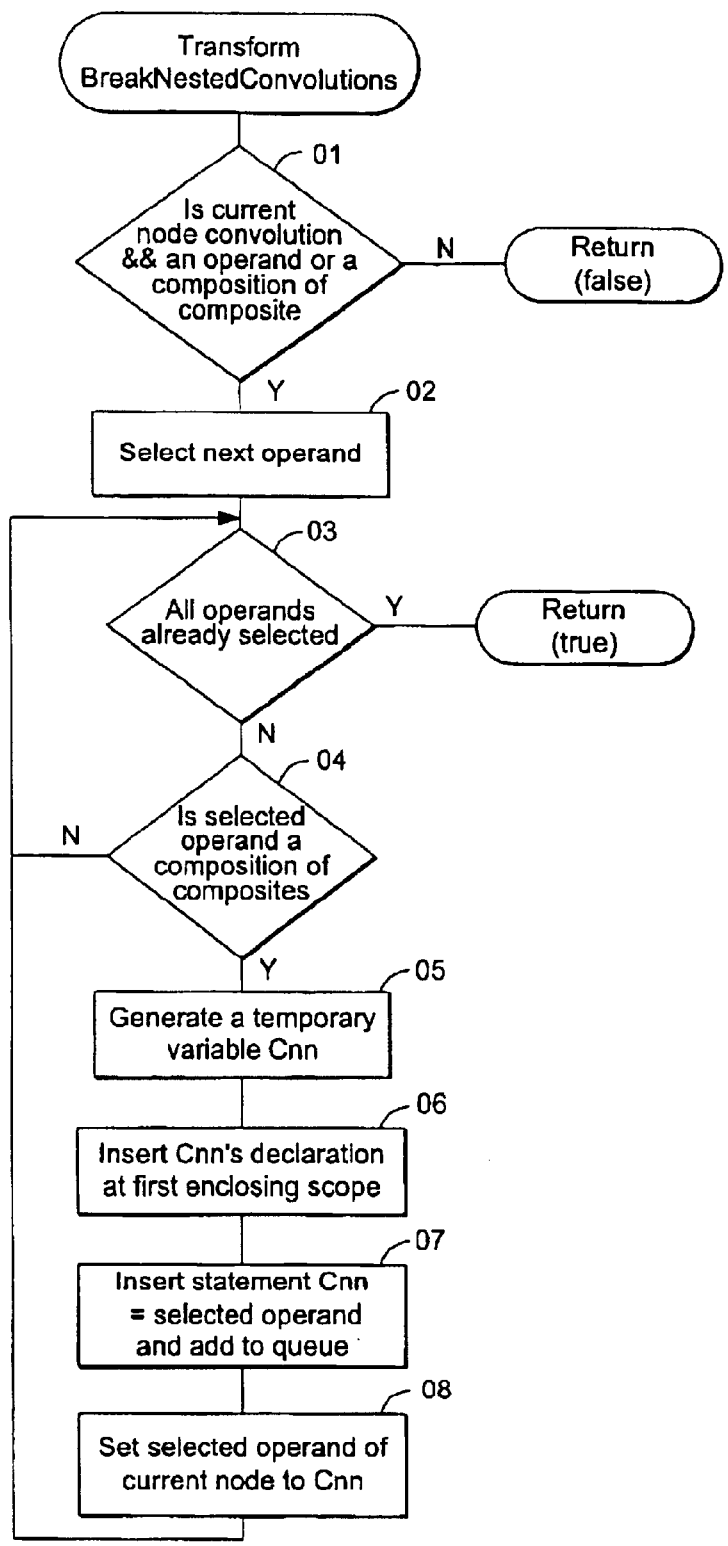

FIGS. 11A–11C illustrate the transforming of nested convolutions during phase 1. The transform BreakNestedConvolutions is defined for the operators within the group ConvolutionOps. The transform determines whether the root node refers to a convolution operator and whether at least one of the operands is a composition of a composite data structure (e.g., A+B, where A and B are images). If so, then the transform generates a temporary composite data structure, adds a statement to the AST to assign the result of the composition to the temporary structure, and replaces the expression of the composition in the current subtree with a reference to the temporary structure. FIGS. 11A and 11B illustrate a subtree before and after the transform is applied. The subtree represents the statement D=(A+B)⊕C. The transform adds a new portion to the AST representing the statement C1=A+B and revises the current subtree to D=C1⊕C. The variable C1 represents the temporary composite data structure. FIG. 11C is a flow diagram of the transform BreakNestedConvolutions. In step 1101, if the root node indicates a convolution operator and one of the operands is a composition of composites, then the transform continues at step 1102, else the transform returns an indication of false. In steps 1102–1108, the transform loops selecting and processing each operand. In step 1102, the transform selects the next operand. In step 1104, if both operands have already been selected, then the transform returns an indication of true, else the transform continues at step 1104. In step 1104, if the selected operand is a composition of composites, then the transform continues at step 1105, else the transform loops to step 1102. In step 1105, the transform defines a temporary variable of the form Cnn of the composite type, where nn represents a number generated by the AO system so that the variable name is unique. In step 1106, the transform inserts the declaration for the variable Cnn at the first enclosing scope of the current subtree. In step 1106, the transform inserts a statement assigning the value of the selected composition to the variable before the statement containing the current subtree and adds the statement to the to-be-processed queue so that anticipatory optimizations can be applied to the statement. In step 1108, the transform sets the selected operand at the current node to the variable Cnn and loops to step 1102.

Figure 12A:
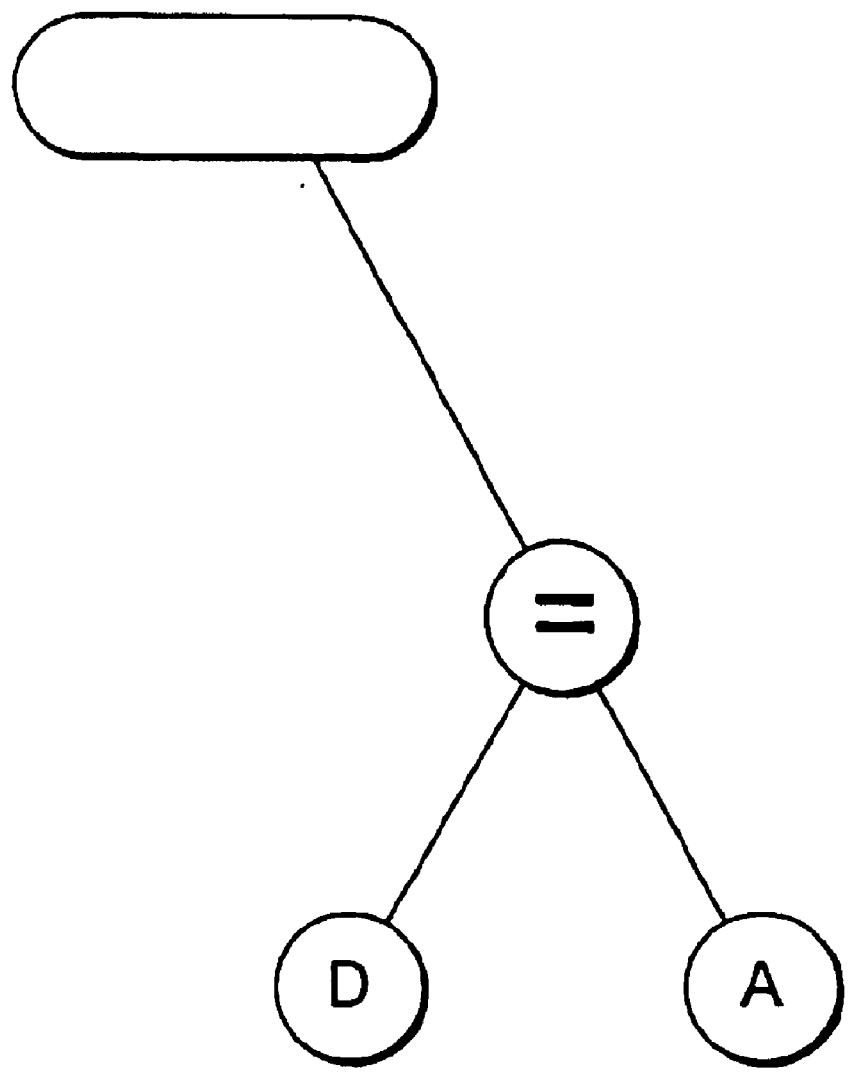
FIGS. 12A–12C illustrate the transforming of composite leaf nodes during phase 2.
Figure 12B:
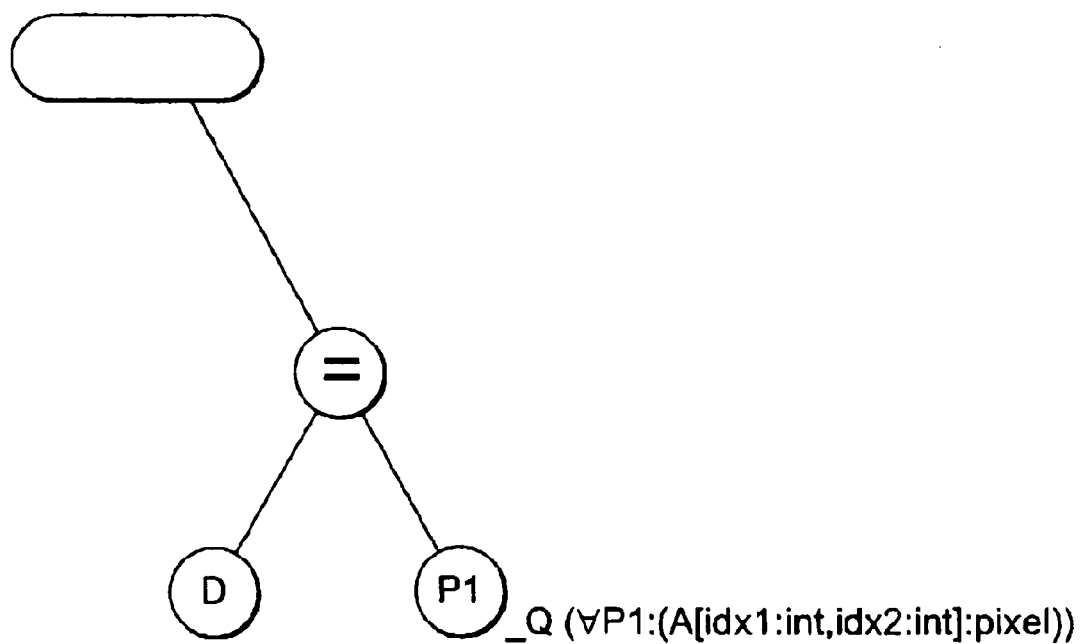
Figure 12C:
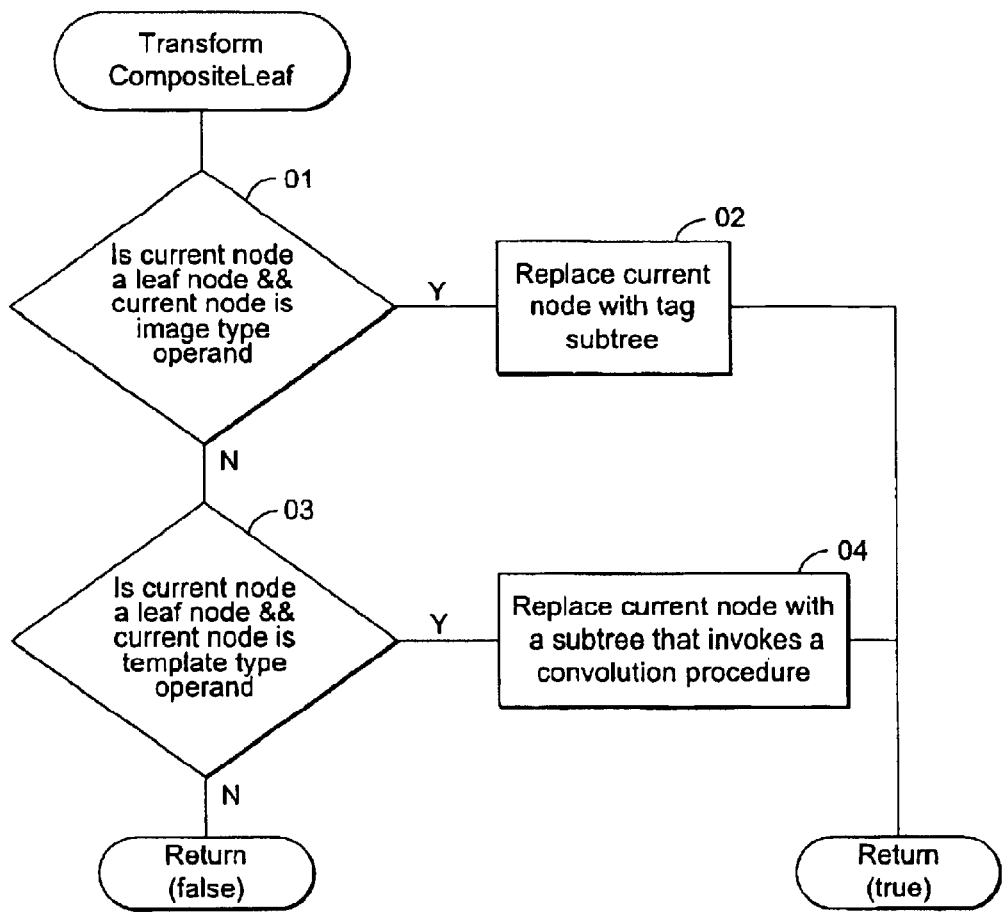

FIGS. 12A–12C illustrate the transforming of composite leaf nodes during phase 2. The transform CompositeLeaf is defined for the operands that are a subtype of the type composite. If a leaf node refers to an operand that is a composite (e.g., an image), then the transform adds the appropriate optimization tag. FIGS. 12A–12B illustrate a subtree before and after the transform is applied. The subtree represents the statement D=A, where D and A are images. The transform replaces the leaf node with a node that refers to iteration operand p1 and adds the following tag:

$$\_Q(\forall p1{:}(A[\text{idx1:int},\text{idx2:int}]{:}\text{pixel}))$$

FIG. 12C is a flow diagram of the transform CompositeLeaf. In step 1201, if the root node of the subtree is leaf node and the operand type is an image, then the transform continues at step 1202, else the transform continues at step 1203. In step 1202, the transform replaces the subtree with a node with the iteration operand and a quantifier tag and returns true. In step 1203, if the root node of the subtree is a leaf node and the operand type is a template, then the transform continues at step 1204, else the transform returns false. In step 1204, the transform returns true with no change to the node so that the processing moves on to the parent node, which is a general convolution operator (i.e., ⊕). A later transform in a later phase (i.e., ReduceConvolutionOperator) uses this unaltered leaf as an argument in the call to the general convolution function to be generated from its processing of the general convolution operator one level above this leaf in the AST. Indeed, there is the opportunity for ReduceConvolutionOperator transform to generate highly optimized code for the general convolution operator by inlining much of the template code.

Figure 13A:
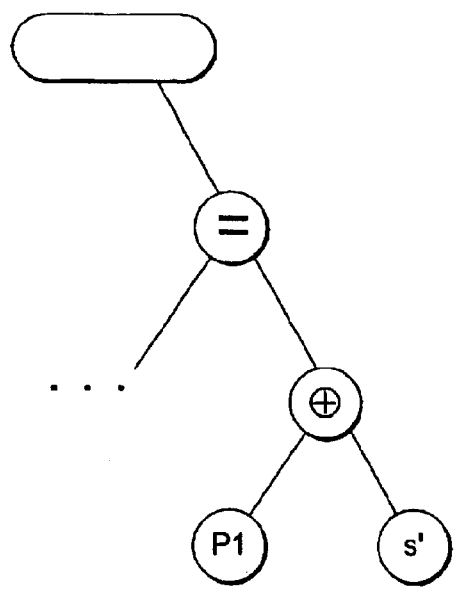
FIGS. 13A–13C illustrate the transforming that migrates a quantifier tag to a node that references the convolution operator during phase 2.
Figure 13B:
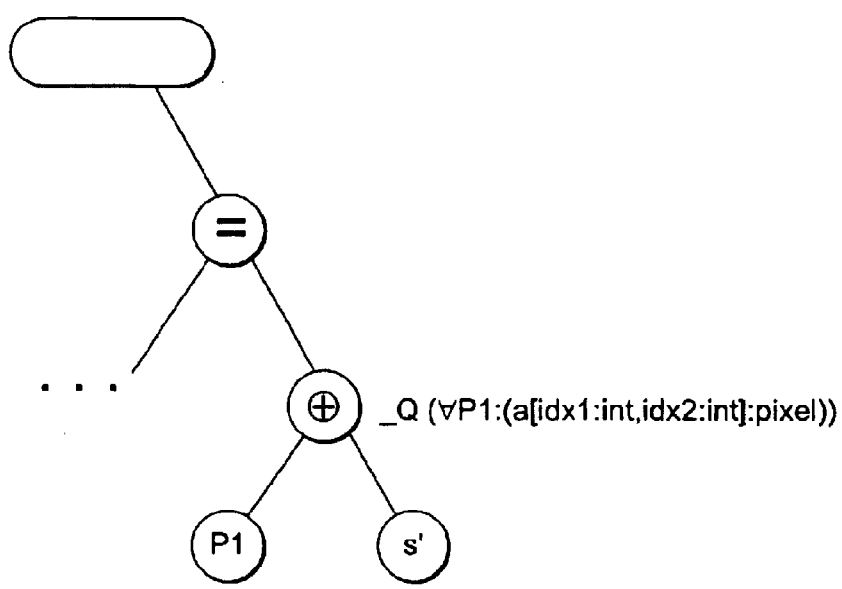
Figure 13C:
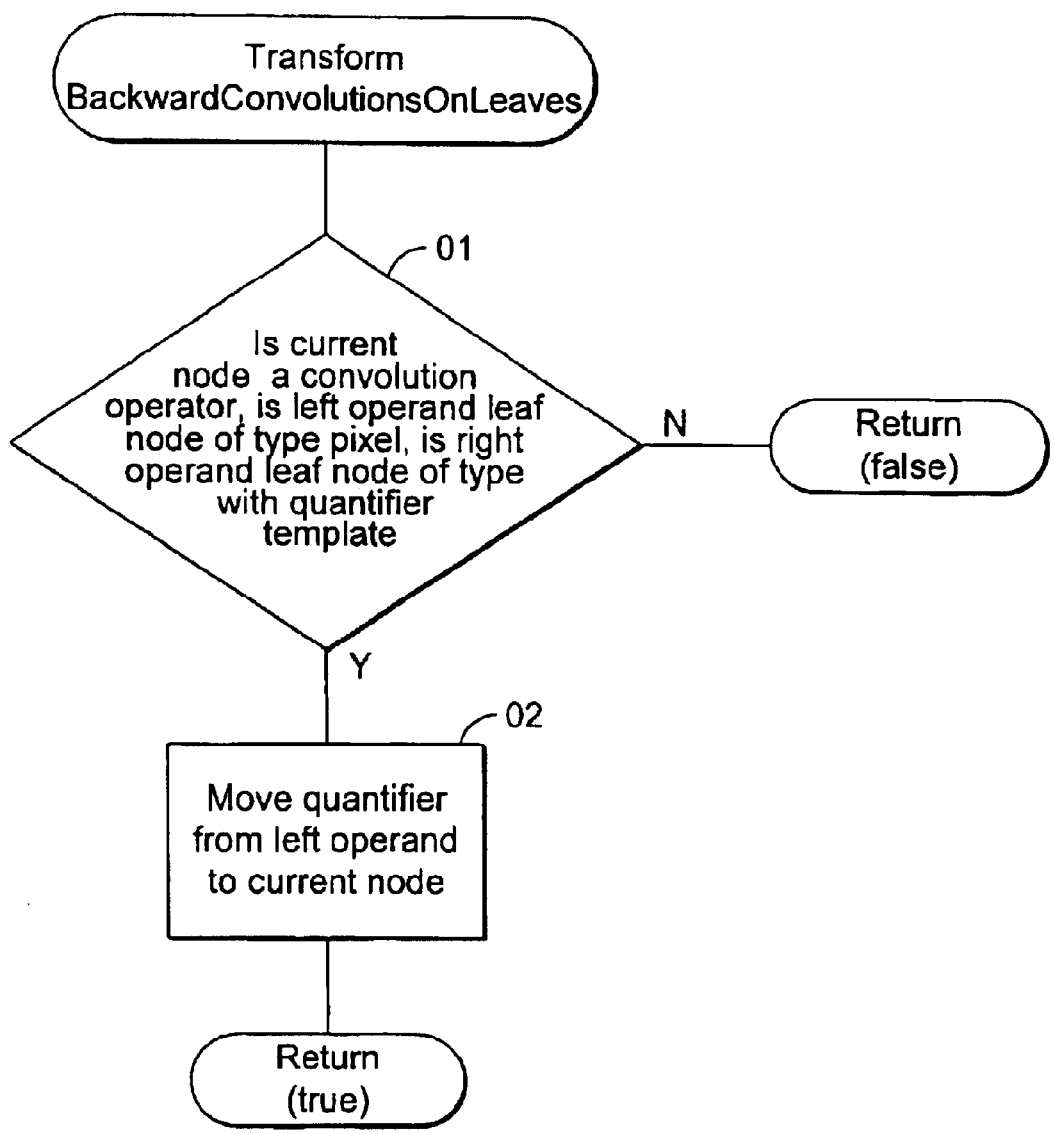

FIGS. 13A–13C illustrate the transforming that migrates a quantifier tag to a node that references the convolution operator during phase 2. The transform BackwardConvolutionOnLeaves is defined for the operators in the group BackwardConvolution. If the left operand is a pixel (e.g., iteration operand) and the right operand is a template, then a quantifier tag of the left operand is moved to the node of the convolution operator. FIGS. 13A–13B illustrate a subtree before and after the transform is applied. FIG. 13C is a flow diagram of a transform BackwardConvolutionOnLeaves. In step 1301, if the root node of the subtree is a convolution operator, if the left operand is a leaf node of type pixel with a quantifier and if the right operand is a leaf node of type template, then the transform continues at step 1302, else the transform returns false. In step 1302, the transform moves a quantifier tag from the left operand to the current node and returns a true.

Figure 14:
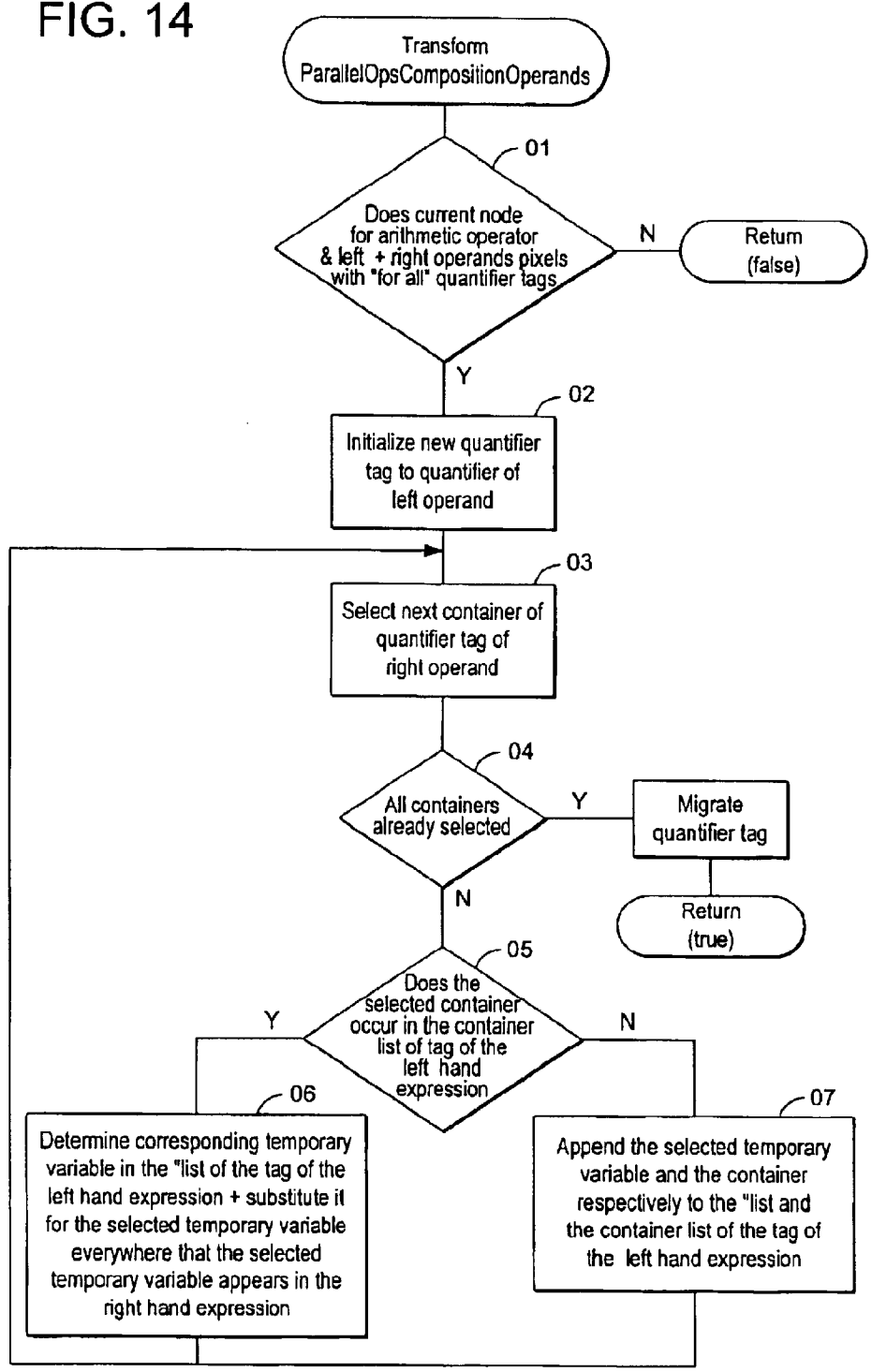
FIG. 14 is a flow diagram that illustrates the transforming of parallel operators of composite operands during phase 2.

FIG. 14 is a flow diagram that illustrates the transforming of parallel operators of composite operands during phase 2. The transform ParallelOpsCompositeOperands is defined for the operators in the ParallelOps group. This transform is applied when the operator is an arithmetic operator and the left and right operands are composite operands with the "forall" quantifier tags. The transform coalesces and migrates the quantifier tag to the operator node. If both the left and right quantifier tags refer to the same container (i.e., composite data structure), then the iteration operand for accessing the composite data structures can be shared. The index variables can also be shared. The transform initializes the new quantifier tag to contain the iteration operands, the containers, and the index variables of the quantifier tag of the left operand. The transform then adds those iteration operands and containers of the quantifier tag of the right operand for each container that is not already in the new quantifier tag. When a container is already in the new quantifier tag, the transform replaces each reference to the iteration operand for that container in the right operand to refer to the iteration operand for that container that is in the new quantifier tag. The transforms may also handle containers of different sizes. For example, in the expression $$(A+B)+A$$

A and B are images that may be of the same dimensions or different dimensions. If they have different dimensions, then a code generation transforms in a later transformation phase generates appropriate case logic within the common enclosing loop to process the overlapping regions differently from the non-overlapping regions. Thus, a programmer can use A and B without reference to whether or not they have the same dimensions. The transform may replace expression (A+B) by an expression of temporary variables, p27 and p28, of the form (p27+p28) of type pixel and annotate the new expression with a quantifier tag of the form:

$$\_Q(\forall <p27|p28>:(<A|B>[idx1:int,idx2:int]:pixel)).$$

The transform may replace the last instance of A in the expression with a temporary variable, p29, of type pixel, p29, and annotate the new expression with a quantifier tag of the form:

$$\_Q(\forall p29:(A[idx3:int,idx4:int]:pixel)).$$

In a shared loop, p27 and p29 reference the same data structure and this equivalence can be identified because of the equivalence of the instance of A in <A|B> of the first quantifier tag and A itself in the second quantifier tag. Therefore, the transform will replace p29 by p27 transforming the expression from $$((p27+p28)+p29)$$

to $$((p27+p28)+p27)$$

which will be annotated with the combined quantifier tag of the form:

$$\_Q(\forall <p27|p28>:(<A|B>[idx1:int,idx2:int]:pixel)).$$

In step 1401, if the root node of the subtree is an arithmetic operator and the left and right operands are pixels (i.e., iteration operands) with the "forall" quantifier tags, then the transform continues at step 1402, else the transform returns false. In step 1402, the transform initializes the new quantifier tag to the quantifier tag of the left operand. In steps 1403–1407, the routine loops checking for duplicates in the quantifier tag of the right operand. The transform checks for duplicates in the user-defined container names (e.g., the container image A) not the temporary variables because the temporary variables all have unique names. Once a duplicate like A is found, the corresponding temporary variable (e.g., p29) can be found because it is at the same position as A within the list immediately following the ∀ in the right quantifier tag (i.e., the list of temporary variables generated by the various transforms). The same logic is used to find the temporary variable corresponding to A in the left quantifier tag. Thus, p27 and p29 are identified as equivalent data items. Using this correspondence, the transform then substitutes p27 for p29 everywhere it occurs in the right expression, which produces the expression ((p27+p28)+p27) shown above. Any remaining temporary variables and containers in the right quantifier tag (i.e., ones that were not duplicates) are appended to the temporary variables and containers of the left quantifier tag, which will become the new quantifier tag attached at the operator level. In the example, there are no remaining temporary variables and containers in the right quantifier tag, so the left quantifier tag becomes the quantifier tag for the overall expression. In step 1403, the transform selects the next container of the quantifier tag of the right operand. In step 1404, if all the containers of the quantifier tag of the right operand have already been selected, then the transform continues at step 1408, else the transform continues at step 1405. In step 1405, if the selected container has already been placed in the new quantifier tag, then the transform continues at step 1406, else the transform continues at step 1407. In step 1407, the transform updates the nodes of the right operand which had referenced iteration operands for the duplicate container to contain the iteration operand and associated with that container that is already in the new quantifier tag. In step 1407, the transform adds the iteration operand and container to the new quantifier tag and loops to step 1403 to select the next container. In step 1408, the transform migrates the quantifier tag to the current node by adding the new quantifier tag to the current node and removing the quantifier tags for the left and right operands.

Figure 15:
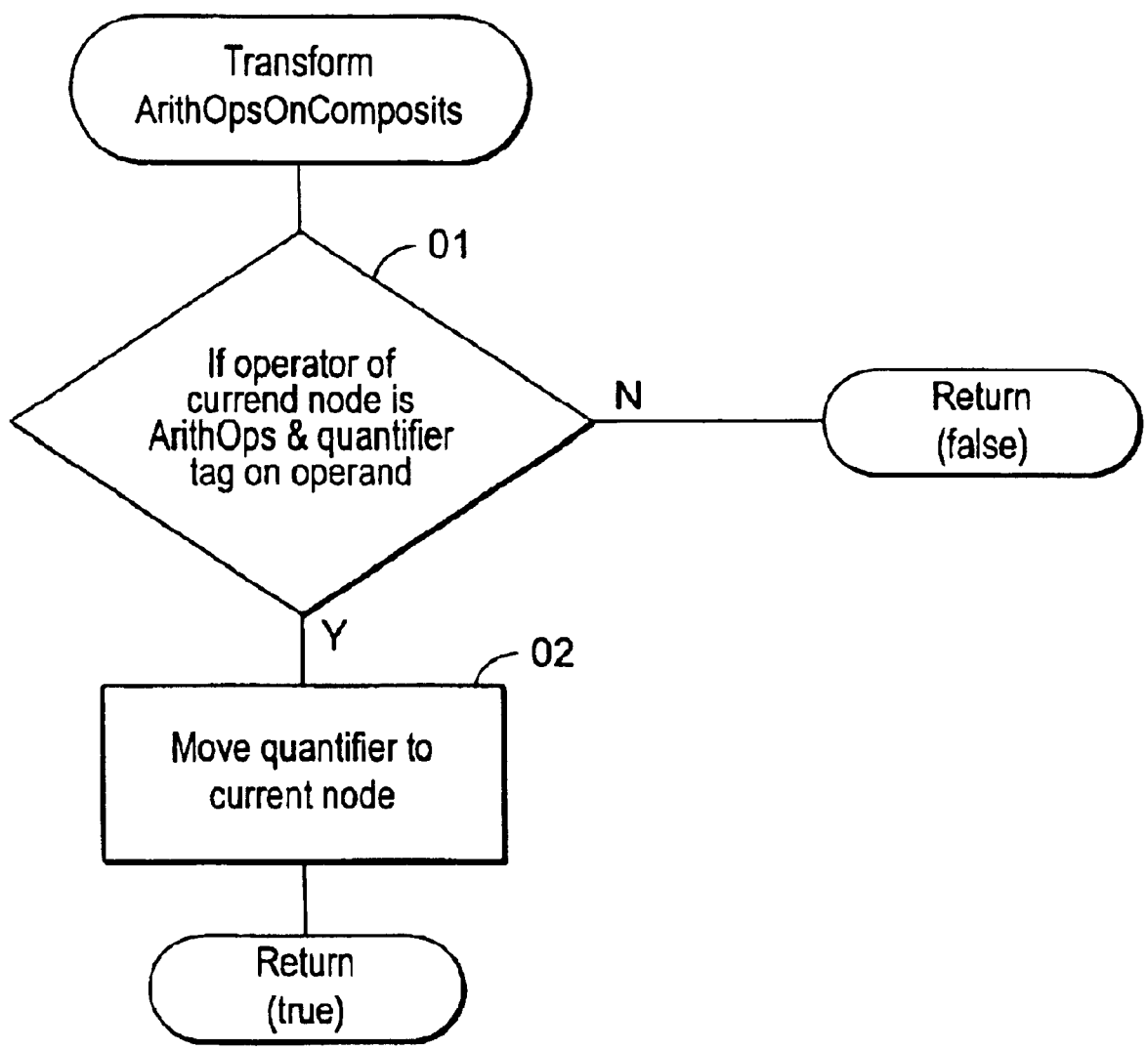
FIG. 15 is a flow diagram that illustrates a transforming arithmetic operators on composite data structures.

FIG. 15 is a flow diagram that illustrates a transforming arithmetic operators on composite data structures. The transform ArithOpsOnComposites is defined for the operators in the ArithOps group. The transform migrates quantifier tag from the node of the operand to the current node. In step 1501, if the operator of the current node is an arithmetic operator with one operand and the operand has a quantifier tag, then the transform continues at step 1502, else the transform returns false. In step 1502, the transform moves the quantifier from the operand to the current node and returns true.

The following transforms are code generation transforms that are applied in phase 3. These transforms assume that all optimization tag migrating and coalescing is complete. Therefore, since all the anticipatory optimizations have been noted, these transforms convert the AST to low-level computational constructs.

Figure 16:
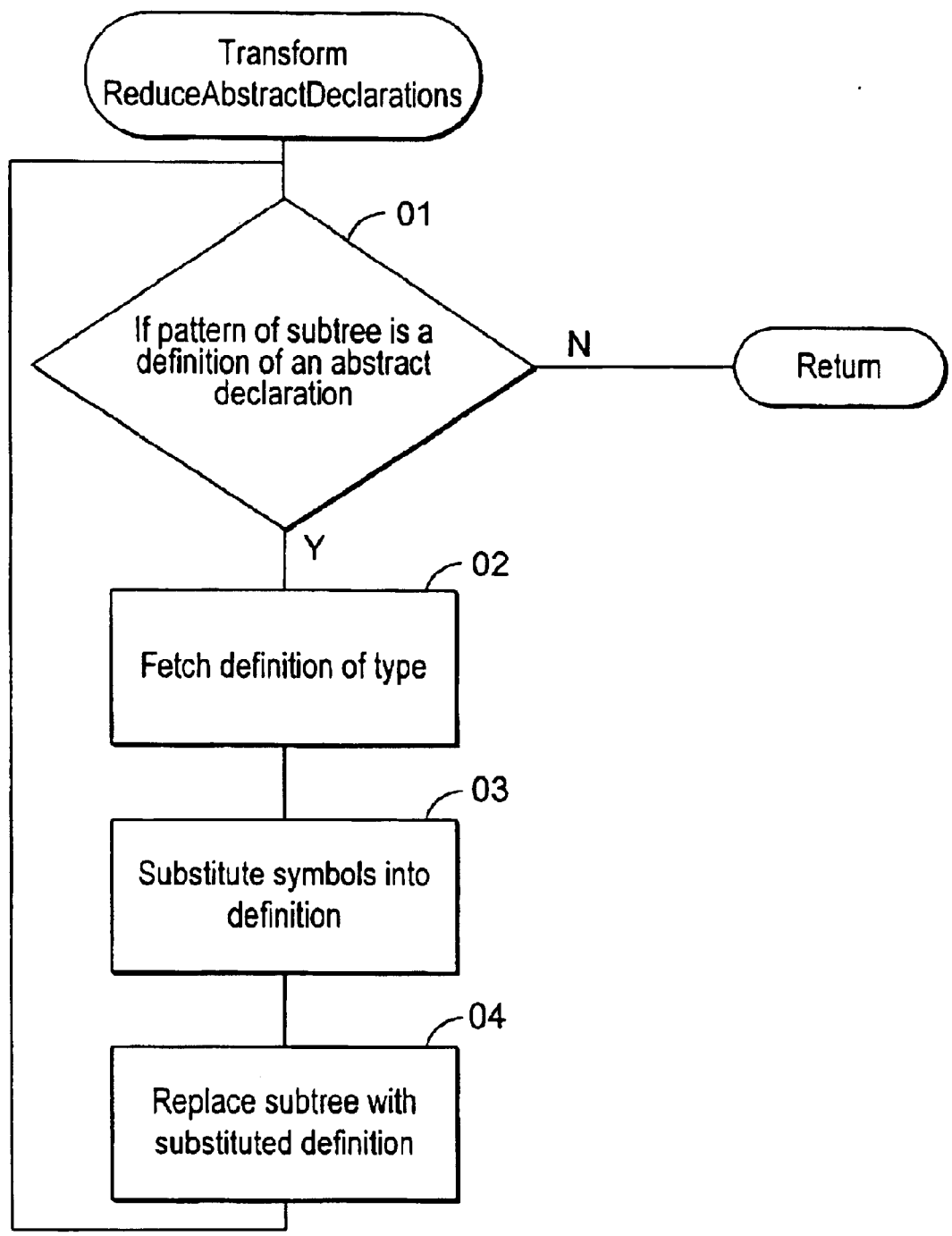
FIG. 16 is a flow diagram that illustrates transforming that reduces high-level declarations.

FIG. 16 is a flow diagram that illustrates transforming that reduces high-level declarations. The transform ReduceAbstractDeclarations is defined for operands that are subtype of the composite type. This transform operates much like a macro substitution by binding the definitions of the types to the symbols of the high-level type declaration. In step 1601, if the subtree refers to a definition of high-level (i.e., abstract) declaration, then the routine continues at step 1602, else the routine returns true. In step 1602, the transform retrieves the definition of the high-level type. In step 1603, the transform substitutes the symbols of the high-level declaration into the defined lower-level declaration. In step 1604, the transform replaces the subtree with the substituted declaration and loops to step 1601 to further reduce the substituted subtree. Once the definition is completely reduced to C, the transformation returns true indicating that it succeeded.

Figure 17A:
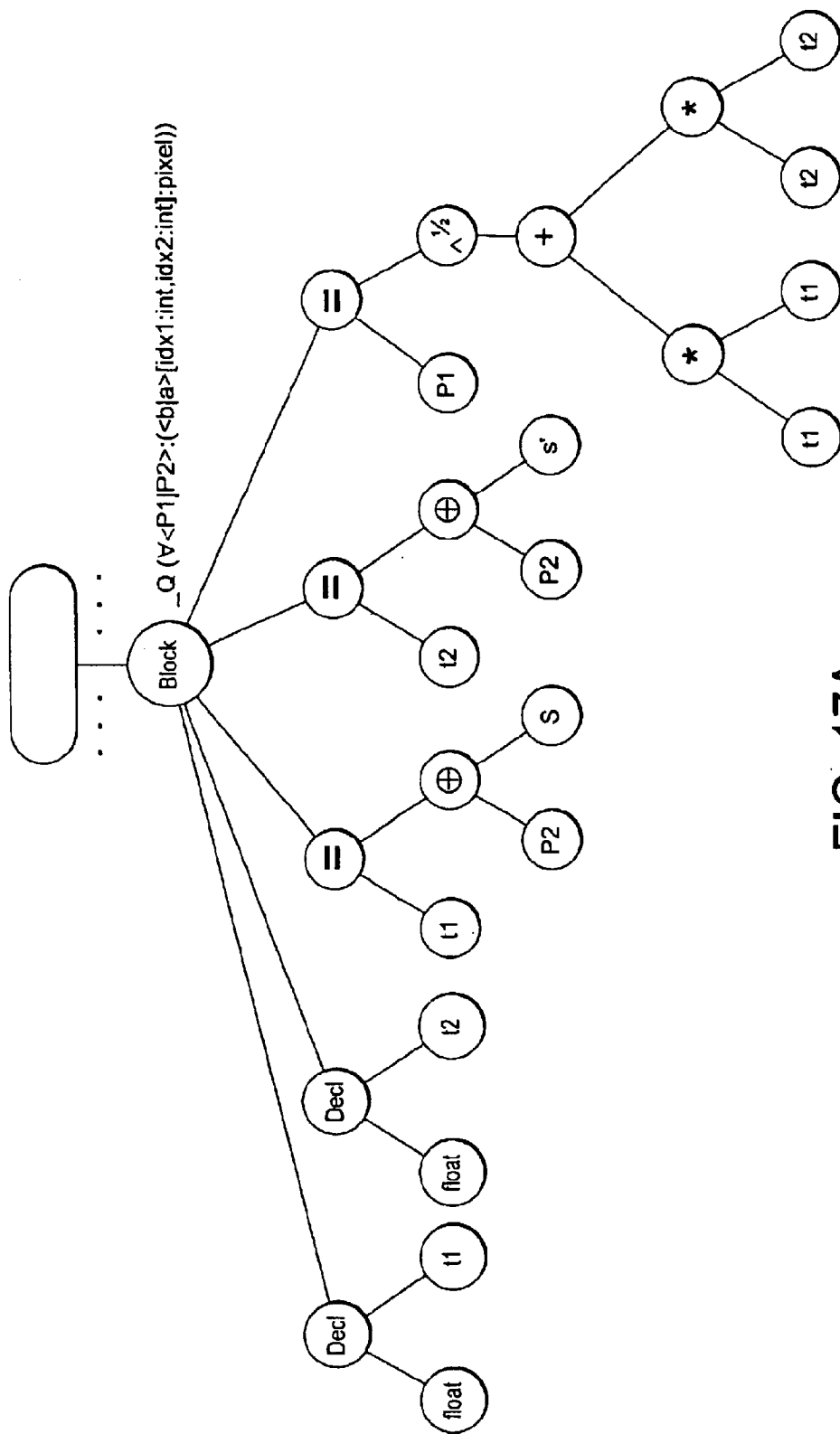
FIGS. 17A–17B illustrate the transforming for a power operator for code generation.
Figure 17B:
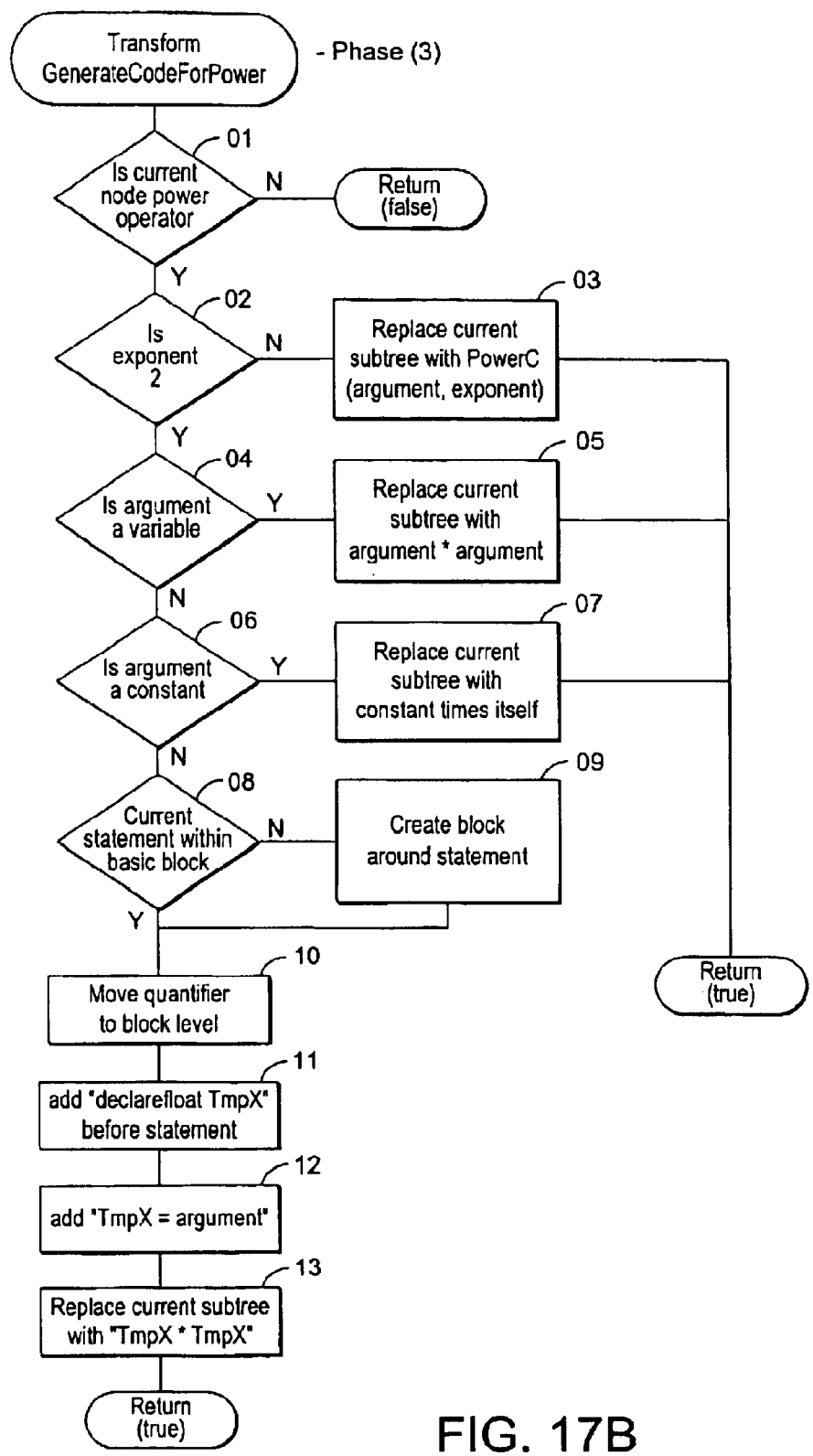

FIGS. 17A–17B illustrate the transforming for a power operator for code generation. FIG. 17A illustrates the transformation of the subtree of FIG. 4I after the power transform has been applied. When the power operator is 2, there are several optimizations that can be made. For example, it may be more computationally efficient to multiply the argument by itself rather than invoking a more general power function. As shown, a block node has been defined and the quantifier tag has been migrated from the assignment node to the block node. In addition, declaration nodes and assignment nodes have been defined. The new temporary variables t1 and t2 are set to the value of the operand that is to be squared. That squaring is performed by the multiplication of variable to by itself and by the multiplication of variable t2 by itself. FIG. 17B is a flow diagram of a transform to generate code for the power operator o during phase 3. The transform GenerateCodeForPower is defined for the power operator. In step 1701, if the current node refers to a power operator, then the transform continues at step 1702, else the transform returns false. In step 1702, if the exponent is 2, then the transform continues at step 1704, else the transform continues at step 1703. In step 1703, the transform replaces the current subtree with an invocation to a function to raise the argument to the exponent and returns an indication of true. In step 1704, if the argument is a variable, then the routine continues at step 1705, else the routine continues at step 1706. In step 1705, the transform replaces the current subtree with a subtree in which the argument is multiplied by itself and returns true. In step 1706, if the argument is a constant, then the transform continues at step 1707, else the transform continues at step 1708. In step 1707, the transform replaces the current subtree with a reference to a constant value that is equal to the argument squared and returns true. In step 1708, if the current statement is within a basic block, then the transform continues at step 1710, else the transform continues at step 1709. In step 1709, the transform creates a block around the statement. In step 1710, the transform moves the quantifier tag for the current node to the block level. In step 1711, the transform adds a declaration for a temporary variable before the statement. In step 1712, the transform adds a statement to set the temporary value to the argument. In step 1713, the transform replaces the current subtree with a subtree that indicates its temporary variable should be multiplied by itself and returns true.

Figure 18:
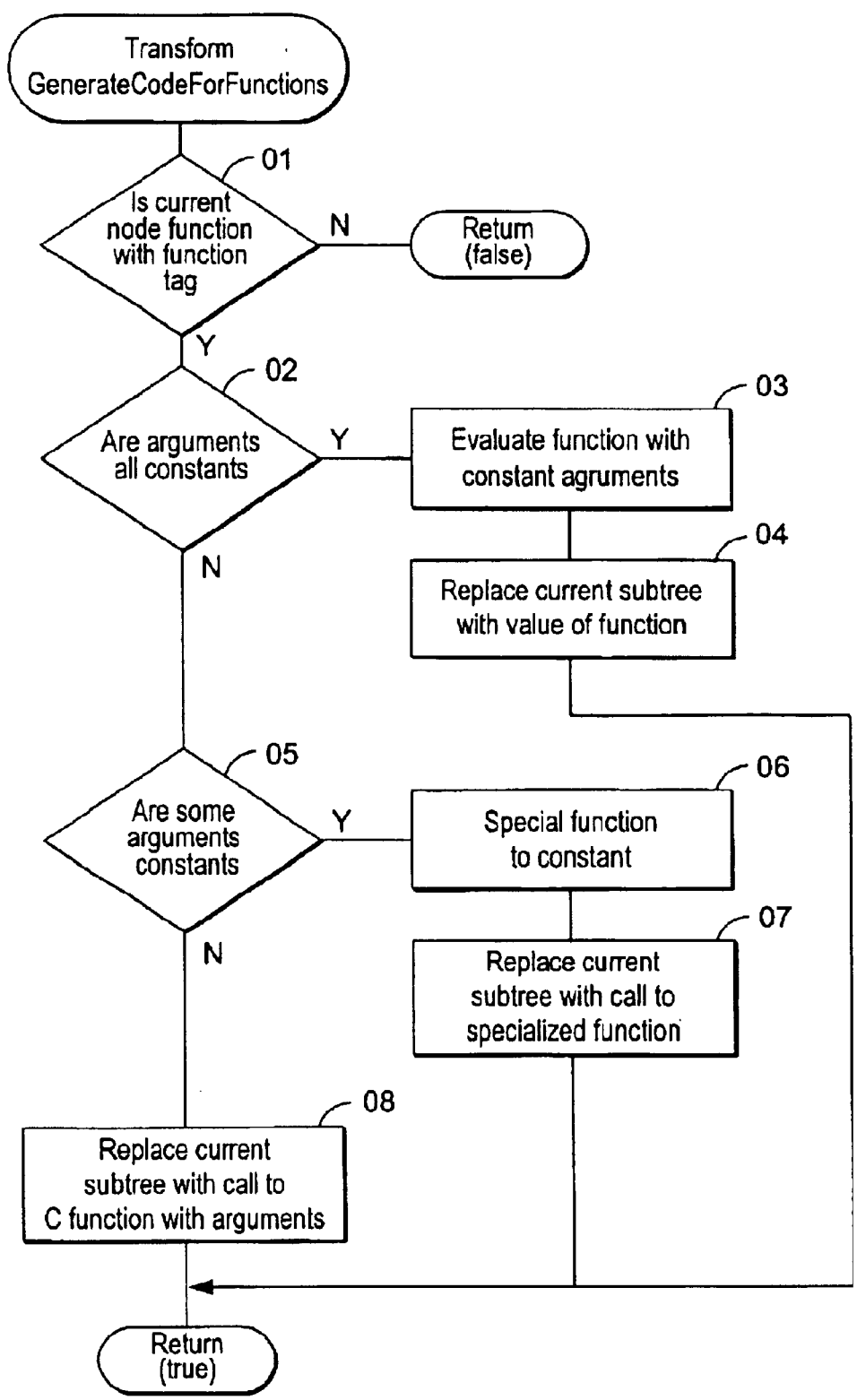
FIG. 18 is a flow diagram of a transform to generate code for a function invocation during phase 3.

FIG. 18 is a flow diagram of a transform to generate code for a function invocation during phase 3. The transform GenerateCodeForFunctions is defined for the user-defined, mathematically pure functions that are within the ArithOps group. Such functions are not directly translatable into single operators that are built into conventional languages. However, since they are mathematically pure functions (i.e., no side effect and no dependencies other than on their parameters), they have properties that are similar to operators (e.g., they can be manipulated and moved like operators) and their definitions are easily manipulated and optimized by automated tools. Specialization (e.g., eliminating the runtime parameter binding for constant parameters and eliminating some programming logic by executing it once at translation time) is a common and useful kind of optimization that is easily done on such functions. The objective of the GenerateCodeForFunctions transform is to exploit any such optimization opportunities that might present themselves in the code. If there are no such opportunities, the transform expresses the functional invocation as a call to the runtime code produced by the definition of the function. If the actual arguments to the function are constant, then the transform will calculate the result of the function and replace the call to the function with a reference to a constant. If some of the actual arguments are constant, then the invocation to the function can be replaced by an invocation to a specialized function that relies on the constant values of the arguments.

Referring to FIG. 18, in step 1801, if the current node refers to a function and it has a function tag then the transform continues at step 1802, else the transform returns false. The function tag indicates that this transform can be applied. In step 1802, if all the actual arguments are constant, then the transform continues at step 1803, else the transform continues at step 1805. In step 1803, the transform evaluates the function with the constant arguments. In step 1804, the transform replaces the current subtree with a node with a reference to the constant value of that function and returns true. In step 1805, if some of the actual arguments are constant, then the transform continues at step 1806, else the transform continues at step 1808. In step 1806, the transform specializes the function to the constant value of the actual arguments. In step 1807, the transform replaces the current subtree with a call to the specialized function and returns true. In step 1808, the transform replaces the current subtree with a call to a corresponding lower-level function and returns.

Figure 19:
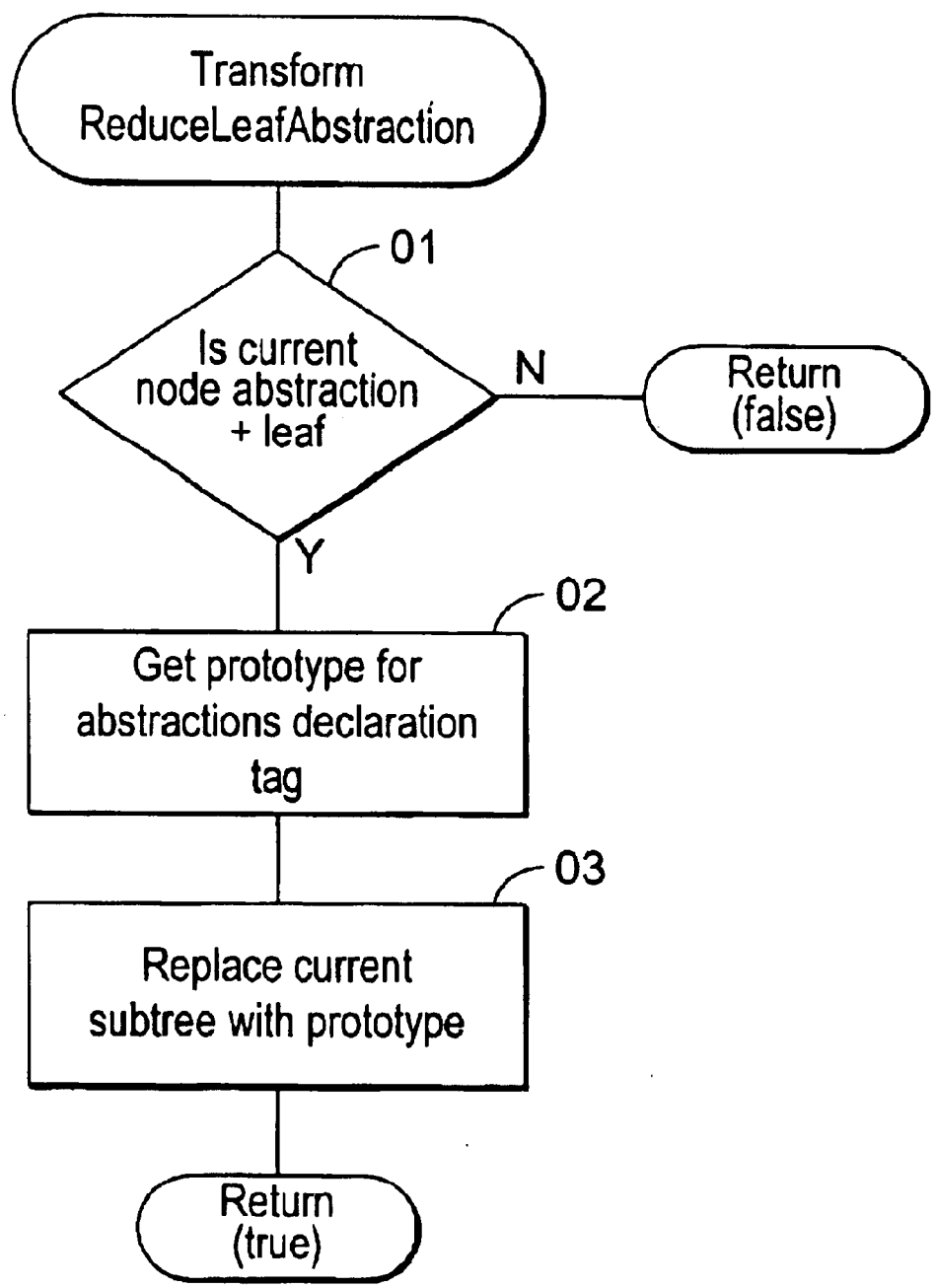
FIG. 19 is a flow diagram of a transform to reduce a leaf abstraction.

FIG. 19 is a flow diagram of a transform to reduce a leaf abstraction. The transform ReduceLeafAbstraction is defined for a subtype of the type Composite. This transform re-expresses high-level constructs such as iteration operands for pixels in terms of low-level programming constructs (e.g., matrix references) so that code can be generated for the operators. The information in the quantifier tag provides information to access the definition of the high-level construct. For example, a leaf (e.g., "p29") that is of type pixel will be implemented using the information from the tag associated with the leaf (e.g., _Q($\forall$p29:(A[idx1:int, idx2:int]:pixel))"). So the implementation of the leaf for this example, would be "A[idx1, idx2]". In step 1901, if the current node is a leaf node and contains a reference to a data structure that is a subtype of the Composite type, then the transform continues at step 1902, else the transform returns false. In step 1902, the transform retrieves the prototype for the high-level declaration within the quantifier tag. In step 1904, the transform replaces the current subtree with a subtree in accordance with the retrieved prototype and returns true.

Figure 20A:
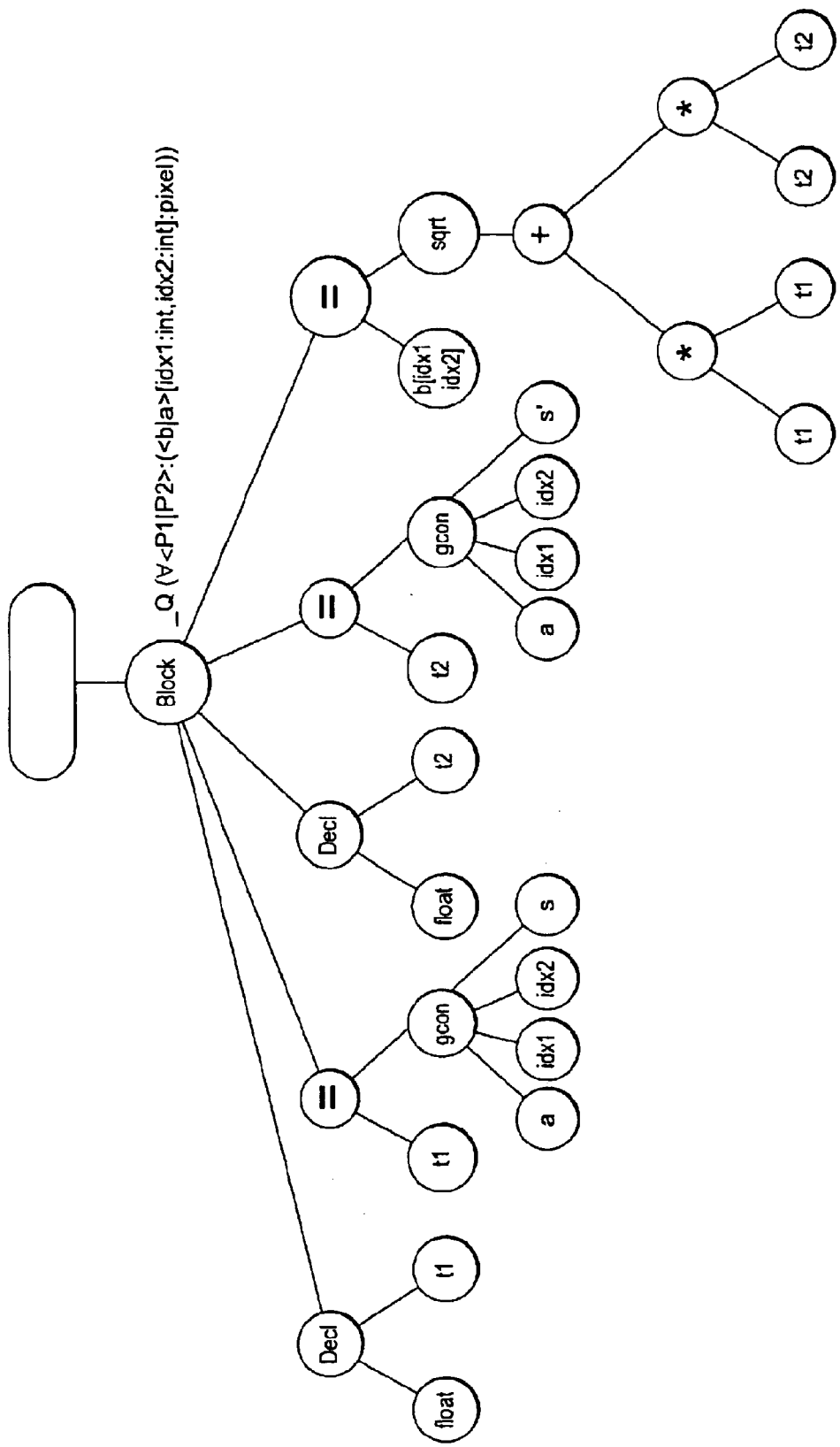
FIGS. 20A and 20B illustrate the transforming of a convolution operator to lower-level computational constructs.
Figure 20B:
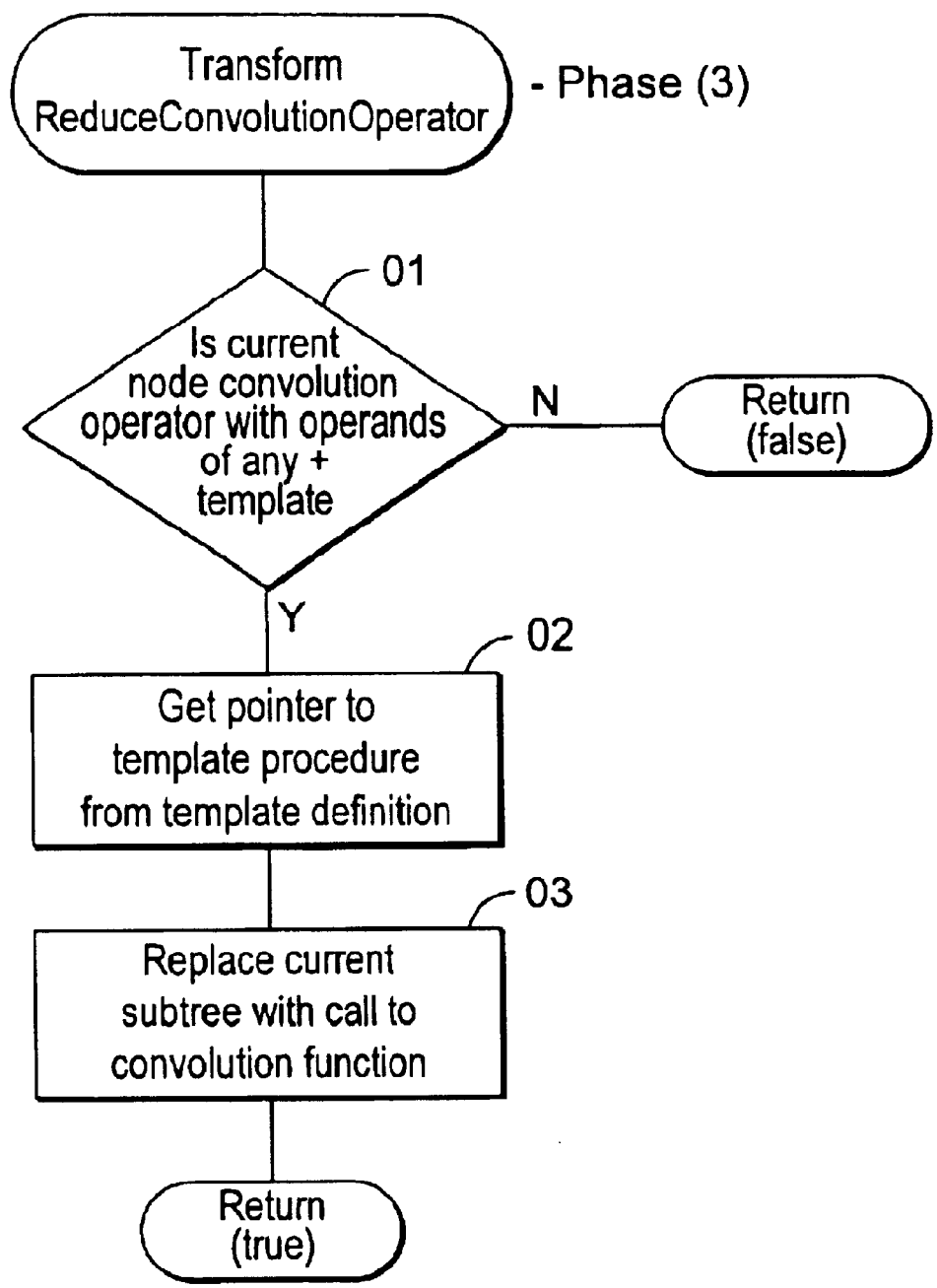

FIGS. 20A and 20B illustrate the transforming of a convolution operator to lower-level computational constructs. FIG. 20A illustrates the transforming of the subtree of FIG. 17A after the transforming of the convolution operator. This transform expresses the convolution operator as a call to a convolution function that performs the convolution. FIG. 20B is a flow diagram of a transform to reduce a convolution operator during phase 3. The transform ReduceConvolutionOperator is defined for the operators in the ConvolutionOps group. In step 2001, if the operator in the current node is a convolution operator with operands indicating to access an element of an image neighborhood defined by the right hand template operand where the neighborhood is centered on a specific image pixel defined by the left hand pixel operand and a template, then the transform continues at step 2002, else the transform returns false. In step 2002, the transform retrieves a reference to a procedure that applies the template to a pixel neighborhood in the image and returns the result. In step 2003, the transform replaces the current subtree with a call to the convolution operator passing the reference to the procedure and returns.

Figure 21A:
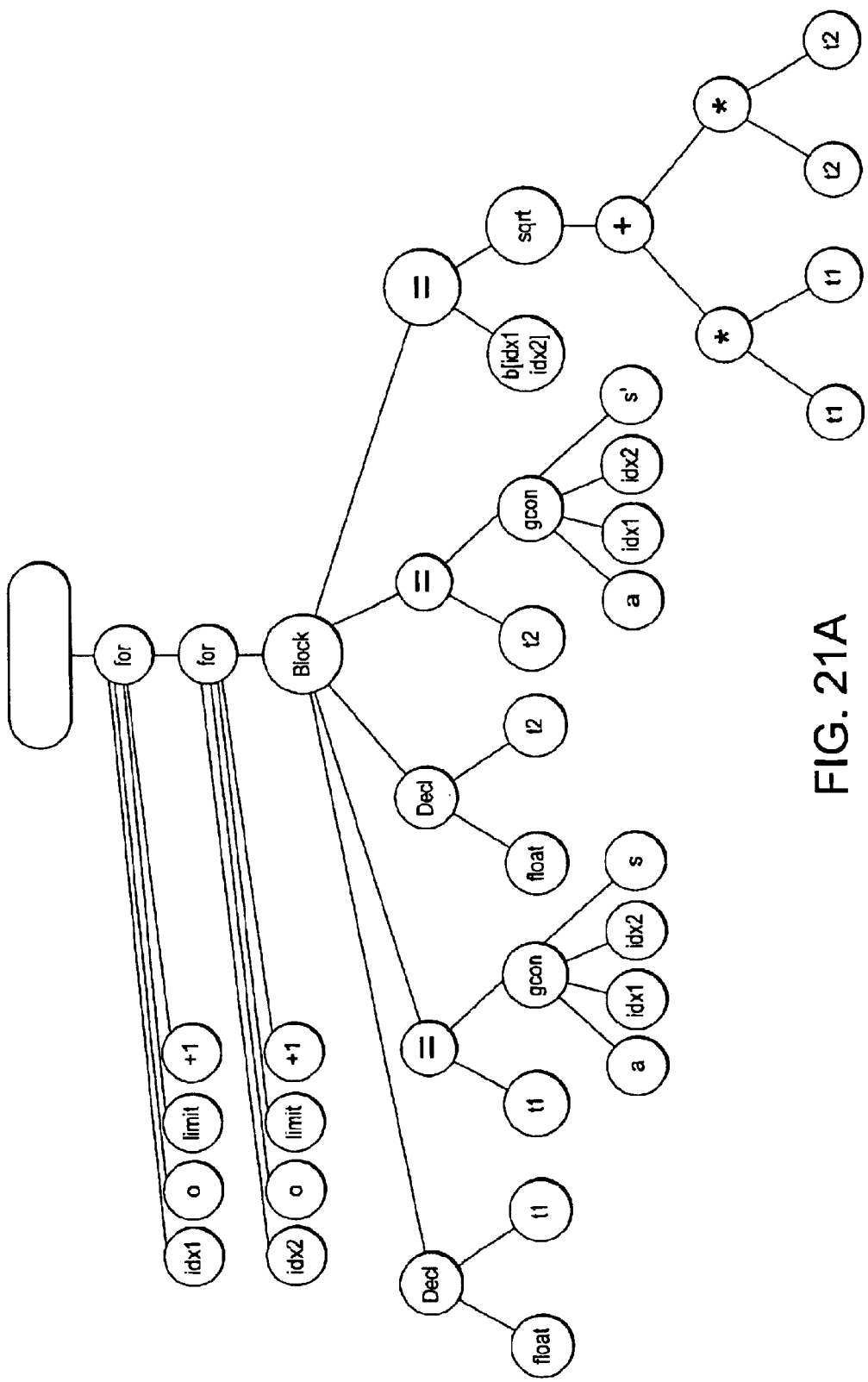
FIGS. 21A–21D illustrate the transforming of a subtree with quantifier tags.
Figure 21B:
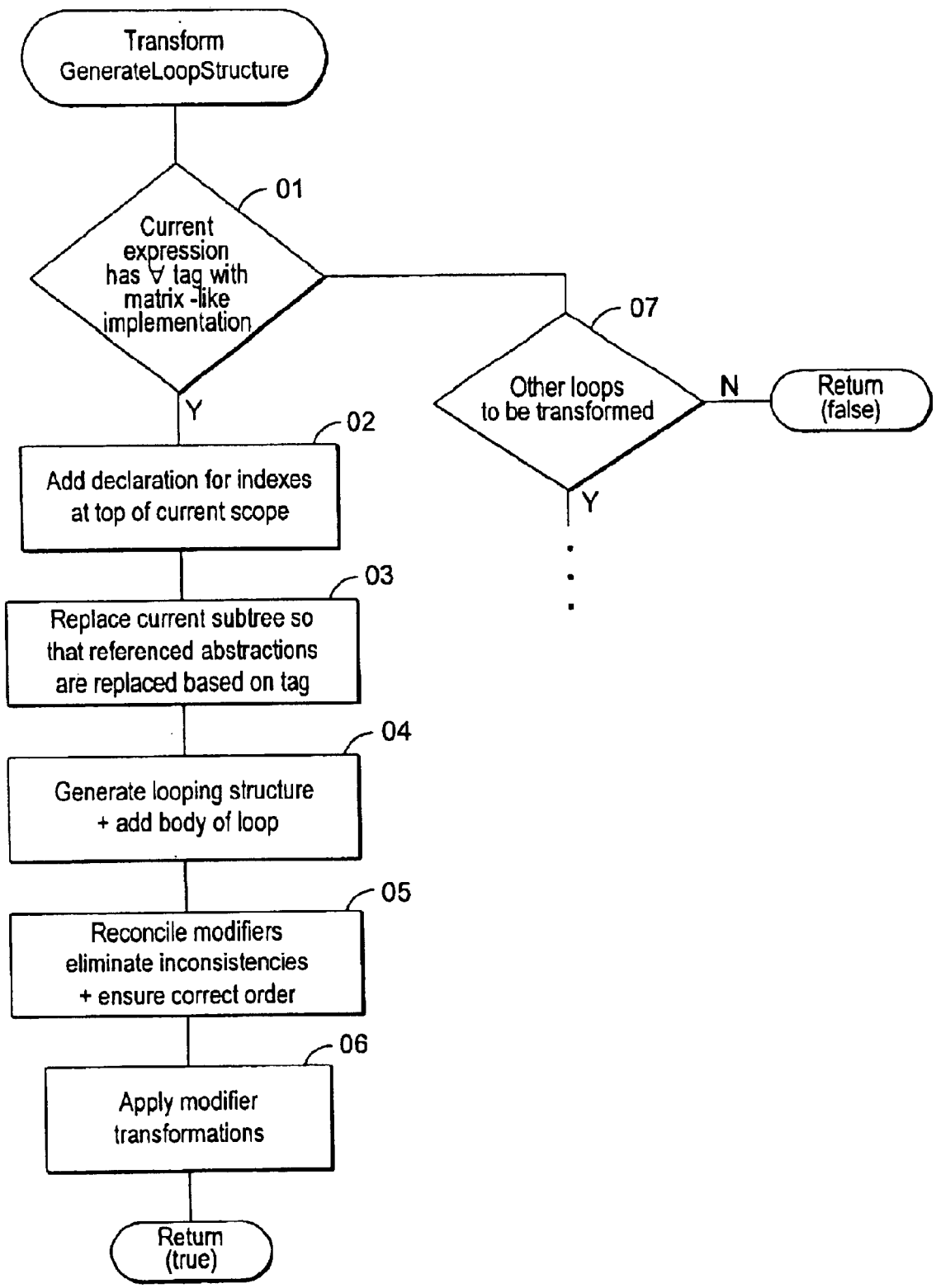

FIGS. 21A and 21B illustrate the transforming of a subtree with quantifier tags. FIG. 21A illustrates a portion of the subtree of FIG. 20A after the transform to add code for the quantifier tags. Two nodes for the "forall" loops have been added. FIG. 21B is a flow diagram of a transform to generate a loop structure for a "forall" quantifier tag. The transform GenerateLoopStructure is defined for all the operators in the image processing domain. In step 2101, if the current expression has a "forall" quantifier with a matrix-like implementation anticipated, then the transform continues at step 2102, else the transform continues at 2107. In step 2102, the transform generates declarations for the indexes of the "forall" and adds the declarations in the AST at the top of the current scope. In step 2103, the transform replaces in the current subtree each referenced abstract operand of the iteration (e.g., p) with an implementation expression (e.g., a[i,j]) for that abstract operand. In step 2104, the transform generates the looping structure (e.g., nested for convolution operations) and sets the body of the loop to the modified tree subtree. In step 2105, the transform begins processing of the modifiers by applying any transformations that identify inconsistent modifiers (e.g., one modifier that suggests unwrapping a loop and a second modifier that will not tolerate unwrapping) and then changing one or more of the inconsistent modifiers to make them consistent. This step will also order the modifiers if they have an ordering dependency. In step 2106, the transformations associated with the modifiers are applied to the subtree. The transform then returns true. In step 2107, the transform determines whether it can handle other loop patterns. If so, the transform continues to process the loop pattern, else the transform returns false.

The transform that changed the "(p1⊕s)" subtree into the "gcon(a,idx1,idx2,s)" subtree also added modifiers to the quantifier tag, which for simplicity were not shown in the previous examples. These are represented as "_PromoteAboveLoop(idx2,ConstantExpressionOf(idx1))" and "_PromoteToTopOfLoop(idx2,ConstantExpressionOf(idx2))."

Figure 21C:
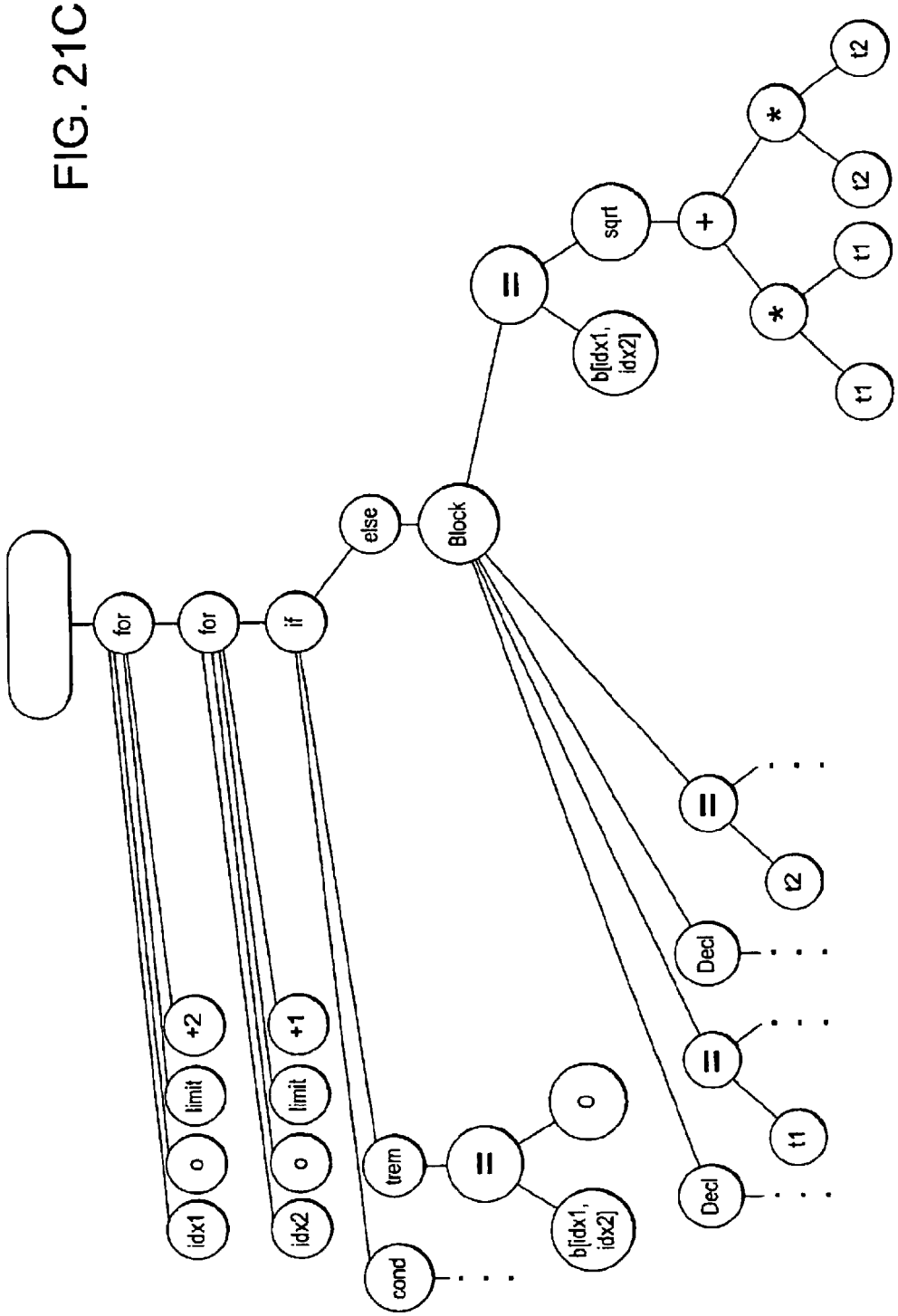

The modifier "_PromoteToTopOfLoop(idx2, ConstantExpressionOf(idx2))" is a variation on the PromoteAboveLoop modifier. It allows constant expressions of "idx2" to be replaced with temporary variables whose definitions are moved up to the top but not above the loop. The PromoteToTopOfLoop modifier prevents expressions like (idx2−1) and (idx2+1) from being computed over and over again within expressions in the loop body. Their values will be computed just once, stored in temporary variables (i.e., idx2m1 and idx2p1), and then the temporary variables may be used many times. The temporary variable assignments are placed at the top but inside of the body block of idx2's loop. The transformation of the second convolution expression "(p2⊕s')" that becomes "gcon(a,idx1,idx2,s')" also changes the modifier expression in the quantifier tag to an enhanced form, specifically, "_PromoteAboveLoop(idx2,ConstantExpressionOf(idx1)" and "_PromoteToTopOfLoop(idx2,ConstantExpressionOf(idx2))." FIG. 21C represents a transformation of the AST in which the if-then-else statements in the definition of the gcon operation are folded into one. The ellipsis under the "cond" node represents the following condition (idx1==0||idx2==0||idx1==limit−1||idx2==limit−1).

Figure 21D:
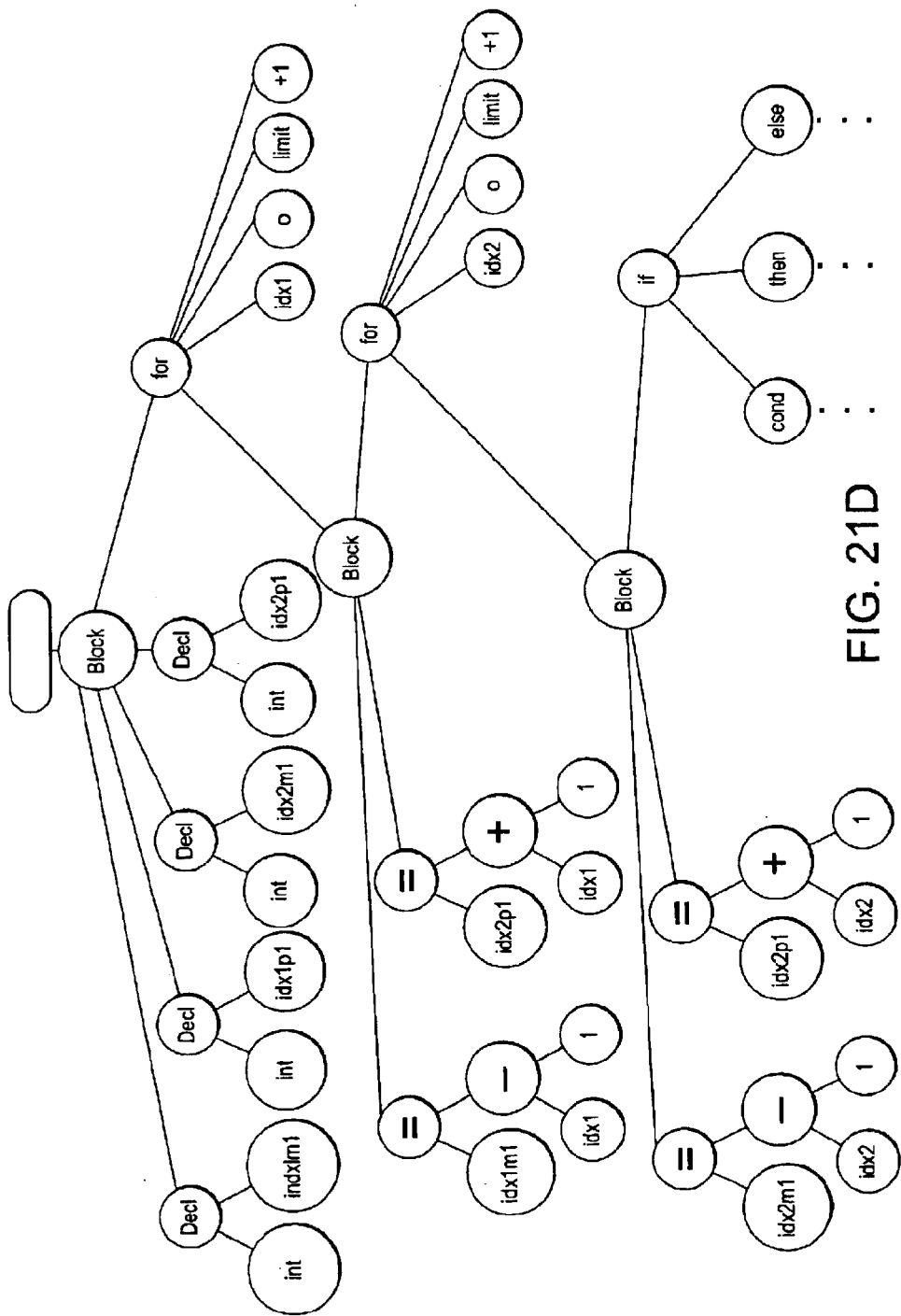

The ellipsis under the "=" nodes represent the following expressions:

t1=a[idx1−1, idx2−1]*(−1)+a[idx1−1, idx2]*(−2)+a[idx1−1, idx2+1]*(−1)+a[idx1+1, idx2−1]*1+a[idx1+1, idx2]*2+a[idx1+1, idx2+1]*1;

t2=a[idx1−1, idx2−1]*(−1)+a[idx1, idx2−1]*(−2)+a[idx1+1, idx2−1]*(−1)+a[idx1−1, idx2+1]*1+a[idx1, idx2+1]*2+a[idx1+1, idx2+1]*1;

FIG. 21D illustrates the AST after promotion modifiers are applied. The ellipsis under the "cond" node represents the following condition (idx1==0||idx2==0||idx1==limit−1||idx2==limit−1).

The ellipsis under the "then" node represents the statement b[idx1,idx2]=0.

The ellipsis under the "cond" node represents the statements
t1=a[im1,jm1]*(−1)+a[im1,idx2]*(−2)+a[im1,jp1]*(−1)+a[ip1,jm1]*1+a[ip1,idx2]*2+a[ip1,jp1]*1;
t2=a[im1,jm1]*(−1)+a[idx1,jm1]*(−2)+a[ip1,jm1]*(−1)+a[im1,jp1]*1+a[idx1,jp1]*2+a[ip1,jp1]*1;
b[idx1,idx2]=sqrt(t1*t1+t2*t2);}

The modifier _PromoteAboveLoop(idx2, ConstantExpressionOf(idx1)) has been described earlier, and it will promote any constant expression of "idx1" outside of the loop controlled by "idx2." The modifier generates statements assigning those expressions to temporary variables that then replace the promoted expression. There is an ordering dependency between the folding shown in FIG. 21C and the two modifiers _PromoteAboveLoop and _PromoteToTopOfLoop. The _PromoteAboveLoop and _PromoteToTopOfLoop modifiers cannot be applied until folding has been completed.

These modifiers are expressed as and manipulated as abstract optimization instructions to the code generator, one level removed from the detail of the code itself. This mechanism allows a single modifier to reference and deal with an infinite variety of specific variations within the detailed target code. Thus, when the code generator calls on transforms that reconcile several such modifiers to check dependencies among them and assure that their actions are properly coordinated, those reconciliation transforms only have to express their dependency checks and manipulations in terms of these abstract expressions of the Optimizations. They only have to look at the modifiers operators and their operands to determine if any reconciliation is necessary and how to do it. They do not have to know about the infinitely many detailed forms of the programming code might take. This inference process during reconciliation is analogous to the inference process in the problem domain that allowed the AO process to infer data flow and data dependency properties from the problem domain operators and operands. It is analogous in the sense that the inference performed by the reconciliation transforms is operating only in the domain of abstract optimization operations. The difference is the same as talking about optimizations rather than executing them. Therefore, this is anticipatory optimization of the optimization instructions themselves.

COMPOSITE FOLDING PHASE OF AO

Basic Pattern Definitions

The following description of composite folding uses a highly declarative pattern-based shorthand notation to describe the pattern of the AST that is being operated upon. Within the AO implementation, these "patterns" are actual data inputs into a pattern matcher that binds pieces of the AST (e.g., "(A+B)") to pattern variables. The pattern variables have the form "?Variablename." For example, if the pattern "(?L ?OP ?R)" were matched against the AST data "(A+B)", the result would be a so-called "binding list" of pairs of variables and values, in this case, ((?L A) (?OP+)(?R B)). That is, the pattern variables ?L, ?OP, and ?R have the respective values "A,""+," and "B". The transforms can then be programmed in terms of ?L, ?OP, ?R, for example. Moreover, when referring to a transform that is matching a simple pattern like "(?L ?OP ?R)" against some AST data and then producing a new form of that data, such as transforming the infix form "(A+B)" into the prefix form "(+A B)"), the transform may be expressed in a shorthand declarative form like:

(?L ?OP ?R)→(?OP ?L ?R)

Patterns can contain other information as well. Literal data may be represented directly so that, for example, the ?OP position could be a literal addition or plus (+) expressed as:

(?L+?R)→(+?L ?R)

Sometimes, the operator could be represented as either a plus or a times, as in this expression:

(?L $(por+*) ?R)

where the whole expression "$( . . . )" is a pattern that will match one element of the data. The name just inside the left parenthesis of this pattern is the particular pattern operator ("por" in this case). A Por operator will cause the pattern to match if any one of its element patterns matches. So, "(?L $(por+*) ?R)" would match "(A+B) and (A*E) but not (A/B), for example. Sometimes, the transform will need to know just which one of several patterns within the Por operator was matched. (E.g., Was it a plus or times?) The pattern "$(bindvar ?whichone bvpattern)" serves this purpose by binding the variable ?whichone to whatever data was matched by "bvpattern." Thus, if the transform needed to know whether plus or times was matched, the pattern "(?L $(bindvar ?which $(por+*)) ?R)" would match "(A+B)" and return the binding list ((?L A) (?Which+) (?R B)).

Pand is another pattern operator. It requires ALL of its patterns to match a specific data item. Hence, the pattern "$(pand ?x $(test integerp))" will match anything and bind it to ?x and then execute the "$(test integerp)" pattern on it, which will succeed if the data ?x matched is an integer and will fail otherwise. Finally, the pattern "$(plisp . . . )" allows arbitrary Lisp code to be executed using any of the pattern variable values bound up to that time. There are many other pattern operators, but this small set will be suffice for us to give succinct descriptions of the behavior of many transforms of the AO generator.

The Details of Composite Folding

Figure 22:
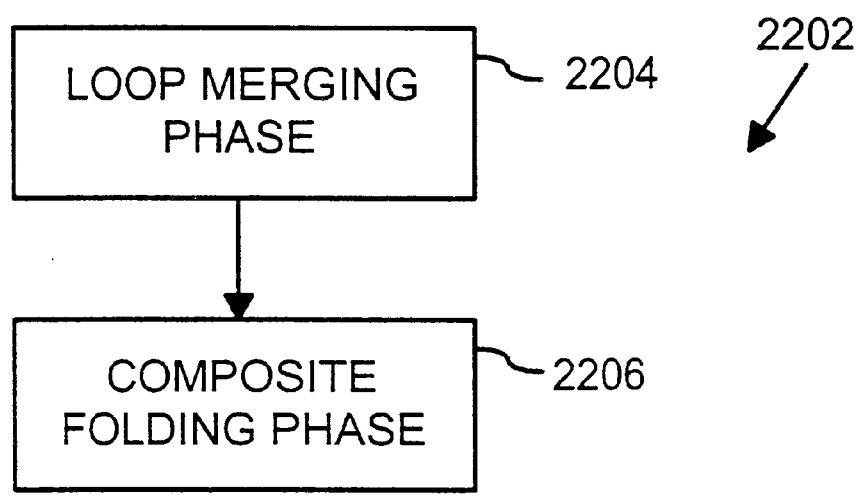
FIG. 22 is a flow diagram of an anticipatory optimization (AO) process that includes a loop merging phase and a composite folding phase.

FIG. 22 is a flow diagram of anticipatory optimization (AO) process 2202, which includes a loop merging phase 2204 (described with reference to FIGS. 1–21) and a composite folding phase 2206 that operates on the body of the resultant loops provided by loop merging phase 2204. Composite folding phase 2206 functions to simplify, rewrite, reorganize and merge the implementation code for the individual domain specific operators and operands in the original domain specific expression. The loop merging phase 2204 incorporates into the loop-merged AST optimization planning tags or modifiers, such as _PromoteAboveLoop and _PromoteToTopOELoop, as well as others, for use during the composite folding phase 2206 of AO process 2202.

Composite folding includes a method for compiling compositions of abstract components (which are themselves composite data structures such as arrays, matrices, trees, record composites, etc.) so as to anticipate non-optimal structures in the compiled code (e.g., redundant iterations). The abstract components are compiled directly into optimized code without producing the non-optimal structures characteristic of conventional compilation optimizers. This is performed in the context of the operators and operands (i.e., composites) of a specific domain and is driven by the form and semantics of those operators and operands. The composite folding is performed with regard to tags that record information introduced during code generation (e.g., data flows) and define deferred transformation invocatioris that are expected might further optimize the code.

Conventional modes of compiling compositions preserve the individual operations' atomic boundaries in the compiled code and thereby isolate the portions of redundant code within these bounded portions of compiled code. Such conventional modes of compiling compositions are based on a "substitute and expand" paradigm in which each individual operation is compiled in isolation (i.e., in a "context free" manner) and is therefore not sufficiently influenced by other operations in the composite during its compilation. Hence, conventional compiling strategies do not produce opportunities for the redundancy in the compiled code to be noticed by the compiler at the compile time nor provide methods for reweaving the compiled code in ways that break the contextual isolation of the neighborhoods induced by the individual high level constructs. Therefore, these conventional compiling methods mostly prevent sharing of redundant code (e.g., sharing the iteration prefixes).

Conventional optimizing strategies wait until the domain specific operators and operands (i.e., composites) have been compiled into programming language level code (e.g., C) before they start the optimization process. By this time, the data flow, variable aliasing, and variable dependency knowledge implicit in the domain specific operators and operands has been lost. So, the first step in conventional optimization is to perform a difficult analysis relying on an open-ended search process to recover this lost information, which is then used to drive the optimization process. The composite folding process of this invention avoids such difficulties by using the implicit knowledge to directly generate optimized code.

AO allows for melding and sharing of common code across the definitions of high level operators and operands within an expression. Thus, loops within methods specific to a high level operand may be melded into loops within high level operators by the process of transforming the separate data flows within each method into a common set of data flows. This process eliminates method call/return operations, memory accesses and even the existence of intermediate memory.

AO and its composite folding process or phase 2206 are applicable to abstract operators and operands from any application domain (e.g., graphics imaging, business software, system software, office software, networking, telephony, etc.) and any implementation composites (e.g., arrays, matrices, lists, collections, trees, record composites, etc.). The composite folding phase is illustrated below with reference to the graphics imaging domain, which utilizes array- and matrix-based implementations. It will be appreciated, however, that AO and its composite phase is similarly applicable to other application domains and other implementation composites.

An example of such composites in the graphics imaging domain is the AST illustrated in FIG. 21D, which can be represented by the expression:

for (i=0; i<m; i++)
{for(j=0; j<n; j++)
{t1=(a[i,j]⊕s);
t2=(a[i,j]⊕s');
b[i,j]=sqrt(t1*t1+t2*t2);}}.

Figure 23:
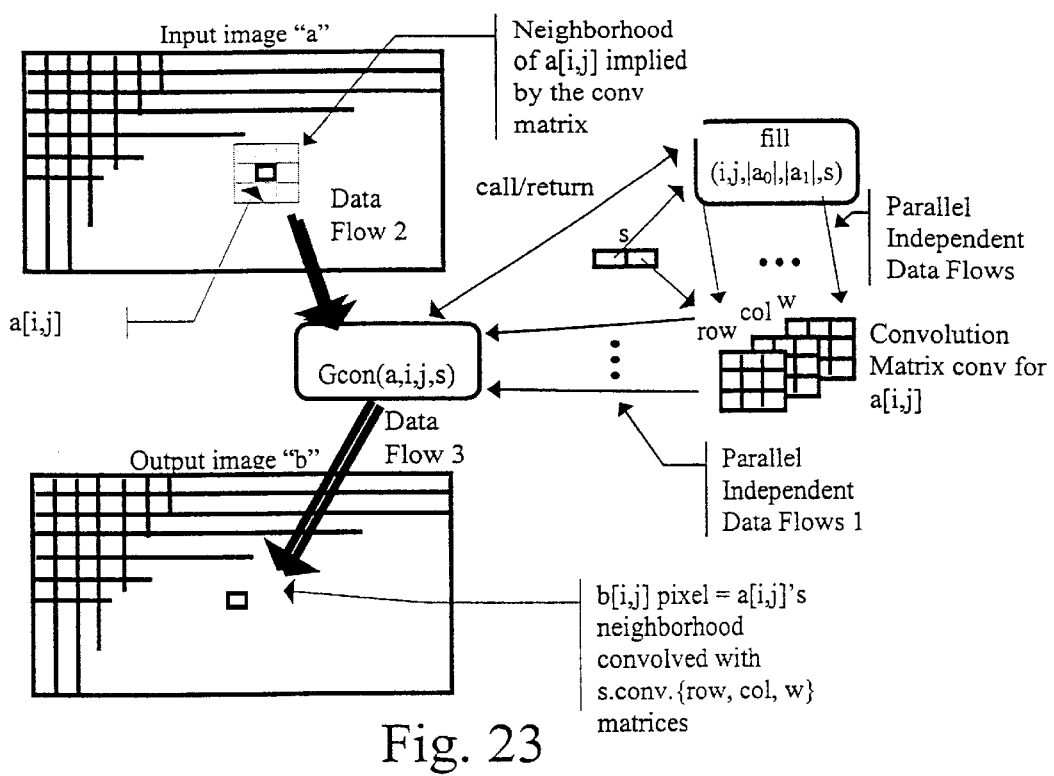
FIG. 23 illustrates the data flow inefficiencies introduced by conventional; compilation of high-level, domain specific (DS) languages.

FIG. 23 illustrates the inefficiencies introduced by high-level, domain specific (DS) languages. DS operators and operands factor (or de-localize) information for reasons of compact expressivity and programming leverage. The programming leverage arises because of combinatorial amplification provided by expression-based composition of the componentry's piece-parts, i.e., provided by composing the domain specific operators and operands. During "compilation," this factored information needs to be melded and reorganized into a highly localized, compact form for performance reasons. Such localization and melding is not easily done automatically.

In the example of FIG. 23, one step of the backwards convolution operator ⊕ applied to an image a is defined by the routine gcon, which for each input pixel a[i,j], convolves it and its neighboring pixels with the three layer convolution matrix conv. Conv and its computation are separately defined by the right hand operand of ⊕, which is the so-called "graphic template" operand. Both the left-hand image operand and the right hand graphic template operand of ⊕ are composite structures requiring loop-based or recursion-based processing. Similarly, the operator itself implies loop-based or recursion-based processing. For acceptable performance, the various loop-based operations implied by the definitions of the operands and the operator must be woven and melded together in complex ways that are not easily accomplished by automated procedures.

Composite folding is a method for automating a portion of this reweaving and melding. This overall process is analogous to formula substitution in algebra where once the formula substitution is completed, the resulting formula must be simplified, which often requires reorganizing the formula according to the laws of algebra. Composite folding effects the analog of the substitution step and the deferred instantiations of the transformations of the AO tags effect the analog of the simplification and reorganization steps.

Each application of the backwards convolution operator ⊕ to the image a requires two nested loops since a is a two dimensional matrix. Further, each of the arithmetic operations (i.e., the three subexpressions of the forms (image)$^{1/2}$, (image)$^2$, and (image+image)) on the pixels of the resulting images, (i.e., on the images (a⊕s) and (a⊕s')), also require two similarly structured nested loops. As described hereinabove with regard to the loop merging processing, these multiple instances of two nested loops have been melded into one pair of nested loops controlled by the index variables i and j. All of the various loop-based arithmetic operations have been transformed so as to operate within the body of the single, melded form of these two nested loops.

Moreover, the right hand operands of ⊕ are also composite structures (viz. s and s'), which have methods (viz. FILL.S and FILL.S') that execute two additional loops within the body of the loops of i and j for each pixel a[i,j]. FIG. 23 shows the general data flow pattern for FILL.S and FILL.S' in terms of an exemplar method fill that characterizes the general processing pattern of this class method. The job of fill-like methods is to remotely compute all of the values of the conv matrix once for each pixel in the input image and warehouse those values in conv for later use by gcon. In the general exemplar, the conv matrix may be any data structure shared between the definition of a composite operator and a method of one of its operands. This organization of the overall data flow may be referred to as the Remote Computation and Warehousing (RCW) data flow.

The procedure gcon is the implementation of the ⊕ operator for a single instance of a pixel neighborhood. The procedure gcon performs a single step of the overall ⊕ computation (i.e., it computes a single output pixel for each pixel neighborhood in the input image). The gcon procedure processes a single input pixel neighborhood by computing a loop-based summation of the image pixels in the neighborhood (whose exact positions are warehoused in conv) multiplied by the weights warehoused in conv. Once fill has iterated through the elements of conv, computing the matrix coordinates and associated weights for the neighborhood of a is specific pixel in a, gcon must iterate through conv a second time to get the coordinates of each pixel in the neighborhood (e.g., [row.conv.s [l,m], col.conv.s [l,m]]) and the weight that is specific to that pixel (e.g., w.conv.s [l,m]). Hence, there is a significant amount of wasted memory usage and wasted computation because of the de-localization in the definitions of gcon and fill.

One way to solve this problem is by a priori combination and localization (i.e., writing a specialized function for each combination of operator and operand). That is, one could create a library of components that meld the logic of gcon and each different possible version of FILL.S into an atomic component. However, this is not feasible because there are an infinite variety of such specialized localizations (i.e., an infinite number of possible FILL.S's). In view of the variations possible in the implementation of the image format of the left hand operand (e.g., an array, a sparse array, a memory hierarchy, etc.) in combination with each ⊕-like operator, building one concrete implementation for each combination would be prohibitively expensive.

Adding the infinite variety of LA image templates (i.e., the right hand operand types) on top of that already large set of possible components creates a combinatorial explosion of specific concrete components. Moreover, beyond just building a custom localized component for each combination of operators and atomic operands, performance localizations may require sharing and interweaving code from extended multilevel subexpressions. Therefore, the number of cases for which custom concrete components must be built must also include such subexpressions and there are countless such subexpressions. Hence, the number of concrete components that would need to be written is so large that it would be impractical to build components for all of the combinations of operators, operands, and subexpressions. Accordingly, building a reusable library of concrete instances is not feasible.

Alternatively, mapping this variety of atomic elements (i.e., the convolution operator and the individual graphic templates) into conventional programming language constructs such as reusable functions, classes, templates, COM-like objects, etc. introduce other similarly insoluble problems, most notably performance problems.

Another alternative is the equivalent of manually creating (on demand) a concrete implementation for each required combination of image implementation variation, image operator, and graphics template variation. This strategy is feasible but extends implementation time and thereby, time to market, wastes precious resources that could be better directed to the design of an application's high level architecture, and wastes development costs involved in solving sets of problems that are very nearly the same except for a few minor details. Creation of such monolithic, customized routines prevents further degrees of reuse, sharing, reorganization, and associated performance improvements that would accrue from custom melding together of code from the several high level operators and operands within a domain specific expression. Casting subexpressions like (a⊕s) and (a⊕s') into concrete reusable parts a priori isolates the internal structure of each and prevents opportunities to share low level implementation code.

The composite folding of this invention allows one to program in terms of DS (domain specific) operators and operands to obtain the flexibility, expressiveness, and componentry amplification that arises from being able to express complex compositions of relatively simple domain specific operators and operands. Composite folding also provides automatic melding (i.e., compiling) of those compositions of composites and their extended computations (e.g., loop-based computations) into custom, high performance code rivaling that of manually produced custom code. There are many differing classes of composite folding possible depending on the specifics of the data flow and data dependencies implied by the domain specific operators and operands. Each different class will engender a slightly different composite folding algorithm, but the essential (common) insights in all of the methods are easily illustrated by a single example (e.g., the data flow structure of FIG. 23).

Figure 24:
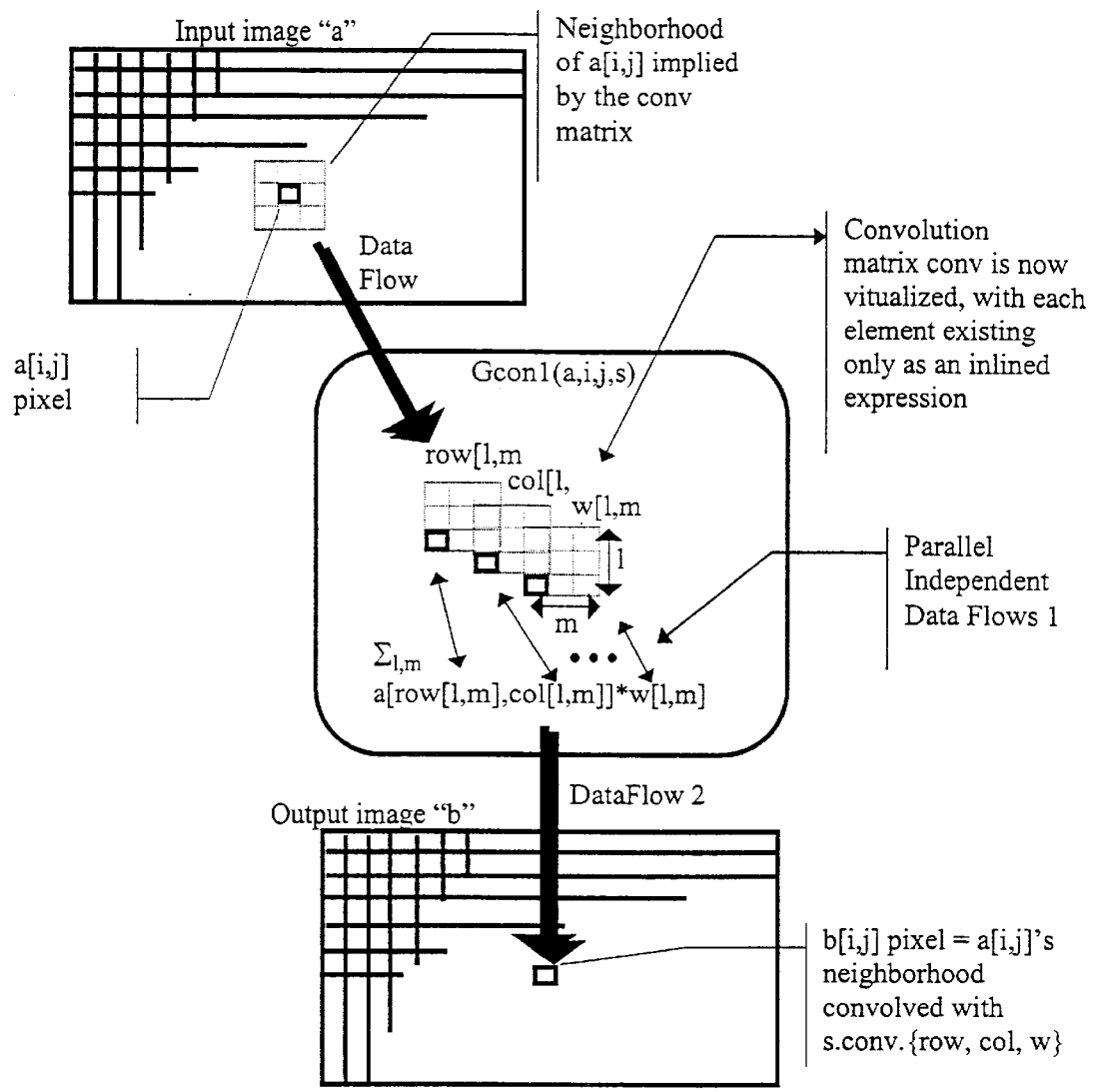
FIG. 24 illustrates the objective of composite folding to provide more efficient data flow than the data flow of FIG. 23.

The objective of composite folding, for the case of the backward convolution operator ⊕ and by generalization for all high level operators and operands, is to remove the inefficiencies inherent to data flows like RCW. FIG. 24 illustrates the objective of composite folding for the backward convolution example; an equivalent but more efficient computation than the computation of FIG. 23. In particular, the RCW data flow of FIG. 23 is transformed into an On Demand, Value by Value (ODVBV) data flow illustrated in FIG. 24. This transformation will specialize, inline, reorder, share and simplify the computations of the functions fill and gcon, and eventually inline the resultant gcon and weave its body into the implementation code from other parts of the expression.

Reorganizing the data flow of FIG. 23 into that of FIG. 24 will completely eliminate the run-time global storage for the convolution matrix conv. Once this transformation is complete, the matrix conv is a conceptual or virtual design structure that exists only at design or generation time and is unneeded at run-time because the computation of each individual element of that matrix will be computed in situ in the automatically created composite Gcon-Fill, as needed. Gcon-Fill is a specialized and reorganized version of gcon created at design time to house this reorganized code. By run-time it too will have been inlined away and its implementation code merged with the implementation code of other parts of the expression to realize the most efficient implementation.

FIGS. 23 and 24 illustrate improvements in the data flow and therefore computational speed and efficiency that composite folding can provide over conventionally compiled code. These data flow improvements are illustrated with reference to the procedure gcon, which is the implementation of the backwards convolution operator ⊕ for a single instance of a pixel neighborhood—performing a single step of the overall ⊕ computation. For purposes of illustration, the composite folding procedure will be described with reference to a matrix representation of the backwards convolution operator ⊕ to better illustrate the application of the composite folding procedure to a high level programming language.

In this implementation, a first step of composite folding is the analysis and manipulation of Fill into a set of methods that each compute one of the values produced by Fill on an "on demand, value by value" (ODVBV) basis, thereby eliminating the conv intermediate storage. One could actually generate such methods in concrete form as intermediate definitions, or equivalently one could produce a set of substitutions that would have the equivalent effect when applied to gcon. It is immaterial which way it is accomplished. The effect of this first step of composite folding will bring the optimization to the same point.

Regardless of which method is chosen for the first step of composite folding, for simplicity of exposition, we will treat these intermediate on demand, value by value (ODVBV) methods as if they are actually generated and then proceed with the subsequent reorganization, simplification, and localization from there. An example of one of these on demand, value by value (ODVBV) methods generated by analysis of Fill would be W.S(i,j,m,n,p,q), where i and j are the indexes of the loop over the image, m and n define the size of the image, p and q are the indexes over the neighborhood of the a[i,j] pixel, and the result of W.S is the value of the weight associated with the (p, q) offset within the neighborhood of the pixel a[i,j]. The first step of composite folding would likewise generate a method to compute the row coordinate of the (p,q) offset of a[i,j] in terms of a's coordinate system, which would be Row.S(i,j,m,n,p,q). Similarly, Col.S(i,j,m,n,p,q) would compute the analogous value for the column and the methods PRange S(i,j,m,n,p,q) and QRange S(i,j,m,n,p,q) would compute the ranges of the p and q indexes. Both would compute the value [−1:1] for the example under consideration. FIG. 27 shows the detailed definitions of these intermediate methods for Fill.

It should be clear that in an alternate embodiment, the end user could write such on demand, value by value (ODVBV) methods at the outset thereby obviating the first step of composite folding. Nevertheless, he or she would still greatly benefit by the subsequent code reorganization, simplification, and localization performed by the subsequent phases of composite folding.

Figure 25:
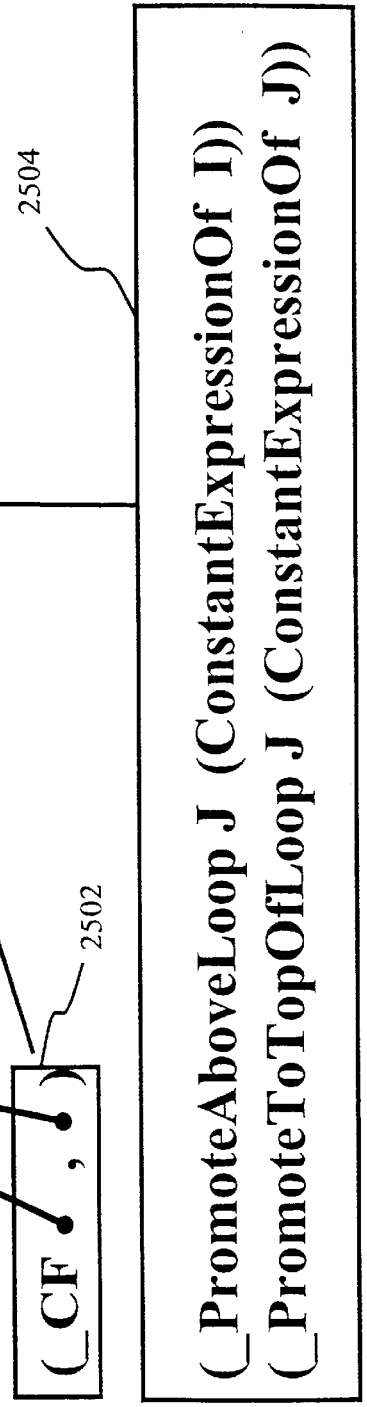
FIG. 25 illustrates exemplary optimization planning or composite folding tags that are incorporated into the loop-merged AST of FIG. 21D.

FIG. 25 illustrates exemplary optimization planning or composite folding tags 2502 and 2504 that are incorporated into the loop-merged AST of FIG. 21D as an expression of an abstract optimization plan. The composite folding tags 2502 initiate composite folding of the definitions of a, s, and t, and the associated optimizations. In one embodiment, the composite folding tags 2502 apply to three optimization phases: local optimization, cross-operator code sharing (e.g., triggered by a tag CFWRAPUP), and closing optimization (e.g., triggered by a tag CFWRAPUPEND). The Promote tags 2504, such as __PromoteAboveLoop and __PromoteToTopOfLoop referenced above, will remove and promote common index subexpressions.

In addition to tags 2502 and 2504, various other event-driven optimization tags typically are associated with parts of the expression to be optimized by composite folding. The tags are triggered by two kinds of optimization events in this embodiment: 1) scheduled optimization events and 2) unscheduled optimization events. The scheduled events are known, named and ordered in an a priori plan by which the composite folding process orders the kinds of optimizations that are anticipated. The unscheduled events are data dependent, occur in an unpredictable order, and interrupt the fixed, planned sequence of transformations to accomplish opportunistic simplifications and optimizations that arise because of the specifics of the expression being translated and the code being manipulated.

With regard to the scheduled events, the composite folding optimization begins where Phases 0 through 3 of the loop merging phase 2204 described herein above leaves off. When the loop merging process 2204 is complete, the composite folding process 2206, as a continuation of the AO process 2202, executes any tags or modifiers that are attached to the loop code in the order of their occurrence. This event is given the name EndOfPhase3, StartModifierProcessing although the event name is not explicitly used in an __ON modifier.

These events are not required to exist on a single global time line. The events can be viewed as state machines associated with specific transformations. For example, the events CFWrapUp and CFWrapUpEnd are specific to composite folding (__CF) and occur only during __CF processing. However, the posting of one of these __CF specific events (say CFWrapUp for example) may trigger a whole cascade of other transformations much as if those triggered transformations were "called" by __CF. This behavior is analogous to a lower level state machine being initiated by a higher level state machine when the transformation associated with the higher level state machine triggers, invokes or calls the transformation associated with the lower level state machine. For the example forming the basis of this description, the order of occurrence of the scheduled events is:

EndOfPhase3, StartModifierProcessing, which will trigger __CF
CFWrapUp, which will trigger
  __MergeCommonCondition
CFWrapUpEnd, which will trigger
  __UnWrapIfSmallConstant
CFCompleted, which will trigger the optimization tags that follow it in the tag, i.e.,
  __PromoteAboveLoop
  __PromoteToTopOfLoop The unscheduled events in this example, with their order of occurrence determined by transformation actions, are:

SubstitutionOfMe, which at various times for this example will trigger
  __PromoteConditionAboveLoop
  __PromoteConditionAboveExpression
  __Fold0
  __RemoveUndefined
MigrationIntoBlockOf, which will trigger
  __SchedFoldFlows
  __FoldFlows The following description elaborates on the operation and effects of these events.

FIG. 26 is a flow diagram of a composite folding process 2602 in which composite structures of a specific domain (e.g., graphics imaging) are compiled so as to anticipate and optimize non-optimal structures in the compiled code. Process block 2604 indicates that composite folding tags are applied or annotated to pre-compiled code. In one embodiment, composite folding tags (e.g., __CF, __PromoteAboveLoop and __PromoteToTopOfLoop), as well as or alternatively others, are annotated to the code during a loop merging process, such as loop merging phase 2204. These tags are defined as "generated" tags because they are generated by the AO program itself. In contrast to generated tags, some tags may be added to reusable components when they are built and entered into the library by the component developer. These tags are defined to be "prepositioned" in that the tags are annotated to the code prior to execution of the AO generator. An example of a prepositioned tag is "(__ON SUBSTITUTIONOFME (__FOLD0))". Other examples of prepositioned tags, may be seen in FIG. 27. The prepositioned tags may identify composite folding optimizations that are local to individual operators, cross operator optimizations that affect more than one operator, and finalizing optimizations that exploit optimizations available after the local and cross operator optimizations are completed. A programmer or developer may perform such prepositioning of tags, or the tags may be positioned automatically by a computer.

Process block 2606 indicates that the tag-annotated code is inlined so that operators and function calls (e.g., backward convolution operators, loop function calls, etc.) are replaced with instances of the underlying function bodies, and actual arguments are substituted for formal parameters. The tags from the function calls and operators in the tag-annotated code are carried to the corresponding instances in the inlined code.

Query block 2608 represents an inquiry as to whether the inlined code includes an unexecuted tag identifying an optimization that is local to an individual operator or function call. A local optimization may alternatively be considered an unscheduled event. A tag is unexecuted if the optimization that it identifies has not been performed or attempted. Query block 2608 proceeds to process block 2610 whenever the inlined code includes an unexecuted tag that is local to an individual operator or function call, and otherwise proceeds to query block 2612.

Process block 2610 indicates that the optimization identified by the unexecuted tag for the optimization that is local to an individual operator or function call is attempted and, if possible, completed. It will be appreciated that the tags identify optimizations that are expected to be feasible at compilation, but such optimizations may sometimes be infeasible or impossible and so might not be completed. Process block 2610 returns to query block 2608.

Query block 2612 represents an inquiry as to whether the inlined code includes an unexecuted tag identifying a cross operator optimization. Query block 2612 proceeds to process block 2614 whenever the inlined code includes an unexecuted tag identifying a cross operator optimization, and otherwise proceeds to query block 2616.

Process block 2614 indicates that the optimization identified by the unexecuted tag for the cross operator optimization is attempted and, if possible, completed.

Query block 2608' represents an inquiry as to whether the inlined code includes an unexecuted tag identifying an optimization that is local to an individual operator or function call. Query block 2608' proceeds to process block 2610 whenever the inlined code includes an unexecuted tag that is local to an individual operator or function call, and otherwise returns to query block 2612.

Query block 2616 represents an inquiry as to whether the inlined code includes an unexecuted tag identifying a finalizing optimization. Query block 2616 proceeds to process block 2618 whenever the inlined code includes an unexecuted tag identifying a finalizing optimization, and otherwise proceeds to process block 2620.

Process block 2618 indicates that the optimization identified by the unexecuted tag for the finalizing optimization is attempted and, if possible, completed.

Query block 2608" represents an inquiry as to whether the inlined code includes an unexecuted tag identifying an optimization that is local to an individual operator or function call. Query block 2608" proceeds to process block: 2610" whenever the inlined code includes an unexecuted tag that is local to an individual operator or function call, and otherwise returns to query block 2616. Process block 2610" indicates that the optimization identified by the unexecuted tag for the optimization that is local to an individual operator or function call is attempted and, if possible, completed. Process block 2610" returns to query block 2616.

Process block 2620 indicates that optimized compilation of the code is performed.

Process 2602 may be implemented, for example, by a scheduler. Each transformation or tag invokes other transformations through the scheduler and returns both a value and a continuation (i.e., the current state of its computation Via its current bindings, whereby it can be continued if it has further work to do). This allows the scheduler to intervene in the middle of calls to and returns from transformations. By this mechanism, transformations cooperatively allow the scheduler to get control at points of call, return, and other points determined by the individual transformation. Transformations can be scheduled to be called in several ways: (1) immediately, (2) not until completion of a specified transform, (3) in the next available time slot after a posted event, or (4) a combination of conditions (2) and (3). Delaying the invocation of a subsequent transformation until the currently executing transformation is complete or until it has reached a particular point in its processing may be required because the existing transformation may be only partially complete in restructuring the AST thereby putting the AST in a temporarily unstable, inconsistent, or incompletely processed state. The subsequent transformation cannot be allowed to fire until the AST is in a stable and consistent state, thereby assuring that the subsequent transformation will correctly perform its processing. This situation is analogous to the "critical section" problem in operating systems. The subsequent transformation expects to find a correctly structured AST and will not operate correctly unless it does. Delaying the firing of a subsequent transformation until the current transformation is out of its "critical section of tree manipulation" assures the proper initial conditions for the subsequent transformation.

Immediately calling a transformation or tag is equivalent to one transformation directly calling another transformation. For example, _PROMOTECONDITIONABOVELOOP may invoke _PROMOTECONDITIONABOVEEXPRESSION to set up the necessary pre-conditions for the latter to operate correctly. Not calling a transformation until completion of a specified transform may be exemplified by (_PROMOTEABOVELOOP J (CONSTANTEXPRESSIONOF I)), which will not be executed until after the _CF transform is completed, by virtue of the _PROMOTE act is listed after the _CF transform in the AO tag.

Calling a tag or transformation in the next available time slot after a posted event, e.g., (_ON CFWRAPUP _MERGECOMMONCONDITION) will schedule the transformation _MERGECOMMONCONDITION to be executed during the wrap up phase of the _CF transform. The combination of conditions 2 and 3 is exemplified when the meld transformation performs a substitution of an expression with the AO tag (_ON SUBSTITUTIONOFME (_PROMOTECONDITIONABOVELOOP P Q)) attached to it. However, the earliest that the _PROMOTECONDITIONABOVELOOP transformation can actually be invoked is after meld is complete and so it will be scheduled for the first available time slot after that time. This scheduler functionality may be represented by the following pseudo-code:

```
Define Function TransformationScheduler( )
{
while (there are posted events or scheduled transforma-
    tions and progress is made on each loop iteration)
    {
    Check for any recently posted events, schedule relevant
        transformations and unposted events;
    If expressions in event-driven tags depend on recently
        posted events, evaluate the expressions and schedule
        the transforms for which the expressions evaluated to
        true;
    If any transformations are scheduled for immediate
        execution, invoke them and continue the interrupted
        transformation with the result of the last one;
    If state specific transformations (e.g., upon completion
        of a specific named transformation) are scheduled
        then invoke them if the AO system is in that state and
        upon completion, continue the interrupted transfor-
        mation;
    }
}
Define ControlFunction (AST)
{
Walk AST and schedule any transformations that are not
    event-driven;
Enter dependencies into schedule (e.g.,
    _PromoteToTopOfLoop cannot be invoked until _CF
    is completed);
Call TransformationScheduler( );
Return reorganized AST;
}
```

The operation of composite folding process 2602 will now be described with reference to the expression of FIG. 25, which is based upon the Sobel edge detection expression described above with reference to FIG. 4. This example is drawn from the domain of graphics imaging software and is based on an imaging notation specific to that domain called the Image Algebra (IA). This domain is a convenient domain in which to cast examples of composite folding process 2602 because the domain notation is well-defined and mature. In this illustration, loop-based computations on s and s' are folded into the loop-based definition of the convolution operator and opportunities for merging common portions of the two instances of the convolution operator are exploited when feasible.

Composite folding process 2602 is not limited to this specific domain, but rather is applicable to abstract operators and operands from any application domain (e.g., business software, system software, office software, networking, telephony, etc.). Similarly, while this example will focus on array- and matrix-based implementations, composite folding process 2602 and AO process 2202 an accommodate other implementation composites (e.g., lists, collections, trees, record composites, etc.) through the use of different tags and transformations.

With reference to the expression of FIG. 25, local optimizations are applied to the definitions t1=(a[i,j]⊕s) and t2=(a[i,j]⊕s') according to process step 2604. Due to the symmetry of the two definitions, the local optimization of t1 is analogous to the local optimization of t2. Therefore, the following description of the local optimization of t1 is similarly applicable to the local optimization of t2. Due to this similar applicability, expressions of t2 will be referenced only when relevant to cross operator optimizations.

In accordance with inlining process step 2606, the expression (a[i,j]⊕s) may be represented by the substitute inline definition:

$$(a[i,j] \oplus s) \rightarrow \{\Sigma p,q(p \in p\text{Range.s})(q \in q\text{Range.s}):$$

$$\{a[\text{row.s}(i,j,m,n,p,q),\text{col.s}(i,j,m,n,p,q)]*\text{w.s}(i,j,m,n,p,q)\}\}$$

in which p and q are index variables that are elements of the pRange.s and qRange.s of an s template (i.e., pixel neighborhood in the image operand), m and n are the range limits of the index variables i and j, and row.s, col.s, and w.s represent definitions of methods in the s template. The definitions of row.s, col.s, and w.s may be represented in the following shorthand form:

row.s(fi,fj,fm,fn,fp,fq)→(fi+fp)
col.s(fi,fj,fm,fn,fp,fq)→(fj+fq)
pRange.s(fi,fj,fm,fn,fp,fq)→[−1:1]
qRange.s(fi,fj,fm,fn,fp,fq)→[−1:1]
w.s(fi,fj,fm,fn,fp,fq)→
{if ((fi==0)||(fj==0) (fi==(fm−1))||(fj==(fn−1)))
 then 0;
 else {if((fp !=0) && (fq !=0)) then fq;
  else {if((=fp 0) && (fq !=0)) then (2*fq);
   else *undefined*}}}

This substitution or inlining of the definitions of row.s, col.s, and w.s into the expression (a[i,j]⊕s) is then inlined into the context of the code generated by the loop merging process. Tags are inserted into the code to be inlined by, for example, a software developer who is creating reusable components for a reusable library and who is likely to be someone other than the end-user programmer that writes the domain specific expression to be compiled (i.e., 4A). Such tag insertion would occur long before (e.g., months or even years) the components would be applied to this example. Thus, such tags are prepositioned. The tags are executed after the code is inlined as described above.

FIG. 27 illustrates exemplary tags 2702–2712 on the inlined w method of the s template. Tags 2702–2706 are based upon tags prepositioned within the expression of FIG. 25 according to process step 2604 and are respectively labeled:

(_ON SUBSTITUTIONOFME
 (_PROMOTECONDITIONABOVELOOP FP FQ))
(_ON SUBSTITUTIONOFME (_FOLD0))
(_ON SUBSTITUTIONOFME
 (_REMOVEUNDEFINED)), and are triggered by "unplanned" or irregular optimization events and are therefore analogous to hardware interrupts in the sense that are executed when a transformation performs particular optimization event, in this case, a substitution of the subtree to which the example tags are attached. Tag 2702 seeks to avoid performing a special case check for every pixel in a neighborhood since only a single check is all that is required for the neighborhood as a whole. The neighborhood as a whole is a special case or the neighborhood as a whole is not. Tag 2704 seeks to simplify expressions into which the "0" to which 2704 is attached gets substituted. Zero folding often engenders a cascade of other optimizations. In this example, 2704 causes a cascade of transformations over the life of the example that turn loops into zero, simplify the expression "sqrt(t1*t1+t2*t2)" to zero, and eventually result in the "b[i,j]=0" statement in the final result (FIG. 33). Tag 2706 seeks to incorporate its expression context into the decision structure and to deal with undefined values. The term undefined has different meanings in different computational contexts. For example, the term can arise as a 0 in addition, as a 1 in multiplication, or as a null iteration in a loop.

Tag 2708 is:

(_ON CFWRAPUP (_MERGECOMMONCONDITION)), and is executed when the composite folding attempts cross-operator optimizations and seeks to avoid checking special cases more than once per pixel neighborhood. Tags 2710 and 2712 are respectively:

(_ON CFWRAPUPEND (_UNWRAPIFSMALLCONSTANT p
 |pRANGE|), (_ON CFWRAPUPEND _UNWRAPIFSMALLCONSTANT q
 |qRANGE|), and are executed as the composite folding is completed to obtain any remaining performance optimization due to iterations that occur over "small" ranges, since small ranges will generate a small number of terms when the loop is unwrapped. The definition of what constitutes "small" is up to the developer. Tags 2710 and 2712 seek to eliminate loop overhead and any other overhead (e.g., conditional tests) by expressing a summation as a list of terms.

Tags are prepositioned when the developer anticipates that particular instances of a function might possibly be concatenated or otherwise calculated in alternative ways that can provide opportunities to improve overall performance of the function. For example, one such opportunity might arise if the if . . . then tests on multiple separate instances of a particular condition on the ⊕ operator can be merged into one if . . . then test. These anticipated optimizations may be expressed by attaching two event-driven optimization tags 2702 and 2708 to the top conditional operator in the expression.

Similarly, the developer can anticipate that there will be an opportunity for simplifying a formula whenever the zero value is substituted into that formula. This anticipated opportunity for optimization may be identified by attaching tag 2704 to the zero value. For example, the Substitution-OfMe event will trigger the (_Fold0) transformation only if the zero value by itself is substituted into an expression. If the zero value is a part of a larger expression that is substituted into an expression, the (_Fold0) transformation will not be executed. Finally, the else value of the condition contains an UNDEFINED value, which is part of the design specification that will have to be translated into an expression that can be handled at execution time. The case that this UNDEFINED value represents will have to be detected by a conditional computation and turned into a null operation. To accomplish this anticipated optimization, the programmer has attached tag 2706. The actual execution of the deferred transformations corresponding to each of these tags occurs only within the context of a specific custom usage arising from the end-user programmer writing an expression of domain specific operators and operands.

The definition of the expression (a[i,j]⊕s), with the definitions of row.s, col.s, and w.s inlined into the expression, may be represented as:

{Σp,q(p∈[−1:1])(q∈[−1:1]):
  {a[(i+p),(j+q)]*
    {if((i==0)||(j==0)||(i==(m−1))||(j==(n−1))) then 0;
    else {if((p !=0) && (q !=0)) then q;
      else {if((=p 0) && (q !=0)) then (2*q);
        else *undefined*}}}}}

This expression is the body of the i,j loop (which is not shown but is wrapped around the outside of this expression). The i,j loop iterates over the array a. This expression shows the neighborhood summation loop that iterates on the variables p,q which vary over the ranges (p∈[−1:1]) (q∈[−1:1]) for every neighborhood around each one of the a[i,j] pixels defined by the i,j loop.

The optimizations identified by tags 2702–2706 are attempted successively according to steps 2608 and 2610 of composite folding process 2602. In this illustration, the optimization identified by each of the tags is performed successfully. It will be appreciated, however, that the expected optimizations might not be feasible or possible in all applications. If the optimization events that these tags are waiting for never happen in some application, then the tags are simply deleted from the final form of the code, thereby making the final code acceptable for some intended target compiler (e.g., C or Lisp). The sequence in which tags 2702–2706 are performed is based upon the occurrence of unscheduled actions or conditions.

In connection with simplifying each iteration of these loops, the (_PROMOTECONDITIONABOVELOOP FP FQ) tag 2702 is executed because the if-then statement to which it is attached was substituted during the inlining of W.S. In the course of inlining W.S, the variables fp and fq will be replaced during the substitution by variables local to the code for the backward convolution operator ⊕. Thus, fp will be replaced by p and fq will be replaced by q in the substituted form. This substitution means that (_PROMOTECONDITIONABOVELOOP P Q) will try to move the if-then expression above the loop whose control variables are p and q. In other words, the execution of 2702 functions to shift the special-case expression "if((i==0)||(j==0)||(i==(m−1))||(j==(n−1))" out of or above the p,q loop that iterates over the neighborhood of each pixel a[i,j].

Just before 2702 fires, the example expression has the form:

{Σp,q(p∈[−1:1])(q∈[−1:1]):
  {a[(i+p),(j+q)]*
    {if((i==0)||(j==0)||(i==(m−1))||(j==(n−1))) then 0;
    else {if((p !=0) && (q !=0)) then q;
      else {if((=p 0) && (q !=0)) then (2*q);
        else *undefined*}}}}}

The so-called "enabling conditions" (i.e., those conditions that must be true for the transform to succeed in its objective) of tag 2702 require that it be at the level of the loop body in order to execute. Unfortunately, it is not. The if . . . then . . . else that the transform wants to move is the right hand operand in the expression a[(i+p),(j+q)]*(if . . . then . . . else . . . )

The _PROMOTECONDITIONABOVELOOP transform cannot solve this problem itself but recognizes the pattern (?leftoperand*?me) as one that can be handled by another transformation, _PROMOTECONDITIONABOVEEXPRESSION (not shown). _PROMOTECONDITIONABOVEEXPRESSION's operation may be represented by the rule:

(?operand ?operator(if ?condexpr
  (then ?thenclause)(else ?elseclause)))
→

(if ?condexpr(then(?operand ?operator ?thenclause))
  (else(?operand ?operator ?elseclause))))

Applying this rule simply moves the arithmetic operation into both the then and else legs of the if . . . then . . . else, producing the form:

{Σp,q(p∈[−1:1])(q∈[−1:1]):
  {if((i==0)||(j==0)||(i==(m−1))||(j==(n−1)))
    then a[(i+p),(j+q)]*0;
    else a[(i+p),(j+q)]*
    {if((p !=0) && (q !=0)) then q;
      else {if((=p 0) && (q !=0)) then (2*q);
        else *undefined*}}}}

Now, 2702 is at the top of the loop body and therefore, its enabling conditions are fulfilled so that it can fire. After 2702 fires, the example has the form:

{if ((i==0)||(j==0)||(i==(m−1))||(j==(n−1)))
  then {Σp,q(p∈[−1:1])(q∈[−1:1]):
    a[(i+p),(j+q)]*0;}
  else {Σp,q(p∈[−1:1])(q∈[−1:1]):
    a[(i+p),(j+q)]*
    {if((p !=0) && (q !=0)) then q;
      else {if((=p 0) && (q !=0)) then (2*q);
        else *undefined*}}}}

The operation of tag 2702 _PROMOTECONDITIONABOVELOOP can be represented by the rule:

($(bindvar ?Quantifier $(por _Sum _Forall)) ?vbllist
  ?suchthat
  (if ?condexpr(then ?thenclause)(else ?elseclause)))
→
(if ?condexpr
  (then(?Quantifier ?vbllist ?suchthat ?thenclause))
  (else(?Quantifier ?vbllist ?suchthat ?elseclause)))

Figure 28:
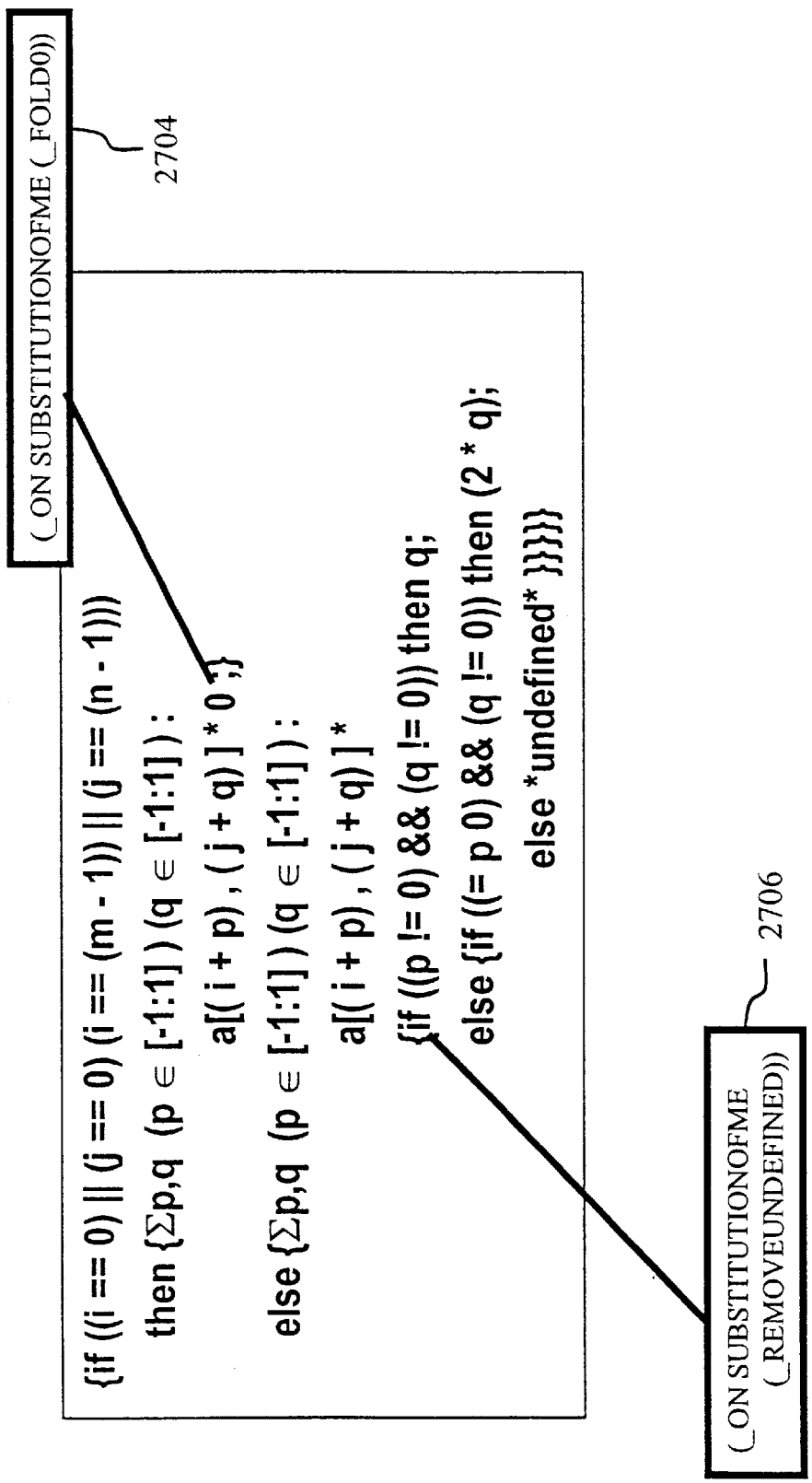
FIG. 28 shows positions of tags resulting from execution of another tag.

FIG. 28 shows the resulting positions of tags 2704 and 2706 upon execution of the (_PROMOTECONDITIONABOVELOOP FP FQ) tag 2702. In the course of the substitutions caused by the (_PROMOTECONDITIONABOVELOOP FP FQ) tag 2702, the (_FOLD0) tag 2704 is triggered and functions to simplify zero-value expressions. The resulting expression is:

{if((i==0)||(j==0)||(i==(m−1))||(j==(n−1))) then 0;
  else {Σp,q(p∈[−1:1])(q∈[−1:1]):
    a[(i+p),(j+q)]*
    {if((p !=0) && (q !=0)) then q;
      else {if((=p 0) && (q !=0)) then (2*q);
        else *undefined*}}}}

The (_Fold0) tag 2704 performs several simplifications using well known rules of arithmetic and control structure simplification. For example, the following transformations may be applied recursively up the tree if the left hand side of the patterns (i.e., the expressions to the left of the symbol →) match the current subtree in which the zero value has just been substituted:

?X+0→?X
0+?X→?X

?X*0→0

0*?X→0

?X/0→*Error*

0/?X→0

{?X ?AnyArithOp=0}→ϕ//where this includes +=, −=, etc., and ϕ means eliminate statement The zero folding tag 2704 can lead to control structures that can be further simplified by control structure simplification rules such as:

{∀fp . . . 0}→0

Such a simplification rule can be applied repetitively until no other cases exist.

In the course of the substitutions caused by the (_PROMOTECONDITIONABOVELOOP FP FQ) tag 2702, the (_REMOVEUNDEFINED) tag 2706 is triggered and functions to incorporate its expression context into the decision structure and to deal with undefined values. The resulting expression is:

{if((i==0)||(j==0)||(i==(m−1))||(j==(n−1))) then 0;
   else {Σp,q(p∈[−1:1])(q∈[−1:1]):
      {if((p !=0) && (q !=0)) then a[(i+p),(j+q)]*q;
      else {if((=p 0) && (q !=0))
         then a[(i+p),(j+q)]*(2*q);
         else nil}}}}

The _REMOVEUNDEFINED transformation or tag 2706 detects conditional values with an UNDEFINED value on some leg and recursively moves the conditions from the expression by recursively incorporating the context expression that contains the if . . . then . . . else . . . with the UNDEFINED value into both legs of the if . . . then . . . else . . . Eventually, the leg containing the UNDEFINED value is transformed into a null statement, which will be eliminated if loop unwrapping occurs later.

The optimization identified by tag 2708 labeled:

(_ON CFWRAPUP (_MERGECOMMONCONDITION)), is attempted according to finalizing steps 2616 and 2618 of composite folding process 2602. In this illustration, only one cross operator optimization is attempted, and it is performed successfully. It will be appreciated, however, that multiple or no cross operator optimizations might be attempted and that the expected optimizations might not be feasible or possible in all applications. The sequence in which the tags of multiple cross operator optimizations would be performed could be based upon a predetermined sequencing or hierarchy of the tags or the order in which they occur in the code.

The above expressions relating to the exemplary definition (a[i,j]⊕s) of t1 have omitted the part of the expression that contains assignment to t1 for purposes of simplicity. Completely stated, the expression resulting from the localized composite folding optimizations of t1=(a[i,j]⊕s) may be expressed as:

t1{if((i==0)||(j==0)||(i==(m−1))||(j==(n−1))) then 0;
   else {Σp,q(p∈[−1:1])(q∈[−1:1]):
      {if((p !=0) && (q !=0)) then a[(i+p),(j+q)]*q;
      else {if((=p 0) && (q !=0))
         then a[(i+p),(j+q)]*(2*q);
         else nil}}}}

As an initial step in execution of the cross operator optimization tag 2708, the assignment between t1 and the expression derived from (a[i,j]⊕s) is incorporated into both the then and else legs of the if . . . then . . . else . . . to form a single integrated expression of the form:

{if((i==0)||(j==0)||(i==(m−1))||(j==(n−1))) then t1=0;
   else t1={Σp,q(p∈[−1:1])(q∈[−1:1]):
      {if((p !=0) && (q !=0)) then a[(i+p),(j+q)]*q;
      else {if((==0) && (q !=0))
         then a[(i+p),(j+q)]*(2*q);
         else nil}}}}

Figure 29:
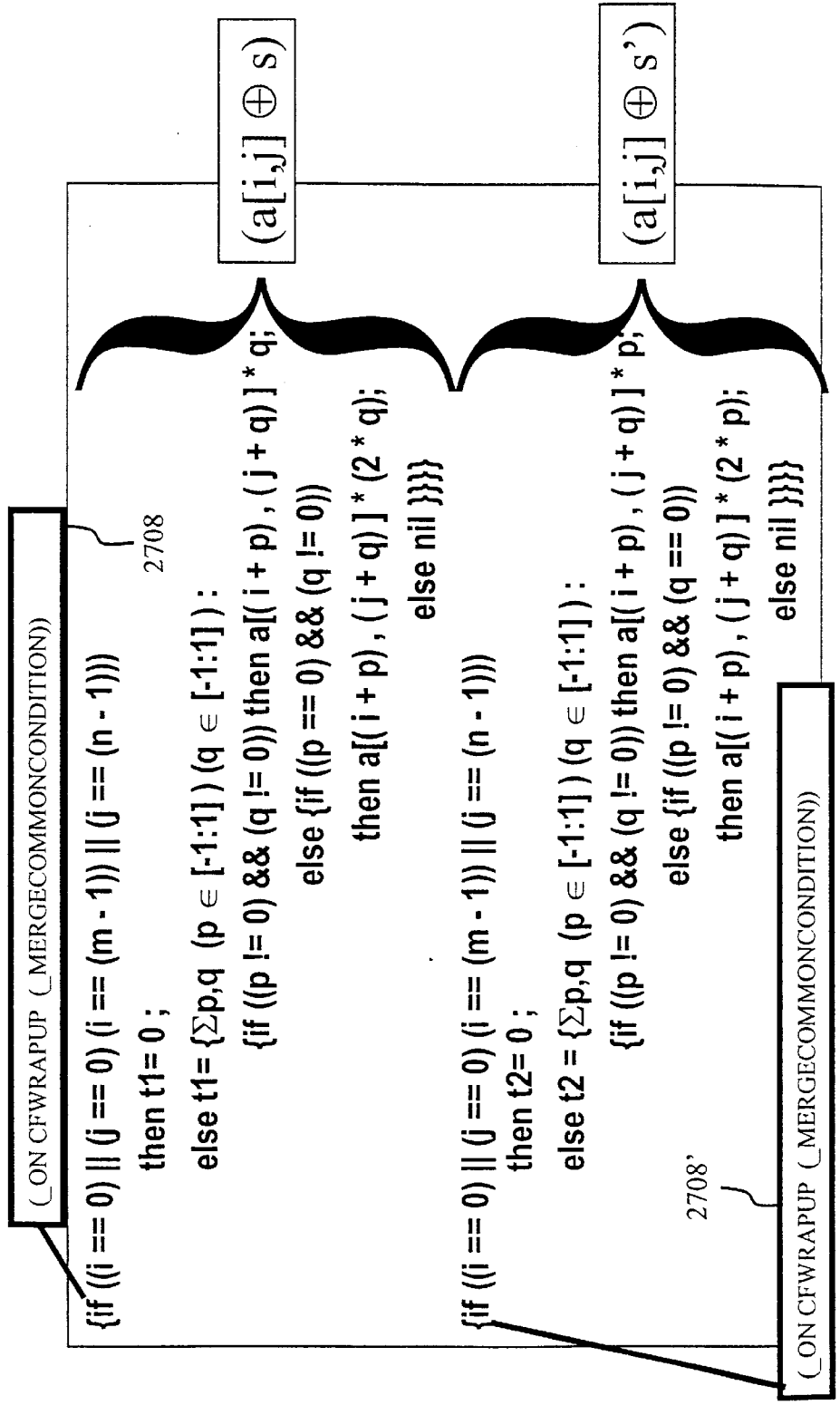
FIG. 29 illustrates the cross operator optimization tags in integrated expressions.

FIG. 29 illustrates the cross operator optimization tags 2708 and 2708' in the integrated expressions for t1=(a[i,j]⊕s) and t2=(a[i,j]⊕s'). As indicated above, the expression (a[i,j]⊕s') would be processed in a manner substantially the same as the expression (a[i,j]⊕s) and would result in a corresponding integrated expression as indicated in FIG. 29. The cross operator optimization tags 2708 and 2708' identify an optimization that merges the integrated expressions for (a[i,j]⊕s) and (a[i,j]⊕s'), which share a common special case condition test of the form "if ((i==0)||(i==(m−1))||(j==(n−1)))," resulting in the merged expression:

{if((i==0)||(j==0)||(i==(m−1))||(n−1)))
   then {t1=0; t2=0;}
   else {t1={Σp,q(p∈[−1:1])(q∈[−1:1]):
      {if((p !=0) && (q !=0)) then a[(i+p),(j+q)]*q;
      else {if((p==0) && (q !=0))
         then a[(i+p),(j+q)]*(2*q);
         else nil}}}
   t2={Σp,q(p∈[−1:1])(q∈[−1:1]):
      {if((p !=0) && (q !=0)) then a[(i+p),(j+q)]*p;
      else {if((p !=0) && (q==0))
         then a[(i+p), (j+q)]*(2*p);
         else nil}}}} b[i,j]=sqrt(t1*t1+t2*t2);

The (_MERGECOMMONCONDITION) tag 2708 will be triggered at the start of the CFWrapUp event, which is performed after composite folding has done the bulk of its work. At this point in the example, the body of the two nested loops that process the image will contain two parallel if . . . then . . . else . . . statements with a common conditional expression. The $(plisp . . . ) pattern defines the enabling condition of the rule, specifically that ?C1 and ?C2 must be equal. The transformation merges the if . . . then . . . else . . . statements according to the rule:

((if(?C1)(then ?bodyA)
   (else ?bodyC))
(if($(pand ?C2 $(plisp(equal ?C1 ?C2))))
   (then ?bodyD)
   (else ?bodyE)))
→((if(?C1)(then(?bodyA; ?bodyD))
   (else(?bodyC; ?bodyE))))

Figure 30:
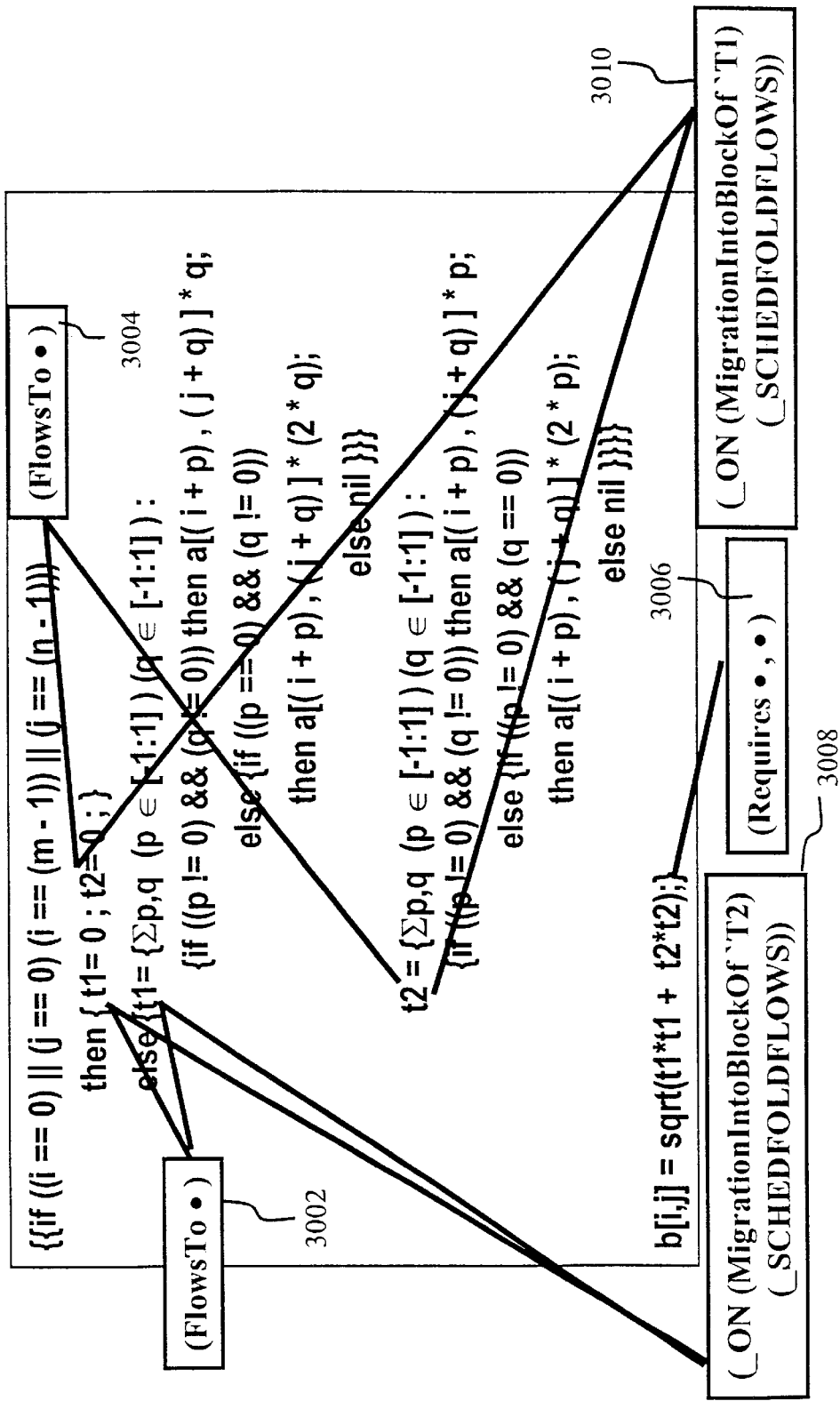
FIG. 30 illustrates unscheduled optimization tags.

FIG. 30 illustrates other unscheduled optimization tags 3002–3010 in the merged expression that are attempted according to steps 2608 and 2610 of composite folding process 2602. The (FlowsTo . . . ) tags 3002 and 3004 identify t1 and t2, respectively, as flowing to another element or expression, specifically the expression "sqrt(t1*t1+ t2*t2)" although the tags in FIG. 30 hide the details of exactly how they refer to that expression to avoid delving into implementation details that are largely irrelevant to their abstract intent. The data flow information is symmetric in that the (Requires . . . ) tag 3006 attached to the expression "sqrt(t1*t1+t2*t2)" identifies t1 and t2 as the source points of the data flow. The Requires tag 3006 similarly hides the exact details of its implementation. The intention of the symmetry is that the data flows can be easily detected at either end, and the opposite end of the data flow is then easily computed. Tags 3002–3006 record the data flow dependencies introduced by the transformation for the power function and anticipate the possible opportunity to fold constants t1 and t2 back into the "sqrt(t1*t1+t2*t2)" expression under the enabling condition that the data flows have a particular data flow pattern. Anticipation of the data constant folding opportunity is recorded by the attachment of the tags 3008 and 3010, represented as:

(_ON(MigrationIntoBlockOf 'T1)(_SCHEDFOLDFLOWS))

(_ON(MigrationIntoBlockOf 'T2)(_SCHEDFOLDFLOWS))

Figure 31A:
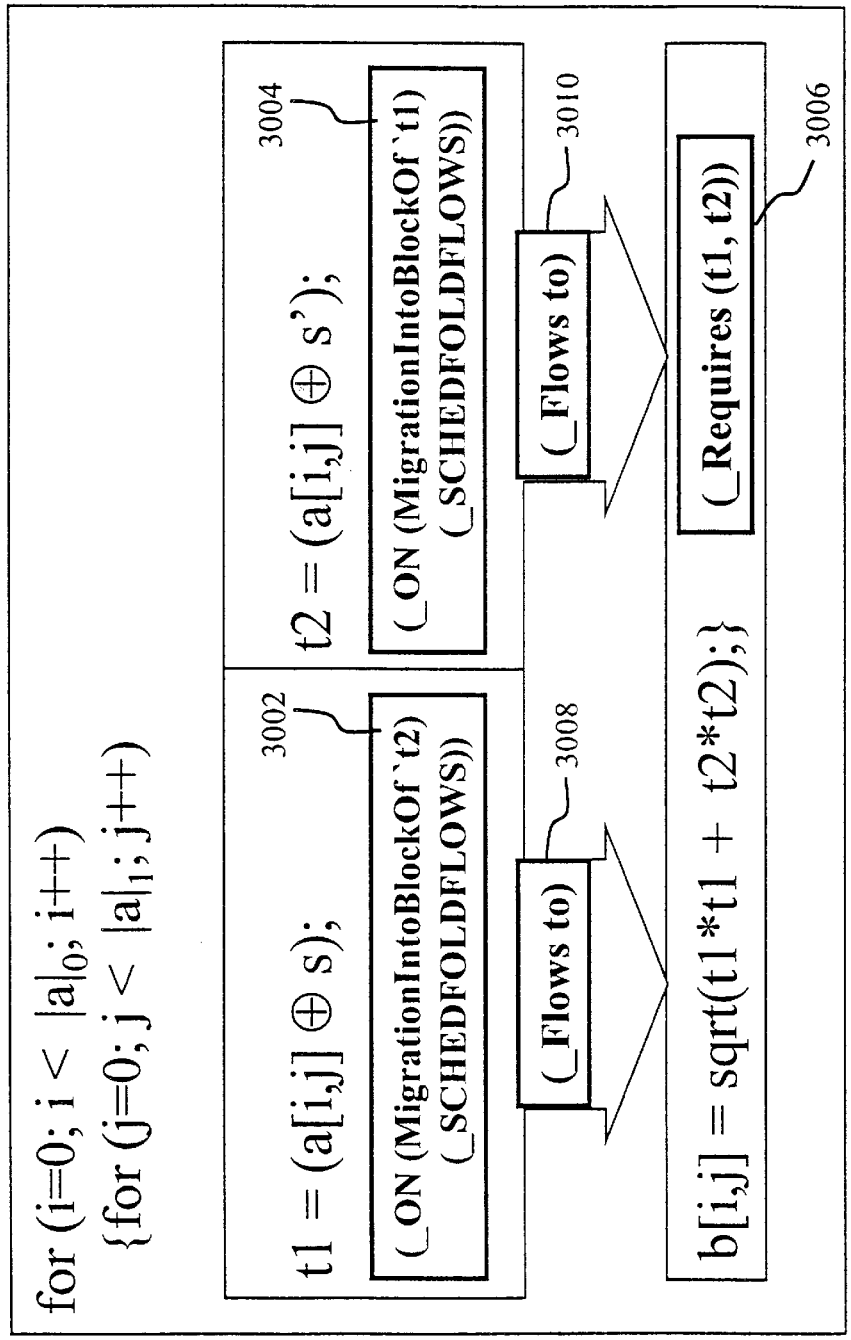
FIG. 31A shows how tags are associated with the expression corresponding to the AST shown in FIG. 21D.

FIG. 31A graphically shows the data flow pattern expressed by tags 3002–3010 and their relationship to the AST shown in FIG. 21D. These tags are affixed automatically at the conclusion of the loop merging operation 2204 during reduction of the power of 2 component in the original exemplary expression for the Sobel edge detection expression. Tags 3008 and 3010 anticipate the possibility of folding constant values of t1 and t2 into the computation of "sqrt(t1*t1+t2*t2)" at some future point. The opportunity for such constant folding will arise once the definitions of the convolution operator and a method of the AO templates s and s' are integrated. The merging of these definitions will be effected by the _CF( . . . ) tag.

Figure 31B:
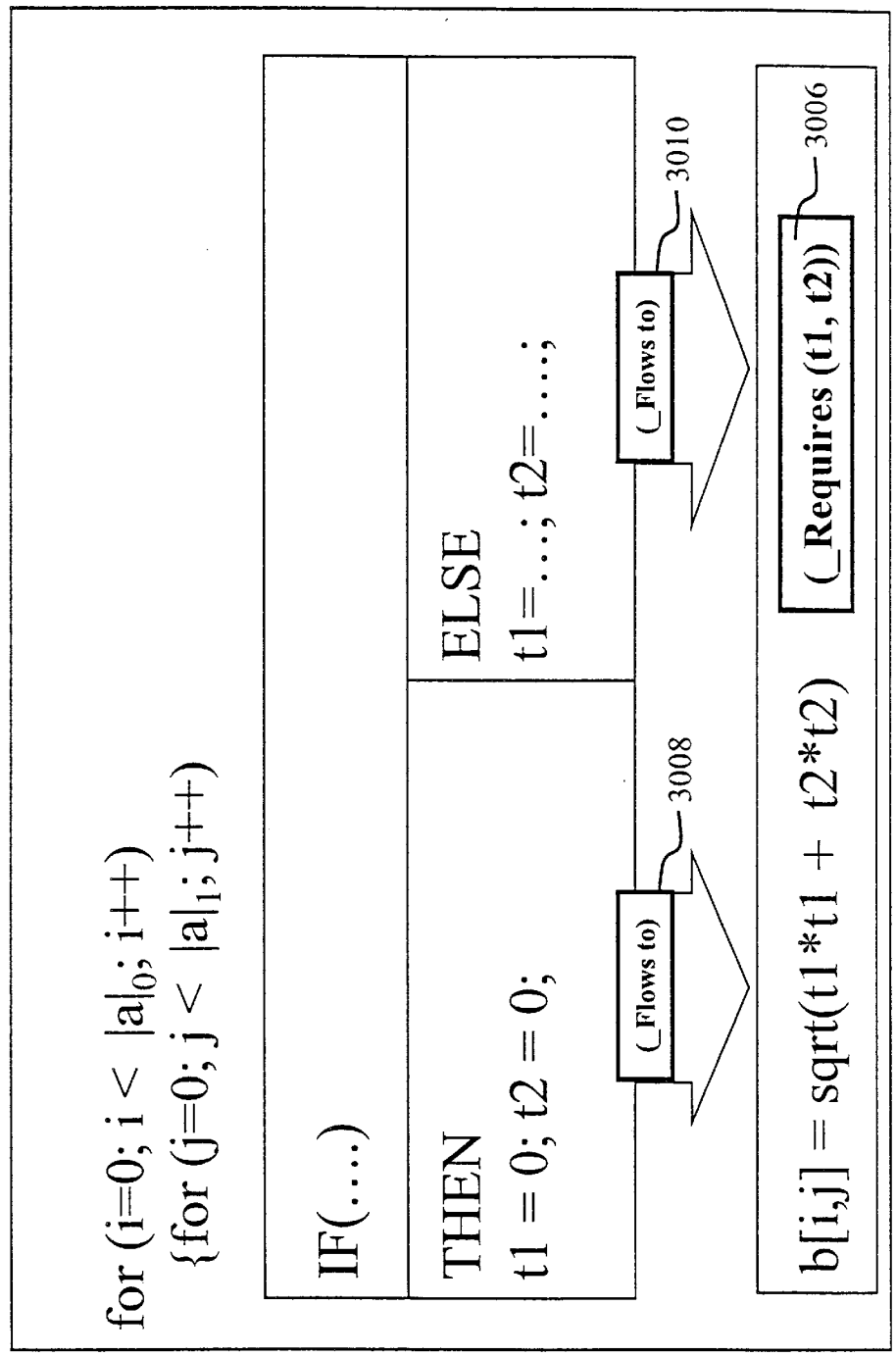
FIG. 31B shows data flows required for the optimizations identified by selected tags.

FIG. 31B shows a data flow pattern that is encoded into the enabling conditions of the SCHEDFOLDFLOWS transformation of tags 3008 and 3010 in the context of the example. An aspect of this enabling condition pattern is that all sources of the data flowing to the "sqrt(t1*t1+t2*t2)" expression (in this case T1 and T2) occur together at every source so that the transformation can copy "sqrt(t1*t1+t2*t2)" back to each source point with assurance that it has not changed the computation. Further, for some of the data flow sources, the right hand sides of T1 or T2 have been simplified to constants (in this example, zeros) or else there is no opportunity for constant folding. For the example under consideration, the expression "sqrt(t1*t1+t2*t2)" will be deleted from its current position and copies of it will be appended to the then and else legs of the if . . . then . . . else expression. The zero values for T1 and T2 will be folded into the "sqrt(t1*t1+t2*t2)" expression, which will then be simplified to zero. Execution of the of the movement of the "sqrt(t1*t1+t2*t2)" expression and the constant folding within the SCHEDFOLDFLOWS transformation of tags 3008 and 3010 reduces the merged expression of FIG. 30 to:

{{if((i==0)||(j==0)||(i==(m−1))||(j==(n−1))) then {b[i,j]= sqrt(0*0+0*0);}
 else {t1={Σp,q(p∈[−1:1])(q∈[−1:1]): . . . }
  t2={Σp,q(p∈[−1:1])(q∈[−1:1]): . . . }
  b[i,j]=sqrt(t1*t1+t2*t2);}}}

(with the loop bodies elided on the then and else legs to save space and emphasize the changed portions of the example). Then the final simplification of the "sqrt(0*0+0*0)" expression simplifies this to:

{{if((i==0)||(j==0)||(i==(m−1))||(j==(n−1))) then {b[i,j]= 0;}
 else {t1={Σp,q(p∈[−1:1])(q∈[−1:1]): . . . }
  t2={Σp,q(p∈[−1:1])(q∈[−1:1]): . . . }
  b[i,j]=sqrt(t1*t1+t2*t2);}}}.

Figure 32:
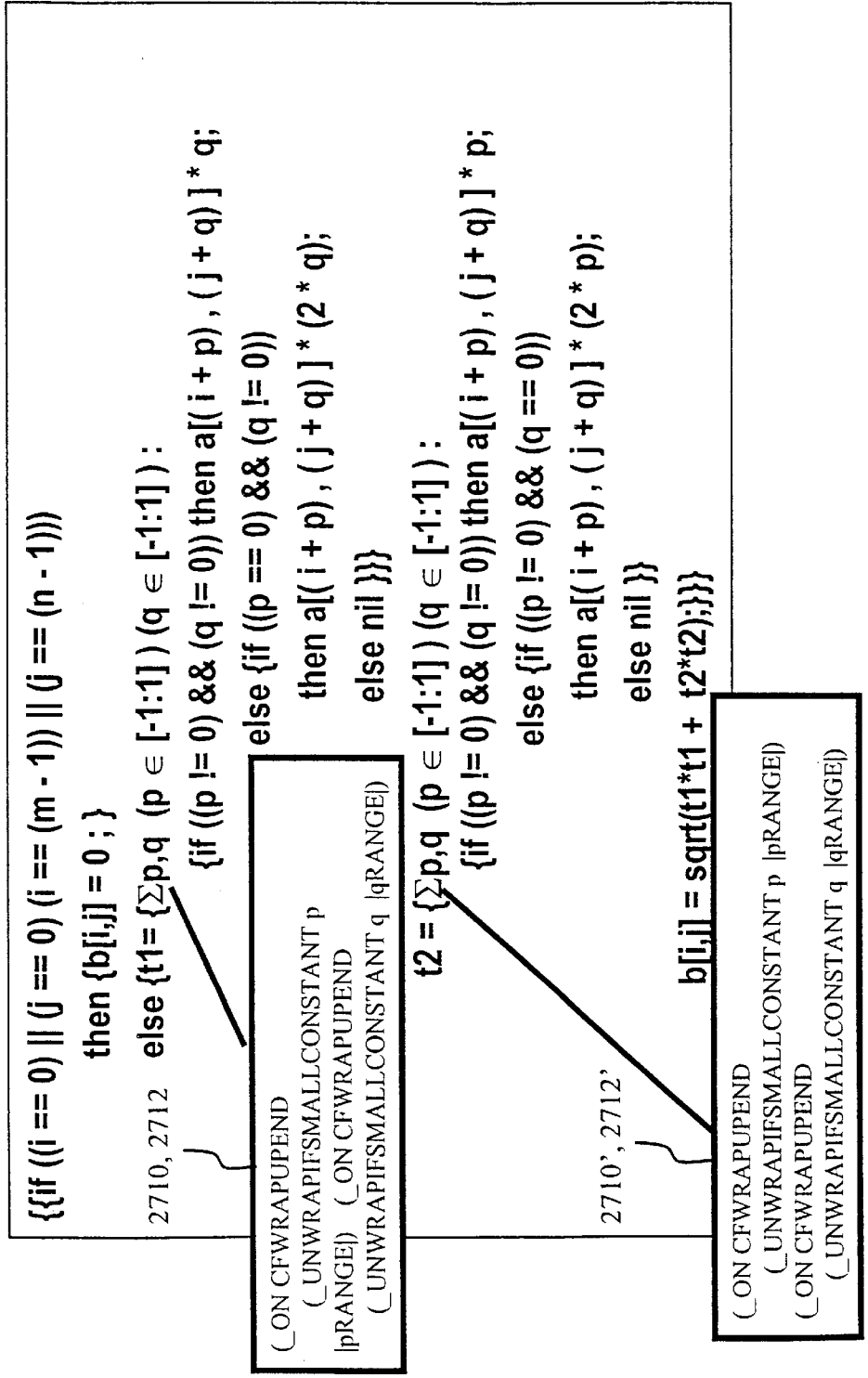
FIG. 32 illustrates finalizing optimization tags in a cross operator composite folded expression.

The optimizations identified by tags 2710 and 2712 labeled:

(_ON                    CFWRAPUPEND
(_UNWRAPIFSMALLCONSTANT p |pRANGE|),
(_ON                    CFWRAPUPEND
(_UNWRAPIFSMALLCONSTANT q |qRANGE|), will have been simplified during the earlier substitution process. Specifically, the values for the ranges of p and q were supplied by the definitions of s and s', with each one having the value [−1:1]. This changed the expression |pRange| into the expression |1−(−1)| which simplified to "2". The _UNWRAPIFSMALLCONSTANT will check this value as part of its enabling conditions against some programmer-defined value of "small" because the transformation wants to avoid unwrapping loops that might create hundreds or greater numbers of terms in the unwrapped version, making a rather poor optimization. Presumably, "2" meets the test and thus allows the transform to unwrap first the loop of p and then the loop of q. In this illustration, each of the finalizing optimizations is performed successfully. It will be appreciated, however, that more or fewer finalizing optimizations might be attempted and that the expected optimizations might not be feasible or possible in all applications. For example, if |pRange| or |qRange| were not constants or if constants, were not "small", either or both of these transformations would fail to execute. The sequence in which the tags of non-event-driven optimizations would be performed would be based upon a predetermined sequencing or hierarchy of the tags or the order in which the tags are positioned in the code. In contrast, the order of event-driven tags is determined by the runtime sequence of relevant optimization and transformation events. Tags 2710 and 2712 are event-driven tags attached to the p,q loop in this expression and will be triggered at the end of the CFWrapUp process FIG. 32 illustrates the finalizing optimization tags 2710, 2712 and 2710', 2712' in the cross operator composite folded expression. As indicated above, tags 2710, 2712 and 2710', 2712' function to expand or unwrap a loop or iteration of the number of iterations is small. Execution of tags 2710, 2712 and 2710', 2712' for respective T1 and T2 results provides the following expression:

{for(i=0; i<m; i++)
 {for(j=0; j<n; j++)
  {{if((i==0)||(j==0)||(i==(m−1))||(j==(n−1))) then {b[i,j]=0;}
   else {t1={(a[(i+1),(j+1)]−a[(i+1),(j−1)]+(a[i,(j+1)] *2)−(a[i,(j−1)]*2)+a[(i−1),(j+1)]−a[(i−1),(j−1)])}
    t2={(a[(i+1),(j+1)]+(a[(i+1),j]*2)+a[(i+1),(j−1)]−a[(i−1),(j+1)]−(a[(i−1),j]*2)−a[(i−1),(j−1)])}
   b[i,j]=sqrt(t1*t1+t2*t2);}}}}}

This expression represents the end result of composite folding (_CF) optimization process 2602 as applied to the Sobel edge detection expression:

$$b=[(a \oplus s)^2+(a \oplus s')^2]^{1/2}$$

as represented by the loop-merged expression for(i=0; i<m; i++)
 {for(j=0; j<n; j++)
  {t1=(a[i,j]⊕s);
   t2=(a[i,j]⊕s');
  b[i,j]=sqrt(t1*t1+t2*t2);}}.

Recall however that there were two tags 2504 just after the _CF tag 2502 attached to the i,j loop. These are shown in FIG. 33 and they have the form:

(_PROMOTEABOVELOOP J (CONSTANTEXPRESSIONOF I))

(_PROMOTETOTOPOFLOOP J (CONSTANTEXPRESSIONOF J))

The transformation PROMOTEABOVELOOP will find expressions of I and constants (e.g., (i+1) or (1−1)) and if there are multiple instances of the expression, it will generate a temporary variable (e.g., ip1 or im1), create an assignment statement for each unique expression (e.g., ip1= i+1), place that assignment statement above and outside the loop of j but inside the loop of i, and replace each occurrence of the constant expression in the body of the loop of j with the temporary variable that was generated. This creates the two assignments:

$$im1 = i-1$$

$$ip1 = i+1.$$

The transformation PROMOTETOTOPOFLOOP performs a similar service for constant expressions of j except that it places the assignment statement at the top but still inside the loop of j. This transformation creates the two assignments:

$$jm1 = j-1$$

$$jp1 = j+1.$$

The final form of the code for sequential machines is shown in FIG. 34 and has the form:

```
for(i=0; i<m; i++)
{im1=i-1; ip1=i+1;
for(j=0; j<n; j++)
  {jm1=j-1; jp1=j+1;
  if(i==0||j==0||i==m-1||j==n-1) then b[i,j]=0;
  else {t1={(a[ip1,jp1]-a[ip1,jm1]+(a[i,jp1]*2)-(a[i,
      jm1]*2)+a[im1,jp1]-a[im1,jm1])};
  t2={(a[ip1,jp1]+(a[ip1,j]*2)+a[ip1,jm1]-a[im1,
      jp1]-(a[im1,j]*2)-a[im1,jm1])};
  b[i,j]=sqrt(t1*t1+t2*t2)}}}
```

By composite folding optimization process 2602, the expressions for the temporary variables t1 and t2 are an integration of the definition of the implementation of the convolution operator ⊕ with the respective definitions of the fill methods of s and s'. Both the convolution operator and the fill methods are loop-based definitions that are woven together. The resulting loops are unwrapped into a series of terms, those terms simplified via partial evaluation and eventually, the common index expressions within those terms are replaced with temporary variables whose values are computed so as to minimize re-computation of the index expressions. Similarly, the conditional test for boundary pixels (i.e., if (i==0||j==0||(i==(m-1))||(j==(n-1))) ... ) was independently defined as part of both of the fill methods of s and s', and was originally inside the body of the loops from which the expressions for t1 and t2 were formed.

This conditional test was migrated outside those loops generating specialized versions of the loop on both the then and else branches, and then they were merged into a single if ... then ... else statement. The then branch degenerated to {t1=0; t2=0;} which later allowed the statement {b[i,j]= sqrt(t1*t1+t2*t2);} to be folded into both branches further allowing the then branch to be simplified to {b[i,j]=0;}. Finally, two other tags introduced during the loop fusion phase complete the optimizations. To minimize re-computation of the index expressions, these tags generated and promoted the assignments for common index expressions {im1=i-1; ip1=i+1;} to just outside of the j loop and the assignments {jm1=j-1; jp1=j+1;} to the top but still inside of the j loop. Simultaneously, these tags replaced all instances of the index expressions in the loop bodies by the corresponding temporary variables.

Composite folding optimization process 2602 produces an implementation of the computation of the image b that rivals manually coded, customized loops performing the same computation by significantly changing the data flow of the code. This involves code elimination, code movement, partial evaluation, code reorganization, code simplification and inlining. In theory, this could be performed by general optimization mechanisms operating on conventional programming language representations of fill and gcon (FIG. 23). However, such general optimization mechanisms involve large search spaces and an open ended search processes. They require a large number of serendipitous choices of transformations to be made in a very specific order that is a function of the structure of the program structure being optimized. In the general case, this can be a high order search process that can run literally to geological time.

AO eliminates the open endedness of the search by anticipating the abstract optimization steps, the time of their invocation, and the expression upon which they will operate. This greatly reduces the search space. Operationally, AO accomplishes this by seeding the building block parts of the program with AO tags that will trigger specific optimizations on the appropriate expression at the appropriate time. The ability to anticipate these specific optimization steps arises from the domain specific translation knowledge that is encoded in the domain specific operators and operands. The domain specific knowledge determines the overall optimization envelope in which the transformations occur. Thus, each optimization process is highly tailored to the domain specific operators and operands that engendered it.

The description above, such as with reference to process block 2604 of composite folding process 2602, is directed primarily to an embodiment in which the programmer who develops that reusable library containing the graphics templates methods (i.e., the fill methods) and operator methods would program the tags or annotations that anticipate the optimization steps. In another embodiment, this process may be performed automatically by a computer at the time the components are registered for the reusable library. The logic for several tags or annotations is outlined below. Others would be generated by similar strategies.

If the value of the shared variable has a conditional value (e.g., (if (fi==0||fj==0||fi==(fm-1)||j==(fn-1)) (then . . . ) (else . . . )), and all of the variables in the condition are not dependent on the quantification variables of a loop in which it is embedded (e.g., fp and fq), then attach the tags: PromoteConditionAboveLoop ( . . . list of quantifier variables of the embedded loops . . . ) and _MERGECOMMONCONDITION to the conditional operator and make them conditional on the events SUBSTITUTIONOFME and CFWRAPUP respectively.

If literal zeros are embedded in the code of a component to be reused (including values embedded in conditional value expressions), then attach an event-driven tag containing the _FOLD0 transformation to the zero and make _FOLD0 conditional on the event SUBSTITUTIONOFME. Similarly, for constants other than zero, attach the appropriate annotation, _FOLD1 or _FOLDCONSTANT, similarly conditioned on the SUBSTITUTIONOFME optimization event.

If the value of a variable in the purpose list is UNDEFINED (including values embedded in conditional value expressions), then attach the conditional version _REMOVEUNDEFINED and make it conditional on the event SUBSTITUTIONOFME.

If the definition of an operator will generate a loop (e.g., the convolution operator), add an (_ON CFWRAPEND (_UNWRAPIFSMALLCONSTANT <loopvariablename> <expressiontocomputesizeofrange>)) for each loop variable. In loops where the upper and lower range values are not constants known at generation time, this transform will fail because its enabling conditions cannot be true. Similarly, it will fail for loops whose upper and lower range values are constants that are, known at generation time but exceed the "small" threshhold. In these two cases, the loops will not be unwrapped. Only in cases like the convolution neighborhood loop will the right conditions be present for this tag to succeed.

As described hereinabove, the tags that incorporate the optimization plan are attached to individual elements of the domain specific program (e.g., attached to operators and operands, including data constants). It will be appreciated, however, that tags may be associated with elements of a domain specific program in other ways as well.

In a separate data structure design, the tags could be stored in a separate data structure and referenced in the domain specific program with an explicit label name (e.g., g31) or via a piece of code that would navigate to the item from the root of the expression tree. As a result, a program expression with an incorporated tag as described above of the following format:

. . . if(mumble)then(0(tags(_on substitutionofme(_fold0)))) . . .

would instead be of the following format:

. . . if(mumble)then(label g31: 0) . . .

in which the exemplary label g31 points to a separate list or array or other data structure of tags such as ( . . .
(g31(tags(_on substitutionofme(*13* fold0)))
(g32(tags . . . ))
(g33(tags . . . ))
. . . ).

In an interrupt/exception-based design, the items with tags could be stored in a protected address space so that reads and writes would generate exception processing (e.g., interrupts, address checks, bounds checks, or other). This could be hardware based or even software based exception processing. A read of the item (e.g., the 0 in the "then" clause above) would cause an exception. The exception processing code would retrieve the tags from wherever they are stored, put them into a standard location that the transform could access and change, and set a flag that the transform could check to see if there, are tags on the item just retrieved. When the item, was rewritten to storage, another exception would be triggered which would take the modified tags from the standard location and re-store them in the protected address space.

In a proxy-based design, all items in the domain specific expression could be represented by proxies (e.g., Lisp symbols or CLOS (composite Lisp object system) instances) and the tags stored in the storage structure associated with that proxy (e.g., the Lisp symbol property list or the CLOS instance variables). In one implementation, the leaves of the AST in the design described above having tags are CLOS objects in which the tags are stored as the value of one of the object's instance variables. (For non-leaf items in this implementation, the tags are just appended to the list that is the non-leaf item.)

In a navigation-based design, each item in the domain specific expression tree is uniquely defined by a navigation path from the root of the tree. For example, with reference to the exemplary structure:

(*(+*ab*)7)

if the variable root points to the top of the tree, then b's position is "(car(cdr(cdr(car(cdr root))))" where car is the function that gets to a sublist within a list and cdr is the function that moves horizontally to the next item in the list. Then the navigation path to b can be expressed as a function, which in Lisp may be represented as (defun gettoB(rt)(car (cdr(cdr(car(cdr rt)))))). Such functions are easy to dynamically create in Lisp (on-the-fly) so even though data structures may be constantly changing a new navigation path for an item that has moved relative to the root of the trees is easily created. For example, if the tags are kept in a parallel structure such as ( . . . *tags . . .
   ( . . . +tags . . . (tags of a . . . )(tags(_on substitutionofme
      (_dooBeeDooBeeDoo))))
   . . . tagsfor7 . . . ), which is bound to a Lisp variable ts, calling gettoB on the root (i.e., (gettoB root)) will return the value of "b," and calling gettoB on ts (i.e., (gettoB ts)) will return "(tags(_on substitutionofme(_dooBeeDooBeeDoo))). Thus, this is another mechanism that will achieve the association between items and their tags.

Contracts

Contracts express the rules under which reusable components and the transformations of the AO generator are built. The contracts assure the various properties needed for the AO generator to work correctly and efficiently.

Contracts, which may or may not be explicitly stated, capture the assumptions that express the dependencies among and that are built into: 1) the designs of the domain specific composites (e.g., S) and their methods (e.g., fill); 2) the methods of the domain specific operators that can be used to compose those composites into expressions (e.g., ⊕); and 3) the transformations that effect the compilation of domain specific expressions (e.g., _CF). The objective of contracts is to make composite folding simple, canonical, and easily open to automation. While they may sometimes impose some inconvenience on the component writer (i.e., the programmer or developer who creates the reusable component analogous to S), contracts simplify the automated integration provided by composite folding.

Contracts have two parts. One part is general and applies to all contracts. The other part is specific to some given class of composites and the operators that can apply to them. Methods of composites and the related implementations of domain specific operators that compose the composites are defined to obey the following five general rules or properties: the confinement property, the confined referential transparency property, the common canonical quantification property, problem specific notational extensions, and single assignment property. For purposes of illustration, these rules or properties are described with reference to the operators and operands shown in and described with reference to FIGS. 23 and 24.

For the confinement property, the relationships allowed between domain specific operator and operand definitions are canonically confined by an a priori, common contractual understanding. This property basically says that shared entities should look the same (e.g., in terms of form and format) to all of the sharers. For example, the global instance data (e.g., the S record and its row.conv, col.conv, and w.conv convolution matrices) shared by the composite's methods (e.g., fill) and the operator's implementation (e.g., gcon) is the only global data that the method may alter via assignments (i.e., by assigning values to elements of the shared data). This property simplifies the symbolic execution algorithm needed to compute the symbolic forms of the global instance data values. The remaining properties express the details of this confinement.

The term referential transparency conventionally is used to describe the property of a computing language and conventionally means that different expressions that compute the same result in that language can be substituted interchangeably for each other in a program without changing the results computed by the program. The term confined referential transparency is defined herein to mean that this property holds only for the specific expressions and subexpressions within one or more confined segments of code. The confined referential transparency property implies that the value expressions of any assignments to the global instance data (i.e., the right hand sides of the assignments) must be expressed as first class expressions (i.e., functional expressions that are side effect free) and these value expressions may depend only on the method's parameters, on global data that is constant with respect to operations of the composite methods and to the domain specific operators that may operate on that composite, and on quantification variables local to the method in which the assignment occurs. With regard to the following expression, for example:

{Σp,q(p∈pRange.s)(q∈qRange.s):
  {a[row.s(i,j,m,n,p,q),col.s(i,j,m,n,p,q)]*w.s(i,j,m,n,p,q)
  }} the definitions of row.s, col.s, and w.s can be simultaneously substituted within this expression without altering the results that it computes. Therefore, the expressions of row.s, col.s, and w.s cannot contain any code that produces side effects because such side effects (e.g., row.s altering a global variable used in the computation of w.s) could alter the value computed by the expression. The referential transparency property, in this case, is confined to this expression and all of the definitions that it requires. This property allows the symbolic expressions that are equal (in the sense that they will compute equal values even though they may be specified in different symbolic forms) to be used interchangeably (i.e., referential transparency with respect to these expressions). In the case of the specific RCW→ODVBV contract described below, this property allows the value expressions for the shared variables to be substituted for those shared variables in computations without altering the results of those computations. The referential transparency property is confined to specific expressions defined by the RCW→ODVBV contract.

The canonical quantification property simply says that quantifiers for data shared among a number of components (e.g., the conv temporary storage shared by fill and gcon) should be expressed in the same format by all of the components that reference the shared data. For the common canonical quantification property, the form of the extended or quantified computations on the shared data in both the composite's methods and the domain specific operator's implementation have an agreed upon canonical form that is common to both. For example, if the extended or quantified computations take the form of one or more loops, the loop prefixes must be canonically coordinated (e.g., they may be isomorphic as with fill and gcon or structurally different, but in a contractually known way). Or, if the extended computation form is recursive in one loop, the extended computation form is similarly recursive in the other loop. And, if the extended computation is an enumerated list of computational steps in one loop, the extended computation has a similar form in the other loop. This property allows value expressions to be easily relocated from the composite's method and melded into to the operator's implementation by simple symbol manipulation-based and substitution-based techniques that require no deep inference on the semantics of the value expressions.

For the problem specific notational extensions, the notation in which the operator implementations and the composite methods are expressed shall be suitably extended such that specialized forms exist to express all relevant relationships among parameters, global variables, and local variables. The semantics of these forms are known by and built into the transformations of the AO system. For example, the notational extension used in the example {Σp,q(p∈pRange.s)(q∈qRange.s): ... } expresses the relationship among the local iteration variables p and q and their iteration limits which will be defined by s through its methods pRange and qRange. This property allows shallow inferences to be done without general formalisms (e.g., predicate calculus formulas) and without theorem proving machinery. All inferences (e.g., inferring the relationship between s and the iterators used to iterate through it) are simple symbol manipulation-based and substitution-based techniques.

For the single assignment property, the assignment of values to the shared variables must be accomplished by a single assignment. There cannot be a chain of assignments that finally result in setting the value of the shared variables.

There may be many different kinds of specific contracts each of which is characterized by the original data flows vis-a-vis the resulting data flows. The contract for the example of FIGS. 23 and 24, RCW→OCVBV, requires the following two conditions to hold. First, the starting and ending data flows are defined by FIGS. 23 and 24. Second, the data flows to and from each element of conv are ParallelIndependent data flows. This means that each entry in conv does not depend on any of the other elements of conv and therefore can be computed and used independently of all of the other elements.

These are general preconditions for the RCW→OCVBV transformation to reorder the computation without altering the results of the computation. The operator group that contains the definition for gcon, which is the implementation form for the domain specific expression (pixel ⊕ IATemplate), belongs to a group of functions sharing some properties. In particular, they all adhere to the RCW→OCVBV contract.

As one example, the contract between FILL.S and gcon assures that the necessary pre-conditions for the transformation will be true (i.e., the data flows among the blocks are accommodating) or, if not absolutely guaranteed by the contract, they will be checked by the specific transformations before the transformations make any changes to the code. So (PROMOTECONDITIONABOVELOOP FP FQ) does not have to check the pre-conditions beyond those that assure that it is at the level of the loop body.

As another example, the __REMOVEUNDEFINED transformation or tag 2706 detects conditional values with an UNDEFINED value on some leg and recursively moves the conditions from the expression by recursively incorporating the context expression that contains the if . . . then . . . else . . . with the UNDEFINED value into both legs of the if . . . then . . . else . . . This is guaranteed to work because the contract controlling the form of both functions and any function in which it is embedded requires that no such expression in which the value is embedded can perform any computations that alters the values of any of the variable in the substituted expression. Eventually, the leg containing the UNDEFINED value is transformed into a null statement, which will be eliminated if loop unwrapping occurs later.

As yet another example, tags 2710 and 2712 are attached to two index variable loops and will be triggered at the end of the CFWrapUp process. These transforms will cause the two loops to be unwrapped if the loop variables are small constants per some user defined definition of "small constant". This is guaranteed to work because of the contract controlling the form of both functions and any function in which it is embedded requires that no such expression in which the value is embedded can perform any computations that alters the values of any of the variable in the substituted expression.

Composite Folding in Parallel Processing Hardware

The composite folding optimization illustrated with reference to FIGS. 25–32 computations design for a single conventional cpu or sequential computer. It will be appreciated, however, that that some optimizations for such a sequential computer or machine would not be appropriate for a parallel or vector processing computer. For example, a vector processing computer, or vector processing operations within a computer, would commonly include vector-based computations that could be applicable to an expression such as the exemplary Sobel edge detection expression. One type of parallel processing functionality is referred to as MMX, which is sometimes considered to refer to multimedia extensions that are available to later-generation x86 format microprocessors. The following description is directed by way of example to such multimedia extensions, but is similarly applicable to parallel processing functionality of other types or other processor formats.

FIG. 35 illustrates exemplary parallel processing optimization planning or composite folding tags 3502 and 3504 that are incorporated into the loop-merged AST of FIG. 21D for parallel or vector processing. The additional _MMX token in the call to _CF (composite folding) arises from the user simply adding that token to the equation for Sobel edge detection. The composite folding tags 3502 initiate composite folding of the definitions of a, s, and t, and the associated optimizations. In one embodiment, the composite folding tags 3502 apply to three optimization phases: local optimization, cross-operator code sharing (e.g., triggered by a tag CFWRAPUP), and closing optimization (e.g., triggered by a tag CFWRAPUPEND). The Promote tags 3504, such as _PromoteAboveLoop and _PromoteToTopOfLoop referenced above, will remove and promote common index subexpressions. Tags 3502 and 3504 differ from respective tags 2502 and 2504 by including vector processing (e.g. MMX-type) extensions _MMX that could be applied, for example, by a developer preparing the code for compilation.

Figure 36:
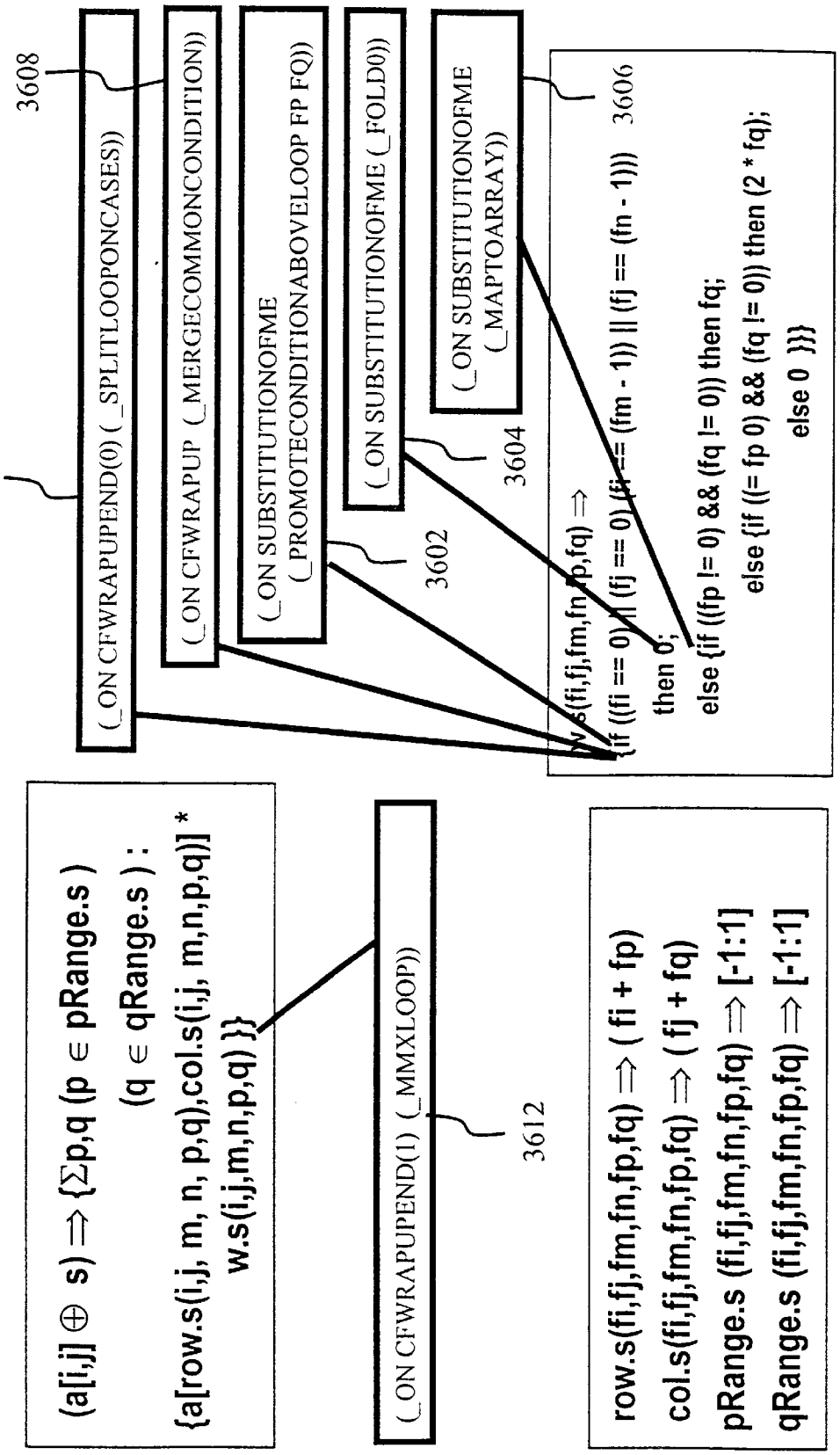
FIG. 36 illustrates on an inlined method exemplary tags for vector processing implementation.

FIG. 36 illustrates exemplary tags 3602–3612 on the inlined w method of the s template. Tags 3602–3606 are based upon tags prepositioned within the expression of FIG. 35 according to process step 2604 and are respectively labeled:

(_ON SUBSTITUTIONOFME (_PROMOTECONDITION-ABOVELOOP FP FQ))

(_ON SUBSTITUTIONOFME (_FOLD0))

(_ON SUBSTITUTIONOFME (MAPTOARRAY)), and are triggered by unscheduled or irregular optimization events and are therefore analogous to optimization interrupts that are executed when a transformation performs a substitution of a tagged subtree. Tags 3602 and 3604 are the same as tags 2702 and 2704 shown in FIG. 27 and used for optimization for a sequential processing system. Tag 3602 seeks to avoid performing a special case check for every pixel in a neighborhood whenever a single check is all that is required within the neighborhood. Tag 3604 seeks to simplify expressions that contain zero to allow other optimizations to be performed.

This parallel or vector processor optimization does not include tag 2706, which seeks to incorporate its expression context into the decision structure to deal with undefined values. Instead, tag 3606 seeks to incorporate the tagged expressions or variables into an array (e.g., an integer array), which is a prerequisite for fully exploiting the vector processing instructions in the MMX instruction set. Since undefined values cause the generation of conditional logic to deal with those cases and since conditional logic interferes with vector processing instructions, the undefined value from the previous example has been replaced with zero. The definition is computationally equivalent and allows the generator to fully exploit the vector processing instructions.

Tag 3608 is labeled:

(_ON CFWRAPUP (_MERGECOMMONCONDITION)), and is executed when the composite folding attempts cross-operator optimizations and seeks to avoid checking special cases more than once per pixel neighborhood. Tag 3608 is the same as tag 2708. Tags 3610 and 3612 are respectively labeled:

(_ON CFWRAPUPEND(0)(_SPLITLOOPONCASES), (_ON CFWRAPUPEND(1)(_MMXLOOP), and are executed as the composite folding is completed to obtain any remaining performance optimization. Tag 3610 seeks to split a general loop into special case loops for enhanced performance by avoiding special case logic that would interfere with the vector processing. Tag 3612 seeks too convert a loop into a parallel processor (e.g., MMX friendly) format. The indications of (0) and (1) for respective tags 3610 and 3612 indicate their order of execution. Tags 3610 and 3612 differ from tags 2710 and 2712 that seek for sequential processing to eliminate loop overhead and any other overhead (e.g., conditional tests) by expressing the summation as a list of terms.

The differences between tags 3602–3612 and tags 2702–2712 illustrate how different tags are applied for respective parallel and sequential processor operations. It will be appreciated that different tags could also be used for different hardware architectures, processes, or expressions within a computational domain (e.g., the graphics imaging domain illustrated herein) or for the hardware architectures, processes, or expressions in different domains. For example, display accelerator boards often move part of a display computation into hardware thereby enhancing its performance. To exploit such hardware acceleration, the AO planning transformations would choose a different set of tags thereby causing the final computation to be organized into a form that exploits the hardware acceleration. Other problem domains would engender different but similarly rewarding examples of domain specific reorganizations to exploit existing software or hardware.

The optimizations identified by tags 3602–3606 are attempted successively according to steps 2608 and 2610 of composite folding process 2602. In this illustration, the optimization identified by each of the tags is performed successfully. It will be appreciated, however, that the expected optimizations might not be feasible or possible in all applications. The sequence in which some of the tags 3602–3606 are performed is based upon the occurrence of unscheduled events or conditions (e.g., the "ONSUBSTITUTIONOFME" event) and some of the tags are performed based upon scheduled events (e.g., the "CFWRAPUP" or "CFWRAPUPEND" events Tags 3602, 3604, and 3608 are the same as respective tags 2702, 2704, and 2708 the operation of which is illustrated hereinabove, and the description of that operation is not repeated here. FIG. 37 shows the result of the operation of tags 3602, 3604, 3608, 3008, and 3010 including the position of tags 3606 after these operations are complete. The result shown in FIG. 37 is obtained for b[i,j] by executing the following tags on the expression of FIG. 28: (_FOLD0) tag 3604, (_MERGECOMMONCONDITION) tag 3608, and (_SCHEDULEFOLDFLOWS) tags 3008 and 3010. FIG. 38 shows the result of initial operation of the (MAPTOARRAY) tag 3606, which in this example incorporates the tagged expressions or variables into integer arrays s and s'. Another aspect of the initial operation of the (MAPTOARRAY) tag 3606 shown in FIG. 38 is the incorporation of (_UNWRAP) tags 3802 into the resulting expression. In one embodiment, tags 3802 are incorporated automatically by operation of tag 3606 to unwrap or expand the resulting arrays if, for example, they are relatively small and have values that can be computed at generation time. Continued operation of tag 3606 and tags 3802 provides the intermediate result $\{\forall i,j(i\in[0:(m-1)])(j\in[0:(n-1)])$:
  $\{int\ s[(-1:1),(-1:1)]=\{\{-1,0,1\},\{-2,0,2\},\{-1,0,1\}\}$;
  $\{int\ s'[(-1:1),(-1:1)]=\{\{-1,-2,-1\},\{0,0,0\},\{-1,-2,-1\}\}$;
  $\{if((i==0)\|(j==0)\|(i==(m-1))(n-1)))$ then $\{b[i,j]=0;\}$
  else $\{t1=\Sigma p,q(p\in[-1:1])(q\in[-1:1])$: $a[(i+p),(j+q)]*s[p,q]\}$
    $t2=\{\Sigma p,q(p\in[-1:1])(q\in[-1:1])$: $a[(i+p),(j+q)]*s'[p,q]\}$
    $b[i,j]=sqrt(t1*t1+t2*t2);\}\}\}$ and as the final step of 3802, the arrays are moved outside of the i,j loop resulting in the expression:

$\{int\ s[(-1:1),(-1:1)]=\{\{-1,0,1\},\{-2,0,2\},\{-1,0,1\}\}$;
$\{int\ s'[(-1:1),(-1:1)]=\{\{-1,-2,-1\},\{0,0,0\},\{-1,-2,-1\}\}$;
$\{\forall i,j(i\in[0:(m-1)])(j\in[0:(n-1)])$:
  $\{if((i==0)\|(j==0)\|(i==(m-1))\|(j==(n-1)))$
  then $\{b[i,j]=0;\}$
  else $\{t1=\{\Sigma p,q(p\in[-1:1])(q\in[-1:1])$: $a[(i+p),(j+q)]*s[p,q]\}$
    $t2=\{\Sigma p,q(p\in[-1:1])(q\in[-1:1])$: $a[(i+p),(j+q)]*s'[p,q]\}$
    $b[i,j]=sqrt(t1*t1+t2*t2);\}\}\}$ FIG. 39 shows the result of the optimizations identified by tags 3606 and 3802. FIG. 39 also shows the resulting position of the (_SPLITLOOPONCASES) tag 3610, whose execution is attempted according to composite folding finalizing steps 2616 and 2618 of composite folding process 2602. In this illustration, tag 3610 identifies, within a loop, special case conditions that in accordance with tag 3610 are attempted to be split into separate loops.

Figure 40:
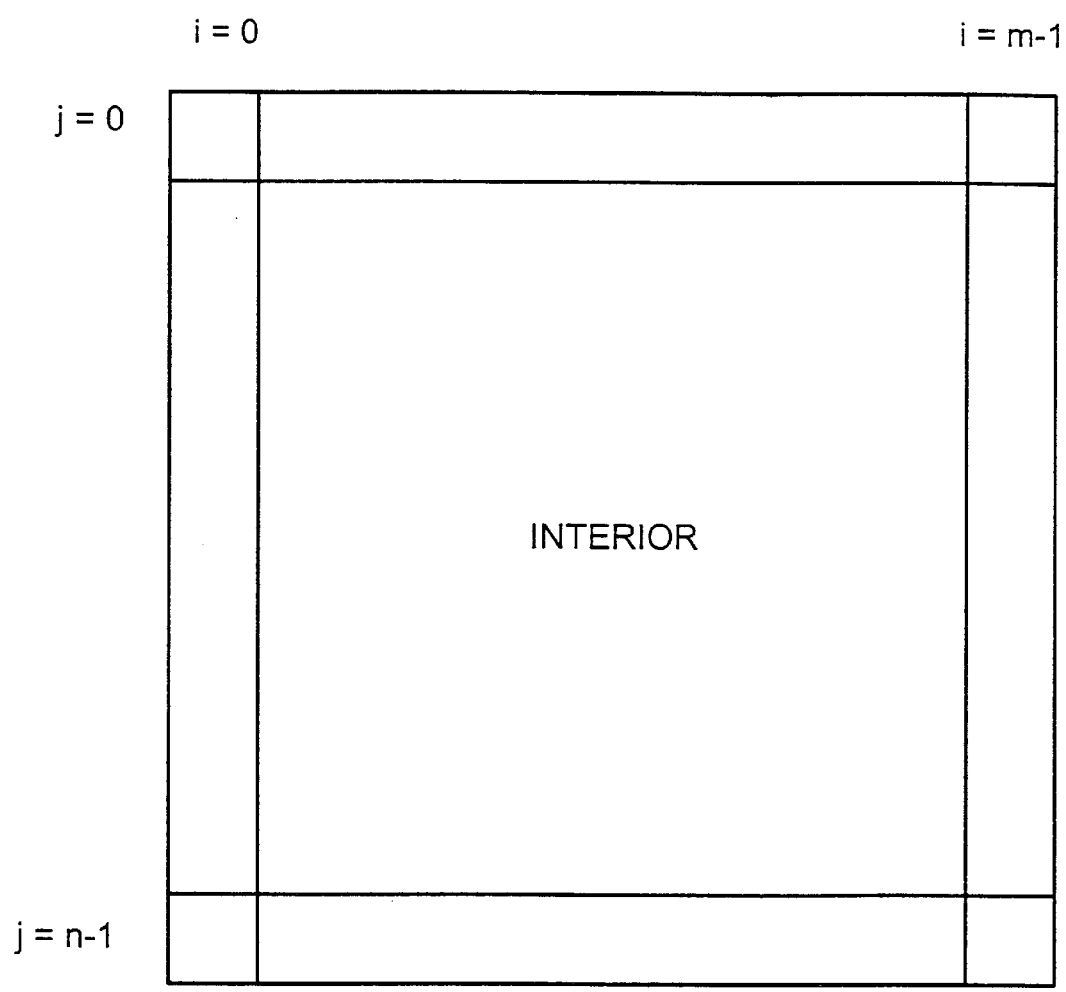
FIG. 40 shows the special case conditions with regard to Sobel edge detection.

FIG. 40 shows the special case conditions with regard to the Sobel edge detection example of this illustration. In this illustration, the i=0 and (i=m−1) conditions refer to pixel columns at the vertical edges or boundaries of an image to which the edge detection process is applied, and the j=0 and (i=n−1) conditions refer to pixel rows at the horizontal edges or boundaries of the image. The remaining condition refers to the pixels that are not along an edge of the image (i.e., are the interior of the image) and so are not subject to the special conditions for pixels along the edge of the image. As a result of the four special conditions for the edges of the image and the general condition for the interior pixels, operation of tag 3610 initially splits the loop illustrated in FIG. 39 into five separate loops that are represented as follows:

$\{int\ s[(-1:1),(-1:1)]=\{\{-1,0,1\},\{-2,0,2\},\{-1,0,1\}\}$;
$\{int\ s'[(-1:1),(-1:1)]=\{\{-1,-2,-1\},\{0,0,0\},\{-1,-2,-1\}\}$;
$\{\forall i,j(i\in[0:(m-1)])(j\in[0:(n-1)])(i==0)$: $b[i,j]=0\}$
$\{\forall i,j(i\in[0:(m-1)])(j\in[0:(n-1)])(j==0)$: $b[i,j]=0\}$
$\{\forall i,j(i\in[0:(m-1)])(j\in[0:(n-1)])(i==(m-1))$: $b[i,j]=0\}$
$\{\forall i,j(i\in[0:(m-1)])(j\in[0:(n-1)])(j==(n-1)$: $b[i,j]=0\}$
$\{\forall i,j(i\in[0:(m-1)])(j\in[0:(n-1)])(i\ !=0)(j\ !=0)(i\ !=(m-1))(j\ !=(n-1)))$:
  $\{t1=\{\Sigma p,q(p\in[-1:1])(q\in[-1:1])$: $a[(i+p),(j+q)]*s[p,q]\}$
  $t2=\{\Sigma p,q(p\in[-1:1])(q\in[-1:1])$: $a[(i+p),(j+q)]*s'[p,q]\}$
  $b[i,j]=sqrt(t1*t1+t2*t2);\}\}$ In this embodiment, we are using a mathematical shorthand, which may benefit from some notational explanation. All of the expressions between the quantifiers (i.e., $\forall i,j$) and the colon are conjunctive predicates meaning that there is an implied "AND" relationship among them. In other words, "$\{\forall i,j(i\in[0:(m-1)])(j\in[0:(n-1)])(i==0)$: $b[i,j]=0\}$" expresses the idea that "for all i and j", where i is a member ($\in$) of the range [0:(m−1)] AND j is a member ($\in$) of the range [0:(n−1)] AND i equals 0, then the statement "b[i,j]=0" is executed.

In this embodiment, operation of tag 3610 further includes application of loop inference rules that allow split loops to be manipulated into a form that is the prescriptive form that is closer to the form required by the conventional compilers. Eventually, conventional compilers will be used to reduce the generated code to executable form. Exemplary loop inference rules provide additional optimizations that include a fixed index optimization, a clip low end of range optimization, a clip high end of range optimization, a split range optimization, and a range splitting range optimization. The loop inference rules provide loops of a form better suited to vector or parallel processing and may be represented as:

Fixed Index: ($\forall$(?i, ... othervbls ... )(?i∈[?Low:?High]) (?i==?c) ... otherterms ... : ?expr)→($\forall$ ... othervbls ...... otherterms ... : ?expr) {?c/?i})

Clip Low End of Range: ($\forall$(?i, ... othervbls ... ) (?i∈[?Low:?High])(?i !=?Low) ... otherterms ... : ?expr)→($\forall$(?i, ... othervbls ... )(?i∈[(?Low+1): ?High]) ?otherterms: ?expr)

Clip High End of Range: ($\forall$(?i, ... othervbls ... ) (?i∈[?Low:?High])(?i !=?High) ... otherterms ... ): ?expr)→($\forall$(?i, ... othervbls ... )(?i∈[?Low:(?High−1)] ... otherterms ... ): ?expr)

Split Range: ($\forall$(?i, ... othervbls ... )(?i∈[?Low:?High]) (?i !=?c)(?c∈Range[?Low, ?High]) ... otherterms ... ): ?expr)→($\forall$(?i, ... othervbls ..)(?i ∈[?Low:(?c−1)](?i ∈[(?c+1):?High] ... otherterms ... ): ?expr).

Range Splitting Range: ($\forall$(?i, ... othervbls ... )(?i∈ [?Low, ?High])(?i∉[?c1:?c2])([?c1:?c2]∈ [?Low:?High]) ... otherterms ... )): ?expr)→($\forall$ (?i, ... othervbls ... )(?i∈[?Low:(?c11)](?i∈[(?c2+1):? High] ... otherterms ... ): ?expr)

In the fixed index optimization, an expression having one or more index variables that are fixed or constant are optimized by eliminating the fixed indices as variables. The fixed index rule is exemplary of the general structure of these rules, so examining it in more detail will help in the interpretation of the other rules. To this end, the fixed index rule looks for some loop variable (e.g., ?i) that is asserted to be equal to some ?c (e.g., (?i==?c)), where ?c is a constant. If found, the loop is modified to eliminate iteration over ?i, and ?c is substituted for ?i in the loop body. Hence, this rule turns a loop of the form {∀i,j(i∈[0(m−1)])(j∈[0:(n−1)])(i==0): b[i, j]=0} into one of the form {∀j(j∈[0:(n−1)]): b[0,j]=0}. The other rules follow a similar pattern. In the clip low end of range optimization, an expression is optimized by eliminating a part of the low end of a range of an index (i.e., by incrementing the index toward the high end of the range) when the value of the low end of the range is explicitly asserted to be not equal to the variable ?i that is within the range via the predicate (?i !=?Low). Therefore, the low end of the range (?low) can be eliminated from the range by simply re-expressing the range as [(?low+1): ?high] and the predicate (?i !=?Low) can be dropped from the specification. In the clip high end of range optimization, an expression is optimized by eliminating a part of the high end of a range of an index (i.e., by incrementing the index toward the low end of the range) when the expression at the high end of the range is explicitly excluded from the loop by a predicate expression.

In the split range optimization, an expression is optimized by splitting the range of an index at an index value, other than the high or low range limits, at which index value the expression is insignificant or undefined. The result of such a split range is two (or more) separate ranges. In the range splitting range optimization, for an expression in which a pair of index values between the high and low range limits are omitted from the range, the range splitting range optimization selects the index range between the pair of index values.

In the case of transforming the Sobel edge detection expression for an MMX architecture, the fixed index rule is used to modify each of the four special case loops and the two range clipping rules are used two times each to produce the general case loop, thus putting the general case loop into a form in which _MMXLOOP will succeed in restructuring the loop's body into an MMX friendly form. Application of these loop inference rules initially provided by the operation of tag 3210 provides an expression illustrated in FIG. 41, which also shows the resulting position of the (_MMXLOOP) tags 3612. Tags 3612 are attempted according to composite folding finalizing steps 2616 and 2618 of composite folding process 2602. Tag 3612 identifies expressions to which vector-specific processes may be applied. As indicated hereinabove, this illustration is directed by way of example to vector processes based on the x86 MMX instruction set. With regard to this exemplary vector processing instruction set, vector processing pseudo-code instructions applicable to the expression of FIG. 41 are:

PMADD$_3$((a0, a1, a2), (c0, c1, c2))=(a0*c0+a1*c1, a2*c2+0*0)

In general, PMADD$_k$ (&a, &c)≡(($\Sigma_{i=0, 1}$ c[i]*a[i]), ($\Sigma_{i=2, k}$ c[i]*a[i])) with 0 padding to 4 for k≦4 OR(($\Sigma_{i=0, 1}$ c[i]*a[i]), . . . , ($\Sigma_{i=k−1, k}$ c[i]*a[i])) with 0 padding to 8 for k≦8

PADD$_2$((x0,x1), (x2,x3))=(x0+x2, x1+x3)

PADD((x0,x1,x2,x3)), (x4,x5,x6,x7))=(x0+x4,x1+x5,x2+x6,x3+x7)

UNPACKADD((x0,x1))=(x0+x1)

The exemplary x86-based vector processing instruction set operates on vectors of 2, 4, or 8 elements. Not all multi-component elements have 2, 4, or 8 elements. For example, the expression of FIG. 41 includes three-element vectors. The PMADD pseudo-code instruction functions to conform vectors such as those in FIG. 41 to the MMX preferred form by padding or adding elements onto the nonconforming vector. In the present illustration, the PMADD instruction functions to add a fourth element (i.e., zero) to the three-element vectors of FIG. 41. The PADD pseudo-code instructions provide vector addition between a pair of designated vectors, and the UNPACKADD pseudo-code instruction provides a compacting addition within a single vector. Application of these vector processing instructions to the expression of FIG. 41 in accordance with the (_MMXLOOP) tags 3612 results in the following vector processor optimized code:

{int s[(−1:1),(−1:1)]={{−1, 0, 1}, {−2, 0, 2}, {−1, 0, 1}};
{int s'[(−1:1),(−1:1)]={{−1, −2, −1}, {0, 0, 0}, {−1, −2, −1}};
{∀j(i∈Range[0,(n−1)]): b[0,j]=0}
{∀i(i∈Range[0,(m−1)]): b[i,0]=0}
{∀j(j∈Range[0,(n−1)]): b[(m−1)]=0}
{∀i(i∈Range[0,(m−1)]: b[i,(n−1)]=0}
{∀i,j(i∈Range[1,(m−2)])(j∈Range[1,(n−2)]):
  {t1=UNPACKADD(PADD$_2$(PADD$_2$(PMADD$_3$(&(a[i−1, j−1]), &(s[−1, −1])),
    PMADD$_3$(&(a[i,j−1]), &(s[0, −1]))),
      PMADD$_3$(&(a[i+1,j−1]), &(s[1, −1]))));
    t2=UNPACKADD(PADD$_2$(PMADD$_3$(&(a[i−1,j−1]), &(s'[−1, −1])),
      PMADD$_3$(&(a[i+1,j−1]), &(s'[0, −1])))));
b[i,j]=sqrt(t1*t1+t2*t2);

Like the first example, the composite folding for a vector processing computer allows one to program in terms of DS (domain specific) operators and operands to obtain the flexibility, expressiveness, and componentry amplification that arises from being able to express complex compositions of relatively simple domain specific operators and operands. Composite folding also provides automatic melding (i.e., compiling) of those compositions of composites and their extended computations (e.g., loop-based computations) into custom, high performance code rivaling that of manually produced custom code.

To adapt an optimization for conventional sequential processing to MMX processing the optimization plan reforms the target program so that the data (e.g., the image array a and the weights of s and sp) are expressed as data vectors. This is accomplished by re-planing the optimization at the outset so that the optimization phases, including composite folding, will be dealing with components that have a different optimization plan.

For example, upon discovering the two _UNWRAPIFSMALLCONSTANT tags on the ?p and ?q loops, a MMX re-planning transformation recognizes that loop unwrapping would interfere with an advantage of the MMX architecture and replaces these tags with (_ON CFWRAPUPEND (_MMXLOOP)), which causes the loop structure to be retained so that it can be restructured in an MMX compatible way. The re-planning transformation recognizes that MMX instructions can only be exploited if the W method of s (see FIG. 27) and W method of s' can both be turned into data vectors, preferably at compilation time but alternatively at run time. Therefore, it sets about to re-label W of s and W of s'.

To accomplish this re-labeling, the re-planning transformation 1) keeps the bodies of the W methods atomic and does not let the W methods be merged into other code, 2) omits conditional tests that might interfere with vector operations, 3) creates temporary storage for the data vectors of s and sp and 4) initializes the data vectors, preferably at generation time rather than execution time. To keep the bodies of the W methods atomic, the transformation replaces the tag (_ON SUBSTITUTIONOFME (_INCOPORATECONTEXT)) with the tag (_ON SUBSTITUTIONOFME (_MAPTOARRAY)), which will prevent the integration of outside context, cause the temporary vector storage to be allocated, and generate the initial values for the vectors. The special case conditional is eliminated by splitting the i,j loop into separate loops to handle each of the different cases. Each disjunct of the condition will cause the generation of a separate loop to process one aspect of the special case (e.g., when i==0 and j$\in$[0:(n-1)]). These loops will be followed by a final loop to handle the general case (i.e., (i$\in$[1: m]) and (j$\in$[1: n])).

Operationally, this generates one loop each to plug zeros into the border elements of each of the four sides followed by a loop to process the inside elements of the image. With that, the special case test will completely disappear. The enabling conditions for this reasoning to succeed are 1) recognize that i and j are loop control variables for some loop in which W of s (and W of s') will be embedded, 2) recognize that W of s (and W of s') are not dependent on the loop control variables that iterate over the pixel neighborhood (i.e., ?p and ?q)—which is strongly suggested by the _PROMOTECONDITIONABOVELOOP tag—and 3) recognize that the disjuncts of the special case test (e.g., (i==0) or (i==(M-1))) belong to a category of predicates that modify ranges and thereby can be reasoned over by the specialized loop reasoning rules. Once the enabling conditions are determined to be acceptable, the transformation replaces the _PROMOTECONDITIONABOVELOOP tag with the tag (_ON CFWRAPUPEND (_SPLITLOOPONCASES)). When this transformation actually triggers (during _CF processing) it will form separate i,j loops for each disjunct on the then leg and a final general case loop for the else leg. Operationally, for the special case loops, _SPLITLOOPONCASES generates separate copies of the i,j loop and adds a different disjunct into the _SUCHTHAT clause, where the _SUCHTHAT clause is the expression following the $\Sigma$ or $\forall$ expressions but preceding the colon. (For example, in an expression like $\{\forall i,j (i\in[0:(m-1)])(j\in[0:(n-1)])(i==0): b[i,j]=0\}$, the _SUCHTHAT clause is "(i$\in$[0:(m-1)])(j$\in$[0:(n-1)])(i==0)" where the name "_SUCHTHAT" derives generally from mathematical convention and more particularly from the fact that in the AO implementation the "_SUCHTHAT" symbol is used as the first element in the list that contains the suchthat clause.) Finally, for the general case loop, _SPLITLOOPONCASES generates a loop copy and adds the negation of the full condition into the _SUCHTHAT clause.

A fixed index optimization (as described above) is applied for each loop to recalculate ranges to eliminate the predicates. The fixed index rule looks for a loop s variable (e.g., ?i) that is asserted to be equal to some ?c (e.g., (?i==?c)) where ?c is a constant. If this situation is found, the loop is modified to eliminate iteration over ?i, and ?c gets substituted for ?i in the body of the loop. This turns a loop like $\{\forall i,j (i\in[0:(m-1)])(j\in[0:(n-1)])(i=0): b[i,j]=0\}$ into one like $\{\forall j(j\in[0:(n-1)]): b[0,j]=0\}$. Similar rules are used to clip the ends of ranges or otherwise manipulate the loop ranges, as described above.

In the case of compiling the Sobel edge detection expression for an _MMX architecture, the fixed index rule is used to modify each of the special case loops and the rule that clips off the top or bottom of a range is used four times to produce the general case loop. This puts the general case loop into a form where the transformation _MMXOOP will succeed in restructuring the loop's body into an MMX friendly form.

This reasoning is performed over the abstraction optimization plan (i.e., the tags) before any optimizations are actually executed. This allows the reasoning logic to be applied more globally about the components of the optimization plan and their interdependencies. For example, the several separate optimization goals are subtly interdependent—e.g., preventing loop unwrapping, vectorizing W of s and W of s' (accomplished by _MAPTOARRAY), and eliminating case logic within W of s and W of s' by splitting the i,j loop on the cases, and finally, the reformulating of the body of the i,j loop into an MMX friendly form (accomplished by _MMXLOOP). Separating the reasoning about the optimization from the actual execution of the optimizations, reasoning about the individual optimizations in the abstract (i.e., using the optimization names in the tags), reasoning about the global optimization interdependencies, and including information about the program and about the domain specific elements in the course of that reasoning all serve to simplify the reasoning process.

Pseudo-Code for Composite Folding Tags

As described hereinabove, optimizations tags are expressed in abstract terms and not in terms of specific target program or control structure patterns (i.e., not in terms of specific AST patterns). The code that recognizes the specific AST patterns is encapsulated or hidden inside the definitions of the transformations and not explicitly expressed at the point of their invocation. This allows tags that anticipate a given class of optimization to be affixed to a program structure before the final form of that program structure is known. Hence, a tag invoking an optimization can be affixed when an operator or operand method is defined even though the eventual form of that definition may be melded with other definitions and significantly reorganized. This also allows a single optimization tag to handle a wide variety of specific target program and control structures or patterns (i.e., many specific cases) and thereby simplifies the case logic in the transformations.

Optimizations are expressed in abstract terms, which is a powerful mechanism because it prevents their having to be overly explicit about the details of the target program or details of the optimization that are not really relevant to the general goal of the optimization. An optimization language that forced the programmer to state the optimizations in terms of the structure of the AST would make many of the optimizations described above very difficult to accomplish. For example, (_PromoteAboveLoop J (AnyPatterns (I+?c) or (I*?c) or (I-?c) . . . )) contains a less desirable expression of the entity to be promoted than (_PromoteAboveLoop J (ConstantExpressionOfI)) because (ConstantExpressionOfI) can more easily encompass a large variety of desired patterns than the explicit notation and still retain the ability to be easily understood. Moreover, automated reasoning about the semantic concept "ConstantExpressionOf something" is relatively straightforward in the abstract notation whereas it is computationally impractical in the explicit notation because it is virtually impossible to infer the abstract concept "ConstantExpressionOf something" from the explicit patterns. Therefore, abstract reasoning about abstract concepts in the explicit notation is virtually impossible. As a consequence, the reasoning used to re-plan the tags for the MMX architecture would be computationally infeasible if the optimization tags did not express the optimizations in terms of abstract concepts.

Optimizations are invoked based on optimization events. Events may be represented as computable expressions which "happen" when their computation is true. (e.g., (MIGRATIONTOBLOCKOF VBL), which will become true when the item to which it is attached migrates into a block that contains an assignment to ?vb1 "vb1= expression"). Beyond just testing a flag or calling a function, events may be expressed explicitly in the tags as expressions that test complex logical conditions. (e.g., (_ON (OR CFWRAPUP SUBSTITUTIONOFME) (_DOSOMETRANSFORM)) would invoke _DoSomeTransform if either the CFWrapUp event occurred or the SubstitutionOfMe event occurred.)

Events may be statically scheduled and ordered. (e.g., CFWRAPUP event precedes CFWRAPUPEND event), or may be unscheduled and occur at unpredictable times. This allows an optimization plan to adapt to the specific program structures that it is dealing with. The scheduled events define the broad outline of the optimization process that is known independently of the structure of the expression being optimized. Unscheduled events provide for opportunistic transformations to occur that often act to simplify the target code and thereby enable further optimizing transforms that might be stymied without such simplification. For example, the _FOLD0 transform enabled the _SCHEDULEFLOWFLOWS, without which the then branch of the target code would be destined to perform many useless computations for the boundary conditions (i.e., computing "(sqrt(0*0+0*0))" for every border pixel).

Optimization events provide a rich array of computational structures that can give rise to complex and powerful optimization behaviors. For example, events may be parameterized with integers to define finer ordering gradations within an event (e.g., CFWRAPUP(1) would precede CFWRAPUP(2) which would precede CFWRAPUP(3) etc.). Event-driven optimization tags may express conditional branchings in the overall optimization process. (e.g., ((_ON CFWRAPUP . . . ) (_ON (NOT CFWRAPUP) . . . )). Event-driven optimization tags may be created automatically by analysis of components. This spares the reusable library component programmer some work. Any number of different events may be defined by the programmer.

Each optimization tag functions as a call to an optimization transformation routine that is deferred until later in the processing, e.g., until a particular event time or a particular code generation phase. Some optimization tags are created by the programmer of a reusable component in anticipation of the kinds of optimizations that are likely to be applicable for that code. These are a prior or pre-positioned tags and they are static. Other optimization tags are created dynamically by transformations during the optimization process. Such optimization tags may be created automatically (i.e., by computer), in a domino effect whereby the completion of one transformation removes the instance of itself and attaches one or more new transforms that perform finer, grained, or preparatory transformations or transformations that must occur later in the overall optimization process. For example, the transformation (_PROMOTECONDITIONABOVELOOP will first invoke the preparatory transformation (_PROMOTECONDITIONABOVEEXPRESSION) in the course of setting up its own preconditions to assure successful execution. An example of a cascade of transformations, each one triggered by the previous transformation, is the series MERGECOMMONCONDITION and _SCHEDFOLDFLOWS described hereinabove.

If transformations introduce dependency information, it is their responsibility to insert tags that encode those dependencies and retain any high level domain specific knowledge that can be used by later transformations operating on lower level constructs. For example, the transformation of the power function into a series of statements containing assignments to temporary variables (e.g., T1 and T2) introduced data flow dependencies that were encoded as tags in the generated code. In addition, that transformation anticipated the opportunity for constant folding in the later, reorganized form of the program, and inserted event-driven tags to detect and schedule such constant folding (e.g., (_ON (MigrationIntoBlockOf 'T2) (_SCHEDFOLDFLOWS))).

Optimization meta-rules (i.e., meta-transformations) may operate on and transform the optimization tags themselves, which at a later stage operate upon the target program itself. This alternates optimization planning and program generation where each generation step anticipates incremental opportunities for optimization. Such meta-rules reason abstractly and globally about the optimization plan as a whole (i.e., the set of all optimization tags as a whole). For example, the _MMX tag caused a transformation to reason in abstract, goal oriented terms about how the final code should be structured. This reasoning is performed over the abstraction optimization plan (i.e., the tags) before any optimizations are actually executed. This allows the reasoning logic to reason more globally about the optimization plan tags and their interdependencies. For example, the several separate abstract MMX optimization goals are subtly interdependent—e.g., preventing loop unwrapping, vectorizing W of s and sp (accomplished by _MAPTOARRAY), and eliminating case logic within: W of s and W of sp by splitting the i,j loop on the cases, which then allows the reformulation of the body of the general case i,j loop into an MMX friendly form. In such a case, reasoning is simplified by separating it from optimization execution, by treating optimizations in the abstract (i.e., using tag names), by reasoning about the global tag interdependencies, and by including program and domain knowledge in the reasoning process.

Finally, the program derivation search space is significantly reduced by the mechanisms of 1) attaching deferred transformations to the AST subtrees thereby specifying exactly what they will eventually operate on, 2) naming the specific transformation that will fire, and 3) ordering the transformations execution by the techniques of event triggering and order triggering. Thus, in contrast to other transformation-based systems, AO requires no search to pick which transformation to fire, which AST subtree that it is to operate on, or when the transformation is to fire. This is why there is effectively no search space with AO.

Tags 2702–2712 are exemplary ones of multiple optimization tags that are suitable for the graphics imaging domain. Set forth below are pseudo-code representations of tags 2702–2712, as well as other tags that are suitable for local optimization in this domain. It will be appreciated that tags like these, as well as other tags, could be used to provide anticipatory optimization in other domains as well.

Definitions Required by Pseudo-Code

In addition to the pattern notation describe hereinabove, we will use a shorthand notation to describe operations involving substitution lists and a particular kind of symmetric matching called unification. Definitions of the shorthand notation is given here.

Definition: Term. A variable is a term, and a string of symbols consisting of a function symbol of degree $n \geq 0$ followed by a list of n terms is a term.

Example: The variable x is a term. The function expression f (x, y, z) is a term. Within these definitions, we will use a publication form for terms, substitutions, etc. that conforms to mathematical convention. Within the pseudo-code, function expressions like f(x, y, z) will be written according to the Lisp convention as (f x y z) with the function symbol inside the parentheses and the terms separated by blanks rather than commas.

Definition: Substitution. A substitution is a finite set of the form $\{t_1/v_1, \ldots, t_n/v_n\}$[1], where every $v_i$ is a variable, every $t_i$ is a term different from $v_i$, and no two elements in the set have the same variable after the stroke symbol. The substitution that consists of no elements is called the empty substitution and is denoted by $\in$.

[1] Conventionally, the mathematical notation $\{t_1v_1, \ldots, t_n/v_n\}$ is used to represent a substitution. However, to maintain consistency with the Lisp implementation environment, the implementation form in the pseudo-code shown later in this document uses a list of the form $((v_1 t_1) \ldots (v_n t_n))$.

Examples: $\{f(z)/x, y/z\}$ and $\{a/x, g(y)/y, f(g(b))z\}$.

Definition: Instantiation. Let $\theta = \{t_1/x_1, \ldots, t_n/x_n\}$ be a substitution and E be an expression. Then $E\theta$ is an expression obtained from E by replacing simultaneously each occurrence of the variable $v_i$, $1 \leq i \leq n$, in E by the term $t_i$. $E\theta$ is called an instance of E.

Example: Let $\theta = \{a/x, f(b)/y, c/z\}$ and $E = P(x, y, z)$. Then $E\theta = P(a, f(b), c)$.

Definition: Composition of substitutions. Let $\theta = \{t_1/x_1, \ldots, t_n/x_n\}$ and $\lambda = \{u_1/y_1, \ldots, u_n/y_n\}$ be two substitutions. Then the composition of $\theta$ and $\lambda$ is the substitution, denoted by $\theta \cdot \lambda$, that is obtained from the set $$\{t_1\lambda/x_1, \ldots, t_n\lambda/x_n, u_1/y_1, \ldots, u_n/y_n\}$$

by deleting any element $x_j/t_j\lambda$ for which $t_j\lambda = x_j$ and any element $y_i/u_i$ such that $y_i$ is among $(x_1, x_2, \ldots, x_n)$.

Example: Let $\theta = \{f(z)/x, y/z\}$ and $\lambda = \{a/x, b/y, y/z\}$. Then $\theta \cdot \lambda = \{f(b)/x, y/y, a/x, b/y, y/z\} = \{f(b)/x, y/z\}$ Definition: Unification. If a set A of well-formed expressions and $\theta$ is a substitution, then $\theta$ is said to unify A, or to be a unifer of A, if $A\theta$ is a singleton. Any set of well-formed expressions which has a unifer is said to be unifiable.

Example: The set $\{P(a, y), P(x, f(b))\}$ is unifiable since $\theta = \{a/x, f(b)/y\}$ is a unifier for the set.

| Pseudo-Code |
|---|

```
Define Transformation__CF(&args)
{∀ Pattern('(?lhs = ?op(?oplist)) ) ∈ &args:
        {Invoke the __CF method of Contract(?op)
        and if__CF method returns failure then Return (Fail);
        //Contract will search up the class hierarchy of ?op until
        //it finds a __Contract tag that names the class of the contract.
        //For the example, it will find the tag __Contract(RCW→OCVBV) and
        //thus invoke the __CF method of the contract class (RCW→OCVBV).
        Call scheduler to invoke, any triggerable optimization tags;
        }
Call scheduler to invoke any __On(CFWrapUp,....) transformations;
Call scheduler to invoke any __On(CFWrapUpEnd,....) transformations;
Return(True);
}
//Note: this is a version of the __CF method specialized to contract(gcon)
//which will be the __CF method for the class (RCW→OCVBV).
//Summary of CF's operation
//σ_gcon = {Unify arguments from call to gcon with formal parameter list of
//              gcon}
//σ_fill = {Unify the call of fill in gcon with formal parameter list of fill}°
//              σ_gcon
//σ_ValuesOfGlobals = {Symbolic execution of fill developing a set of
//                      substitutions for all global variables g:
//                      {∀g: SymbolicValue_g/VariableExpr_g}}
//σ_Meld = {Unify loop prefixes of gcon and fill} ° σ_Fill
//σ_ValuesOfGlobalsMeld =
//              {∀( SymbolicValue/VariableExpr) pairs in σ_ValuesOfGlobals
//                      { SymbolicValue σ_Meld/VariableExpr σ_Meld}}
Define Transformation __CF. (RCW→OCVBV) (&args)
        {∀ Pattern('(?lhs = ?Op(?OpArgs)) ∈ &args:
        //In the example case, this will be '(?lhs = gcon(?image, ?i, ?j, ?Template))
                {
                Deconstruct ?Template into ?FunPointer and ?GlobalStorage;
                //Compute the three substitution vectors
                Parms = Get parameter list from ?Op's decl;
                //In example, get gcon's parms
                σ_gcon = Unify (Parms, '(?Op ?OpArgs));
                //For example Unify(Parms, '(gcon ?image, ?i, ?j, ?template) );
                if(σ_gcon is null) Return(Nil);//failure
                σ_fill =
                ComposeSubstitutions(Unify(PrototypeOf(DeclOf(?FullPointer)),
                        CallSiteOf?FunPointer in body of?Op)), σ_gcon);
                if(σ_fill is null) Return(nil);//failure
                σ_ValuesOfGlobals = Symbolically execute ?FillPointer to get values of
                ?GlobalStorage;
                if(σ_ValuesOfGlobals is null or incomplete) Return(nil); //failure
                //Remove call to fill from body of ?Op and apply definitions to form
                //a new version of gcon that is specialized and has reordered the
                //computations of the global storage so that they are executed at the
```

| Pseudo-Code |
| --- |

```
            //point that each is needed
            //in the body of ?Op. As an option. We could throw away the ?Template
            //parameter as it is no longer needed. In this case, we will just let
            //the regular compiler do that work as part of its normal optimizations.
            NewOPDef = Form definition from PrototypeOf(DeclOf(?FillPointer))
            and
                    Substitute(RemoveFillCallSite(?FillPointer,
            BodyOf(DeclOf('gcon))), σ_fill);
            LoopOverA = Find pointer to Loop over neighborhood of image A;
            //Melding is different from a pure substitution because the Meld
            //transform insists on exact matching of the "variable expression" and
            //must verify compatibility of the Loop over neighborhood of A and the
            //loop of Fill;
            //Meld computes σ_Meld and σ_ValuesOfGlobalsMeld; it rewrites the
            //loop in gcon using the σ_ValuesOfGlobalsMeld
            //values; and applies σ_fill to all of the body of fill;
            if(Not(Meld(LoopOverA, σ_fill, σ_ValuesOfGlobals) ) ) Return (nil);
            Apply simplifications (i.e., fold constants, prune dead branches, etc.)
                    to NewOPDef;
            Inline Substitute(SigmaGcon, NewOPDef) at the old gcon call site;
            Return(True);//Success
            }
}
Define Transformation Meld(LoopOverA, σ_fill, σ_ValuesOfGlobals)
{
Compare quantification of (LoopOverAσ_fillCall) and of variables expressions
in (σ_ValuesOfGlobalsσ_fillCall).
If they are incompatible (e.g., different number of quantifiers or different
beginning and ending limits),
            then Return(Nil);          // note: a ∀ quantifier is compatible to be melded
into a Σ quantifier but not
                                                    // the reverse.
Compute σ_Meld = (σ_fill ° unification of quantifiers)
For all expr/value pairs in ValuesOfGlobals, make assoc list of pairs (expr
σ_Meld, value σ_Meld)
and perform substitution of each (value σ_Meld) for any (expr σ_Meld) in
LoopOverA;
If any action on the variables was a postable event, then post that event;
Return LoopOverA}
}
Define Function ConstantExpressionOf(vb1)
{
Scan current AST tree and find the set of all subtrees that are expressions
involving vbl;
Return that set;
}
Define Transformation _PromoteAboveLoop(IndexVariable,
SetOfSetOfPromotableExpressions)
//Each set in SetOfSetOfPromotableExpressions contains pointers to instances
of the COMMON
//        (i.e., SAME) expression in the tree.
{∀Sets ∈ SetOfSetOfPromotableExpressions:
            {
            Generate a unique temporary variable in Temp;
            Create a declaration for Temp, referenced as DeclOf(Temp),
            and promote DeclOf(Temp) to the top of the block containing the loop;
            Generate an assignment statement of the form:
                    PtrTo(DeclOf(Value(Temp))) '= FirstSubtree(Sets);
            and promote the statement just in front of the loop whose variable is
IndexVariable;
            {∀Instances ∈ Sets: Replace subtree pointed to by Instances with
            pointer to PtrTo(DeclOf(Value(Temp)));}
            }
If any action on the variables was a postable event, then post that event;
Return(True);
}
Define Transformation _PromoteToTopOfLoop(IndexVariable,
SetOfSetOfPromotableExpressions)
//Each set in SetOfSetOfPromotableExpressions contains pointers to instances
of the SAME expression
//in the tree.
{∀Sets ∈ SetOfSetOfPromotableExpressions:
            {
            Generate a unique temporary variable name in Temp;
            Create a declaration for Temp, referenced as DeclOf(Temp),
            and promote DeclOf(Temp) to the top of the block containing the loop;
            Generate an assignment statement of the form:
```

-continued

| Pseudo-Code |
|---|

```
                PtrTo(DeclOf(Temp)) '= FirstSubtree(Sets);
            and promote the statement to the top of but inside the loop whose
    variable is IndexVariable;
                {∀Instances ∈ Sets: Replace subtree pointed to by Instances with
                pointer to PtrTo(DeclOf(Temp));}
                }
    If any action on the variables was a postable event, then post that event;
    Return(True);
    }
    Define Function Substitute (ASTSubtree, σ)
    //Where σ = { vbl₁/value₁, vbl₂/value₂,...}
    {TempTree = copy ofASTSubtree
    ∀ { vbl/value } pair ∈ σ: Scan TempTree replacing each instance of vbl with
    value;
    Scan ASTSubtree looking for _On(SubstitutionOfMe, TransformExpression1)
    or
    _On(Substitution , TransformationExpression2) annotations,
            then schedule all TransformExrpession1's first in post order (i.e.,
    leaves first)
            followed by all TransformExrpession2's first in post order;
    Return(TempTree);
    }
    Define Transformation _UnWrapLoop(IndexVariable)
    {
    Set Start and Finish to the starting value of IndexVariable and the ending value
    of IndexVariable in the loop of the current AST, and Increment to the
    incrementing value;
    if(error in setting Start, Finish, or Increment) then Return(Nil);
    if(Finish-Start is not a constant) then Return (Nil);
    NewBlock = Create an empty code block;
    Body = The body of the target loop controlled by IndexVariable;
    {∀IndexValue ∈ {Start, Start+Increment, ...,Finish} :
            Create and Add the following new code block at the end ofNewBlock
            Substitute(( Create substitution vector {IndexValue/IndexVariable}),
        Body);}
    Replace the target loop controlled by IndexVariable with NewBlock;
    Trigger any transformations dependent on the AfterUnWrap event;
    Return(True);
    }
    Define Transformation _UnWrapIfSmallConstant(IndexVariable, Const)
    {if(Const is less than some threshold constant)
                then {If(Invoke UnWrapLoop(IndexVariable)) then Return(True); else
    Return(Nil)}}
                else Return(Nil);
    }
    //The unification based pattern matcher comprises the functions:
    //
    //          Unify(Expr1, Expr2)-Unify two structures returning a binding list
    //                              Sigma or nil for failure
    //          UnifyWithBindings(Expr1, Expr2, Sigma)-Unify two structures
    //                                              consistent with bindings
    //                                              Sigma
    //          VariableMatch(Variable, Item, Sigma)-Unify Variable and Item
    //                                              consistent with Sigma
    //          ContainedIn(Variable, Item, Sigma)-Return True if Variable is in Item
    //                                              under Sigma bindings
    //          AddBinding(Variable, Item, Sigma)-Return new binding list with
    //                                              (Variable, Item) cons to Sigma
    //          GetBinding(Variable, Sigma)-Return the Value associated with
    //                                              Variable on Sigma
    //
    //          See Wilensky 1986 for a deeper discussion of unification
    //          pattern matching
    //          See Robinson 1965 for the original paper that introduced unification
    //
    Define Function Unify (Expr1: expression, Expr2 : expression)
    {
    Decl substitution Sigma;
    Sigma = list( nil); //Exact match of constant structure, with no bindings needed
    Return(UnifyWithBindings(Expr1, Expr2, Sigma));
    }
    Define Function UnifyWithBindings (Expr1: expression, Expr2 : expression,
                                            Sigma : substitution)
    //Unify expressions Expr1 and Expr2 and return two values
    //(success flag, resulting bindings)
    //Sigma is the starting substitution vector
    {
```

-continued

Pseudo-Code

```
Decl substitution carBindings; //Bindings for first of structure
if(Either Expr1 or Expr2 has a __global tag)
            then Return (Expr1==Expr2 ? Sigma : nil) // where nil ==Fail
if(Expr1 is a variable) then Return (VariableMatch(Expr1, Expr2, Sigma));
if(Expr2 is a variable) then Return (VariableMatch(Expr2, Expr1,Sigma));
if atom(Expr1) then {if (Expr1 eq Expr2) then Return(Success with Bindings)}
if atom(Expr2) then Return (Failure with nil bindings);
//Both Expr1 and Expr2 are structures
//
(flag, carBindings) = UnifyWithBindings(First(Expr1), First(Expr2),Bindings);
//
if(flag eq nil) Return (nil); // First of each did not match
//First of structure matched, therefore Unify remainder
//           using carBindings bindings to assure consistency between
//           bindings of First and bindings of Rest
Return(UnifyWithBindings(rest(Expr1), rest(Expr2), carBindings));
}
Define Function VariableMatch(Variable, Item, Sigma)
{
if(equal(Variable, Item)) Return(Success and Sigma);
VarBinding = GetBinding(Variable, Sigma);
if(not(null(VarBinding))) //if there is a current binding
            then Return(UnifyWithBindings(VarBinding, Item, Sigma));
if(not(ContainedIn(Variable, Item, Sigma)))
//if Item does not contain Variable within it
            then Return(Success and bindings of AddBinding(Variable, Item,
                                                           Sigma));
Return(nil);
//Failed because of reference circularity (Item contains Variable within it)
}
Define Function ContainedIn(Variable, Item, Sigma)
{
//Obviously, Variable cannot be contained in an atomic item
if(atom(Item)) then Return(nil);
if(Item is a variable)
            then Return(Or( (Variable == Item) //True if they are equal
                            //Else may be contained in the value bound to Item
                            ContainedIn(Variable,
                                        GetBinding(Item, Sigma), Sigma)));
                    //Else Search the substructure of Item
            else Return(Or(ContainedIn(Variable, First(Item), Sigma)
                            ContainedIn(Variable, Rest(Item), Sigma)));
}
Define Function AddBinding(Variable, Item, Sigma)
{
Return(Cons( List(Variable, Item), Sigma));
//cons binding onto front of Sigma and return it
}
Define Function GetBinding(Variable, Sigma)
{
if(∃Pair ∈ Sigma such that First(Pair)==Variable)
            then Return(Second(Pair));
            else Return(nil);//not found
}
Define Operator ° (θ: substitution , τ : substitution) : substitution
{Return ( ComposeSubstitutions(θ,τ)) }
Define Function ComposeSubstitutions(θ: substitution , λ : substitution):
substitution
{
```
$\sigma_{return} = '(nil\ )$ ;
$\{\forall\{x_i/t_i\} \in \theta :$
            $t_j\tau = ApplyComposition(\tau, t_i)$ ;
            $if(not(Member^*(x_i , t_j\tau)))$ then $\sigma_{return} = AddBinding(x_i, t_j\tau, \sigma_{return})$
            ;}
$\{\forall\{y_i/u_i\} \in \tau:$
            $if(not(GetBinding(y_i, \theta)))$ then $\sigma_{return} = AddBinding(y_i, u_i, \sigma_{return})$ ; }
$Return(\sigma_{return})$ ;
```
}
Define Function MemberAnyWhere(Item, Structure)
{
if(Structure is an atom)
            then Return (if (equal(Item, Structure)) then True else Nil);
if(MemberAnyWhere (Item, First(Structure)) then Return(Nil);
            else Return(MemberAnyWhere(Second(Structure)));
}
Define Function ApplySubstitution (σ : substitution, expr : expression) :
expression
```

-continued

Pseudo-Code

```
{
if (expr is a constant) then Return(expr);
if(expr is a variable)
then {if ( t_j = GetBinding(expr, σ ))
            then {If t_j has an OnSubstitutionOfMe tag, schedule the attached
                transformation invocation; Return (t_j );}
            else Return(expr);}
if(expr is a structure) //data or control structure
            then {If expr has an OnSubstitutionOfMe tag
                then schedule the attached transformation invocation;
                Return( cons(ApplySubstitution(σ , First(expr)),
            ApplySubstitution(σ,Rest(expr)));}
Return(expr);
}
Define Transformation _Fold0 ()
{Loop applying the following transformations on subtrees above current node
(i.e., 0) which contain
    the current instance of 0 as a leaf until no further patterns apply:
            ?X + 0 ⇒   ?X
            0 + ?X ⇒   ?X
            ?X * 0 ⇒   0
            0 * ?X ⇒   0
            ?X / 0 ⇒   *Error*
            0 / ?X ⇒   0
            {?X ?AnyArithOp= 0} ⇒  φ       // where this includes +=,−=,etc.,and φ means
            eliminate statement
            { ∀fp...: φ } ⇒  φ
If any action on the variables was a postable event, then post that event;
}
Define Transformation _Fold1 ()
{Loop applying the following transformations on subtrees above current node
(i.e., 1) which contain
    current instance of 1 as a leaf until no further patterns apply:
            ?X * 1 ⇒   ?X
            ?X / 1 ⇒   ?X
            1 * ?X ⇒   ?X
            {?X ?arithop= 1} ⇒  ?X    ; where this includes *= and /=
            { ∀fp...: 1 } ⇒   1
If any action on the variables was a postable event, then post that event;
}
Define Transformation _RemoveUndefined ()
{
//Find 'undefined value in current AST and search up the AST looking for the
largest value expression //subtree containing only 'undefined or conditional
value expressions;
?Value = current 'undefined node
loop {
            if subtree containing ?Value matches
                '(if?P1 (then ?Value) (else ?X))
            then {?Value = the '(if?P1 (then ?Value) (else ?X)) subtree;}
            else {if subtree containing ?Value matches
                '(if ?P1(then ?X) (else ?Value))
                    then ?Value = the '(if ?P1 (then ?X) (else ?Value))
                                        subtree;}
                    else terminate loop;
        }
if ?Value exactly equals 'undefined, then delete statement and Return(True);
if whole statement matches (?Pre ?Value ?Post) and
            ?Value matches '(if ?P1 (then ?A) (else ?B))
            then {
                    if (?A== 'undefined) then {Replace current statement with
                            '{if ?P1 (then { }) (else {?Pre ?B ?Post}) }
                            Return(True); }
                    if (?B== 'undefined) then {Replace current statement with
                            '{if ?P1 (then {?Pre ?A ?Post}) (else { }) }
                            Return(True); }
                    else {Replace current statement with
                            '{if ?P1 (then {?Pre ?A ?Post })
                                (else {?Pre ?B ?Post}) }
                    Attach _RemoveUndefined on 'undefined node in ?A or ?B and
                            recursively invoke self on that node;
            If any action on the variables was a postable event, then post that event;
                    Return(True); }
            }
}
Define Transformation _MergeCommonCondition ()
{
```

-continued

Pseudo-Code

Find candidate "if" expressions that are contiguous.
Check to assure that candidate "if" expressions are at the statement level.
If not, call IncorporateContext transformation. If it fails, return failure.
Otherwise execute the rule :
        if( '(if?C1 (then ?bodyA)
                     (else ?bodyC ) ) matches the first if candidate
        and '(if(?C2) (then ?bodyD )
                     (else ?bodyE )) matches the first if candidate
        and (?C1==?C2)
        then replace both candidates with
        (if(?C1) (then (?bodyA; ?bodyD))
                     (else (?bodyC ; ?bodyE )))
If any action on the variables was a postable event, then post that event;
If successful then return(true) else return (nil);
}
Define Function SymbolicExecute (Function: expression, Sigma : substitution)
{
//Find the statement of purpose and get list of global variables to be assigned to
If (At function definition level and Not(Find Pattern(?Purpose ?AssignList))
        then Return (nil); // Failure
If (At function definition level)
        then Find all variables declared as externals:
                      {Tag each instance with '_global;
                      Globals = Globals $\cup$ {variable};}
Walk definition tree and for each expr:
        {
        //Assignment statement where target is a shared global,
        //or a variable or structure declared as shared by Purpose statement
        if(Or (Match(Pattern(?LHS (tags ... '_global) '= ?ValueExpr) , expr),
                And( Match(Pattern(?LHS '= ?ValueExpr) , expr)
                    Or (?LHS $\in$ ?AssignList, PartOf(?LHS) $\in$ ?AssignList))
                then Sigma = append(Sigma, {?ValueExpr/?LHS});
        //Iterator. No action on iterator variables as these will be free variables
        //that are expected to be bound to their counterparts in the target
        //meld loop, but process body for additional bindings.
        if(expr is an '{?Iterator: ?Body})
                then Sigma = SymbolicExecute(?Body, Sigma);
        }
Return (Sigma);
}
Define Transformation _SchedFoldFlows ()
{
Set ?vbl to current node;
Set ?tags to tags of ?vbl;
If(not(Pattern ('(flowsto ?targetstmt) ?tags))) then return(nil);
If(not(Pattern ('(requires ?vblset) ?targetstmt))) then return (nil);
if(not ($\forall$Blockp : ((T1 $\in$ Blockp) iff(T2 $\in$ Blockp))
        where Blockp contains some origin of the flow)
        then return(nil);
;Some origin block does not originate all of the flows (at least not yet)
?vblset = remove ?vbl from ?vblset;
?AssignStmt = Find assignments of variables in ?vblset;
Remove the tag '(_ON (MigrationIntoBlockOf ,LHS(?AssignStmt))
(_SCHEDFOLDFLOWS,?vblset))) from ?AssignStmt
If any action on the variables was a postable event, then post that event;
If($\exists$ ?vbl in ?vblset such that { $\exists$ ?AssignStmt of the form ?vbl = ?const and
?const is a constant:
    {Affix '(_FOLDFLOWS ,?targetstmt) where ?targetstmt points to the inner
    most block that contains all items of this flow structure (i.e., the ?targetstmt
    with the _requires tag and all statements with tags indicating flows to
    ?targetstmt.) and schedule for execution after the transformation that was
    interrupted by _SCHEDFOLDFLOWS is done ;}
        then return (true);
        else return (nil);
}
Define Transformation _FoldFlows (expr vblset)
{
$\forall$?vbl in vblset: if (binding of vbl is a constant) replace expr with
                (ApplySubstitution '(binding(?vbl) ?vbl) expr);
Simplify expression via partial evaluation;
If any action on the variables was a postable event, then post that event;
return result of simplification;
}
Define Transformation _MoveAssignmentIntoIF ()
{
if (match('(?vbl = (if ?cond (then ?thenexpr) (else ?elseexpr))),
        current expression))

-continued

Pseudo-Code

```
then {Replace current subtree with '( if ,?cond      (then (,?vbl = ,?thenexpr))
                                                    (else (,?vbl = ,?elseexpr)))
         if any action on the variables was a postable event, then post that event;
         return(true);}
return(nil):
}
Pattern notes refresher:
         1) The form $(por A B) will match A or B
         2) $(bindvar ?vbl PatternExpr) causes whatever PatternExpr matches
            to be bound to the variable ?vbl
         3) Inside a backquoted expression (i.e., '( ... )), a comma before
            an expression means that the expression following the comma is to
            be evaluated and the result put into the backquoted expression.
            E.g., if ?cond is bound to the expression '(< x 10) then the
            backquoted expression '(if,?cond ...) becomes '(if (< x 10) ...)
Define Transformation __PromoteConditionAboveLoop (ifexpr)
{
if ifexpr is not at the loop body level
then {if (not(invoke __PromoteConditionAboveExpression on ifexpr))
                    return (nil)}
if(not (match( '( $(bindvar ?Quantifier $(por __Sum __Forall)) ?vbllist ?suchthat
?loopbody) parentof(ifexpr))))
         then return (nil);
if(not (match('(if ?condexpr (then ?thenclause) (else ?elseclause)) ?loopbody)))
         then return(nil);
Replace expr with
'(if ,condexpr (then (,?Quantifier ,?vbls ,?suchthat
                                   (,?operator ,?operand ,?thenclause)))
               (else (,?Quantifier ,?vbls ,?suchthat
                                   (,?operator ,?operand ,?elseclause))));
if any action on the variables was a postable event, then post that event;
return(true);
}
Define Transformation __PromoteConditionAboveExpression (ifexpr )
{
if(not (match('(?operand ?operator
                            (if ?condexpr (then ?thenclause)
                                          (else ?elseclause))) parentof(ifexpr))))
         then return(nil);
Replace parentof(ifexpr) with
         '(if ,?condexpr (then (,?operand ,?operator ,?thenclause))
                         (else (,?operand ,?operator ,?elseclause))))
if any action on the variables was a postable event, then post that event;
return(true);
}
```

[2]Expressions of terms and literals.

One skilled in the art would appreciate that the transforms illustrated for the image domain implementation are not all the transformations required for a complete implementation of the image domain but are illustrative of transforms needed to create such a complete implementation. Also, the AO system is described in terms of examples for fusing the loop structures of high-level operators applied to composite data structures. When the AO system applies transforms with different sets of user-defined optimization rules, the AO system can achieve the sharing of low-level operations among other kinds of definitions for high-level data structures and operators, including but not limited to high-level operations that are recursively defined, high-level definitions that are enumerated lists of low-level operations, and operations that are expressed as distributed, cooperating pieces of the overall operation definition.

From the foregoing it will be appreciated that, although specific embodiments of the invention have been described herein for purposes of illustration, various modifications may be made without deviating from the spirit and scope of the invention. The anticipatory optimization techniques apply to any domain even though the examples that we have chosen to illustrate it are focused on the graphics imaging domain. Similar optimization problems arise in every domain regardless of its structure and details. For example, other domains to which anticipatory optimization can be applied are networking, business systems, telephony, productivity applications, databases, and so forth. In addition, the optimization tags shown are narrowly focused on the explanatory example but this is not intended to indicate any inherent limitation of the applicability of the technique. The kinds (e.g., quantifier) and form; of the optimization tags may be extended in arbitrary ways to extend the applicability of the technique to new domains, new transformations, and new kinds of optimizations. Anticipatory optimization applies to many kinds of optimizations. It applies to any redundant or non-optimal code that might arise from any composition of any abstractions. For example, suppose that two separate abstractions A and B compile into code that contains a redundant step, for example, an initialization or normalization step that is only required to happen once in the overall composition. Anticipatory optimization can handle this case in the following way. A and B are both tagged with an expression identifying code chunks (e.g., the initialization step) that are candidates for pruning if they occur previously in the generated code. Transforms migrate those tags (or alternatively, migrate a temporary form of "migratory tag") up the AST until both reside on the same AST node. At this point, a separate transform adds new tags to A and B that will inform the code generator to coordinate the generation of the code for A and B such that the initialization step will be generated only once and that once will be in the earliest code to be executed. If A will get executed first, then the initialization code will be generated for it but not for B. If B is the first in the execution stream of the generated code, then the initialization step will be generated in B but not in A. If the control structure is such that the execution order of A and B is indeterminate, then either the tag will never migrate up to the same node in the AST (i.e., the indeterminacy of execution order can be determined from the abstractions in the composition) or the code generator cannot perform the optimization and will generate the initialization step in the code for both A and B. Also, when matrices of different sizes are used in an operation, a transform can be applied to indicate how to handle the non-overlapping elements. Arbitrary kinds of abstractions can be handled. For example, even composition of concrete components (e.g., Java or ActiveX components) that might be optimized through compilation could be dealt with by anticipatory optimization. Accordingly, the invention is not limited except as by the appended claims.

What is claimed is:

1. A method in a computer system for generating code for a high-level program that is specified using programming-language-defined computational constructs and that is to be translated into a low-level computer program using low-level computational constructs, the programming-language-defined computational constructs defining a data flow and including high-level operands that are domain-specific composites of low-level computational constructs and including high-level operators for indicating operations on the high-level operands, the method comprising:

identifying selected domain-specific composites within the programming-language-defined computational constructs; and applying one or more abstract optimization tags to the programming-language-defined computational constructs in association with the selected domain-specific composites, the one or more abstract optimization tags identifying one or more anticipated optimization transformations for modifying the data flow in the translation from the high-level program to the low-level program.

2. The method of claim 1 in which the composites include separate components and modifying the data flow in the translation from the high-level program to the low-level program includes melding the separate components from different composites.

3. The method of claim 1 in which the composites include separate components and modifying the data flow in the translation from the high-level program to the low-level program includes reorganizing components from the composites.

4. The method of claim 1 in which the data flow defined by the high-level computational constructs includes a shared storage element and modifying the data flow in the translation from the high-level program to the low-level program includes elimination of the shared storage element.

5. The method of claim 1 in which the data flow defined by the high-level computational constructs includes plural loop structures and modifying the data flow in the translation from the high-level program to the low-level program includes identifying at least one of the loop structures as redundant and eliminating the redundant loop structure.

6. The method of claim 1 further comprising inlining the programming-language-defined computational constructs to form an inlined representation of the programming-language-defined computational constructs with the one or more abstract optimization tags to the programming-language-defined computational constructs in association with the selected domain-specific composites.

7. The method of claim 1 further comprising defining the domain-specific composites of low-level computational constructs in accordance with a contract standard establishing selected data flow requirements between the low-level computational constructs.

8. The method of claim 1 further comprising defining the domain-specific composites of low-level computational constructs in accordance with a contract standard establishing selected data reference requirements between the low-level computational constructs.

9. The method of claim 1 further comprising defining the domain-specific composites of low-level computational constructs in accordance with a confinement property contract standard confining relationships between domain specific operator and operand definitions to predetermined, fixed relationships.

10. The method of claim 1 further comprising defining the domain-specific composites of low-level computational constructs in accordance with a confined referential transparency property contract standard establishing that symbolic values that are equal in different expressions may be used interchangeably between those expressions.

11. The method of claim 1 further comprising defining the domain-specific composites of low-level computational constructs in accordance with a common canonical quantification property contract standard establishing a common canonical form for quantified computations on shared data in a composite method and a domain specific operator.

12. The method of claim 1 further comprising defining the domain-specific composites of low-level computational constructs in accordance with a problem specific notational extensions property contract standard establishing a notation in which operator implementations and composite methods can express relevant relationships among parameters, global variables, and local variables.

13. The method of claim 1 further comprising defining the domain-specific composites of low-level computational constructs in accordance with a single assignment property contract standard establishing that each assignment of a value to a shared variable shall be accomplished by a single assignment.

14. The method of claim 1 further comprising:

generating an abstract syntax tree (AST) representation of the programming-language-defined computational constructs, the AST having nodes representing the computational constructs of the program; and applying the one or more abstract optimization tags to the programming-language-defined computational constructs includes applying the optimization tags to the AST.

15. The method of claim 1 in which the domain-specific composites are of the graphics imaging domain.

16. In a computer readable data storage medium having therein a high-level program that is specified using programming-language-defined computational constructs and that is to be translated into a low-level computer program using low-level computational constructs, the programming-language-defined computational constructs including high-level operands that are composites of low-level computational constructs and including high-level operators for indicating operations on the high-level operands, an optimization tag data structure, comprising:

an anticipated optimization transformation in the translation from the high-level program to the low-level program; and a transformation condition identifying a condition for attempting the anticipated optimization in the translation from the high-level program to the low-level program.

17. The medium of claim 16 wherein the transformation condition relates to a localized condition in the high-level program.

18. The medium of claim 16 wherein the transformation condition relates to a cross-operator condition in the high-level program.

19. The medium of claim 16 wherein the transformation condition relates to a condition indicating finalization of the optimization of the high-level program.

20. The medium of claim 16 wherein the optimization transformation effects a folding of composites within the programming-language-defined computational constructs.

21. The medium of claim 16 wherein the optimization transformation includes merging conditions within different composites within the programming-language-defined computational constructs.

22. The medium of claim 16 wherein composites of the programming-language-defined computational constructs include computational conditions and the optimization transformation includes merging computational conditions within different composites of the programming-language-defined computational constructs.

23. The medium of claim 16 wherein composites of the programming-language-defined computational constructs include computational loops with conditions therein and the optimization transformation includes promoting the conditions above the computational loops.

24. The medium of claim 16 wherein a composite of the programming-language-defined computational constructs includes an undefined term and the optimization transformation includes removing the undefined term.

25. The medium of claim 16 wherein a composite of the programming-language-defined computational constructs includes a user-definable small number of terms and the optimization transformation includes unfolding the computational construct.

26. The medium of claim 16 wherein the transformation condition relates to a scheduled event in optimization of the program.

27. The medium of claim 16 wherein the transformation condition relates to an unscheduled event in optimization of the program.

28. The medium of claim 16 wherein the transformation condition is parameterized to define an ordering preference for the optimization transformations.

29. The medium of claim 16 wherein the optimization transformation relates to a computer processing format.

30. The medium of claim 29 wherein the optimization transformation relates to a sequential computer processing format.

31. The medium of claim 29 wherein the optimization transformation relates to a vector computer processing format.

32. In a computer readable data storage medium software instructions for generating code for a high-level program that is specified using programming-language-defined computational constructs and that is to be translated into a low-level computer program using low-level computational constructs, the programming-language-defined computational constructs defining a data flow and including high-level operands that are domain-specific composites of low-level computational constructs and including high-level operators for indicating operations on the high-level operands, comprising:

software instructions for applying one or more abstract optimization tags to the programming-language-defined computational constructs in association with the selected domain-specific composites, the one or more abstract optimization tags identifying one or more anticipated optimization transformations for modifying the data flow in the translation from the high-level program to the low-level program.

33. The medium of claim 32 in which each of the one or more abstract optimization tags includes a transformation condition identifying a condition for attempting the anticipated optimization in the translation from the high-level program to the low-level program.

34. The medium of claim 33 wherein at least one transformation condition relates to a localized condition in the high-level program.

35. The medium of claim 33 wherein at least one transformation condition relates to a cross-operator condition in the high-level program.

36. The medium of claim 33 wherein at least one transformation condition relates to a condition indicating finalization of the optimization of the high-level program.

37. The medium of claim 33 wherein the transformation condition relates to a scheduled event in optimization of the program.

38. The medium of claim 33 wherein the transformation condition relates to an unscheduled event in optimization of the program.

39. The medium of claim 33 wherein the transformation condition is parameterized to define an ordering preference for the optimization transformations.

40. The medium of claim 32 wherein the optimization transformation effects a folding of composites within the programming-language-defined computational constructs.

41. The medium of claim 32 wherein the optimization transformation relates to a sequential computer processing format.

42. The medium of claim 32 wherein the optimization transformation relates to a vector computer processing format.

43. A method for generating code for a high-level program that is specified using programming-language-defined computational constructs and that is to be translated into a low-level computer program using low-level computational constructs, the programming-language-defined computational constructs including high-level operands that are domain-specific composites of low-level computational constructs and including high-level operators for indicating operations on the high-level operands, comprising:

identifying an optimization event;

identifying each abstract optimization tag applied to the programming-language-defined computational constructs and having a transformation condition identifying the optimization event as a condition for attempting an anticipated optimization in the translation; and attempting execution of each of the anticipated optimization transformations associated with the optimization event.

44. The method of claim 43 in which the abstract optimization tags are arranged in the programming-language-defined computational constructs in a sequential order and in which the anticipated optimization transformations are attempted in the sequential order of the optimization tags.

45. The method of claim 43 in which the optimization event is a scheduled event that occurs upon a scheduled basis.

46. The method of claim 43 in which the optimization event is an unscheduled event that does not occur upon a scheduled basis.

47. The method of claim 46 in which the abstract optimization tags are arranged in the programming-language-defined computational constructs in a sequential order and in which the anticipated optimization transformations associated with unscheduled events are attempted in the sequential order of the optimization tags.

48. The method of claim 43 in which the transformation condition includes a logical combination of plural conditions.

49. A method in a computer system for generating code for a program, the program being specified using programming-language-defined computational constructs and user-defined, domain-specific computational constructs, the computational constructs including high-level operands that are domain-specific composites of low-level computational constructs, the method comprising:
  generating in a loop merging process an abstract syntax tree (AST) representation of the program, the AST having nodes representing the computational constructs of the program and abstract optimization tags for folding of the composites; and
  applying a composite finding process to the AST according to the optimizations tags to generate optimized code for the program.

50. The method of claim 49 wherein the composite folding process includes:
  identifying an optimization event;
  identifying each abstract optimization tag, applied to the programming-language-defined computational constructs and having a transformation condition identifying the optimization event as a condition for attempting an anticipated optimization in the translation; and
  attempting execution of each of the anticipated optimization transformations associated with the optimization event.

51. The method of claim 49 wherein the computer system uses multiple phases and each user-defined, domain-specific transform has an associated phase during which it can transform the AST.

52. The method of claim 49 in which the optimization event is a scheduled event that occurs, upon a scheduled basis.

53. The method of claim 49 in which the optimization event is an unscheduled event that does not occur upon a scheduled basis.

54. A method for generating code for a high-level program that is specified using programming-language-defined computational constructs and that is to be translated into a low-level computer program using low-level computational constructs, the high-level computational constructs including high-level operands that are domain-specific composites of low-level computational constructs and including high-level operators for indicating operations on the high-level operands, comprising:
  identifying an optimization event;
  identifying each abstract optimization tag applied to the programming-language-defined computational constructs and having a transformation condition identifying the optimization event as a condition for attempting an anticipated optimization in the translation, the abstract optimization tags being arranged in the programming-language-defined computational constructs in a sequential order; and
  attempting execution of each of the anticipated optimization transformations associated with the optimization event, at least a pair of the anticipated optimization transformations being attempted in an indicated sequential order different from the sequential order of the optimization tags.

55. The method of claim 54 in which the optimization event is a scheduled event that occurs upon a scheduled basis.

56. The method of claim 54 in which the optimization event is an unscheduled event that does not occur upon a scheduled basis.

57. The method of claim 56 in which the abstract optimization tags are arranged in the programming-language-defined computational constructs in a sequential order and in which the anticipated optimization transformations associated with unscheduled events are attempted in the sequential order of the optimization tags.

58. The method of claim 57 in which an attempt of the anticipated optimization transformation associated with the unscheduled event interrupts the attempt of the anticipated optimization transformation associated with the scheduled event.

59. The method of claim 54 in which the transformation condition includes a logical combination of plural conditions.

60. The method of claim 54 in which at least one of the optimization tags is generated automatically in response to the optimization transformation in another of the optimization tags.

61. A method for generating code for a high-level program that is specified using programming-language-defined computational constructs and that is to be translated into a low-level computer program using low-level computational constructs, the high-level computational constructs including high-level, operands that are domain-specific composites of low-level computational constructs and including high-level operators for indicating operations on the high-level operands, comprising:
  identifying an optimization event including an unscheduled event that does not occur upon a scheduled basis;
  identifying each abstract optimization tag applied to the programming-language-defined computational constructs and having a transformation condition identifying the optimization event as a condition for attempting an anticipated optimization in the translation, the abstract optimization tags being arranged in the programming-language-defined computational constructs in a sequential order; and
  attempting execution of each of the anticipated optimization transformations associated with the optimization event, the anticipated optimization transformations associated with unscheduled events being attempted in the sequential order of the optimization tags and an attempt of the anticipated optimization transformation associated with the unscheduled event interrupting the attempt of the anticipated optimization transformation associated with the scheduled event.

62. The method of claim 61 in which the abstract optimization tags are arranged in the programming-language-defined computational constructs in a sequential order and in which at least a pair of the anticipated optimization transformations are attempted in an indicated sequential order different from the sequential order of the optimization tags.

63. The method of claim 61 in which the transformation condition includes a logical combination of plural conditions.

64. The method of claim 61 in which at least one of the optimization tags is generated automatically in response to the optimization transformation in another of the optimization tags.

65. A method for generating code for a high-level program that is specified using programming-language-defined computational constructs and that is to be translated into a low-level computer program using low-level computational constructs, the high-level computational constructs including high-level operands that are domain-specific composites of low-level computational constructs and including high-level operators for indicating operations on the high-level operands, comprising:

identifying an optimization event;

identifying each abstract optimization tag applied to the programming-language-defined computational constructs and having a transformation condition identifying the optimization event as a condition for attempting an anticipated optimization in the translation, at least one of the optimization tags being generated automatically in response to the optimization transformation in another of the optimization tags; and attempting execution of each of the anticipated optimization transformations associated with the optimization event.

66. The method of claim 65 in which the abstract optimization tags are arranged in the programming-language-defined computational constructs in a sequential order and in which the anticipated optimization transformations are attempted in the sequential order of the optimization tags.

67. The method of claim 65 in which the abstract optimization tags are arranged in the programming-language-defined computational constructs in a sequential order and in which at least a pair of the anticipated optimization transformations are attempted in an indicated sequential order different from the sequential order of the optimization tags.

68. The method of claim 65 in which the optimization event is a scheduled event that occurs upon a scheduled basis.

69. The method of claim 65 in which the optimization event is an unscheduled event that does not occur upon a scheduled basis.

70. The method of claim 69 in which the abstract optimization tags are arranged in the programming-language-defined computational constructs in a sequential order and in which the anticipated optimization transformations associated with unscheduled events are attempted in the sequential order of the optimization tags.

71. The method of claim 70 in which an attempt of the anticipated optimization transformation associated with the unscheduled event interrupts the attempt of the anticipated optimization transformation associated with the scheduled event.

72. The method of claim 65 in which the transformation condition includes a logical combination of plural conditions.

* * * * *